United States Patent
Ando et al.

(10) Patent No.: US 7,292,524 B2
(45) Date of Patent: Nov. 6, 2007

(54) INFORMATION RECORDING MEDIUM, INFORMATION REPRODUCING APPARATUS, INFORMATION REPRODUCING METHOD AND INFORMATION RECORDING METHOD

(75) Inventors: Hideo Ando, Yokohama (JP); Yutaka Kashihara, Chigasaki (JP); Akihito Ogawa, Kawasaki (JP); Hideki Takahashi, Kashiwa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/564,462

(22) Filed: Nov. 29, 2006

(65) Prior Publication Data

US 2007/0097844 A1    May 3, 2007

Related U.S. Application Data

(63) Continuation of application No. 11/085,516, filed on Mar. 22, 2005.

(30) Foreign Application Priority Data

Mar. 26, 2004    (JP)    .............................. 2004-092864

(51) Int. Cl.
    G11B 7/00    (2006.01)
(52) U.S. Cl. ................................ 369/275.3; 369/47.53
(58) Field of Classification Search .. 369/275.1–275.5, 369/59.25, 94, 30.04, 52.1, 288, 30.37, 30.07, 369/53.1, 283, 47.53; 428/64.4; 714/710
    See application file for complete search history.

(56) References Cited

U.S. PATENT DOCUMENTS

2007/0133379 A1*    6/2007    Ando et al. .............. 369/275.3
2007/0153661 A1*    7/2007    Ando et al. .............. 369/59.25

FOREIGN PATENT DOCUMENTS

| JP | 3090316 | 7/2000 |
| JP | 2001-273637 | 10/2001 |
| KR | 10-2004-0016503 | 2/2004 |
| WO | WO 03/079335 A1 | 9/2003 |
| WO | WO 2004/017314 A1 | 2/2004 |

* cited by examiner

*Primary Examiner*—Ali Neyzari
(74) *Attorney, Agent, or Firm*—Oblon, Spivak, McClelland, Maier & Neustadt, P.C.

(57) ABSTRACT

An information recording medium includes a user information storage area which stores user information, a test write area which is extendable and for test write of information, a spare area which is extendable and capable of alternatively storing user information, and a recording position management information area including recordable range information expressing recordable ranges in the aforesaid test write area and the aforesaid spare area. The information recording medium, an information reproducing apparatus, an information reproducing method and an information recording method which make it easy to record and reproduce information properly are provided.

5 Claims, 88 Drawing Sheets

FIG. 1

| POINT CONTENT | CORRESPONDING DRAWINGS | EFFECT/COMBINATION NUMBERS | 1 | 2 | 3 | 4 | 5 | 6 |
|---|---|---|---|---|---|---|---|---|
| A) USE PRML FOR REPRODUCTION IN DATA AREA, DATA LEAD-IN AREA, DATA LEAD-OUT AREA | FIG.9 FIG.13 | HIGH DENSIFICATION OF INFORMATION STORAGE MEDIUM LINE DENSITY IS ENHANCED ESPECIALLY | ○ | ○ | ☆ | | | ◎ |
| A1) UTILIZE PR (1, 2, 2, 2, 1) | FIG.11 | DENSIFICATION + REPRODUCTION SIGNAL RELIABILITY | ◎ | ◎ | ☆ | | △ | ◎ |
| A2) DISPOSE REFERENCE CODE RECORDING ZONE ADJACENTLY TO DATA AREA | FIG.21 | ENHANCE CIRCUIT ADJUSTMENT ACCURACY | | ◎ | ○ | | △ | △ |
| A3) REPEAT "3T3T6T" FOR REFERENCE CODE PATTERN | FIG.21 | OPTIMIZE TO ETM&RLL (1,10) AND PRML | | ☆ | | | △ | △ |
| B) USE SLICE LEVEL DETECTION METHOD FOR REPRODUCTION IN SYSTEM LEAD-IN AREA AND SYSTEM LEAD-OUT AREA | FIG.7 FIG.13 | SECURE COMPATIBILITY WITH CURRENT DVDSTABILIZE REPRODUCTION | ◎ | ◎ | ○ | | | △ |
| B1) MAKE DENSITY OF SYSTEM LEAD-IN/OUT AREA LOWER THAN THAT OF DATA LEAD-IN/OUT AREA | FIG.18 to FIG.20 | SECURE COMPATIBILITY WITH CURRENT DVDSTABILIZE REPRODUCTION | ◎ | ◎ | △ | | | △ |
| B2) SYSTEM LEAD-IN AREA AND BURST CUTTING AREA ARE DISTRIBUTIVELY DISPOSED | FIG.13 | PREVENT INTERFERENCE BETWEEN SYSTEM LEAD-IN INFORMATION AND BCA INFORMATION TO ENHANCE REPRODUCTION ACCURACY | △ | △ | △ | | | △ |
| B3) FORM MICROSCOPIC ASPERITIES IN BURST CUTTING AREA BY L→H FILM | FIG.13 | DETECTION LEVELS AGREE IN BCA AND SYLDI → PROCESSING IS EASY | △ | △ | | | | ☆ |
| B4) SYSTEM LEAD-IN AREA IS DISPOSED AT OPPOSITE SIDE OF DATA AREA WITH DATA LEAD-IN AREA THEREBETWEEN | FIG.13 FIG.21 | BECAUSE NUMBER OF TIMES OF REPRODUCTION CIRCUIT SWITCHING ALONG REPRODUCTION PROCEDURE IS SMALL, DATA AREA REPRODUCTION STARTING TIME BECOMES EARLY | ○ | ○ | △ | | | |
| C) MANAGEMENT INFORMATION AREA FOR DEFECT MANAGEMENT IS EXTENDABLE (RMZ, ETC.) | FIG.31 | ENHANCEMENT OF RELIABILITY OF RECORDED INFORMATION | | | ○ | ○ | ◎ | |
| C1) (IN RECORDABLE TYPE) MAKE SPARE AREA EXTENDABLE AND MANAGE IT IN RMD | FIG.23 FIG.31 | MEDIA HAVING MANY DEFECTS FOR REASON OF MANUFACTURE IS SELLABLE MANUFACTURE YIELD OF MEDIA IS ENHANCED AND REDUCTION IN PRICE IS POSSIBLE | | | ○ | ○ | ☆ | |
| C2) RECORD ALREADY USED AMOUNT OR REMAINING AMOUNT INFORMATION OF SPARE AREA IN RMD | FIG.31 | PRESENCE OR ABSENCE OF NECESSITY OF RESET OF EXTENDED SPARE AREA CAN BE KNOWN | | | ○ | ○ | ◎ | |
| C3) HAVE MANAGEMENT INFORMATION CONCERNING MULTIPLEXING MODE RECORDING | FIG.32 | SECURE HIGH INFORMATION RELIABILITY AFTER RECORDING (COUNTERMEASURE AGAINST FLAW AND DUST) | | | ○ | ○ | ◎ | |
| D) DISPOSE SERVO CALIBRATION AREA FORMED BY EMBOSS PIT AT OUTER PERIPHERAL PART | FIG.23 | INCLINATION AMOUNT DETECTION USING DPD METHOD INCLINATION CAN BE EASILY DETECTED AND SERVO STABILIZATION IS ENSURED | △ | ○ | ◎ | △ | ○ | |
| D1) CONFORM TRACK PITCH OF SERVO CALIBRATION AREA TO OTHER AREAS IN DATA LEAD-OUT AREA | FIG.23 | MANUFACTURABILITY OF INFORMATION STORAGE MEDIUM ESPECIALLY IN RECORDABLE TYPE IS ENHANCED | △ | ○ | ○ | △ | △ | |
| D2) CONFORM TRACK PITCH OR DATA BIT LENGTH OF SERVO CALIBRATION AREA TO SYSTEM LEAD-IN AREA | FIG.23 | CORRELATION WITH INCLINATION AMOUNT/DIRECTION DETECTION RESULT IN SYSTEM LEAD-IN AREA USING DPD METHOD IS EASILY TAKEN. | △ | ○ | ○ | △ | △ | |

FIG.2

| POINT CONTENT | CORRESPONDING DRAWINGS | EFFECT/COMBINATION NUMBER | 1 | 2 | 3 | 4 | 5 | 6 |
|---|---|---|---|---|---|---|---|---|
| E) HAVE RECORDABLE RANGE INFORMATION IN RMD | FIG.30 | HIGH-SPEED DETECTION OF REMAINING AMOUNT IN RECORDABLE RANGE IS POSSIBLE | △ | | | ○ | ○ | |
| E1) DESCRIBE RECORDABLE RANGE INFORMATION IN ECC BLOCK ADDRESS NUMBER | FIG.30 | HIGH-SPEED ACCESS TO UNRECORDED AREA DATA SIZE IS SMALL | △ | | | ○ | ○ | |
| E2) MAKE EXTENSION OF DRIVE TEST ZONE POSSIBLE | FIG.23 | INCREASE NUMBER OF TEST WRITINGS AND MAKE IT POSSIBLE TO ENHANCE RECORDING ACCURACY | ☆ | | | | | |
| E3) SET EXTENDED DRIVE TEST ZONE FROM OUTER PERIPHERY TO INNER PERIPHERAL SIDE IN SEQUENCE, AND PERFORM TEST WRITING FROM INSIDE IN THE SAME EXTENDED DRIVE TEST ZONE | FIG.23 | TEST WRITING IN EXTENDED DRIVE TEST ZONE CAN BE PERFORMED BY A METHOD OF WRITING BEHIND IN SEQUENCE, AND TEST WRITING PROCESSING IS EASY | | ◎ | | ○ | ○ | |
| E4) MAKE IT POSSIBLE TO RESET DATA LEAD-OUT AREA DTLDO INCLUDING EXTENDED DRIVE TEST ZONE, AND MANAGE ITS START POSITION INFORMATION IN RMD | FIG.23 FIG.30 | MANAGEMENT OF RECORDABLE RANGE OF USER DATA IS FACILITATED BY REDEFINING DATA AREA DTA RANGE | | ◎ | | ○ | ○ | |
| E5) RECORD ALREADY USED AMOUNT OR REMAINING AMOUNT INFORMATION OF DRIVE TEST ZONE IN RMD | FIG.31 | PRESENCE OR ABSENCE OF NECESSITY OF RESETTING EXTENDED DRIVE TEST ZONE CAN BE KNOWN | | | | ○ | ○ | |
| E6) MANAGE POSITION INFORMATION OF EXTENDED DRIVE TEST ZONE IN RMD | FIG.31 | PLURALITY OF EXTENSIONS BY UPDATE OF RMD IS SETTABLE | | ◎ | | ○ | ○ | |
| E7) RECORD ALREADY USED AMOUNT OR REMAINING AMOUNT INFORMATION OF RMD IN RMZ | FIG.30 | NON-RECORDABLE STATE IN RMZ AREA IS KNOWN IN ADVANCE | | | | | ○ | |
| F) HAVE COUNTRY NAME INFORMATION IN SYSTEM LEAD-IN AREA | FIG.27 | ENSURE IP, FACILITATE PATENT INFRINGEMENT WARNING | | | △ | | | |
| G) MAKE INFORMATION POSITION OF PHYSICAL FORMAT COMMON | FIG.27 | COMMONALITY AND SIMPLIFICATION OF INFORMATION REPRODUCTION PROCESSING OF APPARATUS | | ◎ | ◎ | | | |
| G1) GIVE REVISION INFORMATION CORRESPONDING TO RECORDING SPEED | FIG.28 | ENSURE EXTENSION FUNCTION TO MEDIUM PREPARED FOR FUTURE HIGH-SPEED RECORDING STANDARD CAN BE PREPARED WITH SIMPLE METHOD CALLED REVISION | ○ | | | ○ | | |
| G1α) MAKE REVISION NUMBER SEPARATELY SETTABLE AT MAXIMUM VALUE AND MINIMUM VALUE OF RECORDING SPEED | FIG.28 | MEDIUM CAPABLE OF HIGHER SPEED RECORDING AND MEDIUM AT LOWER PRICE CAN BE SUPPLIED BY ENLARGING SELECTION RANGE OF DEVELOPABLE RECORDING FILM | ○ | | | | | |
| G2) HAVE POLARITY INFORMATION OF RECORD MARK IN PHYSICAL FORMAT INFORMATION OR R PHYSICAL FORMAT INFORMATION | FIG.28 | COPE WITH HIGH SPEED RECORDING AND LOW PRICE BY ENLARGING SELECTION RANGE OF RECORDING FILM BY ALLOWING BOTH H→L TYPE AND L→H TYPE RECORDING FILMS | ◎ | ☆ | ◎ | | | ☆ |
| G3) DISPOSE OPTICAL SYSTEM CONDITION INFORMATION AT A PRECEDING POSITION OF RECORDING CONDITION | FIG.28 | WHETHER APPLICABLE OR NOT OF RECORDING CONDITION DISPOSED IMMEDIATELY BEHIND IS DETERMINABLE AT HIGH SPEED | ☆ | | | | | |
| H) SAME DATA FRAM IS DISTRIBUTIVELY DISPOSED IN A PLURALITY OF SMALL ECC BLOCKS | FIG.38 | RELIABILITY OF RECORDED DATA IS ENHANCED BY ENHANCING ERROR CORRECTION ABILITY | | ☆ | | | ☆ | |
| H1) MAKE SAME PHYSICAL SECTOR ALTERNATELY BELONG TO TWO SMALL ECC BLOCKS | FIG.38 FIG.40 | STRONG STRUCTURE AGAINST BURST ERROR CAN BE PROVIDED | | ☆ | | | ☆ | |
| H2) CONSTRUCT ONE ECC BLOCK BY 32 PHYSICAL SECTORS | FIG.34 | ENLARGE ALLOWABLE LENGTH OF MEDIUM SURFACE FLAW CAPABLE OF ERROR CORRECTION | | ☆ | | | ☆ | |
| H3) DATA STRUCTURE IN PHYSICAL SECTOR DIFFERS IN EVEN-NUMBERED SECTOR AND ODD-NUMBERED SECTOR | FIG.40 | PO INSERTION METHOD IS SIMPLE AND INFORMATION EXTRACTION AFTER ERROR CORRECTION IS EASY. ECC BLOCK CONSTRUCTION PROCESSING CAN BE SIMPLIFIED. | | ☆ | | | | |
| H4) PO INSERTION PLACE IS DIFFERENT IN EVEN-NUMBERED SECTOR AND ODD-NUMBERED SECTOR | FIG.40 | DATA ID CAN BE DISPOSED AT HEAD OF PHYSICAL SECTOR | | ☆ | | | | |
| I) INCLUDE POLARITY INVERSION CHANNEL BIT IN SYNC CODE | FIG.41 | DSV CONTROL OF CHANNEL BIT STRING IS POSSIBLE MACROSCOPICALLY. | | ◎ | | | ◎ | |
| J) RECORD ADDRESS INFORMATION IN ADVANCE BY PHASE MODULATION OF WOBBLE | FIG.66 | SLOT INTERVAL IS NARROW, AND SYNCHRONIZATION OF WOBBLE SIGNAL IS EASY | | | | ☆ | ○ | |
| J1) CONSTRUCT PHYSICAL SEGMENT BY 17 WOBBLE DATA UNITS | FIG.71 | FACILITATE SYNC DETECTION BY SECURING SYNC FRAME BORDER PREVENT LINING UP OF INDEFINITE BITS IN ECC BLOCK | | ◎ | | | ○ | |
| J1α) DISPOSE ONE PIECE OF ADDRESS INFORMATION DISTRIBUTIVELY IN ONE PHYSICAL SEGMENT | FIG.71 | CURRENT POSITION CONFIRMATION FOR EACH PHYSICAL SEGMENT IS POSSIBLE | | | | | ○ | |

FIG. 3

| POINT CONTENT | CORRESPONDING DRAWINGS | EFFECT/COMBINATION NUMBERS | | | | | | |
|---|---|---|---|---|---|---|---|---|
| | | | 1 | 2 | 3 | 4 | 5 | 6 |
| J2) OCCUPANCY RATE OF NON-MODULATION AREA IS SET HIGHER THAN MODULATION AREA | FIG.71 | ENHANCE EXTRACTION ACCURACY AND EXTRACTION STABILITY OF REFERENCE CLOCK | | | | ◎ | ○ | |
| J2α) DISPOSE ADDRESS INFORMATION DISTRIBUTIVELY AT EVERY 3 ADDRESS BITS | FIG.71 | INFLUENCE BY DUST AND FLAW CAN BE DECREASED AT ADDRESS REPRODUCTION TIME | | | | ○ | △ | |
| J2β) DISPOSE UNITY FIELD AT END OF PHYSICAL SEGMENT | FIG.71 | DETECT PHYSICAL SEGMENT BORDER POSITION BY DETECTION OF UNITY FIELD | | | | ○ | △ | |
| J3) FORM WOBBLE SYNC WITH PATTERN ABSENT IN WOBBLE ADDRESS | FIG.71 | FACILITATION OF POSITION IDENTIFICATION OF WOBBLE SYNC AREA | | | | ◎ | ○ | |
| J3α) FORM WOBBLE SYNC PATTERN BY CHANGING ADDRESS BIT AND WOBBLE CYCLE | FIG.71 | WOBBLE PLL IS STABILIZED BECAUSE SLOT POSITION IS FIXED POSITION DETECTION OF WOBBLE SYNC AREA IS EASY | | | | ○ | △ | |
| J3β) FORM WOBBLE SYNC AREA BY 12 WOBBLE CYCLES | FIG.71 | DETECTION OF POSITION OF WOBBLE SYNC AREA IS FACILITATED | | | | ○ | △ | |
| J3γ) DISPOSE WOBBLE SYNC AT PHYSICAL SEGMENT HEAD POSITION | FIG.71 | DETECT PHYSICAL SEGMENT BORDER POSITION BY DETECTION OF WOBBLE SYNC | | | | ○ | △ | |
| J3δ) ASSIGN 9 ADDRESS BITS TO UNITY AREA | FIG.71 | ENHANCE REPRODUCTION RELIABILITY FOR DUST AND FLAW ON MEDIUM SURFACE | | | | ○ | △ | |
| J3ε) DISPOSE UNITY AREA AT END OF WOBBLE ADDRESS INFORMATION | FIG.71 | START POSITION DETECTION OF WOBBLE ADDRESS INFORMATION IS EASY | | | | ○ | △ | |
| J4) RECORD ADDRESS INFORMATION IN ADVANCE BY L/G RECORD + WOBBLE MODULATION | FIG.69 | RECORD WITH HIGHEST EFFICIENCY AND HIGHEST DENSITY IS POSSIBLE | | | | ◎ | ○ | |
| J4α) WOBBLE PHASE MODULATION IS COMBINED IN L/G RECORD | FIG.69 | REPRODUCTION SIGNAL QUALITY FROM INDEFINITE BIT AREA IS EASILY IMPROVED | | | | ○ | △ | |
| J4β) ADOPT GRAY CODE FOR TRACK ADDRESS INFORMATION | FIG.72 | DECREASE FREQUENCY OF INDEFINITE BIT AND STABILIZE DETECTION OF REPRODUCTION SIGNAL | | | | ○ | △ | |
| J4γ) INDEFINITE BIT IS DISTRIBUTIVELY DISPOSED ALSO IN GROOVE AREA | FIG.74 | ADDRESS INFORMATION IS STABLY DETECTABLE ALSO IN LAND AREA | | | | ○ | △ | |
| J4δ) INDEFINITE BITS ARE DISTRIBUTIVELY DISPOSED IN BOTH LAND/GROOVE AREAS | FIG.74 | DISTRIBUTE RISK OF ERRONEOUS DETECTION, AND MAKE STABLE DETECTION EASY | | | | ○ | △ | |
| J4ε) DISPOSE ZONE ADDRESS AND PARITY INFORMATION ADJACENTLY | FIG.71 | ENHANCE REPRODUCTION RELIABILITY AGAINST DUST AND FLAW ON MEDIUM SURFACE | | | | ○ | △ | |
| J5) PREVENT AND SHIFT MODULATION AREA OVERLAPPING BETWEEN ADJACENT TRACKS | FIG.75 | PREVENT INTERFERENCE BETWEEN ADJACENT MODULATION AREAS | | | | ◎ | ○ | |
| J5α) GIVE A PLURALITY OF KINDS OF DISPOSITION PATTERNS OF MODULATION AREA | FIG.78 | ESTIMATE POSITION OF OTHER MODULATION AREA IN ADVANCE AND ENHANCE DETECTION ACCURACY | | | | ○ | △ | |
| J5β) SHOW POSITION OF MODULATION AREA WITH WOBBLE SYNC PATTERN | FIG.76 | NEXT MODULATION AREA PLACE CAN BE ESTIMATED IN ADVANCE BY PATTERN DISCRIMINATION | | | | ○ | △ | |
| J5γ) SHOW POSITION OF MODULATION AREA BY PHYSICAL SEGMENT TYPE IDENTIFICATION INFORMATION | FIG.79 | ESTIMATE NEXT MODULATION AREA PLACE IN ADVANCE TO ENHANCE DETECTION ACCURACY | | | | ○ | △ | |
| J5δ) SHOW DISPOSITION INFORMATION OF MODULATION AREA BY COMBINATION OF WOBBLE SYNC PATTERN AND WOBBLE ADDRESS INFORMATION | FIG.80 | THREE OR MORE OF DISPOSITION PATTERNS OF MODULATION AREA CAN BE EXPRESSED, AND IT IS POSSIBLE TO GIVE A PLURALITY OF DISPOSITION PATTERNS OF MODULATION AREA | | | | ○ | △ | |
| J5ε) PHYSICAL SEGMENT SEQUENCE INFORMATION POSITION IS CONFORMED TO REWRITABLE TYPE | FIG.79 | COMPATIBILITY IS ENHANCED AND COMMONALITY AND SIMPLIFICATION OF CONTROL CAN BE ACHIEVED | | | | ○ | △ | |
| K) DISPOSE GUARD AREA BETWEEN DATA FIELDS (ECC BLOCK) | FIG.64 | SECURE COMPATIBILITY BETWEEN DIFFERENT MEDIUM TYPES WITHOUT BREAKING DATA FIELD | | | ◎ | | ○ | |
| K1) CONFORM SIZE OF GUARD AREA TO ONE SYNC FRAME SIZE | FIG.64 | FACILITATE SYNC CODE POSITION DETECTION AT REPRODUCTION TIME | | | ○ | ○ | △ | |
| K2) DISPOSE SYNC CODE (SYNC DATA) IN GUARD AREA | FIG.65 | DISCRIMINATION OF GUARD AREA AND POSITION IN PHYSICAL SECTOR ARE EASY | | | ○ | | △ | |
| K3) ADJUST POSITION IN GUARD AREA AT TIME OF OCCURRENCE OF RECORD POSITION DEVIATION | FIG.82 | CORRECTION OF RECORDING TIMING WITH RESPECT TO POSITION DEVIATION AT RECORDING TIME | | | ○ | | △ | |

FIG.4

| POINT CONTENT | CORRESPONDING DRAWINGS | EFFECT/COMBINATION NUMBERS | 1 | 2 | 3 | 4 | 5 | 6 |
|---|---|---|---|---|---|---|---|---|
| K3) PARTIALLY OVERLAPPED RECORDING IN EXTENDED GUARD AREA AT RECORDABLE/REWRITABLE START POSITION | FIG.82 | PREVENT OCCURRENCE OF GAP AND REMOVE INTERLAYER CROSSTALK | | | ○ | ☆ | ☆ | |
| K3α) FORM RECORDING CLUSTER IN DATA SEGMENT UNIT | FIG.81 | PC DATA AND AV DATA MIXTURE RECORDING PROCESSING IS EASY | | | △ | | ○ | |
| K3β) RANDOM SHIFT AMOUNTS OF ALL DATA SEGMENTS AGREE IN RECORDING CLUSTER | FIG.83 | SYNCHRONIZATION IN VFO ACROSS DATA SEGMENTS IS NOT NECESSARY | | | △ | | ○ | |
| K3γ) SET EXTENDED GUARD AREA AT END OF RECORDING CLUSTER | FIG.81 | PROTECT POST-AMBLE AREA AT WOBBLE SHIFT TIME | | | △ | | ○ | |
| K3δ) SET EXTENDED GUARD AREA AT HEAD OF RECORDING CLUSTER | FIG.81 | LARGE VFO AREA CAN BE TAKEN AND PLL IS EASILY PERFORMED | | | △ | | ○ | |
| K3ε) DATA SEGMENT LENGTH IS CONFORMED TO 7-PHYSICAL-SEGMENT LENGTH | FIG.71 | SECURE SYNC FRAME BORDER AND FACILITATE SYNC DETECTION PREVENT LINING UP OF INDEFINITE BITS IN ECC BLOCK | | | | | | |
| K3ζ) RECORD OVERLAPPED SPOT AT REWRITING/WRITING TIME IN NON-MODULATION AREA | FIG.82 | ENSURE STABLE WOBBLE DETECTION SIGNAL IN OVERLAPPED RECORDING | | | △ | | ○ | |
| K4) RANDOM SHIFT AMOUNT IS LARGER THAN Jm/12 (0≤Jm≤154) | FIG.83 | ENSURE NUMBER OF REPETITIVE RECORDINGS AS CURRENT DVD-RAM | | | △ | | ○ | |
| K5) DISPOSE DATA SEGMENT AFTER 24 WOBBLES FROM HEAD OF PHYSICAL SEGMENT | FIG.83 | PREPARATION TIME OF RECORDING PROCESSING CAN BE TAKEN AND RECORDING WITH HIGH ACCURACY IS POSSIBLE | | | ○ | | | |
| L1) SET NEXT BORDER MARK BY OVERWRITING | FIG.12 | STABILIZE DPD TRACKING IN NEXT BORDER MARK | | | ○ | | | |
| L2) PERFORM PARTIAL OVERWRITE EXCEPT SYNC CODE | FIG.12 | DATA ID POSITION DETECTION USING SYNC CODE IS EASY | | | ○ | | | |
| M) REFLECTIVETY LOWER LIMIT VALUE OF H→L RECORDING FILM IS HIGHER THAN REFLECTIVETY UPPER LIMIT VALUE OF L→H RECORDING FILM | FIG.85 | DISCRIMINATION OF TYPES OF RECORDING FILMS IS VERY EASY BY ONLY REFLECTION RATE MEASUREMENT | | | △ | | | ☆ |
| M1) REFLECTIVITY BETWEEN LOWER LIMIT VALUE OF H→L AND UPPER LIMIT VALUE OF L→H IS 36% | FIG.85 | MANUFACTURABILITY OF RECORDING FILM IS HIGH AND COST REDUCTION IS EASY | | | △ | | | ☆ |
| M2) REFLECTIVITY RANGE OF H→L RECORDING FILM AGREES TO FLECTIVITY RANGE OF REPRODUCTION-ONLY SINGLE LAYER | FIG.85 | COMPATIBILITY WITH REPRODUCTION-ONLY MEDIA IS GOOD AND REPRODUCING APPARATUS IS LOW IN PRICE | | | △ | | ○ | ○ |
| M3) REFLECTIVITY RANGE OF L→H RECORDING FILM AGREES TO REFLECTIVITY RANGE OF REPRODUCTION-ONLY TWO-LAYER | FIG.85 | COMPATIBILITY WITH REPRODUCTION-ONLY MEDIA IS GOOD AND REPRODUCING APPARATUS IS LOW IN PRICE | | | △ | | ○ | ○ |

FIG. 16A
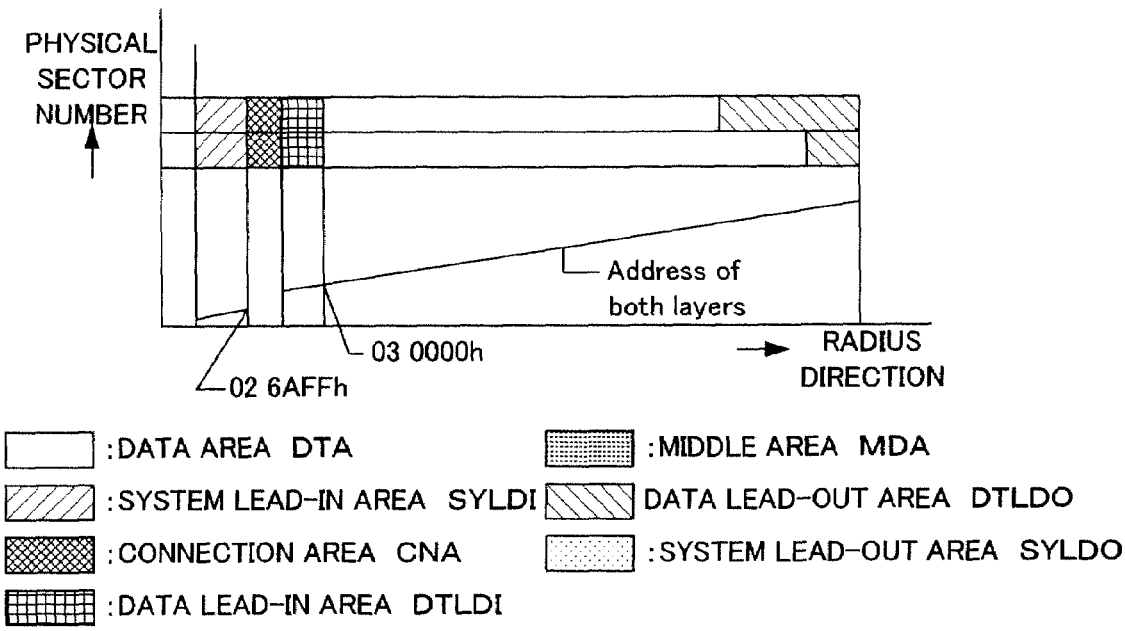
FIG. 16B
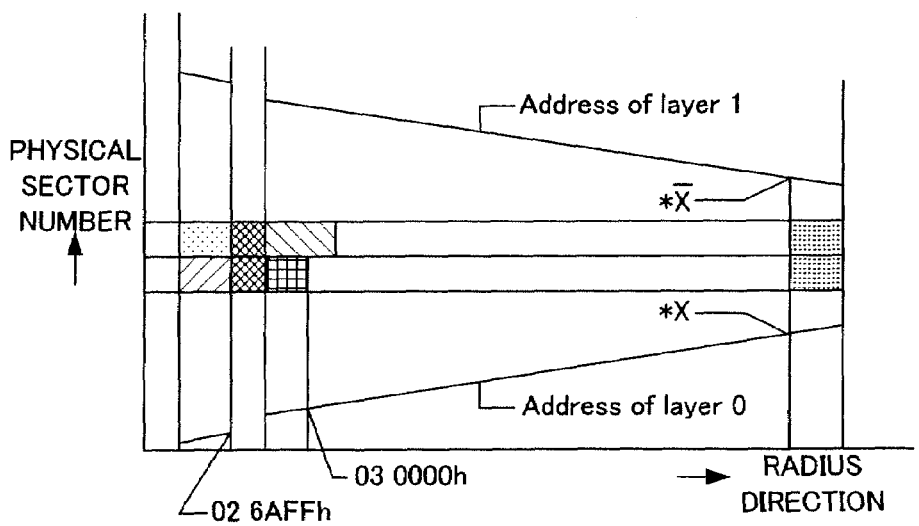
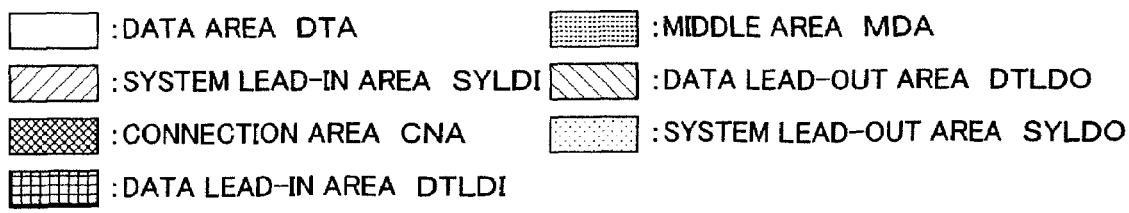

FIG. 17

| | Zone | Normal radius (mm) | Number of Physical segment per track | Number of tracks | System/Land | | Groove | |
|---|---|---|---|---|---|---|---|---|
| | | | | | Start Physical sector number (hex value) | End Physical sector number (hex value) | Start Physical sector number (hex value) | End Physical sector number (hex value) |
| System Lead-in area | Initial zone | | | | 022400 | 024AFF | | |
| | Buffer zone | | | | 024B00 | 024EFF | | |
| | Control data zone | 23.300 ~ 23.795 | | 728.1 | 024F00 | 0268FF | | |
| | Buffer zone | | | | 026700 | 026AFF | | |
| Connection area | Connection zone | 23.795 ~ 23.801 | | | - | - | - | - |
| Data Lead-in area | Guard track zone | | | | 029A00 | 02A3FF | 829A00 | 82A3FF |
| | Disc test zone | | | | 02A400 | 02B3FF | 82A400 | 82B3FF |
| | Drive test zone | | | | 02B400 | 02C9FF | 82B400 | 82C9FF |
| | Guard track zone | 23.801 ~ 24.100 | 13 | 5404 | 02CA00 | 02CCFF | 82CA00 | 82CCFF |
| | Disc identification zone | | | | 02CD00 | 02CDFF | 82CD00 | 82CDFF |
| | DMA1 & DMA2 | | | | 02CE00 | 02FFFF | 82CE00 | 82FFFF |
| Data area | Zone0 | 24.100 ~ 25.639 | | 5390 | 030000 | 050D3F | 830000 | 850D3F |
| | Zone1 | 25.639 ~ 27.471 | 14 | 5390 | 050D40 | 07AEFF | 850D40 | 87AEFF |
| | Zone2 | 27.471 ~ 29.304 | 15 | 5390 | 07AF00 | 0A80DF | 87AF00 | 8A80DF |
| | Zone3 | 29.304 ~ 31.136 | 16 | 5390 | 0A80E0 | 0D82DF | 8A80E0 | 8D82DF |
| | Zone4 | 31.136 ~ 32.969 | 17 | 5390 | 0D82E0 | 0B84FF | 8D82E0 | 90B4FF |
| | Zone5 | 32.969 ~ 34.802 | 18 | 5390 | 10B500 | 14173F | 90B500 | 94173F |
| | Zone6 | 34.802 ~ 36.634 | 19 | 5390 | 141740 | 17A99F | 941740 | 97A99F |
| | Zone7 | 36.634 ~ 38.467 | 20 | 5390 | 17A9A0 | 1B6C1F | 97A9A0 | 9B6C1F |
| | Zone8 | 38.467 ~ 40.299 | 21 | 5390 | 1B6C20 | 1F5EBF | 9B6C20 | 9F5EBF |
| | Zone9 | 40.299 ~ 42.132 | 22 | 5390 | 1F5EC0 | 23817F | 9F5EC0 | A3817F |
| | Zone10 | 42.132 ~ 43.965 | 23 | 5390 | 238180 | 27045F | A38180 | A7045F |
| | Zone11 | 43.965 ~ 45.797 | 24 | 5390 | 270460 | 2C575F | A70460 | AC575F |
| | Zone12 | 45.797 ~ 47.630 | 25 | 5390 | 2C5760 | 310A7F | AC5760 | B10A7F |
| | Zone13 | 47.630 ~ 49.462 | 26 | 5390 | 310A80 | 35EDBF | B10A80 | B5EDBF |
| | Zone14 | 49.462 ~ 51.295 | 27 | 5390 | 35EDC0 | 3B011F | B5EDC0 | BB011F |
| | Zone15 | 51.295 ~ 53.128 | 28 | 5390 | 3B0120 | 40449F | BB0120 | C0449F |
| | Zone16 | 53.128 ~ 54.960 | 29 | 5390 | 4044A0 | 45B83F | C044A0 | C5B83F |
| | Zone17 | 54.960 ~ 56.793 | 30 | 5390 | 45B840 | 4B5BFF | C5B840 | CB5BFF |
| | Zone18 | 56.793 ~ 57.888 | | | 4B5C00 | 4ED73F | CB5C00 | CED73F |
| Data Lead-out area | DMA3 & DMA4 | | 31 | 5012 | 4ED740 | 4F098F | CED740 | CF098F |
| | Guard track zone | 57.888 ~ 58.497 | | | 4F0940 | 4F0C9F | CF0940 | CF0C9F |
| | Drive test zone | | | | 4F0C40 | 4F223F | CF0C40 | CF223F |
| | Disc test zone | | | | 4F2240 | 4F823F | CF2240 | CF323F |
| | Guard track zone | | | | 4F8240 | 50C73F | CF3240 | D0C73F |

FIG. 18

| PARAMETER | | SINGLE LAYER STRUCTURE | DOUBLE LAYER STRUCTURE |
|---|---|---|---|
| ·USER USABLE RECORDING CAPACITY | | 15 Gbytes/side | 30 Gbytes/side |
| ·USE WAVELENGTH | | 405nm | |
| ·OBJECTIVE LENS NA VALUE (NA: Numerical Aperture) | | 0.65 | |
| ·DATA BIT LENGTH | (A) | 0.306 $\mu$m | |
| | (B) | 0.153 $\mu$m | |
| ·CHANNEL BIT LENGTH | (A) | 0.204 $\mu$m | |
| | (B) | 0.102 $\mu$m | |
| ·MINIMUM PIT LENGTH (2T) | (A) | 0.408 $\mu$m | |
| | (B) | 0.204 $\mu$m | |
| ·MAXIMUM PIT LENGTH (13T) | (A) | 2.652 $\mu$m | |
| | (B) | 1.326 $\mu$m | |
| ·TRACK PITCH | (A) | 0.68 $\mu$m | |
| | (B) | 0.40 $\mu$m | |
| ·INFORMATION STORAGE MEDIUM OUTER DIAMETER | | 120mm | |
| ·INFORMATION STORAGE MEDIUM TOTAL THICKNESS | | 0.60 × 2mm | |
| ·CENTER HOLE DIAMETER | | 15.0mm | |
| ·DATA AREA DTA INNER RADIUS | | 24.1mm | |
| ·DATA REAR DTA OUTER RADIUS | | 58.0mm | |
| ·USER DATA SIZE PER SECTOR | | 2048 bytes | |
| ·ECC (Error Correction Code) | | Read-Solomon product code RS(208, 192, 17) × RS(182, 172, 11) | |
| ·ECC BLOCK SIZE | | 32 PHYSICAL SECTOR | |
| ·MODULATION METHOD | | ETM, RLL(1, 10) | |
| ·ERROR CORRECTABLE ERROR LENGTH | | 7.1mm | |
| ·LINEAR VELOCITY | | 6.61m/s | |
| ·CHANNEL BIT TRANSFER RATE | (A) | 32.40Mbps | |
| | (B) | 64.80Mbps | |
| ·USER DATA TRANSFER RATE | (A) | 18.28Mbps | |
| | (B) | 36.55Mbps | |

(A) INDICATES NUMERAL VALUE IN SYSTEM LEAD-IN AREA SYLDI AND SYSTEM LEAD-OUT AREA SYLDO (B) INDICATES NUMERAL VALUE IN DATA LEAD-IN AREA DTLDI, DATA AREA DTA, DATA LEAD-OUT AREA DTLDO AND MIDDLE AREA MDA

FIG. 19

| PARAMETER | | SINGLE LAYER STRUCTURE |
|---|---|---|
| ·USER USABLE RECORDING CAPACITY | | 15 Gbytes/side |
| ·USE WAVELENGTH | | 405nm |
| ·OBJECTIVE LENS NA VALUE | | 0.65 |
| ·DATA BIT LENGTH | (A) | 0.306 μm |
| | (B) | 0.153 μm |
| ·CHANNEL BIT LENGTH | (A) | 0.204 μm |
| | (B) | 0.102 μm |
| ·MINIMUM MARK/PIT LENGTH (2T) | (A) | 0.408 μm |
| | (B) | 0.204 μm |
| ·MAXIMUM MARK/PIT LENGTH (13T) | (A) | 2.652 μm |
| | (B) | 1.326 μm |
| ·TRACK PITCH | (A) | 0.68 μm |
| | (B) | 0.40 μm |
| ·PHYSICAL ADDRESS SETTING METHOD | (B) | WOBBLE ADDRESS |
| ·INFORMATION STORAGE MEDIUM OUTER DIAMETER | | 120mm |
| ·INFORMATION STORAGE MEDIUM TOTAL THICKNESS | | 1.20mm |
| ·CENTER HOLE OUTER DIAMETER | | 15.0mm |
| ·DATA AREA DTA INNER RADIUS | | 24.1mm |
| ·DATA AREA DTA OUTER RADIUS | | 58.0mm |
| ·SECTOR SIZE | | 2048 bytes |
| ·ECC (Error Correction Code) | | Read-Solomon product code RS(208, 192, 17) × RS(182, 172, 11) |
| ·ECC BLOCK SIZE | | 32 PHYSICAL SECTOR |
| ·MODULATION METHOD | | ETM, RLL(1, 10) |
| ·ERROR CORRECTABLE ERROR LENGTH | | 7.1mm |
| ·LINEAR VELOCITY | | 6.61m/s |
| ·CHANNEL BIT TRANSFER RATE | (A) | 32.40Mbps |
| | (B) | 64.80Mbps |
| ·USER DATA TRANSFER RATE | (A) | 18.28Mbps |
| | (B) | 36.55Mbps |

(A) INDICATES NUMERAL VALUE IN SYSTEM LEAD-IN AREA SYLDI (B) INDICATES NUMERAL VALUE IN DATA LEAD-IN AREA DTLDI, DATA AREA DTA, AND DATA LEAD-OUT AREA DTLDO

FIG.20

| PARAMETER | | SINGLE LAYER STRUCTURE |
|---|---|---|
| ·USER USABLE RECORDING CAPACITY | | 20 Gbytes/side |
| ·USE WAVELENGTH | | 405nm |
| ·OBJECTIVE LENS NA VALUE | | 0.65 |
| ·DATA BIT LENGTH | (A) | 0.306 $\mu$m |
| | (B) | 0.130 to 0.140 $\mu$m |
| ·CHANNEL BIT LENGTH | (A) | 0.204 $\mu$m |
| | (B) | 0.087 to 0.093 $\mu$m |
| ·MINIMUM MARK/PIT LENGTH (2T) | (A) | 0.408 $\mu$m |
| | (B) | 0.173 to 0.187 $\mu$m |
| ·MAXIMUM MARK/PIT LENGTH (13T) | (A) | 2.652 $\mu$m |
| | (B) | 1.126 to 1.213 $\mu$m |
| ·TRACK PITCH | (A) | 0.68 $\mu$m |
| | (B) | 0.34 $\mu$m |
| ·PHYSICAL ADDRESS SETTING METHOD | (B) | WOBBLE ADDRESS |
| ·INFORMATION STORAGE MEDIUM OUTER DIAMETER | | 120mm |
| ·INFORMATION STORAGE MEDIUM TOTAL THICKNESS | | 0.60 × 2mm |
| ·CENTER HOLE OUTER DIAMETER | | 15.0mm |
| ·DATA AREA DTA INNER RADIUS | | 24.1mm |
| ·DATA AREA DTA OUTER RADIUS | | 57.89mm |
| ·SECTOR SIZE | | 2048 bytes |
| ·ECC (Error Correction Code) ·ECC BLOCK SIZE ·MODULATION METHOD | | Read-Solomon product code RS(208, 192, 17) × RS(182, 172, 11) 32 PHYSICAL SECTOR ETM, RLL(1, 10) |
| ·ERROR CORRECTABLE ERROR LENGTH | (A) | 7.1mm |
| | (B) | 6.0mm |
| ·LINEAR VELOCITY | (A) | 6.61m/s |
| | (B) | 5.64 to 6.03m/s |
| ·CHANNEL BIT TRANSFER RATE | (A) | 32.40Mbps |
| | (B) | 64.80Mbps |
| ·USER DATA TRANSFER RATE | (A) | 18.28Mbps |
| | (B) | 36.55Mbps |

(A) INDICATES NUMERAL VALUE IN SYSTEM LEAD-IN AREA SYLDI
(B) INDICATES NUMERAL VALUE IN DATA LEAD-IN AREA DTLDI, DATA AREA DTA AND DATA LEAD-OUT AREA DTLDO.

| INITIAL ZONE INZ | BUFFER ZONE1 BFZ1 | CONTROL DATA ZONE CDZ | BUFFER ZONE2 BFZ2 | CONNECTION AREA CNA | DATA LEAD-IN AREA DTLDI | | DATA AREA |
|---|---|---|---|---|---|---|---|
| | SYSTEM LEAD-IN AREA SYLDI | | | | RESERVE ZONE RSA | REFERENCE CODE RECORDING ZONE RCZ | DTA |
| EMBOSS PIT AREA 211 | | | | CONNECTION ZONE CNZ | | | |
| | | | | MIRROR SURFACE 210 | EMBOSS PIT AREA 211 | | |

(b)

| INITIAL ZONE INZ | BUFFER ZONE1 BFZ1 | CONTROL DATA ZONE CDZ | BUFFER ZONE2 BFZ2 | CONNECTION AREA CNA | DATA LEAD-IN AREA DTLDI | | | | | | | DATA AREA |
|---|---|---|---|---|---|---|---|---|---|---|---|---|
| | SYSTEM LEAD-IN AREA SYLDI | | | | GUARD TRACK ZONE1 GTZ1 | DISC TEST ZONE DKTZ | DRIVE TEST ZONE DRTZ | GUARD TRACK ZONE2 GTZ2 | DISC IDENTIFYING ZONE DIZ | DEFECT MANAGEMENT AREA 1 DMA1 | DEFECT MANAGEMENT AREA 2 DMA2 | DTA |
| EMBOSS PIT AREA 211 | | | | CONNECTION ZONE CNZ | | | | | | | | |
| | | | | MIRROR SURFACE 210 | LAND AREA AND GROOVE AREA 213 | | | | | | | |

(c)

| INITIAL ZONE INZ | BUFFER ZONE1 BFZ1 | CONTROL DATA ZONE CDZ | BUFFER ZONE2 BFZ2 | CONNECTION AREA CNA | DATA LEAD-IN AREA DTLDI | | | | | | DATA AREA |
|---|---|---|---|---|---|---|---|---|---|---|---|
| | SYSTEM LEAD-IN AREA SYLDI | | | | GUARD TRACK ZONE1 GTZ1 | DISC TEST ZONE DKTZ | DRIVE TEST ZONE DRTZ | GUARD TRACK ZONE2 GTZ2 | RECORDING POSITION MANAGEMENT ZONE RMZ | R PHYSICAL INFORMATION ZONE RIZ | REFERENCE CODE RECORDING ZONE RCZ | DTA |
| EMBOSS PIT AREA 211 | | | | CONNECTION ZONE CNZ | | | | | | | | |
| | | | | MIRROR SURFACE 210 | GROOVE AREA 214 | | | | | | | |

| SYSTEM LEAD-IN AREA SYLDI | | | | CONNECTION AREA CNA | DATA LEAD-IN AREA DTLDI | | | | | | | DATA AREA |
|---|---|---|---|---|---|---|---|---|---|---|---|---|
| INITIAL ZONE INZ | BUFFER ZONE1 BFZ1 | CONTROL DATA ZONE CDZ | BUFFER ZONE2 BFZ2 | CONNECTION ZONE CNZ | GUARD TRACK ZONE1 GTZ1 | DISC TEST ZONE DKTZ | DRIVE TEST ZONE DRTZ | GUARD TRACK ZONE2 GTZ2 | RECORDING POSITION MANAGEMENT ZONE RMZ | R PHYSICAL INFORMATION ZONE RIZ | REFERENCE CODE RECORDING ZONE RCZ | DTA |

(b)

| RECORDING POSITION MANAGEMENT ZONE RMZ | | | |
|---|---|---|---|
| RECORDING POSITION MANAGEMENT DATA RMD #1 | RECORDING POSITION MANAGEMENT DATA RMD #2 | ... | UNRECORDED AREA 206 |
| ONE PHYSICAL SEGMENT BLOCK SIZE | ONE PHYSICAL SEGMENT BLOCK SIZE | ... | ONE PHYSICAL SEGMENT BLOCK SIZE |

FIG.23

| | DATA LEAD-IN AREA DTLDI | DATA AREA DTA | DATA LEAD-OUT AREA DTLDO | SYSTEM LEAD-OUT AREA SYLDO |
|---|---|---|---|---|
| (a) | DATA LEAD-IN AREA DTLDI | USER DATA PREVIOUSLY RECORDED AREA 201 | ALL MAIN DATA = "00h" | ALL MAIN DATA = "00h" |

| | | DATA AREA DTA | | | | | | | |
|---|---|---|---|---|---|---|---|---|---|
| (b) | DATA LEAD-IN AREA DTLDI | SPARE AREA SPA | USER DATA REWRITABLE RANGE 202 | DEFECT MANAGEMENT AREA 3 DMA 3 | DEFECT MANAGEMENT AREA 4 DMA 4 | GUARD TRACK ZONE 3 GTZ 3 | DRIVE TEST ZONE DRTZ | DISC TEST ZONE DKTZ | GUARD TRACK ZONE4 GTZ4 | SERVO CALIBRATION AREA SCZ |

| | | DATA AREA DTA | | | | | DATA LEAD-OUT AREA DTLDO | | | |
|---|---|---|---|---|---|---|---|---|---|---|
| (c) | DATA LEAD-IN AREA DTLDI | SPARE AREA SPA | USER DATA REWRITABLE RANGE 203 | EXTENDED SPARE AREA 2 ESPA 2 | DEFECT MANAGEMENT AREA 3 DMA 3 | DEFECT MANAGEMENT AREA 4 DMA 4 | GUARD TRACK ZONE 3 GTZ 3 | DRIVE TEST ZONE DRTZ | DISC TEST ZONE DKTZ | GUARD TRACK ZONE4 GTZ4 | SERVO CALIBRATION AREA SCZ |

EMBOSS PIT211

↑ a (START POSITION ADDRESS)

| | | DATA AREA DTA | | |
|---|---|---|---|---|
| (d) | DATA LEAD-IN AREA DTLDI | SPARE AREA SPA | USER DATA RECORDABLE RANGE 204 | DATA LEAD-OUT AREA DTLDO |

| | | DATA AREA DTA | | | | | | | |
|---|---|---|---|---|---|---|---|---|---|
| (e) | DATA LEAD-IN AREA DTLDI | SPARE AREA SPA | USER DATA RECORDABLE RANGE 205 | EXTENDED SPARE AREA 2 ESPA 2 | EXTENDED DRIVE TEST ZONE2 EDRTZ 2 | EXTENDED SPARE AREA 1 ESPA 1 | EXTENDED DRIVE TEST ZONE1 EDRTZ 1 | DRIVE TEST ZONE DRTZ | DISC TEST ZONE DKTZ | GUARD TRACK ZONE4 GTZ4 | SERVO CALIBRATION AREA SCZ |

EACH AREA START POSITION ADDRESS ↑ ↑ζ ↑ε ↑δ ↑γ ↑β

| | | DATA AREA DTA | | | DATA LEAD-OUT AREA DTLDO | | | |
|---|---|---|---|---|---|---|---|---|
| (f) | DATA LEAD-IN AREA DTLDI | SPARE AREA SPA | USER DATA RECORDABLE RANGE 205 | EXTENDED SPARE AREA ESPA | EXTENDED DRIVE TEST ZONE EDRTZ | DRIVE TEST ZONE DRTZ | DISC TEST ZONE DKTZ | GUARD TRACK ZONE4 GTZ4 | SERVO CALIBRATION AREA SCZ |

EMBOSS PIT211

| KIND OF RECORDED INFORMATION | BYTE POSITION | PHYSICAL FORMAT INFORMATION PFI | | | R PHYSICAL FORMAT INFORMATION |
|---|---|---|---|---|---|
| | | IN REPRODUCTION-ONLY TYPE | IN REWRITABLE TYPE | IN RECORDABLE TYPE | |
| INFORMATION IN COMMON TO ALL REPRODUCTION-ONLY TYPE, REWRITABLE TYPE AND RECORDABLE TYPE 267 | 0 | WRITTEN STANDARD TYPE (REPRODUCTION-ONLY/REWRITABLE/RECORDABLE) INFORMATION AND VERSION NUMBER INFORMATION | | | |
| | 1 | MEDIUM SIZE (DIAMETER) AND MAXIMUM POSSIBLE DATA TRANSFER RATE INFORMATION | | | |
| | 2 | MEDIUM STRUCTURE (SINGLE LAYER OR DOUBLE LAYER. PRESENCE OR ABSENCE OF EMBOSS PIT/RECORDABLE AREA/REWRITABLE AREA) | | | |
| | 3 | RECORDING DENSITY (LINEAR DENSITY AND TRACK DENSITY) INFORMATION | | | |
| | 4~15 | DATA AREA DTA DISPOSITION PLACE INFORMATION | | | |
| | 16 | BURST CUTTING AREA BCA PRESENCE OR ABSENCE INFORMATION (ALL PRESENCE IN THIS EMBODIMENT) | | | |
| COMMON IN DVD FAMILY AND COMMON IN REWRITABLE TYPE AND RECORDABLE TYPE 268 | 17 | RESERVE AREA | REVISION NUMBER INFORMATION SPECIFYING HIGHEST RECORDING SPEED | | |
| | 18 | | REVISION NUMBER INFORMATION SPECIFYING LOWEST RECORDING SPEED | | |
| | 19-25 | | REVISION NUMBER TABLE (APPLICATION REVISION NUMBER) | | |
| | 26 | | CLASS STATE INFORMATION | | |
| | 27 | | EXTENDED (PART) VERSION INFORMATION | | |
| | 28-31 | | RESERVE AREA | | |
| HD_DVD | 31-127 | | RESERVE AREA | | |
| PECULIAR INFORMATION OF EACH WRITTEN STANDARD TYPE AND VERSION 263 | 128~175 | | MEDIA MANUFACTURING MAKER NAME INFORMATION | | |
| | 176~191 | | ADDITION INFORMATION FROM MEDIA MANUFACTURING MAKER | | |
| | 192 | | RECORD MARK POLARITY (DISCRIMINATION OF H→L OR L→H) INFORMATION | | |
| | 193 | | LINEAR VELOCITY INFORMATION AT RECORDING TIME OR REPRODUCTION TIME | | |
| | 194 | | OPTICAL SYSTEM RIM INTENSITY VALUE ALONG CIRCUMFERENTIAL DIRECTION | | |
| | 195 | | OPTICAL SYSTEM RIM INTENSITY VALUE ALONG RADIUS DIRECTION | | |
| | 196 | | RECOMMENDED LASER POWER (LIGHT AMOUNT VALUE ON RECORDING SURFACE) AT REPRODUCTION TIME | | |
| | 197~511 | | RESERVE AREA | | |
| INFORMATION CONTENT PECULIARLY SETTABLE FOR EACH REVISION 264 | 512 | RESERVE AREA | LAND AREA PEAK POWER | PEAK POWER | |
| | 513 | | LAND AREA BIAS POWER1 | BIAS POWER1 | |
| | 514 | | LAND AREA BIAS POWER2 | BIAS POWER2 | |
| | 515 | | LAND AREA BIAS POWER3 | BIAS POWER3 | |
| | 516 | | GROOVE AREA PEAK POWER | FIRST PULSE END TIME (T$_{EFP}$ IN FIG. 23) | |
| | 517 | | GROOVE ARE BIAS POWER1 | MULTI PULSE INTERVAL (T$_{MP}$ IN FIG. 23) | |
| | 518 | | GROOVE ARE BIAS POWER2 | LAST PULSE START TIME (T$_{SLP}$ IN FIG. 23) | |
| | 519 | | GROOVE ARE BIAS POWER3 | PERIOD OF BIAS POWER OF 2T MARK (T$_{LC}$ IN FIG. 23) | |
| | 520~196 | | ·········· | ···················· | |
| | 197~204 | | RESERVE AREA | | BORDER ZONE START POSITION INFORMATION |
| | 204~2047 | | RESERVE AREA | | |

FIG.29

| | PHYSICAL FORMAT INFORMATION PFI | | |
|---|---|---|---|
| IN REPRODUCTION-ONLY INFORMATION STORAGE MEDIUM | IN REWRITABLE INFORMATION STORAGE MEDIUM | IN RECORDABLE INFORMATION STORAGE MEDIUM | R PHYSICAL FORMAT INFORMATION R_PFI |
| DATA AREA START POSITION INFORMATION(PHYSICAL SECTOR NUMBER OR ECC BLOCK NUMBER) | LAND AREA DATA AREA DTA START POSITION INFORMATION(PHYSICAL SECTOR NUMBER OR ECC BLOCK NUMBER) | DATA AREA START POSITION INFORMATION(PHYSICAL SECTOR NUMBER OR ECC BLOCK NUMBER) | DATA AREA START POSITION INFORMATION(PHYSICAL SECTOR NUMBER OR ECC BLOCK NUMBER) |
| DATA AREA END POSITION INFORMATION(PHYSICAL SECTOR NUMBER OR ECC BLOCK NUMBER) | LAND AREA DATA AREA DTA END POSITION INFORMATION(PHYSICAL SECTOR NUMBER OR ECC BLOCK NUMBER) | LAST POSITION INFORMATION OF USER DATA RECORDABLE RANGE [POSITION JUST BEFORE POINT ζ IN FIG. 22 (E)] (PHYSICAL SECTOR NUMBER OR ECC BLOCK NUMBER) | LAST POSITION INFORMATION OF ALREADY RECORDED DATA IN APPLICABLE BORDERED AREA(PHYSICAL SECTOR NUMBER OR ECC BLOCK NUMBER) |
| "00h" | DIFFERENCE VALUE OF START POSITION INFORMATION BETWEEN LAND AREA AND GROOVE AREA(PHYSICAL SECTOR NUMBER OR ECC BLOCK NUMBER) | "00h" | "00h" |
| LAST ADDRESS INFORMATION OF "0 LAYER"(PHYSICAL SECTOR NUMBER OR ECC BLOCK NUMBER) | | | |

FIG.30

| RMD FIELD AREA | RECORDED INFORMATION CONTENT | |
|---|---|---|
| | RESERVE AREA OF 2048 BYTES | |
| 0 | | RECORDING POSITION MANAGEMENT DATA FORMAT CODE INFORMATION |
| | | MEDIUM STATE INFORMATION (UNRECORDED STATE, HALFWAY THROUGH RECORDING BEFORE FINALIZING, OR AFTER FINALIZING) |
| | | UNIQUE DISC ID (DISC IDENTIFYING INFORMATION) |
| | DATA AREA DTA POSITION INFORMATION | DATA AREA START POSITION INFORMATION(DESCRIBED IN PHYSICAL SECTOR NUMBER, ECC BLOCK ADDRESS, OR DATA SEGMENT ADDRESS) |
| | | END POSITION OF RECORDABLE RANGE 204 OF USER DATA AT INITIAL TIME(DESCRIBED IN PHYSICAL SECTOR NUMBER, ECC BLOCK ADDRESS, OR DATA SEGMENT ADDRESS) [EXAMPLE IN FIG. 22 (d) SHOWS POSITION JUST BEFORE POINT $\beta$] |
| | NEWEST (UPDATED) DATA AREA DTA POSITION INFORMATION | EXTENDED DRIVE TEST ZONE EDRTZ PRESENCE OR ABSENCE INFORMATION |
| | | EXTENDED SPARE AREA ESPA PRESENCE OR ABSENCE INFORMATION |
| | | DATA AREA DTA START POSITION INFORMATION(DESCRIBED IN PHYSICAL SECTOR NUMBER, ECC BLOCK ADDRESS, OR DATA SEGMENT ADDRESS) |
| | | FINAL POSITION OF NEWEST USER DATA RECORDABLE RANGE 205(DESCRIBED IN PHYSICAL SECTOR NUMBER, ECC BLOCK ADDRESS, OR DATA SEGMENT ADDRESS)[EXAMPLE IN FIG. 22 (d) SHOWS POSITION JUST BEFORE POINT $\zeta$] |
| | | REMAINING AMOUNT RECORDABLE HEREINAFTER IN USER DATA RECORDABLE RANGE 205(DESCRIBED IN NUMBER OF ECC BLOCKS, NUMBER OF PHYSICAL SEGMENT BLOCKS OR NUMBER OF DATA SEGMENTS) |
| | | DATA LEAD-OUT AREA DTLDO START POSITION INFORMATION(DESCRIBED IN PHYSICAL SECTOR NUMBER, ECC BLOCK ADDRESS, OR DATA SEGMENT ADDRESS) |
| | RECORDING POSITION MANAGEMENT DATA RMD POSITION INFORMATION | SET SIZE INFORMATION OF RECORDING POSITION MANAGEMENT ZONE RMZ(PHYSICAL SEGMENT BLOCK UNIT (=ECC BLOCK UNIT=DATA SEGMENT UNIT)) |
| | | CURRENT RECORDING POSITION MANAGEMENT DATA NUMBER IN RECORDING POSITION MANAGEMENT ZONE RMZ OR NUMBER INFORMATION OF ALREADY RECORDED RECORDING POSITION MANAGEMENT DATA RMD IN RECORDING POSITION MANAGEMENT ZONE RMZ (PHYSICAL SEGMENT BLOCK UNIT (=ECC BLOCK UNIT=DATA SEGMENT UNIT))["2" IN RMD #2 IN FIG. 22 (b)] |
| | | REMAINING AMOUNT INFORMATION IN RECORDING POSITION MANAGEMENT ZONE RMZ ((NUMBER OF FURTHER ADDABLE RECORDING POSITION MANAGEMENT DATA RMD) INFORMATION (PHYSICAL SEGMENT BLOCK UNIT (=ECC BLOCK UNIT=DATA SEGMENT UNIT)) |
| 1 | #1:INFORMATION RECORDING AND REPRODUCING APPARATUS MANUFACTURING MAKER IDENTIFYING INFORMATION | |
| | #1:INFORMATION RECORDING AND REPRODUCING APPARATUS SERIAL NUMBER(DESCRIBED IN ASCII CODE) | |
| | #1:INFORMATION RECORDING AND REPRODUCING APPARATUS MODEL NUMBER(DESCRIBED IN ASCII CODE) | |
| | #1:INFORMATION OF DATA AND TIME WHEN RECORDING POWER ADJUSTMENT USING DRIVE TEST ZONE IS PERFORMED | |
| | #1:ALL RECORD CONDITION INFORMATION IN INFORMATION 264 (FIG. 27) SETTABLE PECULIARLY FOR EACH REVISION | |
| | .................. | |
| | #4:INFORMATION RECORDING AND REPRODUCING APPARATUS MANUFACTURING MAKER IDENTIFYING INFORMATION | |
| | #4:INFORMATION RECORDING AND REPRODUCING APPARATUS SERIAL NUMBER(DESCRIBED IN ASCII CODE) | |
| | #4:INFORMATION RECORDING AND REPRODUCING APPARATUS MODEL NUMBER(DESCRIBED IN ASCII CODE) | |
| | #4:INFORMATION OF DATA AND TIME WHEN RECORDING POWER ADJUSTMENT USING DRIVE TEST ZONE IS PERFORMED | |
| | #4:ALL RECORD CONDITION INFORMATION IN INFORMATION 264 (FIG. 27) SETTABLE PECULIARLY FOR EACH REVISION | |
| 2 | USER USE AREA | |
| 3 | INITIAL BORDER OUT BRDO START POSITION INFORMATION(PHYSICAL SECTOR NUMBER) [EXAMPLE SHOWN IN FIG. 25 (c) SHOWS POSITION INFORMATION OF POINT $\eta$] | |
| | SECOND BORDER OUT BRDO START POSITION INFORMATION(PHYSICAL SECTOR NUMBER) [EXAMPLE SHOWN IN FIG. 25 (c) SHOWS POSITION INFORMATION OF POINT $\theta$] | |
| | .................. | |
| | 50TH BORDER OUT BRDO START POSITION INFORMATION | |

FIG.31

| FIELD NUMBER | RECORDED INFORMATION CONTENT |
|---|---|
| 4 | FINAL POSITION INFORMATION OF PLACE ALREADY USED FOR TEST WRITING IN DRIVE TEST ZONE DRTZ IN DATA LEAD-IN AREA DTLDI (PHYSICAL SECTOR NUMBER OR ECC BLOCK ADDRESS) |
| | SIZE INFORMATION OF AREA CAPABLE OF ADDITIONAL TEST WRITING IN DRIVE TEST ZONE DRTZ IN DATA LEAD-IN AREA DTLDI OR FLAG INFORMATION SHOWING WHETHER THIS DRIVE TEST ZONE DRTZ IS USED UP OR NOT |
| | FINAL POSITION INFORMATION OF PLACE ALREADY USED FOR TEST WRITING IN DRIVE TEST ZONE DRTZ IN DATA LEAD-OUT AREA DTLDO(DESCRIBED IN PHYSICAL SECTOR NUMBER, OR ECC BLOCK ADDRESS OR DATA SEGMENT ADDRESS) |
| | SIZE INFORMATION OF AREA CAPABLE OF ADDITIONAL TEST WRITING IN DRIVE TEST ZONE DRTZ IN DATA LEAD-OUT AREA DTLDO OR FLAG INFORMATION SHOWING WHETHER THIS DRIVE TEST ZONE DRTZ IS USED UP OR NOT |
| | NUMBER OF ADDITIONAL SETTINGS INFORMATION OF EXTENDED DRIVE TEST ZONE EDRTZ |
| | START POSITION INFORMATION OF INITIALLY SET EXTENDED DRIVE TEST ZONE EDRTZ(DESCRIBED IN PHYSICAL SECTOR NUMBER OR ECC BLOCK/DATA SEGMENT ADDRESS) |
| | END POSITION INFORMATION OF INITIALLY SET EXTENDED DRIVE TEST ZONE EDRTZ(DESCRIBED IN PHYSICAL SECTOR NUMBER OR ECC BLOCK/DATA SEGMENT ADDRESS) OR SIZE INFORMATION OF INITIALLY SET EXTENDED DRIVE TEST ZONE EDRTZ |
| | FINAL POSITION INFORMATION OF PLACE ALREADY USED FOR TEST WRITING IN INITIALLY SET EXTENDED DRIVE TEST ZONE EDRTZ(DESCRIBED IN PHYSICAL SECTOR NUMBER OR ECC BLOCK/DATA SEGMENT ADDRESS) |
| | SIZE INFORMATION OF AREA CAPABLE OF ADDITIONAL TEST WRITING IN INITIALLY SET EXTENDED DRIVE TEST ZONE EDRTZ OR FLAG INFORMATION SHOWING WHETHER THIS EXTENDED DRIVE TEST ZONE EDRTZ IS USED UP OR NOT |
| | START POSITION INFORMATION OF SECONDARILY SET EXTENDED DRIVE TEST ZONE EDRTZ(DESCRIBED IN PHYSICAL SECTOR NUMBER OR ECC BLOCK/DATA SEGMENT ADDRESS) |
| | ................. |
| 5 | NUMBER INFORMATION OF ECC BLOCKS OR NUMBER INFORMATION OF PHYSICAL SEGMENT BLOCKS ALREADY USED FOR REPLACEMENT IN SPARE AREA SPA ADJACENT TO DATA LEAD-IN AREA DTLDI, OR FINAL POSITION INFORMATION OF USED PLACE FOR REPLACEMENT (ECC BLOCK/DATA SEGMENT ADDRESS) |
| | REMAINING AMOUNT INFORMATION IN SPARE AREA SPA ADJACENT TO DATA LEAD-IN AREA DTLDI (NUMBER INFORMATION OF ECC BLOCKS IN UNUSED PLACE USABLE FOR REPLACEMENT HEREAFTER, OR INFORMATION OF NUMBER OF PHYSICAL SEGMENT BLOCKS OR NUMBER OF DATA SEGMENTS) |
| | NUMBER OF ADDITIONAL SETTINGS INFORMATION OF EXTENDED SPARE AREA ESPA |
| | START POSITION INFORMATION OF INITIALLY SET EXTENDED SPARE AREA ESPA (DESCRIBED IN PHYSICAL SECTOR NUMBER OR ECC BLOCK/DATA SEGMENT ADDRESS) |
| | END POSITION INFORMATION OF INITIALLY SET EXTENDED SPARE AREA ESPA (DESCRIBED IN PHYSICAL SECTOR NUMBER OR ECC BLOCK/DATA SEGMENT ADDRESS) |
| | INFORMATION OF NUMBER OF ECC BLOCKS OR INFORMATION OF NUMBER OF PHYSICAL SEGMENTS ALREADY USED FOR REPLACEMENT IN INITIALLY SET EXTENDED SPARE AREA ESPA, OR FINAL POSITION INFORMATION OF PLACE USED FOR REPLACEMENT(ECC BLOCK/DATA SEGMENT ADDRESS) |
| | REMAINING AMOUNT INFORMATION IN INITIALLY SET EXTENDED SPARE AREA ESPA(INFORMATION OF NUMBER OF ECC BLOCKS OR INFORMATION OF NUMBER OF PHYSICAL SEGMENT BLOCKS OF UNUSED PLACE USABLE FOR REPLACEMENT HEREAFTER) |
| | START POSITION INFORMATION OF SECONDARILY SET EXTENDED SPARE AREA ESPA (DESCRIBED IN PHYSICAL SECTOR NUMBER OR ECC BLOCK/DATA SEGMENT ADDRESS) |
| | END POSITION INFORMATION OF SECONDARILY SET EXTENDED SPARE AREA ESPA (DESCRIBED IN PHYSICAL SECTOR NUMBER OR ECC BLOCK/DATA SEGMENT ADDRESS) |
| | INFORMATION OF NUMBER OF ECC BLOCKS OR INFORMATION OF NUMBER OF PHYSICAL SEGMENTS ALREADY USED FOR REPLACEMENT IN SECONDARILY SET EXTENDED SPARE AREA ESPA, OR FINAL POSITION INFORMATION OF PLACE USED FOR REPLACEMENT (ECC BLOCK/DATA SEGMENT ADDRESS) |
| | REMAINING AMOUNT INFORMATION IN SECONDARILY SET EXTENDED SPARE AREA ESPA (INFORMATION OF NUMBER OF ECC BLOCKS, OR NUMBER OF PHYSICAL SEGMENT BLOCKS OR NUMBER OF DATA SEGMENTS OF UNUSED PLACE USABLE FOR REPLACEMENT HEREAFTER) |
| | ................. |

FIG.32

| FIELD NUMBER | RECORDED INFORMATION CONTENT | | |
|---|---|---|---|
| 6 | SIZE INFORMATION OF RMD FIELD 6 | | |
| | SECONDARY DEFECT LIST INFORMATION SDL | SECONDARY DEFECT LIST IDENTIFYING INFORMATION | |
| | | UPDATE COUNTER OF SECONDARY DEFECT LIST(NUMBER OF UPDATES) | |
| | | INFORMATION OF NUMBER OF SECONDARY DEFECT LIST ENTRIES | |
| | | FIRST SECONDARY DEFECT LIST ENTRY INFORMATION | INFORMATION OF PRESENCE OR ABSENCE OF REPLACEMENT PROCESSING OF DEFECTIVE BLOCK TO SPARE BLOCK |
| | | | INFORMATION OF KIND OF DEFECT MANAGEMENT PROCESSING (・REPLACEMENT PROCESSING IS PERFORMED DUE TO DEFECT OF ORIGINAL ECC BLOCK ? ・ MULTIPLEXING RECORD IS PERFORMED BECAUSE ORIGINAL ECC BLOCK IS NOT DEFECTIVE?) |
| | | | POSITION INFORMATION OF ORIGINAL ECC BLOCK (ECC BLOCK ADDRESS OR DATA SEGMENT ADDRESS, OR ECC BLOCK HEAD POSITION PYSICAL SECTOR NUMBER |
| | | | POSITION INFORMATION OF REPLACED ECC BLOCK (ECC BLOCK ADDRESS OR DATA SEGMENT ADDRESS, OR ECC BLOCK HEAD POSITION PYSICAL SECTOR NUMBER |
| | | ... | |
| | | FINAL SECONDARY DEFECT LIST ENTRY INFORMATION | INFORMATION OF PRESENCE OR ABSENCE OF REPLACEMENT PROCESSING OF DEFECTIVE BLOCK TO SPARE BLOCK |
| | | | INFORMATION OF KIND OF DEFECT MANAGEMENT PROCESSING (・REPLACEMENT PROCESSING IS PERFORMED DUE TO DEFECT OF ORIGINAL ECC BLOCK ? ・ MULTIPLEXING RECORD IS PERFORMED BECAUSE ORIGINAL ECC BLOCK IS NOT DEFECTIVE?) |
| | | | POSITION INFORMATION OF ORIGINAL ECC BLOCK (ECC BLOCK ADDRESS OR DATA SEGMENT ADDRESS, OR ECC BLOCK HEAD POSITION PYSICAL SECTOR NUMBER |
| | | | POSITION INFORMATION OF REPLACED ECC BLOCK (ECC BLOCK ADDRESS OR DATA SEGMENT ADDRESS, OR ECC BLOCK HEAD POSITION PYSICAL SECTOR NUMBER |
| 7 | INFORMATION OF NUMBER OF ENTIRE R ZONES | | |
| | INFORMATION OF NUMBER OF FIRST "OPEN R ZONES" | | |
| | INFORMATION OF NUMBER OF SECOND "OPEN R ZONES" | | |
| | START POSITION INFORMATION OF FIRST "COMPLETE R ZONE" (PHYSICAL SECTOR NUMBER) | | |
| | END POSITION INFORMATION OF FIRST "COMPLETE R ZONE" (PHYSICAL SECTOR NUMBER) | | |
| | ............ | | |
| | START POSITION INFORMATION OF THE 254TH "COMPLETE R ZONE" (PHYSICAL SECTOR NUMBER) | | |
| | END POSITION INFORMATION OF THE 254TH "COMPLETE R ZONE" (PHYSICAL SECTOR NUMBER) | | |
| 8, 9, ... | START POSITION INFORMATION OF THE 255TH "COMPLETE R ZONE" (PHYSICAL SECTOR NUMBER) | | |
| | END POSITION INFORMATION OF THE 255TH "COMPLETE R ZONE" (PHYSICAL SECTOR NUMBER) | | |
| | ............ | | |
| | START POSITION INFORMATION OF THE NTH "COMPLETE R ZONE" (PHYSICAL SECTOR NUMBER) | | |
| | END POSITION INFORMATION OF THE NTH "COMPLETE R ZONE" (PHYSICAL SECTOR NUMBER) | | |

FIG.35

| 4BYTES | 2BYTES | 2BYTES | 160BYTES | 172BYTES | |
|---|---|---|---|---|---|
| DATA ID | IED | RSV | MAIN DATA (D0~D159) | MAIN DATA 172BYTES (D160~D331) | |
| | | | MAIN DATA 172BYTES (D332~D503) | MAIN DATA 172BYTES (D504~D675) | |
| | | | MAIN DATA 172BYTES (D676~D847) | MAIN DATA 172BYTES (D848~D1019) | |
| | | | MAIN DATA 172BYTES (D1020~D1191) | MAIN DATA 172BYTES (D1192~D1363) | |
| | | | MAIN DATA 172BYTES (D1364~D1535) | MAIN DATA 172BYTES (D1536~D1707) | |
| | | | MAIN DATA 172BYTES (D1708~D1879) | MAIN DATA 172BYTES (D1880~D2047) | 4BYTES (ECC) |

6 ROWS

| INITIAL PRESET NUMBER | INITIAL PRESET VALUE | INITIAL PRESET NUMBER | INITIAL PRESET VALUE |
|---|---|---|---|
| 0h | 0001h | 8h | 0010h |
| 1h | 5500h | 9h | 5000h |
| 2h | 0002h | 0Ah | 0020h |
| 3h | 2A00h | 0Bh | 2001h |
| 4h | 0004h | 0Ch | 0040h |
| 5h | 5400h | 0Dh | 4002h |
| 6h | 0008h | 0Eh | 0080h |
| 7h | 2800h | 0Fh | 0005h |

FIG.41

|  | State0 | State1 or State2 |
|---|---|---|
| SY0 | 1000#0 010000 000000 001001 | 0100#0 010000 000000 001001 |
| SY1 | 10100# 010000 000000 001001 | 00100# 010000 000000 001001 |
| SY2 | 10010# 010000 000000 001001 | 00010# 010000 000000 001001 |
| SY3 | 000000# 010000 000000 001001 | 00#010 010000 000000 001001 |

FIG. 43

CONNECTION RULE

| INDEX | PRECEDENT CODE WORD | CURRENT CODE WORD | CONNECTED CODE WORD |
|---|---|---|---|
| 1 | ??0101 010101 | 010??? ????? | ??0100 000000 010??? ????? |
| 2 | ??0101 010101 | 001??? ????? | ??0100 000000 001??? ????? |
| 3 | ??1001 010101 | 010??? ????? | ??1000 000000 010??? ????? |
| 4 | ??0110 101010 | 101010 ????? | ??????  100000 000010 ????? |
| 5 | ??0111 001010 | 101010 ????? | ??????1 000000 000010 ????? |
| 6 | ????? ??0101 | 010101 010??? | ????? ??0100 000000 010??? |
| 7 | ????? ??1001 | 010101 001??? | ????? ??0100 000000 001??? |
| 8 | ????? ??1001 | 010101 010??? | ????? ??1000 000000 010??? |
| 9 | ????? ????? | 001010 101010 | ????? ????? 000000 000010 |

FIG.44

CONNECTION OF CODE WORD AND SYN CODE

| INDEX | PRECEDENT CODE WORD | SUBSEQUENT SYN CODE | CONNECTED CODE |
|---|---|---|---|
| S | ?????0 00000# | SY3 | ?????0 000001+SY3 |

FIG.45

SEPARATION RULE

| INDEX | READ CODE WORD | CURRENT CORD WORD | SUBSEQUENT CODE WORD |
|---|---|---|---|
| 1 | ?????? ?00000 0000?? ????? | ?????? ?01010 ?01010 | 101?? ????? |
| 2 | ?????? ????00 000000 0???? | ?????? ?????01 ????? | 010101 0???? |
| 3 | ?????? ????? ?????? 0000?? | ?????? ????? ????? | 001010 101?? |

FIG.46

CONVERSION TABLE EXPLANATORY DIAGRAM IN PRESENT INVENTION MODULATION METHOD

| DATA WORD | STATE0 CODE WORD | NEXT STATE | STATE1 CODE WORD | NEXT STATE | STATE2 CODE WORD | NEXT STATE |
|---|---|---|---|---|---|---|
| 00 | 100010 00000* | 0 | 010100 01000* | 0 | 010100 01000* | 0 |
| 01 | 100010 00000# | 1 | 010100 010001 | 1 | 010100 010001 | 1 |
| 02 | 100010 000010 | 0 | 010100 010010 | 0 | 010100 010010 | 0 |
| 03 | 100010 000010 | 1 | 010100 010010 | 1 | 010100 010010 | 1 |
| 04 | 100010 10000* | 0 | 010100 01010* | 0 | 010100 01010* | 0 |
| 05 | 100010 10000# | 1 | 010100 010101 | 1 | 010100 010101 | 1 |
| 06 | 100010 100010 | 0 | 010100 010100 | 2 | 010100 010100 | 2 |
| 07 | 100010 100010 | 1 | 010100 010000 | 2 | 010100 010000 | 2 |
| 08 | 100010 10100* | 0 | 010100 00#00* | 0 | 010100 00#00* | 0 |
| 09 | 100010 101001 | 1 | 010100 00#001 | 1 | 010100 00#001 | 1 |
| 0A | 100010 101010 | 0 | 010100 00#010 | 0 | 010100 00#010 | 0 |
| 0B | 100010 101010 | 1 | 010100 00#010 | 1 | 010100 00#010 | 1 |
| 0C | 100010 10010* | 0 | 010100 00010* | 0 | 010100 00010* | 0 |
| 0D | 100010 100101 | 1 | 010100 000101 | 1 | 010100 000101 | 1 |
| 0E | 100010 100100 | 2 | 010100 000100 | 2 | 010100 000100 | 2 |
| 0F | 100010 101000 | 2 | 010100 001000 | 2 | 010100 001000 | 2 |
| 10 | 100010 01000* | 0 | 010000 01000* | 0 | 010000 01000* | 0 |
| 11 | 100010 010001 | 1 | 010000 010001 | 1 | 010000 010001 | 1 |
| 12 | 100010 010010 | 0 | 010000 010010 | 0 | 010000 010010 | 0 |
| 13 | 100010 010010 | 1 | 010000 010010 | 1 | 010000 010010 | 1 |
| 14 | 100010 01010* | 0 | 010000 01010* | 0 | 010000 01010* | 0 |
| 15 | 100010 010101 | 1 | 010000 010101 | 1 | 010000 010101 | 1 |
| 16 | 100010 010100 | 2 | 010000 010100 | 2 | 010000 010100 | 2 |
| 17 | 100010 010000 | 2 | 010000 010000 | 2 | 010000 010000 | 2 |
| 18 | 100010 00100* | 0 | 010000 00100* | 0 | 010000 00100* | 0 |
| 19 | 100010 001001 | 1 | 010000 001001 | 1 | 010000 001001 | 1 |
| 1A | 100010 001010 | 0 | 010000 00#010 | 0 | 010000 00#010 | 0 |
| 1B | 100010 001010 | 1 | 010000 00#010 | 1 | 010000 00#010 | 1 |
| 1C | 100010 00010* | 0 | 010000 00010* | 0 | 010000 00010* | 0 |
| 1D | 100010 000101 | 1 | 010000 000101 | 1 | 010000 000101 | 1 |
| 1E | 100010 000100 | 2 | 010000 000100 | 2 | 010000 000100 | 2 |
| 1F | 100010 001000 | 2 | 010000 001000 | 2 | 010000 001000 | 2 |
| 20 | 100001 00000* | 0 | 010101 00000* | 0 | 010101 00000* | 0 |
| 21 | 100001 00000# | 1 | 010101 00000# | 1 | 010101 00000# | 1 |
| 22 | 100001 000010 | 0 | 010101 000010 | 0 | 010101 000010 | 0 |
| 23 | 100001 000010 | 1 | 010101 000010 | 1 | 010101 000010 | 1 |
| 24 | 100000 10000* | 0 | 010100 10000* | 0 | 010100 10000* | 0 |
| 25 | 100000 10000# | 1 | 010100 10000# | 1 | 010100 10000# | 1 |
| 26 | 100000 100010 | 0 | 010100 100010 | 0 | 010100 100010 | 0 |
| 27 | 100000 100010 | 1 | 010100 100010 | 1 | 010100 100010 | 1 |
| 28 | 100000 10100* | 0 | 010100 10100* | 0 | 010100 10100* | 0 |
| 29 | 100000 101001 | 1 | 010100 001001 | 1 | 010100 001001 | 1 |
| 2A | 100000 101010 | 0 | 010100 101010 | 0 | 010100 101010 | 0 |
| 2B | 100000 101010 | 1 | 010100 101010 | 1 | 010100 101010 | 1 |
| 2C | 100000 10010* | 0 | 010100 10010* | 0 | 010100 10010* | 0 |
| 2D | 100000 100101 | 1 | 010100 100101 | 1 | 010100 100101 | 1 |
| 2E | 100000 100100 | 2 | 010100 100100 | 2 | 010100 100100 | 2 |
| 2F | 100000 101000 | 2 | 010100 101000 | 2 | 010100 101000 | 2 |

FIG.47

| DATA WORD | STATE0 CODE WORD | NEXT STATE | STATE1 CODE WORD | NEXT STATE | STATE2 CODE WORD | NEXT STATE |
|---|---|---|---|---|---|---|
| 30 | 10000# 01000* | 0 | 010101 01000* | 0 | 010101 01000* | 0 |
| 31 | 10000# 010001 | 1 | 010101 010001 | 1 | 010101 010001 | 1 |
| 32 | 10000# 010010 | 0 | 010101 010010 | 0 | 010101 010010 | 0 |
| 33 | 10000# 010010 | 1 | 010101 010010 | 1 | 010101 010010 | 1 |
| 34 | 10000# 01010* | 0 | 010000 00000* | 0 | 010000 00000* | 0 |
| 35 | 100000 010101 | 1 | 010000 000001 | 1 | 010000 000001 | 1 |
| 36 | 10000# 010100 | 2 | 010101 010100 | 2 | 010101 010100 | 2 |
| 37 | 10000# 010000 | 2 | 010101 010000 | 2 | 010101 010000 | 2 |
| 38 | 10000# 00100* | 0 | 010101 00100* | 0 | 010101 00100* | 0 |
| 39 | 10000# 001001 | 1 | 010101 001001 | 1 | 010101 001001 | 1 |
| 3A | 10000# 001010 | 0 | 010101 001010 | 0 | 010101 001010 | 0 |
| 3B | 10000# 001010 | 1 | 010101 001010 | 1 | 010101 001010 | 1 |
| 3C | 10000# 00010* | 0 | 010101 00010* | 0 | 010101 00010* | 0 |
| 3D | 10000# 000101 | 1 | 010101 000101 | 1 | 010101 000101 | 1 |
| 3E | 10000# 000100 | 2 | 010101 000100 | 2 | 010101 000100 | 2 |
| 3F | 10000# 001000 | 2 | 010101 001000 | 2 | 010101 001000 | 2 |
| 40 | 101010 00000* | 0 | 010010 00000* | 0 | 010010 00000* | 0 |
| 41 | 101010 00000# | 1 | 010010 00000# | 1 | 010010 00000# | 1 |
| 42 | 101010 000010 | 0 | 010010 000010 | 0 | 010010 000010 | 0 |
| 43 | 101010 000010 | 1 | 010010 000010 | 1 | 010010 000010 | 1 |
| 44 | 101010 10000* | 0 | 010010 10000* | 0 | 010010 10000* | 0 |
| 45 | 101010 10000# | 1 | 010010 10000# | 1 | 010010 10000# | 1 |
| 46 | 101010 100010 | 0 | 010010 100010 | 0 | 010010 100010 | 0 |
| 47 | 101010 100010 | 1 | 010010 100010 | 1 | 010010 100010 | 1 |
| 48 | 000000 00100* | 0 | 010010 00100* | 0 | 010010 00100* | 0 |
| 49 | 100000 000001 | 1 | 010010 101001 | 1 | 010010 101001 | 1 |
| 4A | 100000 000010 | 0 | 010010 101010 | 0 | 010010 101010 | 0 |
| 4B | 100000 000010 | 1 | 010010 101010 | 1 | 010010 101010 | 1 |
| 4C | 101010 10010* | 0 | 010010 10010* | 0 | 010010 10010* | 0 |
| 4D | 101010 100101 | 1 | 010010 100101 | 1 | 010010 100101 | 1 |
| 4E | 101010 100100 | 2 | 010010 100100 | 2 | 010010 100100 | 2 |
| 4F | 000000 001000 | 2 | 010010 101000 | 2 | 010010 101000 | 2 |
| 50 | 101010 01000* | 0 | 010010 01000* | 0 | 010010 01000* | 0 |
| 51 | 101010 010001 | 1 | 010010 010001 | 1 | 010010 010001 | 1 |
| 52 | 101010 010010 | 0 | 010010 010010 | 0 | 010010 010010 | 0 |
| 53 | 101010 010010 | 1 | 010010 010010 | 1 | 010010 010010 | 1 |
| 54 | 101010 01010* | 0 | 010010 01010* | 0 | 010010 01010* | 0 |
| 55 | 101010 010101 | 1 | 010010 010101 | 1 | 010010 010101 | 1 |
| 56 | 101010 010100 | 2 | 010010 010100 | 2 | 010010 010100 | 2 |
| 57 | 101010 010000 | 2 | 010010 010000 | 2 | 010010 010000 | 2 |
| 58 | 101010 00100* | 0 | 010010 00100* | 0 | 010010 00100* | 0 |
| 59 | 101010 001001 | 1 | 010010 001001 | 1 | 010010 001001 | 1 |
| 5A | 101010 001010 | 0 | 010010 001010 | 0 | 010010 001010 | 0 |
| 5B | 101010 001010 | 1 | 010010 001010 | 1 | 010010 001010 | 1 |
| 5C | 101010 00010* | 0 | 010010 00010* | 0 | 010010 00010* | 0 |
| 5D | 101010 000101 | 1 | 010010 000101 | 1 | 010010 000101 | 1 |
| 5E | 101010 000100 | 2 | 010010 000100 | 2 | 010010 000100 | 2 |
| 5F | 101010 001000 | 2 | 010010 001000 | 2 | 010010 001000 | 2 |

FIG.48

| DATA WORD | STATE0 CODE WORD | NEXT STATE | STATE1 CODE WORD | NEXT STATE | STATE2 CODE WORD | NEXT STATE |
|---|---|---|---|---|---|---|
| 60 | 101001 00000* | 0 | 010001 00000* | 0 | 010001 00000* | 0 |
| 61 | 101001 00000# | 1 | 010001 000001 | 1 | 010001 000001 | 1 |
| 62 | 101001 000010 | 0 | 010001 000010 | 0 | 010001 000010 | 0 |
| 63 | 101001 000010 | 1 | 010001 000010 | 1 | 010001 000010 | 1 |
| 64 | 101000 10000* | 0 | 010000 10000* | 0 | 010000 10000* | 0 |
| 65 | 101000 10000# | 1 | 010000 10000# | 1 | 010000 10000# | 1 |
| 66 | 101000 100010 | 0 | 010000 100010 | 0 | 010000 100010 | 0 |
| 67 | 101000 100010 | 1 | 010000 100010 | 1 | 010000 100010 | 1 |
| 68 | 101000 10100* | 0 | 010000 10100* | 0 | 010000 10100* | 0 |
| 69 | 101000 101001 | 1 | 010000 101001 | 1 | 010000 101001 | 1 |
| 6A | 101000 101010 | 0 | 010000 101010 | 0 | 010000 101010 | 0 |
| 6B | 101000 101010 | 1 | 010000 101010 | 1 | 010000 101010 | 1 |
| 6C | 101000 10010* | 0 | 010000 10010* | 0 | 010000 10010* | 0 |
| 6D | 101000 100101 | 1 | 010000 100101 | 1 | 010000 100101 | 1 |
| 6E | 101000 100100 | 2 | 010000 100100 | 2 | 010000 100100 | 2 |
| 6F | 101000 101000 | 2 | 010000 101000 | 2 | 010000 101000 | 2 |
| 70 | 101001 01000* | 0 | 010001 01000* | 0 | 010001 01000* | 0 |
| 71 | 101001 010001 | 1 | 010001 010001 | 1 | 010001 010001 | 1 |
| 72 | 101001 010010 | 0 | 010001 010010 | 0 | 010001 010010 | 0 |
| 73 | 101001 010010 | 1 | 010001 010010 | 1 | 010001 010010 | 1 |
| 74 | 101001 01010* | 0 | 010001 01010* | 0 | 010001 01010* | 0 |
| 75 | 101001 010101 | 1 | 010001 000000 | 1 | 010001 000000 | 1 |
| 76 | 101001 010100 | 2 | 010001 010100 | 2 | 010001 010100 | 2 |
| 77 | 101001 010000 | 2 | 010001 010000 | 2 | 010001 010000 | 2 |
| 78 | 101001 00100* | 0 | 010001 00100* | 0 | 010001 00100* | 0 |
| 79 | 101001 001001 | 1 | 010001 001001 | 1 | 010001 001001 | 1 |
| 7A | 101001 001010 | 0 | 010001 001010 | 0 | 010001 001010 | 0 |
| 7B | 101001 001010 | 1 | 010001 001010 | 1 | 010001 001010 | 1 |
| 7C | 101001 00010* | 0 | 010001 00010* | 0 | 010001 00010* | 0 |
| 7D | 101001 000101 | 1 | 010001 000101 | 1 | 010001 000101 | 1 |
| 7E | 101001 000100 | 2 | 010001 000100 | 2 | 010001 000100 | 2 |
| 7F | 101001 001000 | 2 | 010001 001000 | 2 | 010001 001000 | 2 |
| 80 | 100100 01000* | 0 | 000100 01000* | 0 | 000100 01000* | 0 |
| 81 | 100100 010001 | 1 | 000100 010001 | 1 | 000100 010001 | 1 |
| 82 | 100100 010010 | 0 | 000100 010010 | 0 | 000100 010010 | 0 |
| 83 | 100100 010010 | 1 | 000100 010010 | 1 | 000100 010010 | 1 |
| 84 | 100100 01010* | 0 | 000100 01010* | 0 | 000100 01010* | 0 |
| 85 | 100100 010101 | 1 | 000100 010101 | 1 | 000100 010101 | 1 |
| 86 | 100100 010100 | 2 | 000100 010100 | 2 | 000100 010100 | 2 |
| 87 | 100100 010000 | 2 | 000100 010000 | 2 | 000100 010000 | 2 |
| 88 | 100100 00#00* | 0 | 000100 00#00* | 0 | 000100 00#00* | 0 |
| 89 | 100100 00#001 | 1 | 000100 00#001 | 1 | 000100 00#001 | 1 |
| 8A | 100100 00#010 | 0 | 000100 00#010 | 0 | 000100 00#010 | 0 |
| 8B | 100100 00#010 | 1 | 000100 00#010 | 1 | 000100 00#010 | 1 |
| 8C | 100100 00010* | 0 | 000100 00010* | 0 | 000100 00010* | 0 |
| 8D | 100100 000101 | 1 | 000100 000101 | 1 | 000100 000101 | 1 |
| 8E | 100100 000100 | 2 | 000100 000100 | 2 | 000100 000100 | 2 |
| 8F | 100100 001000 | 2 | 000100 001000 | 2 | 000100 001000 | 2 |

FIG.49

| DATA WORD | STATE0 | | STATE1 | | STATE2 | |
|---|---|---|---|---|---|---|
| | CODE WORD | NEXT STATE | CODE WORD | NEXT STATE | CODE WORD | NEXT STATE |
| 90 | 101000 01000* | 0 | 001000 01000* | 0 | 001000 01000* | 0 |
| 91 | 101000 010001 | 1 | 001000 010001 | 1 | 001000 010001 | 1 |
| 92 | 101000 010010 | 0 | 001000 010010 | 0 | 001000 010010 | 0 |
| 93 | 101000 010010 | 1 | 001000 010010 | 1 | 001000 010010 | 1 |
| 94 | 101000 01010* | 0 | 001000 01010* | 0 | 001000 01010* | 0 |
| 95 | 101000 010101 | 1 | 001000 010101 | 1 | 001000 010101 | 1 |
| 96 | 101000 010100 | 2 | 001000 010100 | 2 | 001000 010100 | 2 |
| 97 | 101000 010000 | 2 | 001000 010000 | 2 | 001000 010000 | 2 |
| 98 | 101000 00#00* | 0 | 001000 00#00* | 0 | 001000 00#00* | 0 |
| 99 | 101000 00#001 | 1 | 001000 00#001 | 1 | 001000 00#001 | 1 |
| 9A | 101000 00#010 | 0 | 001000 001010 | 0 | 001000 001010 | 0 |
| 9B | 101000 00#010 | 1 | 001000 00#010 | 1 | 001000 00#010 | 1 |
| 9C | 101000 00010* | 0 | 001000 00010* | 0 | 001000 00010* | 0 |
| 9D | 101000 000101 | 1 | 001000 000101 | 1 | 001000 000101 | 1 |
| 9E | 101000 000100 | 2 | 001000 000100 | 2 | 001000 000100 | 2 |
| 9F | 101000 001000 | 2 | 001000 001000 | 2 | 001000 001000 | 2 |
| A0 | 100101 00000* | 0 | 000101 00000* | 0 | 000101 00000* | 0 |
| A1 | 100101 00000# | 1 | 000101 00000# | 1 | 000101 00000# | 1 |
| A2 | 100101 000010 | 0 | 000101 000010 | 0 | 000101 000010 | 0 |
| A3 | 100101 000010 | 1 | 000101 000010 | 1 | 000101 000010 | 1 |
| A4 | 100100 10000* | 0 | 000100 10000* | 0 | 000100 10000* | 0 |
| A5 | 100100 10000# | 1 | 000100 10000# | 1 | 000100 10000# | 1 |
| A6 | 100100 100010 | 0 | 000100 100010 | 0 | 000100 100010 | 0 |
| A7 | 100100 100010 | 1 | 000100 100010 | 1 | 000100 100010 | 1 |
| A8 | 100100 10100* | 0 | 000100 10100* | 0 | 000100 10100* | 0 |
| A9 | 100100 101001 | 1 | 000100 101001 | 1 | 000100 101001 | 1 |
| AA | 100100 101010 | 0 | 000100 101010 | 0 | 000100 101010 | 0 |
| AB | 100100 101010 | 1 | 000100 101010 | 1 | 000100 101010 | 1 |
| AC | 100100 10010* | 0 | 000100 10010* | 0 | 000100 10010* | 0 |
| AD | 100100 100101 | 1 | 000100 100101 | 1 | 000100 100101 | 1 |
| AE | 100100 100100 | 2 | 000100 100100 | 2 | 000100 100100 | 2 |
| AF | 100100 101000 | 2 | 000100 101000 | 2 | 000100 101000 | 2 |
| B0 | 100101 01000* | 0 | 000101 01000* | 0 | 000101 01000* | 0 |
| B1 | 100101 010001 | 1 | 000101 010001 | 1 | 000101 010001 | 1 |
| B2 | 100101 010010 | 0 | 000101 010010 | 0 | 000101 010010 | 0 |
| B3 | 100101 010010 | 1 | 000101 010010 | 1 | 000101 010010 | 1 |
| B4 | 100101 01010* | 0 | 000101 01010* | 0 | 000101 01010* | 0 |
| B5 | 100101 010101 | 1 | 000101 010101 | 1 | 000101 010101 | 1 |
| B6 | 100101 010100 | 2 | 000101 010100 | 2 | 000101 010100 | 2 |
| B7 | 100101 010000 | 2 | 000101 010000 | 2 | 000101 010000 | 2 |
| B8 | 100101 00100* | 0 | 000101 00100* | 0 | 000101 00100* | 0 |
| B9 | 100101 001001 | 1 | 000101 001001 | 1 | 000101 001001 | 1 |
| BA | 100101 001010 | 0 | 000101 001010 | 0 | 000101 001010 | 0 |
| BB | 100101 001010 | 1 | 000101 001010 | 1 | 000101 001010 | 1 |
| BC | 100101 00010* | 0 | 000101 00010* | 0 | 000101 00010* | 0 |
| BD | 100101 000101 | 1 | 000101 000101 | 1 | 000101 000101 | 1 |
| BE | 100101 000100 | 2 | 000101 000100 | 2 | 000101 000100 | 2 |
| BF | 100101 001000 | 2 | 000101 001000 | 2 | 000101 001000 | 2 |

FIG.50

| DATA WORD | STATE0 CODE WORD | NEXT STATE | STATE1 CODE WORD | NEXT STATE | STATE2 CODE WORD | NEXT STATE |
|---|---|---|---|---|---|---|
| C0 | 000010 00000* | 0 | 001010 00000* | 0 | 00#010 00000* | 0 |
| C1 | 000010 00000# | 1 | 001010 00000# | 1 | 00#010 00000# | 1 |
| C2 | 000010 000010 | 0 | 001010 000010 | 0 | 00#010 000010 | 0 |
| C3 | 000010 000010 | 1 | 001010 000010 | 1 | 00#010 000010 | 1 |
| C4 | 000010 10000* | 0 | 001010 10000* | 0 | 00#010 10000* | 0 |
| C5 | 000010 10000# | 1 | 001010 10000# | 1 | 00#010 10000# | 1 |
| C6 | 000010 100010 | 0 | 001010 100010 | 0 | 00#010 100010 | 0 |
| C7 | 000010 100010 | 1 | 001010 100010 | 1 | 00#010 100010 | 1 |
| C8 | 000010 10100* | 0 | 001010 10100* | 0 | 00#010 10100* | 0 |
| C9 | 000010 101001 | 1 | 001010 101001 | 1 | 00#010 101001 | 1 |
| CA | 000010 101010 | 0 | 001000 000010 | 0 | 001000 000010 | 0 |
| CB | 000010 101010 | 1 | 001010 101010 | 1 | 00#010 101010 | 1 |
| CC | 000010 10010* | 0 | 001010 10010* | 0 | 00#010 10010* | 0 |
| CD | 000010 100101 | 1 | 001010 100101 | 1 | 00#010 100101 | 1 |
| CE | 000010 100100 | 2 | 001010 100100 | 2 | 00#010 100100 | 2 |
| CF | 000010 101000 | 2 | 001010 101000 | 2 | 00#010 101000 | 2 |
| D0 | 000010 01000* | 0 | 001010 01000* | 0 | 00#010 01000* | 0 |
| D1 | 000010 010001 | 1 | 001010 010001 | 1 | 00#010 010001 | 1 |
| D2 | 000010 010010 | 0 | 001010 010010 | 0 | 00#010 010010 | 0 |
| D3 | 000010 010010 | 1 | 001010 010010 | 1 | 00#010 010010 | 1 |
| D4 | 000010 01010* | 0 | 001010 01010* | 0 | 00#010 01010* | 0 |
| D5 | 000010 010101 | 1 | 001010 010101 | 1 | 00#010 010101 | 1 |
| D6 | 000010 010100 | 2 | 001010 010100 | 2 | 00#010 010100 | 2 |
| D7 | 000010 010000 | 2 | 001010 010000 | 2 | 00#010 010000 | 2 |
| D8 | 000010 00100* | 0 | 001010 00100* | 0 | 00#010 00100* | 0 |
| D9 | 000010 001001 | 1 | 001010 001001 | 1 | 00#010 001001 | 1 |
| DA | 000010 001010 | 0 | 001010 001010 | 0 | 00#010 001010 | 0 |
| DB | 000010 001010 | 1 | 001010 001010 | 1 | 00#010 001010 | 1 |
| DC | 000010 00010* | 0 | 001010 00010* | 0 | 00#010 00010* | 0 |
| DD | 000010 000101 | 1 | 001010 000101 | 1 | 00#010 000101 | 1 |
| DE | 000010 000100 | 2 | 001010 000100 | 2 | 00#010 000100 | 2 |
| DF | 000010 001000 | 2 | 001010 001000 | 2 | 00#010 001000 | 2 |
| E0 | 000001 00000* | 0 | 001001 00000* | 0 | 00#001 00000* | 0 |
| E1 | 000001 00000# | 1 | 001001 00000# | 1 | 00#001 00000# | 1 |
| E2 | 000001 000010 | 0 | 001001 000010 | 0 | 00#001 000010 | 0 |
| E3 | 000001 000010 | 1 | 001001 000010 | 1 | 00#001 000010 | 1 |
| E4 | 000000 10000* | 0 | 001000 10000* | 0 | 00#000 10000* | 0 |
| E5 | 000000 10000# | 1 | 001000 10000# | 1 | 00#000 10000# | 1 |
| E6 | 000000 100010 | 0 | 001000 100010 | 0 | 00#000 100010 | 0 |
| E7 | 000000 100010 | 1 | 001000 100010 | 1 | 00#000 100010 | 1 |
| E8 | 000000 10100* | 0 | 001000 10100* | 0 | 00#000 10100* | 0 |
| E9 | 000000 101001 | 1 | 001000 101001 | 1 | 00#000 101001 | 1 |
| EA | 000000 101010 | 0 | 001000 101010 | 0 | 00#000 101010 | 0 |
| EB | 000000 101010 | 1 | 001000 101010 | 1 | 00#000 101010 | 1 |
| EC | 000000 10010* | 0 | 001000 10010* | 0 | 00#000 10010* | 0 |
| ED | 000000 100101 | 1 | 001000 100101 | 1 | 00#000 100101 | 1 |
| EE | 000000 100100 | 2 | 001000 100100 | 2 | 00#000 100100 | 2 |
| EF | 000000 101000 | 2 | 001000 101000 | 2 | 00#000 101000 | 2 |

FIG.51

| DATA WORD | STATE0 CODE WORD | | NEXT STATE | STATE1 CODE WORD | | NEXT STATE | STATE2 CODE WORD | | NEXT STATE |
|---|---|---|---|---|---|---|---|---|---|
| F0 | 00000# | 01000* | 0 | 001001 | 01000* | 0 | 00#001 | 01000* | 0 |
| F1 | 00000# | 010001 | 1 | 001001 | 010001 | 1 | 00#001 | 010001 | 1 |
| F2 | 00000# | 010010 | 0 | 001001 | 010010 | 0 | 00#001 | 010010 | 0 |
| F3 | 00000# | 010010 | 1 | 001001 | 010010 | 1 | 00#001 | 010010 | 1 |
| F4 | 00000# | 01010* | 0 | 001001 | 01010* | 0 | 00#001 | 01010* | 0 |
| F5 | 000000 | 010101 | 1 | 001001 | 010101 | 1 | 001001 | 010101 | 1 |
| F6 | 00000# | 010100 | 2 | 001001 | 010100 | 2 | 00#001 | 010100 | 2 |
| F7 | 00000# | 010000 | 2 | 001001 | 010000 | 2 | 00#001 | 010000 | 2 |
| F8 | 000001 | 00100* | 0 | 001001 | 00100* | 0 | 00#001 | 00100* | 0 |
| F9 | 00000# | 001001 | 1 | 001001 | 001001 | 1 | 00#001 | 001001 | 1 |
| FA | 00000# | 001010 | 0 | 001001 | 001010 | 0 | 00#001 | 001010 | 0 |
| FB | 00000# | 101010 | 1 | 001001 | 101010 | 1 | 00#001 | 001010 | 1 |
| FC | 00000# | 00010* | 0 | 001001 | 00010* | 0 | 00#001 | 00010* | 0 |
| FD | 00000# | 000101 | 1 | 001001 | 000101 | 1 | 00#001 | 000101 | 1 |
| FE | 00000# | 000100 | 2 | 001001 | 000100 | 2 | 00#001 | 000100 | 2 |
| FF | 000001 | 001000 | 2 | 001001 | 001000 | 2 | 00#001 | 001000 | 2 |

FIG.52

DECODING TABLE EXPLANATORY DIAGRAM IN
PRESENT INVENTION MODULATION METHOD

| CURRENT CODE WORD | DATA WORD | | |
|---|---|---|---|
| | CASE1 | CASE2 | CASE3 |
| 000000 000100 | FC | FE | FE |
| 000000 000101 | Z | FC | FD |
| 000000 001000 | 48 | 4F | 4F |
| 000000 001001 | Z | 48 | F9 |
| 000000 001010 | FA | FA | FB |
| 000000 010000 | F0 | F7 | F7 |
| 000000 010001 | Z | F0 | F1 |
| 000000 010010 | F2 | F2 | F3 |
| 000000 010100 | F4 | F6 | F6 |
| 000000 010101 | Z | F4 | F5 |
| 000000 100000 | E4 | Z | E5 |
| 000000 100001 | Z | E4 | E5 |
| 000000 100010 | E6 | E6 | E7 |
| 000000 100100 | EC | EE | EE |
| 000000 100101 | Z | EC | ED |
| 000000 101000 | E8 | EF | EF |
| 000000 101001 | Z | E8 | E9 |
| 000000 101010 | EA | EA | EB |
| 000001 000000 | E0 | Z | E1 |
| 000001 000001 | Z | E0 | E1 |
| 000001 000010 | E2 | E2 | E3 |
| 000001 000100 | FC | FE | FE |
| 000001 000101 | Z | FC | FD |
| 000001 001000 | F8 | FF | FF |
| 000001 001001 | Z | F8 | F9 |
| 000001 001010 | FA | FA | FB |
| 000001 010000 | F0 | F7 | F7 |
| 000001 010001 | Z | F0 | F1 |
| 000001 010010 | F2 | F2 | F3 |
| 000001 010100 | F4 | F6 | F6 |
| 000001 010101 | Z | F4 | Z |
| 000010 000000 | C0 | Z | C1 |
| 000010 000001 | Z | C0 | C1 |
| 000010 000010 | C2 | C2 | C3 |
| 000010 000100 | DC | DE | DE |
| 000010 000101 | Z | DC | DD |
| 000010 001000 | D8 | DF | DF |
| 000010 001001 | Z | D8 | D9 |

FIG.53

| CURRENT CODE WORD | DATA WORD | | |
|---|---|---|---|
| | CASE1 | CASE2 | CASE3 |
| 000010 001010 | DA | DA | DB |
| 000010 010000 | D0 | D7 | D7 |
| 000010 010001 | Z | D0 | D1 |
| 000010 010010 | D2 | D2 | D3 |
| 000010 010100 | D4 | D6 | D6 |
| 000010 010101 | Z | D4 | D5 |
| 000010 100000 | C4 | Z | C5 |
| 000010 100001 | Z | C4 | C5 |
| 000010 100010 | C6 | C6 | C7 |
| 000010 100100 | CC | CE | CE |
| 000010 100101 | Z | CC | CD |
| 000010 101000 | C8 | CF | CF |
| 000010 101001 | Z | C8 | C9 |
| 000010 101010 | CA | CA | CB |
| 000100 000000 | 88 | Z | B5 |
| 000100 000001 | Z | 88 | 89 |
| 000100 000010 | 8A | 8A | 8B |
| 000100 000100 | 8C | 8E | 8E |
| 000100 000101 | Z | 8C | 8D |
| 000100 001000 | 88 | 8F | 8F |
| 000100 001001 | Z | 88 | 89 |
| 000100 001010 | 8A | 8A | 8B |
| 000100 010000 | 80 | 87 | 87 |
| 000100 010001 | Z | 80 | 81 |
| 000100 010010 | 82 | 82 | 83 |
| 000100 010100 | 84 | 86 | 86 |
| 000100 010101 | Z | 84 | 85 |
| 000100 100000 | A4 | Z | A5 |
| 000100 100001 | Z | A4 | A5 |
| 000100 100010 | A6 | A6 | A7 |
| 000100 100100 | AC | AE | AE |
| 000100 100101 | Z | AC | AD |
| 000100 101000 | A8 | AF | AF |
| 000100 101001 | Z | A8 | A9 |
| 000100 101010 | AA | AA | AB |
| 000101 000000 | A0 | Z | A1 |
| 000101 000001 | Z | A0 | A1 |
| 000101 000010 | A2 | A2 | A3 |

FIG.54

| CURRENT CODE WORD | DATA WORD | | |
|---|---|---|---|
| | CASE1 | CASE2 | CASE3 |
| 000101 000100 | BC | BE | BE |
| 000101 000101 | Z | BC | BD |
| 000101 001000 | B8 | BF | BF |
| 000101 001001 | Z | B8 | B9 |
| 000101 001010 | BA | BA | BB |
| 000101 010000 | B0 | B7 | B7 |
| 000101 010001 | Z | B0 | B1 |
| 000101 010010 | B2 | B2 | B3 |
| 000101 010100 | B4 | B6 | B6 |
| 000101 010101 | Z | B4 | B5 |
| 001000 000000 | 98 | Z | F5 |
| 001000 000001 | Z | 98 | 99 |
| 001000 000010 | CA | CA | 9B |
| 001000 000100 | 9C | 9E | 9E |
| 001000 000101 | Z | 9C | 9D |
| 001000 001000 | 98 | 9F | 9F |
| 001000 001001 | Z | 98 | 99 |
| 001000 001010 | 9A | 9A | 9B |
| 001000 010000 | 90 | 97 | 97 |
| 001000 010001 | Z | 90 | 91 |
| 001000 010010 | 92 | 92 | 93 |
| 001000 010100 | 94 | 96 | 96 |
| 001000 010101 | Z | 94 | 95 |
| 001000 100000 | E4 | Z | E5 |
| 001000 100001 | Z | E4 | E5 |
| 001000 100010 | E6 | E6 | E7 |
| 001000 100100 | EC | EE | EE |
| 001000 100101 | Z | EC | ED |
| 001000 101000 | E8 | EF | EF |
| 001000 101001 | Z | E8 | E9 |
| 001000 101010 | EA | EA | EB |
| 001001 000000 | E0 | Z | E1 |
| 001001 000001 | Z | E0 | E1 |
| 001001 000010 | E2 | E2 | E3 |
| 001001 000100 | FC | FE | FE |
| 001001 000101 | Z | FC | FD |
| 001001 001000 | F8 | FF | FF |
| 001001 001001 | Z | F8 | F9 |

FIG.55

| CURRENT CODE WORD | DATA WORD | | |
|---|---|---|---|
| | CASE1 | CASE1 | CASE1 |
| 001001 001010 | FA | FA | FB |
| 001001 010000 | F0 | F7 | F7 |
| 001001 010001 | Z | F0 | F1 |
| 001001 010010 | F2 | F2 | F3 |
| 001001 010100 | F4 | F6 | F6 |
| 001001 010101 | Z | F4 | F5 |
| 001010 000000 | C0 | Z | C1 |
| 001010 000001 | Z | C0 | C1 |
| 001010 000010 | C2 | C2 | C3 |
| 001010 000100 | DC | DE | DE |
| 001010 000101 | Z | DC | DD |
| 001010 001000 | D8 | DF | DF |
| 001010 001001 | Z | D8 | D9 |
| 001010 001010 | DA | DA | DB |
| 001010 010000 | D0 | D7 | D7 |
| 001010 010001 | Z | D0 | D1 |
| 001010 010010 | D2 | D2 | D3 |
| 001010 010100 | D4 | D6 | D6 |
| 001010 010101 | Z | D4 | D5 |
| 001010 100000 | C4 | Z | C5 |
| 001010 100001 | Z | C4 | C5 |
| 001010 100010 | C6 | C6 | C7 |
| 001010 100100 | CC | CE | CE |
| 001010 100101 | Z | CC | CD |
| 001010 101000 | C8 | CF | CF |
| 001010 101001 | Z | C8 | C9 |
| 001010 101010 | Z | Z | CB |
| 010000 000000 | 34 | Z | Z |
| 010000 000001 | Z | 34 | 35 |
| 010000 000010 | 1A | 1A | 1B |
| 010000 000100 | 1C | 1E | 1E |
| 010000 000101 | Z | 1C | 1D |
| 010000 001000 | 18 | 1F | 1F |
| 010000 001001 | Z | 18 | 19 |
| 010000 001010 | 1A | 1A | 1B |
| 010000 010000 | 10 | 17 | 17 |
| 010000 010001 | Z | 10 | 11 |
| 010000 010010 | 12 | 12 | 13 |

FIG.56

| CURRENT CODE WORD | DATA WORD | | |
|---|---|---|---|
| | CASE1 | CASE2 | CASE3 |
| 010000 010100 | 14 | 16 | 16 |
| 010000 010101 | Z | 14 | 15 |
| 010000 100000 | 64 | Z | 65 |
| 010000 100001 | Z | 64 | 65 |
| 010000 100010 | 66 | 66 | 67 |
| 010000 100100 | 6C | 6E | 6E |
| 010000 100101 | Z | 6C | 6D |
| 010000 101000 | 68 | 6F | 6F |
| 010000 101001 | Z | 68 | 69 |
| 010000 101010 | 6A | 6A | 6B |
| 010001 000000 | 60 | Z | 75 |
| 010001 000001 | Z | 60 | 61 |
| 010001 000010 | 62 | 62 | 63 |
| 010001 000100 | 7C | 7E | 7E |
| 010001 000101 | Z | 7C | 7D |
| 010001 001000 | 78 | 7F | 7F |
| 010001 001001 | Z | 78 | 79 |
| 010001 001010 | 7A | 7A | 7B |
| 010001 010000 | 70 | 77 | 77 |
| 010001 010001 | Z | 70 | 71 |
| 010001 010010 | 72 | 72 | 73 |
| 010001 010100 | 74 | 76 | 76 |
| 010001 010101 | Z | 74 | Z |
| 010010 000000 | 40 | Z | 41 |
| 010010 000001 | Z | 40 | 41 |
| 010010 000010 | 42 | 42 | 43 |
| 010010 000100 | 5C | 5E | 5E |
| 010010 000101 | Z | 5C | 5D |
| 010010 001000 | 58 | 5F | 5F |
| 010010 001001 | Z | 58 | 59 |
| 010010 001010 | 5A | 5A | 5B |
| 010010 010000 | 50 | 57 | 57 |
| 010010 010001 | Z | 50 | 51 |
| 010010 010010 | 52 | 52 | 53 |
| 010010 010100 | 54 | 56 | 56 |
| 010010 010101 | Z | 54 | 55 |
| 010010 100000 | 44 | Z | 45 |
| 010010 100001 | Z | 44 | 45 |

FIG.57

| CURRENT CODE WORD | DATA WORD | | |
|---|---|---|---|
| | CASE1 | CASE2 | CASE3 |
| 010010 100010 | 46 | 46 | 47 |
| 010010 100100 | 4C | 4E | 4E |
| 010010 100101 | Z | 4C | 4D |
| 010010 101000 | 48 | 4F | 4F |
| 010010 101001 | Z | 48 | 49 |
| 010010 101010 | 4A | 4A | 4B |
| 010100 000000 | 08 | Z | Z |
| 010100 000001 | Z | 08 | 09 |
| 010100 000010 | 0A | 0A | 0B |
| 010100 000100 | 0C | 0E | 0E |
| 010100 000101 | Z | 0C | 0D |
| 010100 001000 | 08 | 0F | 0F |
| 010100 001001 | Z | 08 | 09 |
| 010100 001010 | 0A | 0A | 0B |
| 010100 010000 | 00 | 07 | 07 |
| 010100 010001 | Z | 00 | 01 |
| 010100 010010 | 02 | 02 | 03 |
| 010100 010100 | 04 | 06 | 06 |
| 010100 010101 | Z | 04 | 05 |
| 010100 100000 | 24 | Z | 25 |
| 010100 100001 | Z | 24 | 25 |
| 010100 100010 | 26 | 26 | 27 |
| 010100 100100 | 2C | 2E | 2E |
| 010100 100101 | Z | 2C | 2D |
| 010100 101000 | 28 | 2F | 2F |
| 010100 101001 | Z | 28 | 29 |
| 010100 101010 | 2A | 2A | 2B |
| 010101 000000 | 20 | Z | 21 |
| 010101 000001 | Z | 20 | 21 |
| 010101 000010 | 22 | 22 | 23 |
| 010101 000100 | 3C | 3E | 3E |
| 010101 000101 | Z | 3C | 3D |
| 010101 001000 | 38 | 3F | 3F |
| 010101 001001 | Z | 38 | 39 |
| 010101 001010 | 3A | 3A | 3B |
| 010101 010000 | 30 | 37 | 37 |
| 010101 010001 | Z | 30 | 31 |
| 010101 010010 | 32 | 32 | 33 |

FIG.58

| CURRENT CODE WORD | DATA WORD | | |
|---|---|---|---|
| | CASE1 | CASE2 | CASE3 |
| 010101 010100 | Z | 36 | 36 |
| 100000 000001 | Z | Z | 49 |
| 100000 000010 | 4A | 4A | 4B |
| 100000 000100 | 3C | 3E | 3E |
| 100000 000101 | Z | 3C | 3D |
| 100000 001000 | 38 | 3F | 3F |
| 100000 001001 | Z | 38 | 39 |
| 100000 001010 | 3A | 3A | 3B |
| 100000 010000 | 30 | 37 | 37 |
| 100000 010001 | Z | 30 | 31 |
| 100000 010010 | 32 | 32 | 33 |
| 100000 010100 | 34 | 36 | 36 |
| 100000 010101 | Z | 34 | 35 |
| 100000 100000 | 24 | Z | 25 |
| 100000 100001 | Z | 24 | 25 |
| 100000 100010 | 26 | 26 | 27 |
| 100000 100100 | 2C | 2E | 2E |
| 100000 100101 | Z | 2C | 2D |
| 100000 101000 | 28 | 2F | 2F |
| 100000 101001 | Z | 28 | 29 |
| 100000 101010 | 2A | 2A | 2B |
| 100001 000000 | 20 | Z | 21 |
| 100001 000001 | Z | 20 | 21 |
| 100001 000010 | 22 | 22 | 23 |
| 100001 000100 | 3C | 3E | 3E |
| 100001 000101 | Z | 3C | 3D |
| 100001 001000 | 38 | 3F | 3F |
| 100001 001001 | Z | 38 | 39 |
| 100001 001010 | 3A | 3A | 3B |
| 100001 010000 | 30 | 37 | 37 |
| 100001 010001 | Z | 30 | 31 |
| 100001 010010 | 32 | 32 | 33 |
| 100001 010100 | 34 | 36 | 36 |
| 100001 010101 | Z | 34 | Z |
| 100010 000000 | 00 | Z | 01 |
| 100010 000001 | Z | 00 | 01 |
| 100010 000010 | 02 | 02 | 03 |
| 100010 000100 | 1C | 1E | 1E |

FIG.59

| CURRENT CODE WORD | DATA WORD | | |
|---|---|---|---|
| | CASE1 | CASE2 | CASE3 |
| 100010 000101 | Z | 1C | 1D |
| 100010 001000 | 18 | 1F | 1F |
| 100010 001001 | Z | 18 | 19 |
| 100010 001010 | 1A | 1A | 1B |
| 100010 010000 | 10 | 17 | 17 |
| 100010 010001 | Z | 10 | 11 |
| 100010 010010 | 12 | 12 | 13 |
| 100010 010100 | 14 | 16 | 16 |
| 100010 010101 | Z | 14 | 15 |
| 100010 100000 | 04 | Z | 05 |
| 100010 100001 | Z | 04 | 05 |
| 100010 100010 | 06 | 06 | 07 |
| 100010 100100 | 0C | 0E | 0E |
| 100010 100101 | Z | 0C | 0D |
| 100010 101000 | 08 | 0F | 0F |
| 100010 101001 | Z | 08 | 09 |
| 100010 101010 | 0A | 0A | 0B |
| 100100 000000 | 88 | Z | B5 |
| 100100 000001 | Z | 88 | 89 |
| 100100 000010 | 8A | 8A | 8B |
| 100100 000100 | 8C | 8E | 8E |
| 100100 000101 | Z | 8C | 8D |
| 100100 001000 | 88 | 8F | 8F |
| 100100 001001 | Z | 88 | 89 |
| 100100 001010 | 8A | 8A | 8B |
| 100100 010000 | 80 | 87 | 87 |
| 100100 010001 | Z | 80 | 81 |
| 100100 010010 | 82 | 82 | 83 |
| 100100 010100 | 84 | 86 | 86 |
| 100100 010101 | Z | 84 | 85 |
| 100100 100000 | A4 | Z | A5 |
| 100100 100001 | Z | A4 | A5 |
| 100100 100010 | A6 | A6 | A7 |
| 100100 100100 | AC | AE | AE |
| 100100 100101 | Z | AC | AD |
| 100100 101000 | A8 | AF | AF |
| 100100 101001 | Z | A8 | A9 |
| 100100 101010 | AA | AA | AB |

FIG.60

| CURRENT CODE WORD | DATA WORD | | |
|---|---|---|---|
| | CASE1 | CASE2 | CASE3 |
| 100101 000000 | A0 | Z | A1 |
| 100101 000001 | Z | A0 | A1 |
| 100101 000010 | A2 | A2 | A3 |
| 100101 000100 | BC | BE | BE |
| 100101 000101 | Z | BC | BD |
| 100101 001000 | B8 | BF | BF |
| 100101 001001 | Z | B8 | B9 |
| 100101 001010 | BA | BA | BB |
| 100101 010000 | B0 | B7 | B7 |
| 100101 010001 | Z | B0 | B1 |
| 100101 010010 | B2 | B2 | B3 |
| 100101 010100 | B4 | B6 | B6 |
| 100101 010101 | Z | B4 | B5 |
| 101000 000000 | 98 | Z | 75 |
| 101000 000001 | Z | 98 | 99 |
| 101000 000010 | 9A | 9A | 9B |
| 101000 000100 | 9C | 9E | 9E |
| 101000 000101 | Z | 9C | 9D |
| 101000 001000 | 98 | 9F | 9F |
| 101000 001001 | Z | 98 | 99 |
| 101000 001010 | 9A | 9A | 9B |
| 101000 010000 | 90 | 97 | 97 |
| 101000 010001 | Z | 90 | 91 |
| 101000 010010 | 92 | 92 | 93 |
| 101000 010100 | 94 | 96 | 96 |
| 101000 010101 | Z | 94 | 95 |
| 101000 100000 | 64 | Z | 65 |
| 101000 100001 | Z | 64 | 65 |
| 101000 100010 | 66 | 66 | 67 |
| 101000 100100 | 6C | 6E | 6E |
| 101000 100101 | Z | 6C | 6D |
| 101000 101000 | 68 | 6F | 6F |
| 101000 101001 | Z | 68 | 69 |
| 101000 101010 | 6A | 6A | 6B |
| 101001 000000 | 60 | Z | 61 |
| 101001 000001 | Z | 60 | 61 |
| 101001 000010 | 62 | 62 | 63 |
| 101001 000100 | 7C | 7E | 7E |

FIG.61

| CURRENT CODE WORD | DATA WORD | | |
|---|---|---|---|
| | CASE1 | CASE2 | CASE3 |
| 101001 000101 | Z | 7C | 7D |
| 101001 001000 | 78 | 7F | 7F |
| 101001 001001 | Z | 78 | 79 |
| 101001 001010 | 7A | 7A | 7B |
| 101001 010000 | 70 | 77 | 77 |
| 101001 010001 | Z | 70 | 71 |
| 101001 010010 | 72 | 72 | 73 |
| 101001 010100 | 74 | 76 | 76 |
| 101001 010101 | Z | 74 | 75 |
| 101010 000000 | 40 | Z | 41 |
| 101010 000001 | Z | 40 | 41 |
| 101010 000010 | 42 | 42 | 43 |
| 101010 000100 | 5C | 5E | 5E |
| 101010 000101 | Z | 5C | 5D |
| 101010 001000 | 58 | 5F | 5F |
| 101010 001001 | Z | 58 | 59 |
| 101010 001010 | 5A | 5A | 5B |
| 101010 010000 | 50 | 57 | 57 |
| 101010 010001 | Z | 50 | 51 |
| 101010 010010 | 52 | 52 | 53 |
| 101010 010100 | 54 | 56 | 56 |
| 101010 010101 | Z | 54 | 55 |
| 101010 100000 | 44 | Z | 45 |
| 101010 100001 | Z | 44 | 45 |
| 101010 100010 | 46 | 46 | 47 |
| 101010 100100 | 4C | 4E | 4E |
| 101010 100101 | Z | 4C | 4D |

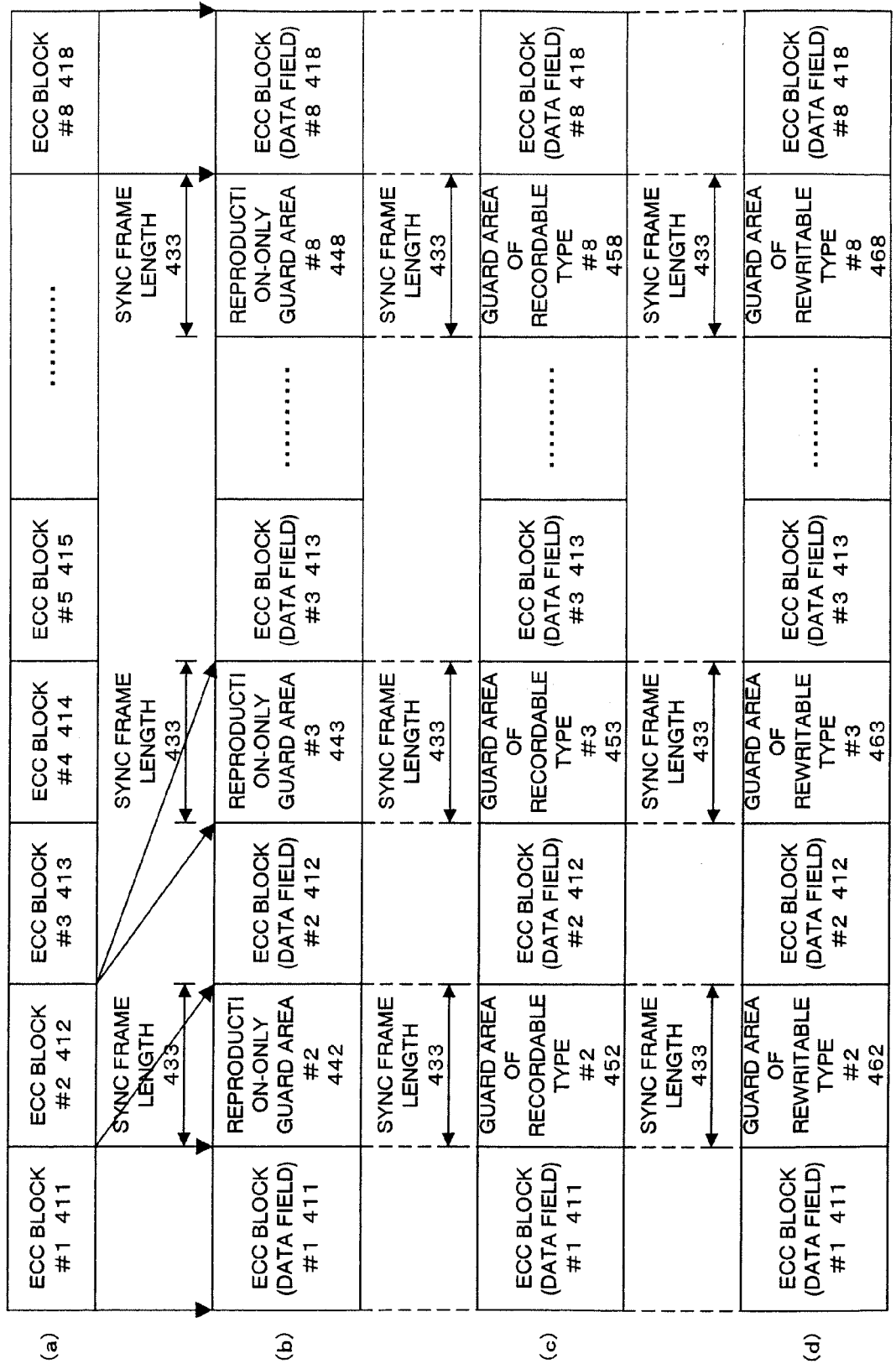

FIG.68

| KIND OF MEDIUM | RECORDABLE INFORMATION STORAGE MEDIUM | REWRITABLE INFORMATION STORAGE MEDIUM |
|---|---|---|
| RECORD MARK FORMING PLACE | FORM RECORD MARK ON GROOVE AREA | FORM RECORD MARKS IN BOTH GROOVE AREA AND LAND AREA |
| RECORDING METHOD | CLV Constant Linear Velocity | Zone CAV Zone Constant Angular Velocity |
| SLOT POSITION RELATIONSHIP BETWEEN ADJACENT TRACKS | DEVIATED BETWEEN ADJACENT TRACKS | AGREE BETWEEN ADJACENT TRACKS |
| TECHNICALLY DIFFICULT POINT | INTERFERENCE BETWEEN ADJACENT WOBBLES | OCCURRENCE OF INDEFINITE BIT AREA |
| POINT CONTENT IN EMBODIMENT | DECREASE OCCUPANCY OF MODULATION AREA AND SHIFT MODULATION AREAS BETWEEN ADJACENT TRACKS | ADOPT GRAY CODE DISPOSE L/G OF INDEFINITE BIT DISTRIBUTIVELY |
| ADDRESS INFORMATION FOR DESIGNATING PLACE | DATA SEGMENT ADDRESS (ECC BLOCK ADDRESS) PHYSICAL SEGMENT SEQUENCE (NUMBER) | ZONE ADDRESS TRACK ADDRESS PHYSICAL SEGMENT ADDRESS |

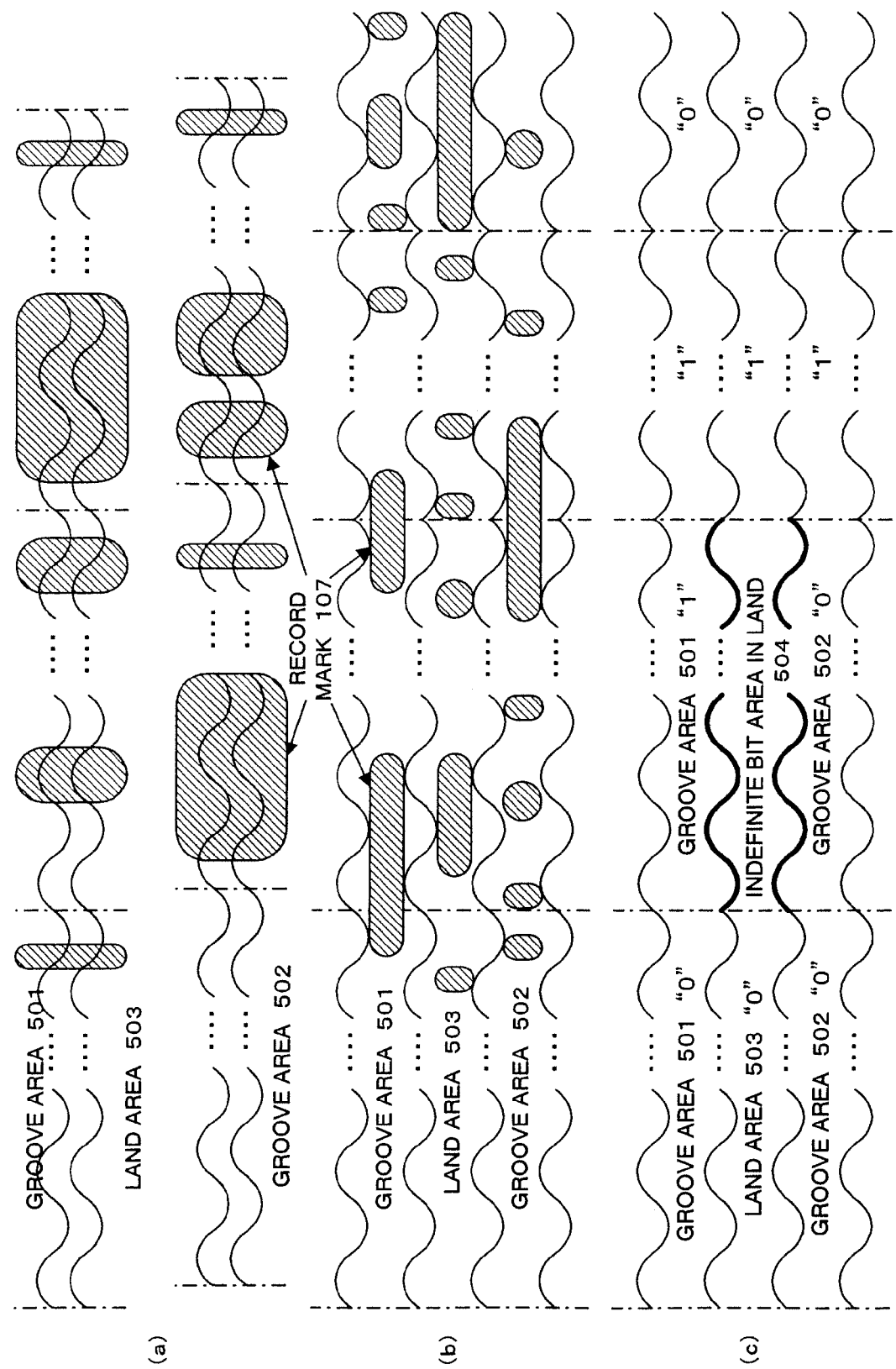

FIG.70A

| | | | | | | |
|---|---|---|---|---|---|---|
| GROOVE AREA 501 | Ph=0<br>Da=n−1 | Ph=0<br>Da=n | Ph=1<br>Da=n | Ph=2<br>Da=n | Ph=3<br>Da=n | Ph=4<br>Da=n | Ph=5<br>Da=n | Ph=6<br>Da=n | Ph=0<br>Da=n+1 |

LAND AREA 503

| | | | | | | |
|---|---|---|---|---|---|---|
| GROOVE AREA 502 | Ph=3<br>Da=m−1 | Ph=4<br>Da=m−1 | Ph=5<br>Da=m−1 | Ph=6<br>Da=m−1 | Ph=0<br>Da=m | Ph=1<br>Da=m | Ph=2<br>Da=m | Ph=3<br>Da=m | Ph=4<br>Da=m |

LAND AREA 507

| | | | | | | |
|---|---|---|---|---|---|---|
| GROOVE AREA 505 | Ph=5<br>Da=k−1 | Ph=6<br>Da=k−1 | Ph=0<br>Da=k | Ph=1<br>Da=k | Ph=2<br>Da=k | Ph=3<br>Da=k | Ph=4<br>Da=k | Ph=5<br>Da=k | Ph=6<br>Da=k |

Ph : PHYSICAL SEGMENT SEQUENCE
Da : DATA SEGMENT (NUMBER)

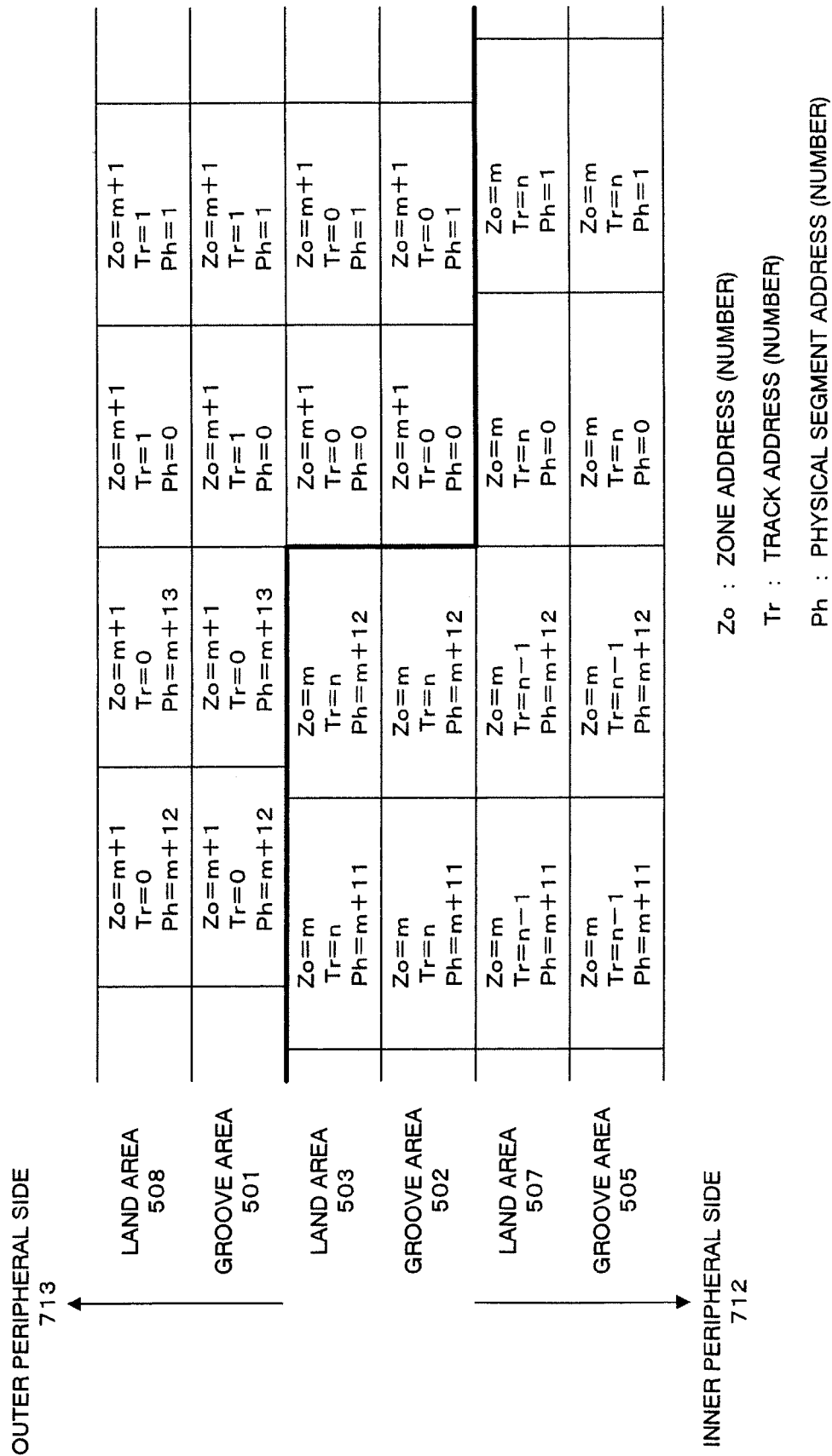

FIG.72

| DECIMAL NUMBER | CONVENTIONAL BINARY NOTATION | GRAY CODE NOTATION |
|---|---|---|
| 0 | 0000 | 0000 |
| 1 | 0001 | 0001 |
| 2 | 0010 | 0011 |
| 3 | 0011 | 0010 |
| 4 | 0100 | 0110 |
| 5 | 0101 | 0111 |
| 6 | 0110 | 0101 |
| 7 | 0111 | 0100 |
| 8 | 1000 | 1100 |
| 9 | 1001 | 1101 |
| 10 | 1010 | 1111 |
| 11 | 1011 | 1110 |
| 12 | 1100 | 1010 |
| 13 | 1101 | 1011 |
| 14 | 1110 | 1001 |
| 15 | 1111 | 1000 |

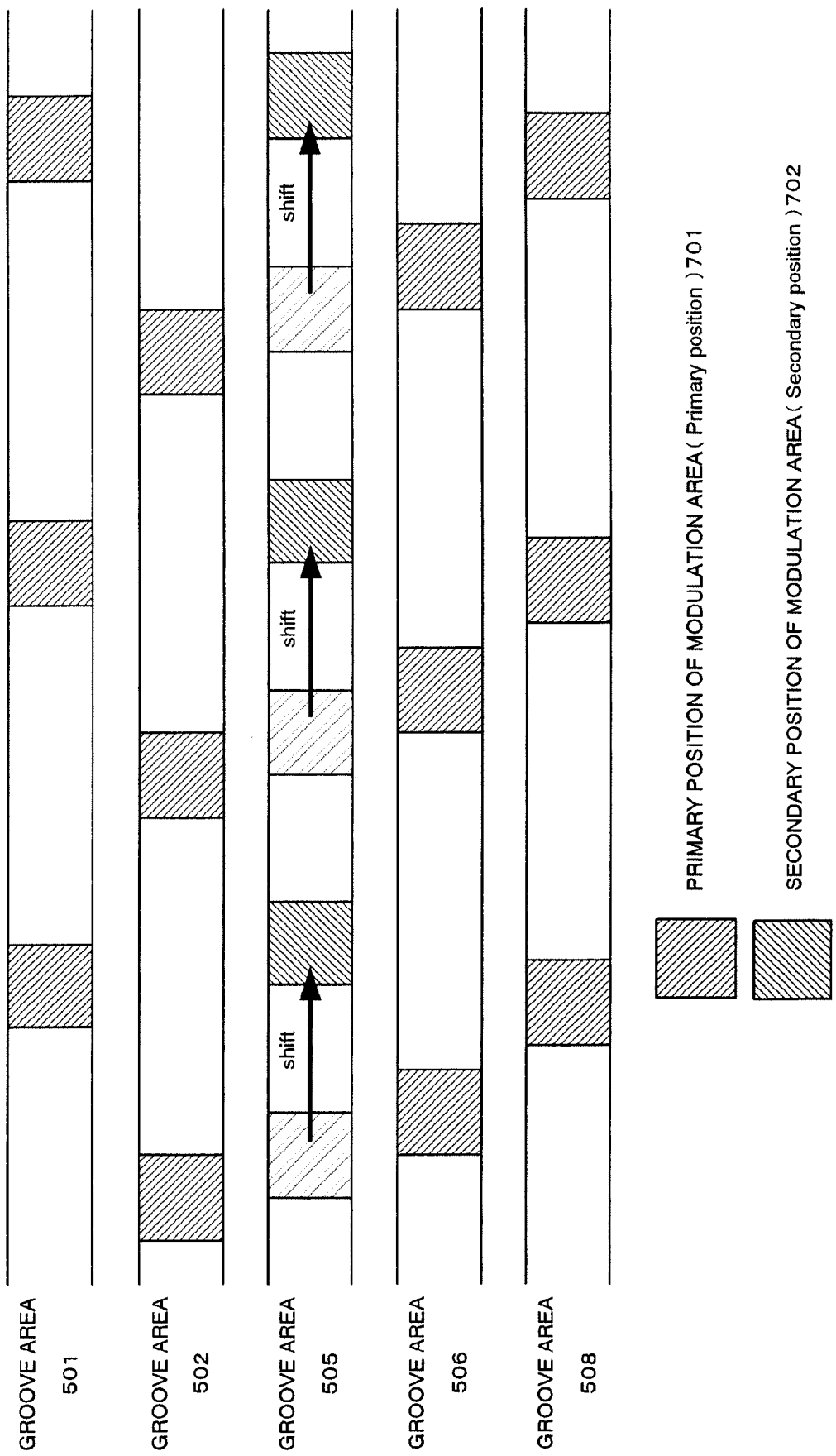

FIG.76

(a) WOBBLE DATA UNIT #0 560

| MODULATION AREA 598 | | NON-MODULATION AREA 593 | |
|---|---|---|---|
| IPW | NPW | IPW | NPW |
| 6WOBBLE | 4WOBBLE | 6WOBBLE | 68WOBBLE |

(b) WOBBLE DATA UNIT #0 560

| NON-MODULATION AREA 593 | | MODULATION AREA 598 | |
|---|---|---|---|
| IPW | NPW | IPW | NPW |
| 42WOBBLE | 68WOBBLE | 4WOBBLE | 6WOBBLE | 4WOBBLE | 28WOBBLE |

(c) WOBBLE DATA UNIT #1 560 ~ #11 571

| MODULATION AREA 598 | | | NON-MODULATION AREA 593 | |
|---|---|---|---|---|
| IPW | ADDRESS BIT #2 | ADDRESS BIT #1 | ADDRESS BIT #0 | NPW |
| 4WOBBLE | 4WOBBLE | 4WOBBLE | 4WOBBLE | 68WOBBLE |

(d) WOBBLE DATA UNIT #1 561 ~ #11 571

| MODULATION AREA 592 | | | | NON-MODULATION AREA 593 | |
|---|---|---|---|---|---|
| NPW | IPW | ADDRESS BIT #2 | ADDRESS BIT #1 | ADDRESS BIT #0 | NPW |
| 42WOBBLE | 4WOBBLE | 4WOBBLE | 4WOBBLE | 4WOBBLE | 26WOBBLE |

| IPW | MODULATION AREA 598 | | | NON-MODULATION AREA 593 | |
|---|---|---|---|---|---|
| | NPW | IPW | | NPW | |
| 6WOBBLE | 4WOBBLE | 6WOBBLE | | 68WOBBLE | |

(b)

| | MODULATION AREA 598 | | | NON-MODULATION AREA 593 | |
|---|---|---|---|---|---|
| IPW | NPW | IPW | | NPW | |
| 4WOBBLE | 6WOBBLE | 4WOBBLE | | 70WOBBLE | |

(c)

| NON-MODULATION AREA 592 | MODULATION AREA 598 | | | NON-MODULATION AREA 593 | |
|---|---|---|---|---|---|
| NPW | IPW | NPW | IPW | NPW | |
| 42WOBBLE | 4WOBBLE | 6WOBBLE | 4WOBBLE | 28WOBBLE | |

(d)

| NON-MODULATION AREA 592 | MODULATION AREA 598 | | | NON-MODULATION AREA 593 | |
|---|---|---|---|---|---|
| NPW | IPW | NPW | IPW | NPW | |
| 42WOBBLE | 6WOBBLE | 4WOBBLE | 6WOBBLE | 26WOBBLE | |

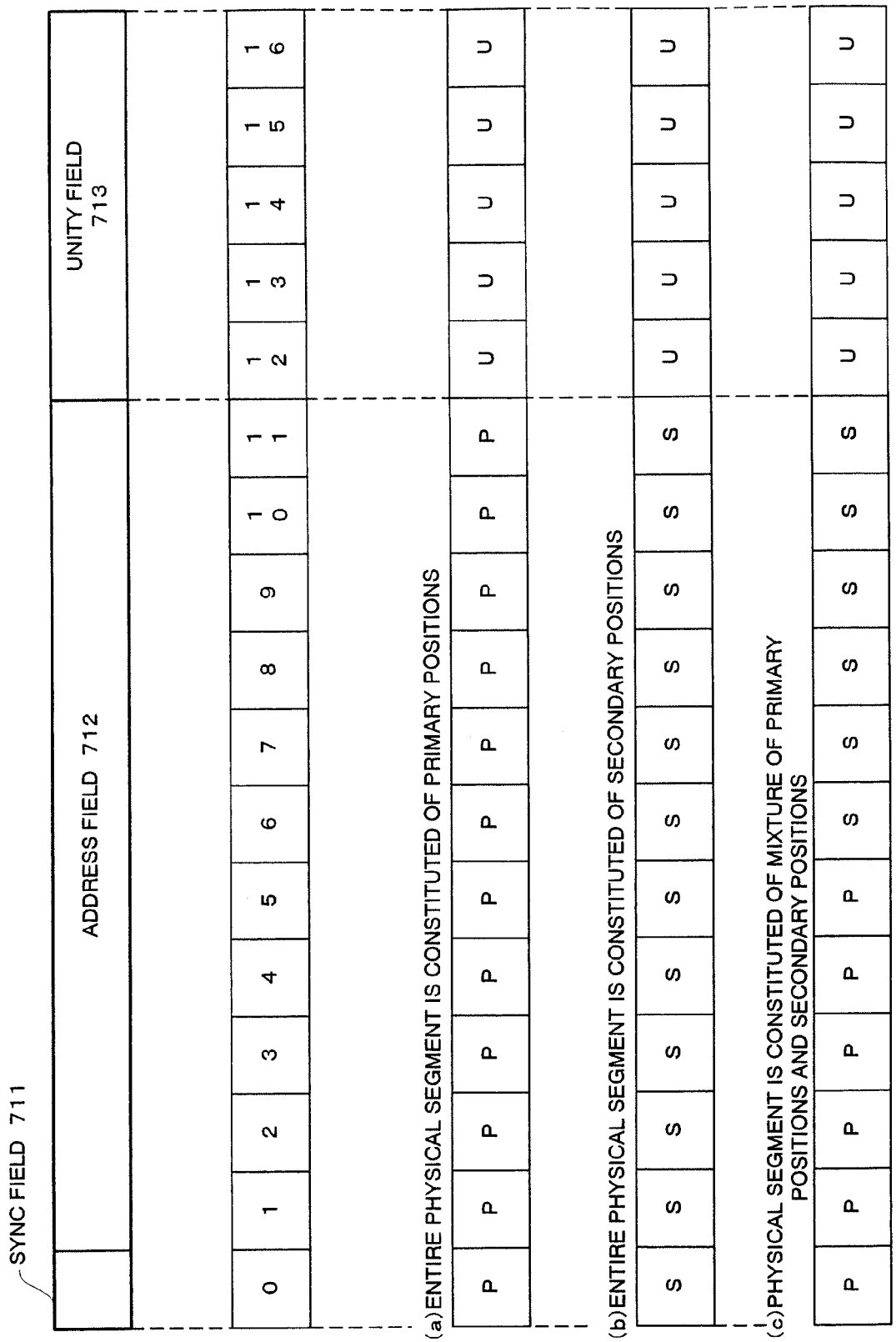

| WOBBLE SYNC AREA 580 | RESERVED AREA 604 | WOBBLE ADDRESS INFORMATION 610 ||||||
|---|---|---|---|---|---|---|---|
| | | PHYSICAL SEGMENT ADDRESS 601 | ZONE ADDRESS 602 | PARITY INFORMATION 605 | GROOVE TRACK ADDRESS 606 | LAND TRACK ADDRESS 607 | UNITY AREA 608 |
| 3BITS | 3ADDRESS BITS | 6ADDRESS BITS | 5BITS | 1ADDRESS BIT | 12BITS | 12BITS | 9ADDRESS BITS |

(b)

| WOBBLE SYNC AREA 580 | TYPE IDENTIFYING INFORMATION 721 | LAYER NUMBER INFORMATION 722 | RESERVED AREA 723 | WOBBLE ADDRESS INFORMATION 610 |||
|---|---|---|---|---|---|---|
| | | | | PHYSICAL SEGMENT SEQUENCE INFORMATION 724 | DATA SEGMENT ADDRESS (NUMBER) (ECC BLOCK ADDRESS) 725 | CRC CODE 726 | UNITY AREA 609 |
| 3BITS | 1 BIT | 1 BIT | 1 BIT | 3ADDRESS BITS | 18ADDRESS BITS | 9BITS | 15ADDRESS BITS |

(c)

| WOBBLE SYNC AREA 580 | SEGMENT INFORMATION 727 | WOBBLE ADDRESS INFORMATION 610 |||
|---|---|---|---|---|
| | | PHYSICAL SEGMENT BLOCK ADDRESS 728 | PHYSICAL SEGMENT SEQUENCE INFORMATION 724 | CRC CODE 726 | UNITY AREA 609 |
| 3BITS | 3ADDRESS BITS | 18ADDRESS BITS | 3ADDRESS BITS | 9BITS | 15ADDRESS BITS |

(d)

| TYPE IDENTIFYING INFORMATION 721 | RESERVED AREA 723 |
|---|---|
| 1 BIT | 1 BIT |

FIG. 80

| COMBINATION METHOD | INFORMATION TYPE | POSITION OF MODULATION AREA IN PHYSICAL SEGMENT | | |
|---|---|---|---|---|
| | | (A) IN FIG. 78 ALL ARE PRIMARY POSITIONS | (B) IN FIG. 78 ALL ARE SECONDARY POSITIONS | (C) IN FIG. 78 PRIMARY/SECONDARY MIXTURE |
| 《A》 | WOBBLE SYNC PATTERN | (A) IN FIG. 77 | (C) IN FIG. 77 | (A) IN FIG. 77<br>(B) IN FIG. 77 |
| | TYPE IDENTIFYING INFORMATION | "0" | "1" | "0" |
| 《B》 | WOBBLE SYNC PATTERN | (A) IN FIG. 77 | (C) IN FIG. 77 | (A) IN FIG. 77<br>(C) IN FIG. 77 |
| | TYPE IDENTIFYING INFORMATION | "1" | "1" | "0" |
| 《C》 | WOBBLE SYNC PATTERN | (A) IN FIG. 77 | (D) IN FIG. 77 | (B) IN FIG. 77<br>(C) IN FIG. 77 |
| | TYPE IDENTIFYING INFORMATION | "0" | "1" | "1" |

INFORMATION RECORDING MEDIUM, INFORMATION REPRODUCING APPARATUS, INFORMATION REPRODUCING METHOD AND INFORMATION RECORDING METHOD

CROSS-REFERENCE TO THE INVENTION

This application is based upon and claims the benefit of priority from the prior Japanese Patent Application No. 2004-092864, filed on Mar. 26, 2004; the entire contents of which are incorporated herein by reference.

BACKGROUND OF THE INVENTION

1. Field of the Invention

This invention relates to an information recording medium, an information reproducing apparatus, an information reproducing method and an information recording method.

2. Description of the Related Art

An optical disk is used as an information recording medium for recording and reproducing information.

An art of increasing a total number of test write area (test area) in proportion to an increase of optical disk capacity is disclosed (See Patent document 1: Japanese Patent Laid-open Application No. 2001-273637). Namely, a test write area is disposed in an inner peripheral position, and its extension scaling factor is discretely set. Then, an SYNC pattern of an ATIP wobble signal is detected to determine the kind of the disc, and the total number of test areas (test write area) is determined.

An art of an optical disk capable of setting a spare area extendable to an outer peripheral side is disclosed (See Patent document 2: Japanese Patent No. 3090316). The position information of the extendable spare area is described in position information of a second spare area in a file entry area of the second spare area.

SUMMARY OF THE INVENTION

In the art disclosed in Patent document 1, the size of the test write area (test area) cannot be set optionally, and there is the possibility of causing substantial capacity reduction.

In the art disclosed in Patent document 2, the position information of the extendable spare area cannot be rewritten in a "recordable information storage medium", and the data structure concerning the position information of the spare area cannot be taken.

In view of the above description, the present invention has its object to provide an information recording medium, an information reproducing apparatus, an information reproducing method and an information recording method which make it easy to record and reproduce information properly.

An information recording medium according to the present invention includes a user information storage area which stores user information, a test write area which is extendable and for test write of information, a spare area which is extendable and capable of alternatively storing user information, and a recording position management information area including recordable range information expressing recordable ranges in the aforesaid test write area and the aforesaid spare area.

An information reproducing apparatus according to the present invention includes an information reproducing device which reproduces information from an information recording medium including a user information storage area which stores user information, a test write area which is extendable and for test write of information, a spare area which is extendable and capable of alternatively storing user information, and a recording position management information area including recordable range information expressing recordable ranges in the aforesaid test write area and the aforesaid spare area.

An information reproducing method according to the present invention includes reproducing information from an information recording medium including a user information storage area which stores user information, a test write area which is extendable and for test write of information, a spare area which is extendable and capable of alternatively storing user information, and a recording position management information area including recordable range information expressing recordable ranges in the aforesaid test write area and the aforesaid spare area.

An information recording method according to the present invention includes recording information in an information recording medium including a user information storage area which stores user information, a test write area which is extendable and for test write of information, a spare area which is extendable and capable of alternatively storing user information, and a recording position management information area including recordable range information expressing recordable ranges in the aforesaid test write area and the aforesaid spare area.

BRIEF DESCRIPTION OF THE DRAWINGS

FIG. 1 is a diagram showing a point list (1) of an embodiment.

FIG. 2 is a diagram showing a point list (2) of the embodiment.

FIG. 3 is a diagram showing a point list (3) of the embodiment.

FIG. 4 is a diagram showing a point list (4) of the embodiment.

FIGS. 16A and 16B are diagrams showing physical sector number setting methods of reproduction-only information storage media having double-layer structures.

FIG. 17 is a diagram showing a physical sector number setting method in a rewritable information storage medium.

FIG. 18 is a diagram showing a general parameter setting example in a reproduction-only information storage medium.

FIG. 19 is a diagram showing a general parameter setting example in a recordable information storage medium.

FIG. 20 is a diagram showing a general parameter setting example in a rewritable information storage medium.

FIG. 21 is a data structure comparison explanatory diagram in a system lead-in area and a data lead-in area.

FIG. 22 is a data structure explanatory diagram in a recording position management zone.

FIG. 23 is a data structure comparison explanatory diagram in a data area and a data lead-out area.

FIG. 27 is a data structure explanatory view in a control data zone and an R physical information zone.

FIG. 28 is an information content comparison explanatory diagrams in physical format information and R physical format information.

FIG. 29 is an information content comparison explanatory view in disposition place information of a data area DTA.

FIG. 30 is a data structure explanatory diagram (1) in a recording position management data.

FIG. 31 is a data structure explanatory diagram (2) (continued) in the recording position management data.

FIG. 32 is a data structure explanatory diagram (3) (continued) in the recording position management data.

FIG. 35 is a structure explanatory diagram in a data frame.

FIG. 41 is an explanatory diagram of a synchronous code pattern content.

FIG. 43 is a diagram showing a connection rule for code words.

FIG. 44 is a diagram showing connection of a code word and a sync code.

FIG. 45 is a diagram showing a separation rule for reproducing code words.

FIG. 46 is a diagram showing a conversion table in a modulation method.

FIG. 47 is a diagram showing the conversion table in the modulation method.

FIG. 48 is a diagram showing the conversion table in the modulation method.

FIG. 49 is a diagram showing the conversion table in the modulation method.

FIG. 50 is a diagram showing the conversion table in the modulation method.

FIG. 51 is a diagram showing the conversion table in the modulation method.

FIG. 52 is a diagram showing a demodulation table.

FIG. 53 is a diagram showing the demodulation table.

FIG. 54 is a diagram showing the demodulation table;

FIG. 55 is a diagram showing the demodulation table.

FIG. 56 is a diagram showing the demodulation table.

FIG. 57 is a diagram showing the demodulation table.

FIG. 58 is a diagram showing the demodulation table.

FIG. 59 is a diagram showing the demodulation table.

FIG. 60 is a diagram showing the demodulation table.

FIG. 61 is a diagram showing the demodulation table.

FIG. 64 is a comparison explanatory diagram of a data recording type of each kind of information storage medium in this embodiment.

FIG. 68 is a comparison table of a wobble position and a recording place in the recordable information storage medium and the rewritable information storage medium of this embodiment.

FIG. 69 is a comparison explanatory view of the wobble position and the recording place in the recordable information storage medium and the rewritable information storage medium of this embodiment.

FIGS. 70A and 70B are explanatory diagrams of address defining methods in the recordable information storage medium and the rewritable information storage medium of this embodiment.

FIG. 72 is an explanatory diagram of a gray code example.

FIG. 75 is an explanatory diagram of a disposition place of a modulation area on the recordable information storage medium of this embodiment.

FIG. 76 is a disposition explanatory view in a wobble data unit concerning a primary disposition place and a secondary disposition place of the modulation area.

FIG. 77 is a comparison explanatory diagram of disposition relationship in a wobble sync pattern and a wobble data unit.

FIG. 78 is a disposition place explanatory view of a modulation area in a physical segment on the recordable information recording medium.

FIG. 79 is a comparison explanatory diagram of a data structure in wobble address information in the rewritable information storage medium and the recordable information storage medium according to this embodiment.

FIG. 80 is a relation explanatory diagram of a combination method of a wobble sync pattern and type identifying information of a physical segment and a disposition pattern of a modulation area.

DESCRIPTION OF THE EMBODIMENTS

Figure 5:
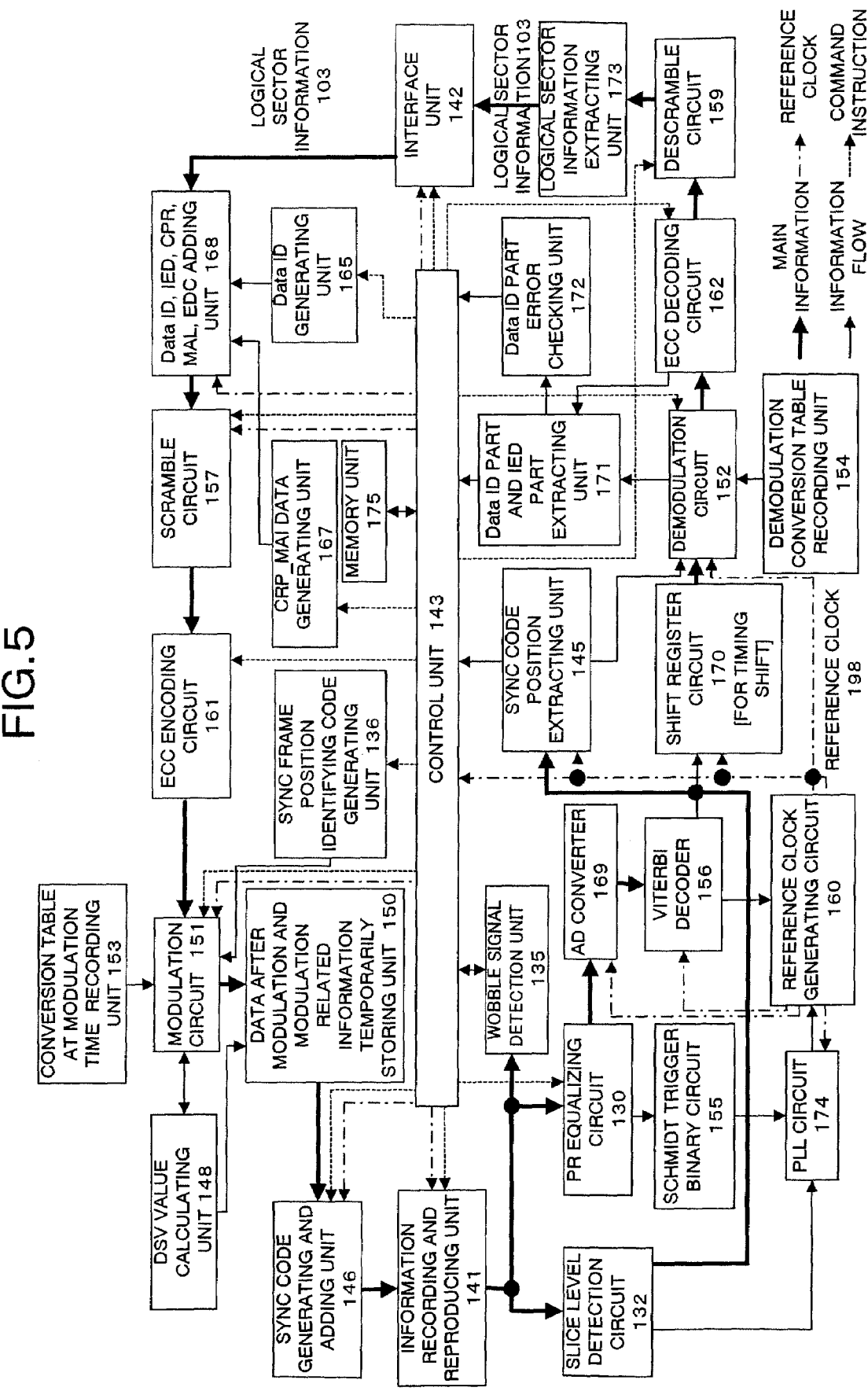
FIG. 5 is an explanatory diagram of a structure in the embodiment of an information recording and reproducing apparatus.

An information storage medium such as an optical disk has an Updated data area allocation area inside an RMD field 0, and in that area, information which is the information of an Updated outer limit of Data Recordable area and in a recordable range is written.

An extendable test write area (test area) and an extendable alternate area (spare area) are settable in an outer peripheral part of the information storage medium, and an area which is the result of taking the above described extendable test write area (test area) and the extendable alternate area (spare area) from an entire recording area corresponds to the recordable range of the information of the Updated outer limit of Data Recordable area and in the recordable range.

The points concerning an embodiment of the present invention are summarized and described in FIGS. 1 to 4. The effects provided when the respective points are combined are shown in the rows in FIGS. 1 to 4, and the mark of ☆ (star) is given to the portion with the highest contribution ratio to each effect, and marks of ⊙ (double circle), ○ (single circle) and Δ (triangle) are given in the order of higher contribution ratio. Outlines of the effects provided when the respective points are combined are as follows.

1. Determine the Optimum Recording Condition

After stably detecting BCA, it is determined whether recommended recording condition information can be used with a value of rim intensity stably read in slice level detection. When the determination is NG (No Good), it is necessary to carefully determine the recording condition in a drive test zone, and therefore, extension of the test zone and its position control become necessary.

2. Reproduction Circuit Setting Method

After stably detecting BCA, identification information of H→L or L→H which is stably read in the slice level detection is read at high speed, and optimal circuit adjustment corresponding to PR (1,2,2,2,1) is performed by utilizing reference codes.

3. Ensure High Reliability at the Time of Reproduction of User Recorded Information After stably detecting BCA, system lead-in information is reproduced by slice level detection, and thereafter, user recorded information is reproduced by using PRML. Ensure reliability of recorded information by alternative processing of a defective position. Stabilization of a servo at the time of reproduction is also important.

4. Reduction of Access Time to a Recording (Rewrite or Record) Place

Confirm the recording (rewrite or write) place by defect management information

5. Recording of a Stable and Highly Accurate Record Mark

Stable tracking and recording place confirmation are important. Record at optimum speed based on recording speed information.

6. Handle both of "L→H recording film" and "H→L recording film", achieve commonality of a circuit and realize simplification of control.

Hereinafter, detailed embodiments will be described.

In the following explanation of the embodiments, the explanation corresponding to each of the points shown in FIG. 1 to FIG. 4 is partially included. The corresponding parenthesized point code is given to the part of the explanation corresponding to each of the points shown in FIG. 1 to FIG. 4.

An explanatory diagram of a structure in an embodiment of the information recording and reproducing apparatus is shown in FIG. 5. In FIG. 5, an upper side from a control unit 143 mainly shows an information record control system for an information storage medium. An embodiment of the information reproducing apparatus corresponds to a structure in FIG. 5 except for the aforementioned information record control system. In FIG. 5, the thick solid arrows indicate the flow of main information which means a reproduction signal or a recording signal, the thin solid arrows indicate the flow of information, the dashed line arrows indicate reference clock lines, and the thin broken line arrows indicate a command instruction direction.

An optical head not shown is disposed in an information recording and reproducing unit 141 shown in FIG. 5. In this embodiment, PRML (Partial Response Maximum Likelihood) is used for reproducing information, and density of an information storage medium is enhanced (FIG. 1 [A]).

As a result of various experiments, as a PR class for use, adoption of PR (1, 2, 2, 2, 1) can enhance line density and enhance reliability of the reproduction signal (demodulation reliability at the time of occurrence of a servo correction error such as blooming and a track deviation, for example). Therefore, in this embodiment, PR (1, 2, 2, 2, 1) is adopted ((A1) in FIG. 1).

In this embodiment, a channel bit string after modulation is recorded in the information storage medium in accordance with (d, k; m, n) modulation regulation (meaning RLL (d, k) of m/n modulation). As a concrete modulation method, ETM (Eight to Twelve Modulation) for converting 8-bit data into 12 channel bits (m=8, n=12) is adopted, and as run-length limited RLL limitation for limiting continuation of "0" in the channel bit string after modulation, the condition of RLL (1, 10) in which the minimum value of continuation of "0" is set as d=1 and the maximum value is set as k=10 is imposed.

Aiming at densification of the information storage medium, this embodiment shortens the channel bit interval near to the limit. As a result, when the pattern of "1010101010101010101010" which is the repetition of the pattern of d=1, for example, is recorded in the information storage medium, and the data is reproduced in the information recording and reproducing unit 141, the density is close to the cutoff frequency of the MTF characteristic of the reproducing optical system. Therefore, the signal amplitude of the reproduction signal is in the state in which it is almost buried in noise. Accordingly, as the method for reproducing a record mark or pit with density enhanced near to the limit (cutoff frequency) of the MTF characteristic, the art of PRML (Partial Response Maximum Likelihood) is used.

Namely, a signal reproduced from the information recording and reproducing unit 141 is subjected to reproduction waveform correction by a PR equalizing circuit 130. The signal after passing the PR equalizing circuit 130 is sampled and converted into a digital amount in AD converter 169 in accordance with timing of a reference clock 198 which is transmitted from a reference clock generating circuit 160, and viterbi decoding processing is performed for it in a viterbi decoder 156. The data after the viterbi decoding processing can be processed in totally the same manner as the binarized data at the conventional slice level.

When the art of PRML is adopted, an error rate of the data after viterbi decoding increases if sampling timing is shifted in the AD converter 169. Accordingly, in order to enhance accuracy of the sampling timing, the information reproducing apparatus or the information recording and reproducing apparatus of this embodiment especially has a sampling timing extracting circuit (combination of a Schmidt Trigger binary circuit 155 and a PLL circuit 174) separately.

The Schmidt Trigger circuit 155 has the characteristic in that a specific range (actually the forward voltage value of diode) is given to the slice reference level for binarization, and binarization is achieved only when the specific range is exceeded. Accordingly, for example, when the pattern of "1010101010101010101010" is inputted as described above, the signal amplitude is so small that switching of binarization does not occur, but when, for example, "1001001001001001001001" or the like, which is a sparser pattern than the above, is inputted, the amplitude of the reproduction signal becomes large, and therefore, polarity switching of the binary signal occurs in accordance with the timing of "1" in the Schmidt trigger binarization circuit 155.

A NRZI (Non Return to Zero Invert) method is adopted in this embodiment, and the position of "1" of the above-described pattern and the record mark or the edge portion (border portion) of a pit agree to each other.

In the PLL circuit 174, deviations of the frequency and phase between the binarized signal which is the output of this Schmidt Trigger binarization circuit 155 and the signal of the reference clock 198 transmitted from the reference clock generating circuit 160 are detected, and the frequency and phase of the output clock of the PLL circuit 174 are changed. In the reference clock generating circuit 160, (frequency and phase of) the reference clock 198 is fed back by using the output signal of the PLL circuit 174 and the decoding characteristic information of the viterbi decoder 156 (information of the convergence length (distance to convergence) in the pass metric memory in the viterbi decoder 156 which is not shown concretely) so that the error rate after viterbi decoding becomes low. The reference clock 198 generated in this reference clock generating circuit 160 is utilized as the reference timing at the time of processing the reproduction signal.

A synchronous code position extracting unit 145 detects the existence position of a synchronous code (sync code) mixed in the output data string of the viterbi decoder 156, and has the function of extracting the start position of the above described output data. With this start position as a reference, demodulation processing is performed in a demodulation circuit 152 for the temporarily stored data in a shift register circuit 170. In this embodiment, the data is converted into the original bit string with reference to a conversion table recorded in a demodulating conversion table recording unit 154 for every 12 channel bits. Thereafter, error correction processing is performed by an ECC decoding circuit 162, and descrambling is performed by a descrambling circuit 159. In the recording type (rewriting or recording) information storage medium, address information is previously recorded by wobble modulation. This address information is reproduced by wobble signal detection unit 135 (namely, the content of the wobble signal is distinguished), and necessary information for access to a desired place is supplied to the control unit 143.

The information record control system existing at the upper side from the control unit 143 will be explained. Data ID information is generated from a Data ID generating unit 165 in accordance with the recording position on the information storage medium, and when copy control information is generated in a CPR_MAI data generating unit 167, each kind of information of Data ID, IED, CPR_MAI and EDC is added to the information to be recorded by a Data ID, IED, CPR_MAI and EDC addition unit 168. Thereafter, the information is descrambled in the descrambling circuit 157, after which, the ECC block is constructed in an ECC encoding circuit 161. After it is converted into a channel bit string in the modulation circuit 151, the synchronous code is added in a synchronous code generating/adding unit 146, and data is recorded in the information storage medium in the information recording/reproducing unit 141. At the time of modulation, a DSV (Digital Sum Value) value after modulation is consecutively calculated in a DSV value calculating unit 148, and is fed back to code conversion at the time of modulation.

Figure 6:
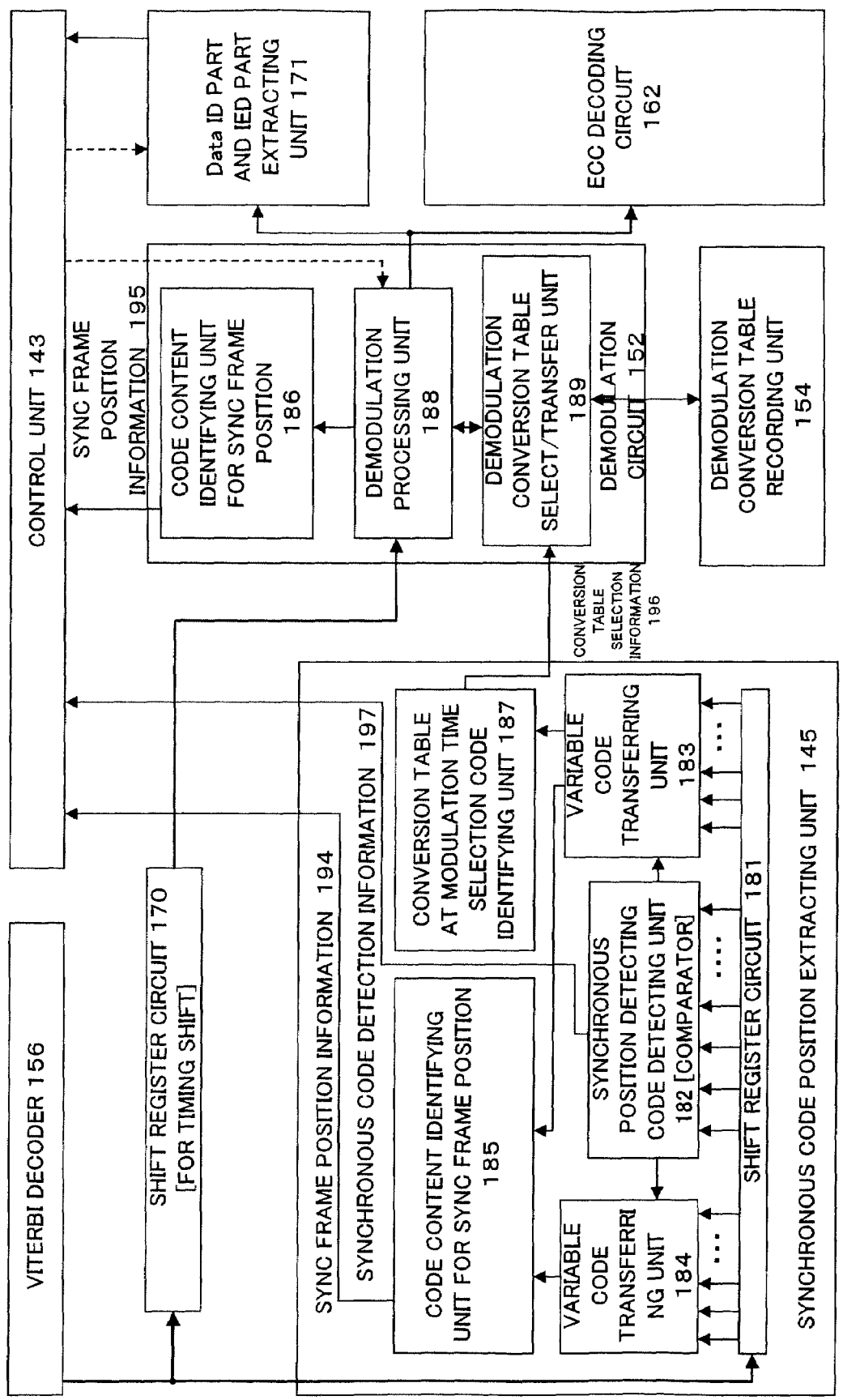
FIG. 6 is an explanatory diagram of a detailed structure of a peripheral part of a synchronous code position detecting unit in this embodiment.

A detailed structure of a peripheral part including the synchronous code position detecting unit 145 shown in FIG. 5 is shown in FIG. 6. The synchronous code is constituted of a synchronous position detecting code part having a fixed pattern and a variable code part. The position of the synchronous position detecting code part having the above described fixed pattern is detected by a synchronous position detecting code detecting unit 182 from a channel bit string outputted from the viterbi decoder 156, and variable code transfer units 183 and 184 extract the data of variable codes existing before and after it, and determines which sync frame in a sector described below the synchronous code detected by an identifying unit 185, which is for a sync frame position identifying code content, is located. The user information recorded on the information storage medium is sequentially transferred to a shift register circuit 170, a demodulation processing unit 188 in the demodulation circuit 152, and the ECC decoding circuit 162 in this order.

In the embodiment of the present invention, densification (linear density is especially enhanced) of the information storage medium is achieved by using PRML for reproduction in a data area, a data lead-in area and a data lead-out area as shown in [A] in FIG. 1, and compatibility with a current DVD is secured and stability of reproduction is secured by using a slice level detection method for reproduction in a system lead-in area and a system lead-out area as shown in [B] in FIG. 1.

Figure 7:
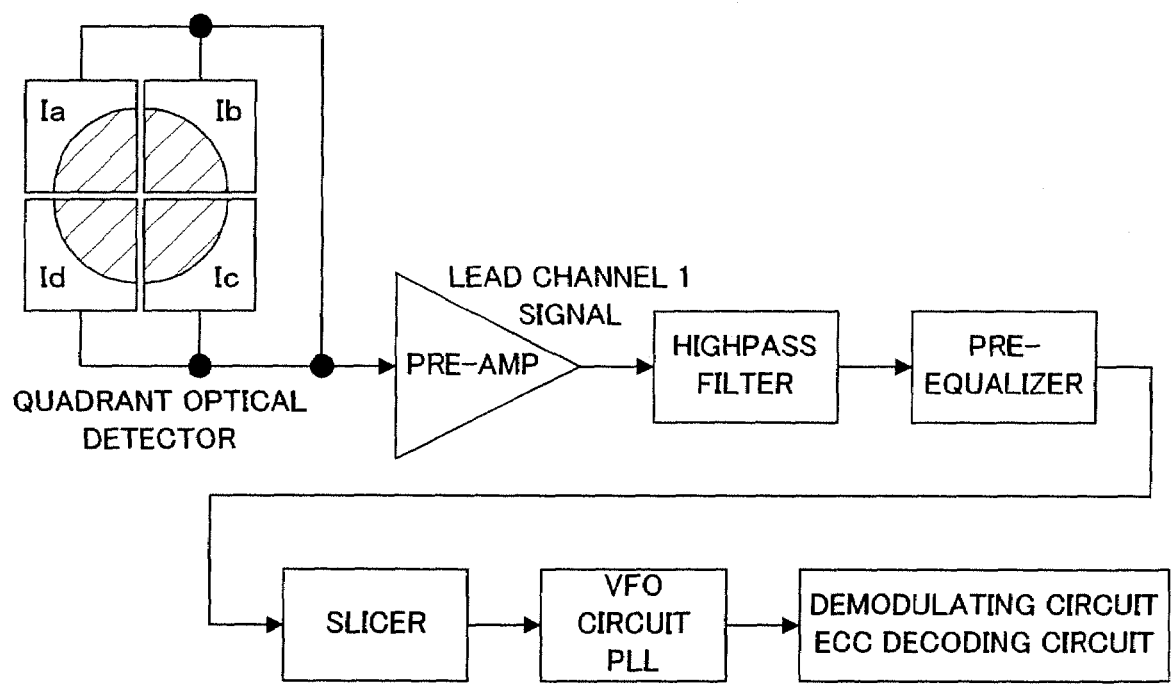
FIG. 7 is an explanatory diagram of an example of a signal processing circuit using a slice level detection method.

An example of a signal reproducing circuit using the slice level detection method which is used at the time of reproduction in the system lead-in area and the system lead-out area is shown in FIG. 7. A quadrant optical detector in FIG. 7 is fixed in an optical head existing in the information recording and reproducing unit 141 in FIG. 5. A signal which takes the sum total of a detection signal capable of being obtained from each optical detection cell of the quadrant optical detector is called a lead channel 1 signal here. A preamp to a slicer in FIG. 7 means the detailed structure in the slice level detection circuit 132 in FIG. 5. A reproduction signal obtained from the information storage medium passes through a high pass filter which cuts off lower frequency components than the reproduction signal frequency band, and thereafter, is subjected to waveform equalizing processing by a pre-equalizer. According to the experiment, it is found out that as for this pre-equalizer, by using a 7-tap equalizer, the reproduction signal can be detected with the smallest circuit scale and high accuracy, and therefore, the 7-tap equalizer is also used in this embodiment. A VFO circuit and PLL part in FIG. 7 correspond to a PLL circuit in FIG. 5, and a demodulation circuit and an ECC decoding circuit in FIG. 7 correspond to the demodulation circuit 152 and the ECC decoding circuit 162 in FIG. 5.

Figure 8:
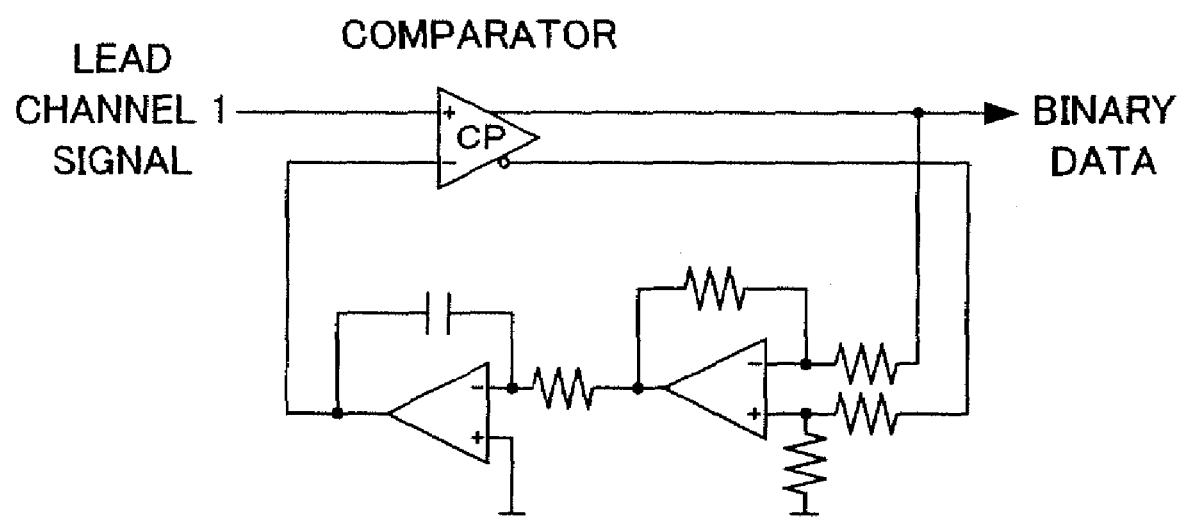
FIG. 8 is a detailed explanatory diagram showing a slicer circuit.

A detailed structure in the slicer circuit in FIG. 7 is shown in FIG. 8. A binarization signal after slicing is generated by using a comparator. In this embodiment, a low pass filter output signal is set at a slice level at the time of binarization for the inversion signal of binary data after binarization by using the duty feedback method. The cutoff frequency of the low pass filter is set at 5 kHz in this embodiment. If this cutoff frequency is high, the slice level varies early and therefore, the influence of noise is easily given, and if the cutoff frequency is low on the other hand, response of the slice level is late, and therefore, the influence of dust and flaw on the information storage medium is easily given. The cutoff frequency is set at 5 kHz in consideration of the relationship between the aforementioned RLL (1, 10) and the reference frequency of the channel bit.

Figure 9:
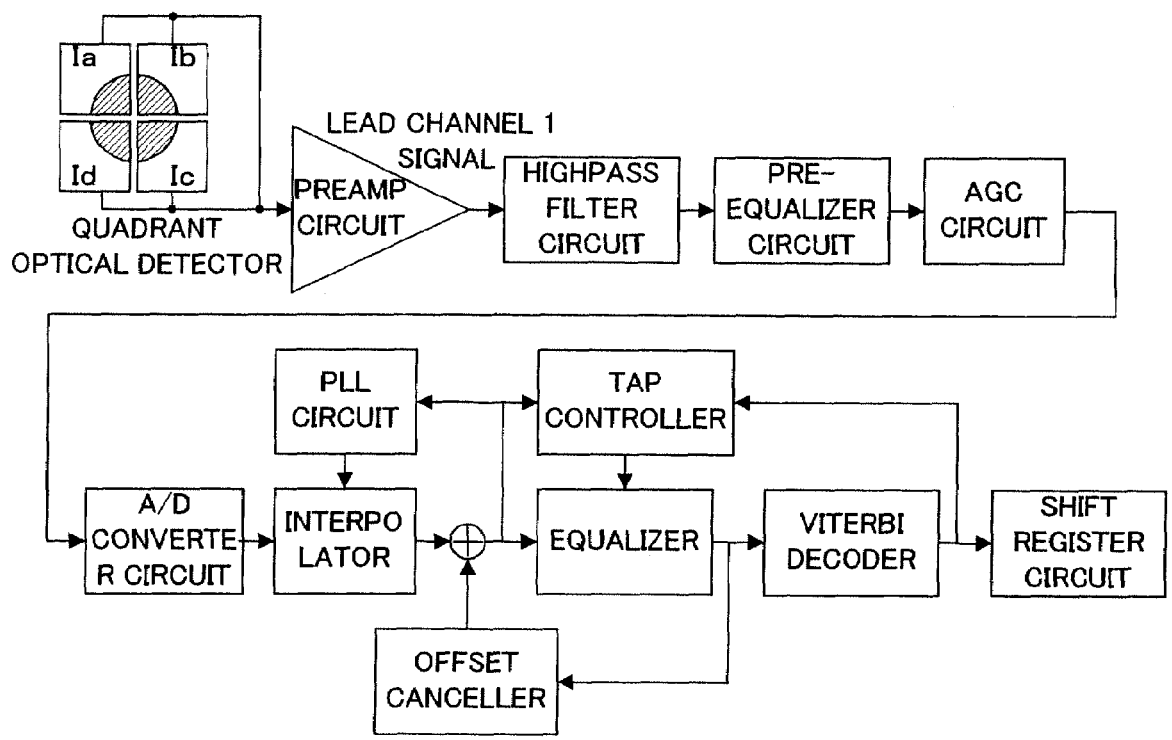
FIG. 9 is an explanatory diagram of an example of a signal processing circuit using a PRML detection method.

A signal processing circuit using the PRML detection method which is used for signal reproduction in the data area, the data lead-in area and the data lead-out area is shown in FIG. 9. A quadrant optical detector in FIG. 9 is fixed in the optical head existing in the information recording and reproducing unit 141 in FIG. 5. The signal taking the total sum of the detection signal obtained from each of optical detection cells of the quadrant optical detector is called a lead channel 1 signal here.

A detailed structure in the PR equalizing circuit 130 in FIG. 5 is constituted by each circuit from a preamp circuit to a tap controller, equalizer, and an offset canceller in FIG. 9. A PLL circuit in FIG. 9 is a part of the inside of the PR equalizing circuit 130 in FIG. 5, and means a different thing from the Schmidt Trigger binarization circuit 155 in FIG. 5.

The primary cutoff frequency of a bypass filter circuit in FIG. 9 is set at 1 kHz. The pre-equalizer circuit uses a 7-tap equalizer as in FIG. 7 (use of 7-tap makes it possible to detect the reproduction signal with the smallest circuit scale and high accuracy).

Sample clock frequency of an A/D converter circuit is 72 MHz, and digital is set at 8-bit output. If the influence of the level variation (DC offset) of the entire reproduction signal is exerted in the PRML detecting method, an error easily occurs at the time of viterbi demodulation. The structure is designed to correct offset by the offset canceller by using a signal obtained from the output of the equalizer in order to remove the influence. In the example shown in FIG. 9, adaptive equalization processing is performed in the PR equalizing circuit 130. Therefore, a tap controller for automatically correcting each tap coefficient in the equalizer by utilizing the output signal of the viterbi decoder 156 is used.

Figure 10:
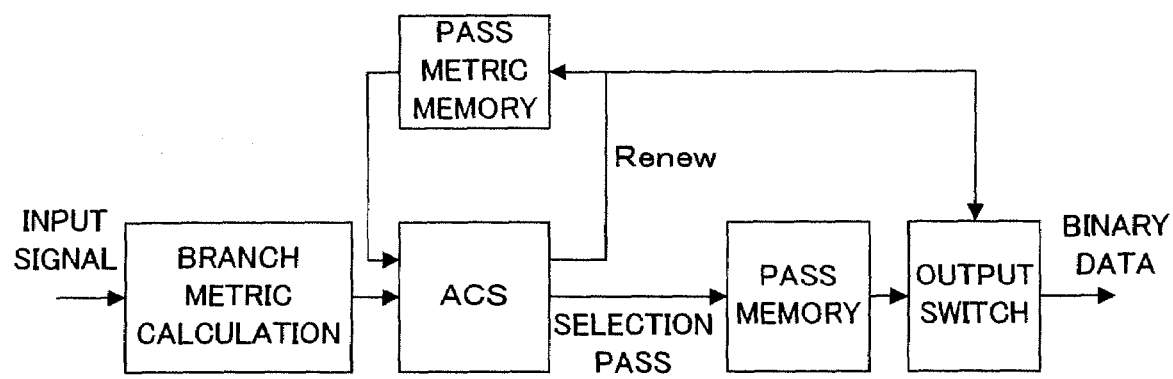
FIG. 10 is an explanatory diagram of a structure in a viterbi decoder.

The structure in the viterbi decoder 156 shown in FIG. 5 or FIG. 9 is shown in FIG. 10. The branch metrics for all the branches which can be estimated for the input signal are calculated in the branch metric calculating part, and the value is sent to the ACS. The ACS is the abbreviated name of Add Compare Select, which calculates the pass metric which can be obtained by adding the branch metric corresponding to each pass which can be estimated in the ACS, and transfers the calculated result to a pass metric memory. At this time, calculation processing is performed with reference to the information in the pass metric memory in the ACS. Each pass (transition) situation which can be estimated and the value of pass metric calculated in the ACS corresponding to each pass are temporarily stored in the pass memory. The pass metric corresponding to each pass is compared in the output switching part, and the pass of which pass metric value is minimum is selected.

Figure 11:
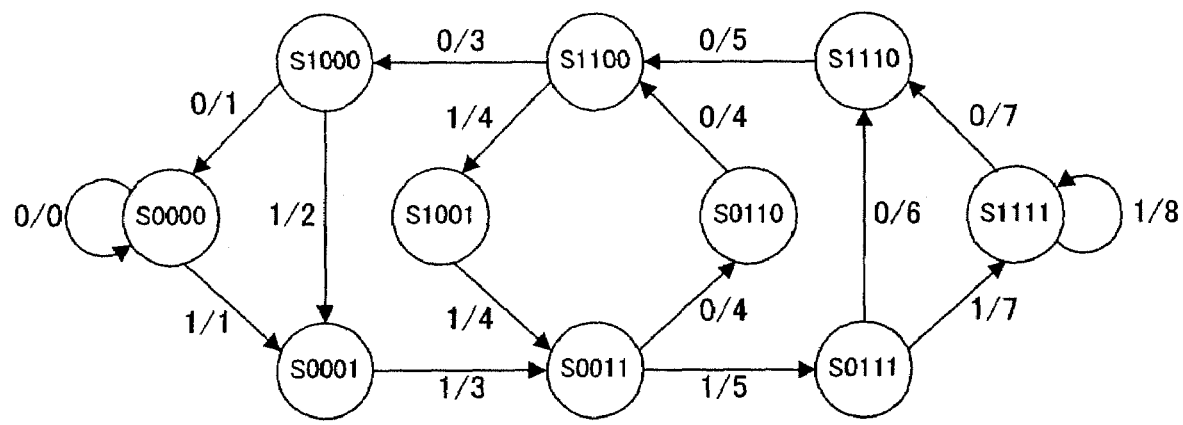
FIG. 11 is a state transition diagram of a PR (1, 2, 2, 2, 1) class.

The state transition in the PR (1, 2, 2, 2, 1) class in the embodiment of the present invention is shown in FIG. 11. As for the transition of the state which can be taken in the PR (1, 2, 2, 2, 1) class, only the transition shown in FIG. 11 is possible, and the pass which is capable of existing (being estimated) at the time of decoding is determined based on the transition diagram of FIG. 11 in the viterbi decoder 156.

Figure 13:
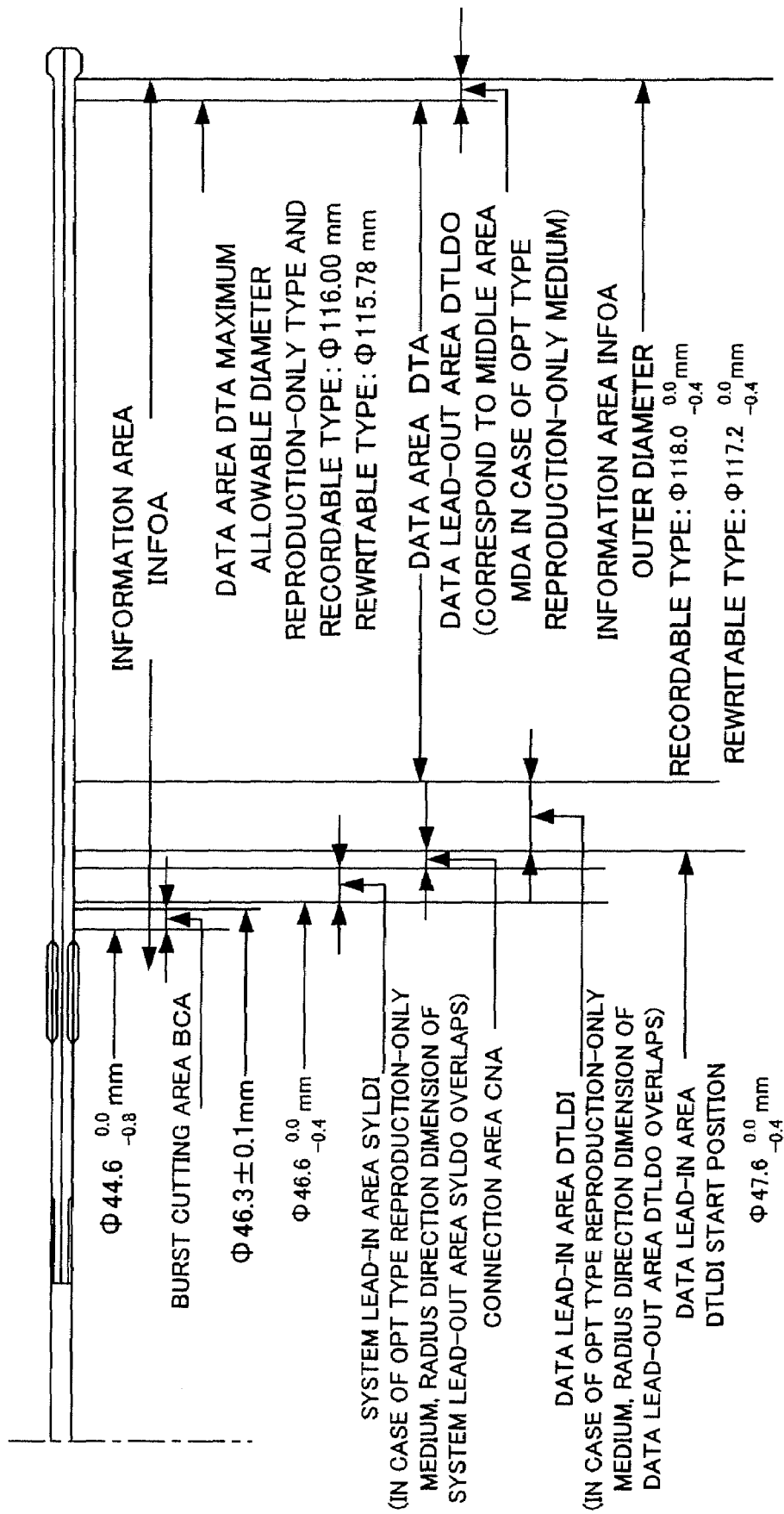
FIG. 13 is a diagram showing an example of a structure and dimension of an information storage medium.

FIG. 13 shows a structure and a dimension of the information storage medium in the embodiment of the present invention. As examples, the following three kinds of information storage medium can be cited.

"Reproduction-only information storage medium" only for reproduction and incapable of recording "Recordable information storage medium" capable of recording only once "Rewritable information storage medium" capable of rewriting any number of times.

As shown in FIG. 13, most of the structures and dimensions are made common in the above described three kinds of information storage media. In any of three kinds of information storage media, a burst cutting area BCA, a system lead-in area SYLDI, a connection area CNA, a data lead-in area DTLDI, and a data area DTA are disposed from an inner peripheral side.

Data lead-out areas DTLDO are disposed in outer peripheral parts in all media except for the OPT type reproduction-only medium. A middle area MDA is disposed at the peripheral part in the OPT type reproduction-only medium as will described later.

Information is recorded in a shape of emboss (prepit) in the system lead-in area SYLDI, and in any of recordable and rewritable types, this area is for reproduction-only (non-recordable). In the reproduction-only information storage medium, information is also recorded in the shape of emboss (prepit) in the data lead-in area DTLDI. On the other hand, in the recordable and rewritable information storage media, the data lead-in area DTLDI becomes an area in which new information by record mark formation is recordable (rewritable in the rewritable type).

As will be described later, in the recordable and rewritable information storage media, in the data lead-out area DTLDO, the area in which the new information is recordable (rewritable in the rewritable type), and a reproduction-only area in which information is recorded in the shape of emboss (prepit) exist mixedly.

As described above, in the data area DTA, the data lead-in area DTLDI, the data lead-out area DTLDO and the middle area MDA shown in FIG. 13, densification (line density is especially enhanced) of the information storage medium is achieved by using PRML for reproduction of the signal recorded therein ([A] in FIG. 1), and in the system lead-in area SYLDI and the system lead-out area SYLDO, compatibility with the current DVD is secured and stabilization of reproduction is secured by using the slice level detecting method for reproduction of the signal recorded therein ([B] in FIG. 1).

Unlike the current DVD standard, in the embodiment shown in FIG. 13, the burst cutting area BCA and the system lead-in area SYLDI do not overlap each other, but are positionally separated ((B2) in FIG. 1). By physically separating both of them, interference between the information recorded in the system lead-in area SYLDI at the time of information reproduction and the information recorded in the burst cutting area BCA is prevented, and therefore, information reproduction with high precision can be ensured.

As another embodiment with respect to the embodiment shown in (B2) in the above described FIG. 1, there is a method of previously forming microscopic recessed and projecting shapes in the disposition place of the burst cutting area BCA when the "L→H" type recording film is used, as shown in (B3) in FIG. 1. In the embodiment of the present invention, the explanation that not only the conventional H→L type recording film but also the L→H type recording film is incorporated in the standard and the selection range of the recording film is enlarged to make it possible to record at high speed and supply a medium at low price ((G2) in FIG. 1) will be made in the part where the explanation concerning the polarity (discrimination of whether H→L or L→H) information of the record mark existing at the 192nd byte in FIG. 28 is performed later. As will be described later, in the embodiment of the present invention, the case where the "L→H" type recording film is used is also considered.

The data (bar code data) to be recorded in the burst cutting area BCA is recorded by locally exposing the recording film to laser. As shown in FIG. 21, the system lead-in area SYLDI is formed in an embossed pit area 211, and therefore, a reproduction signal from the system lead-in area SYLDI tends to decrease in light reflection amount as compared with a light reflection level from a mirror surface 210. If the burst cutting area BCA is brought into the mirror surface state similarly to the mirror surface 210, and the L→H type recording film is used, the reproduction signal from the data recorded in the burst cutting area BCA tends to increase more in light reflection amount than the light reflection level from the mirror surface 210 (of the unrecorded state). As a result, a large difference occurs between the positions of the maximum level and minimum level (amplitude level) of the reproduction signal from the data formed in the burst cutting area BCA, and the positions of the maximum level and the minimum level (amplitude level) of the reproducing signal from the system lead-in area SYLDI.

Figure 14:
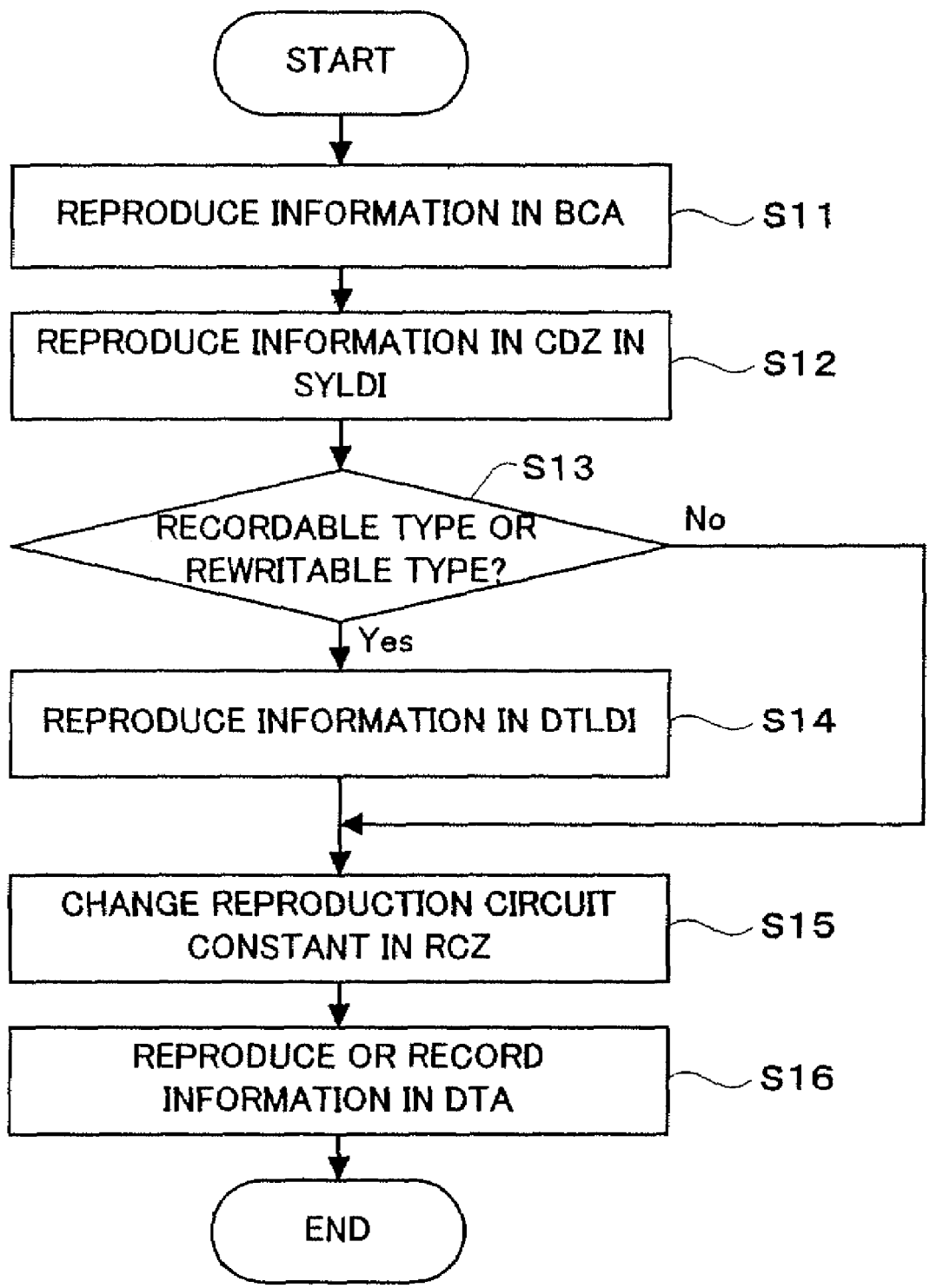
FIG. 14 is an explanatory diagram of process steps in an information reproducing apparatus or an information recording apparatus.

As will be described later in the explanation of FIG. 21 (and ((B4) in FIG. 1), the information reproducing apparatus or the information recording and reproducing apparatus perform processing in the sequence of the following (1) to (5). This processing content will be shown in FIG. 14.

"(1) Reproduce information in the burst cutting area BCA"

→"(2) Reproduce information in an information data zone CDZ in the system lead-in area SYLDI"

→"(3) Reproduce information in the data lead-in area DTLDI (in the case of recordable or rewritable type)"

→"(4) Readjust (optimize) a reproduction circuit constant in a reference code recording zone RCZ"

→"(5) Reproduce information recorded in the data area DTA or record new information"

Therefore, if there is a large difference between the amplitude level of the reproduction signal from the data formed in the burst cutting area BCA and the amplitude level of the reproduction signal from the system lead-in area SYLDI, there arises the problem of reducing reliability of information reproduction. In order to solve the problem, this embodiment has the characteristic that the microscopic recessed and projecting shapes are previously formed in this burst cutting area BCA when the "L→H" type recording film is used for the recording film ((B3) in FIG. 1).

By previously forming the microscopic recessed and projecting shapes, the light reflection level becomes lower than the light reflection level from the mirror surface 210 due to optical interference effect at the stage before the data (bar code data) is recorded by local laser exposure, and the difference between the amplitude level of the reproduction signal (detection level) from the data formed in the burst cutting area BCA and the amplitude level of the reproduction signal (detection level) from the system lead-in area SYLDI reduces to a large extent. As a result, reliability of information reproduction is enhanced, and the effect that the processing when shifting from the above described (1) to (2) becomes easy.

In the case of using the "L→H" type recording film, there is the method of adopting the embossed pit area 211 as in the system lead-in area SYLDI as a concrete content of the microscopic recessed and projecting shapes previously formed in the burst cutting area BCA. As the other examples, there is the method of adopting a groove area 214, or a land area and groove area 213 as in the data lead-in area DTLDI and the DATA area DTA.

As explained in the embodiment ((B2) in FIG. 1) in which the system lead-in area SYLDI and the burst cutting area BCA are separately disposed, if the inside of the burst cutting area BCA and the embossed pit area 211 overlap each other, the noise component of the reproduction signal from the data formed in the burst cutting area BCA increases due to unnecessary interference.

As an example of the microscopic recessed and projecting shapes in the burst cutting area BCA, it is considered to form the microscopic recessed and projecting shapes in the groove area 214 or the land area and groove area 213 instead of forming it in the emboss bit area 211. As a result, the noise component of the reproduction signal from the data formed in the burst cutting area BCA due to unnecessary interference decreases, and quality of the reproduction signal is enhanced.

If the track pitch of the groove area 214 or the land area and groove area 213 formed in the burst cutting area BCA is conformed to the track pitch of the system lead-in area SYLDI, manufacturability of the information storage medium is enhanced. Namely, at the time of producing a master of the information storage medium, the embossed pit in the system lead-in area is produced with the feeding motor speed of the aligner part of the master recording apparatus made constant. At this time, the track pitch of the groove area 214 or the land area and groove area 213 formed in the burst cutting area BCA is conformed to the track pitch of the embossed pit in the system lead-in area SYLDI, and thereby, the motor speed can be kept constant continuously in the burst cutting area BCA and the system lead-in area SYLDI. Therefore, it is not necessary to change the speed of the feeding motor in mid course, and therefore, variation in pitch hardly occurs, thus enhancing manufacturability of the information storage medium.

Figure 15:
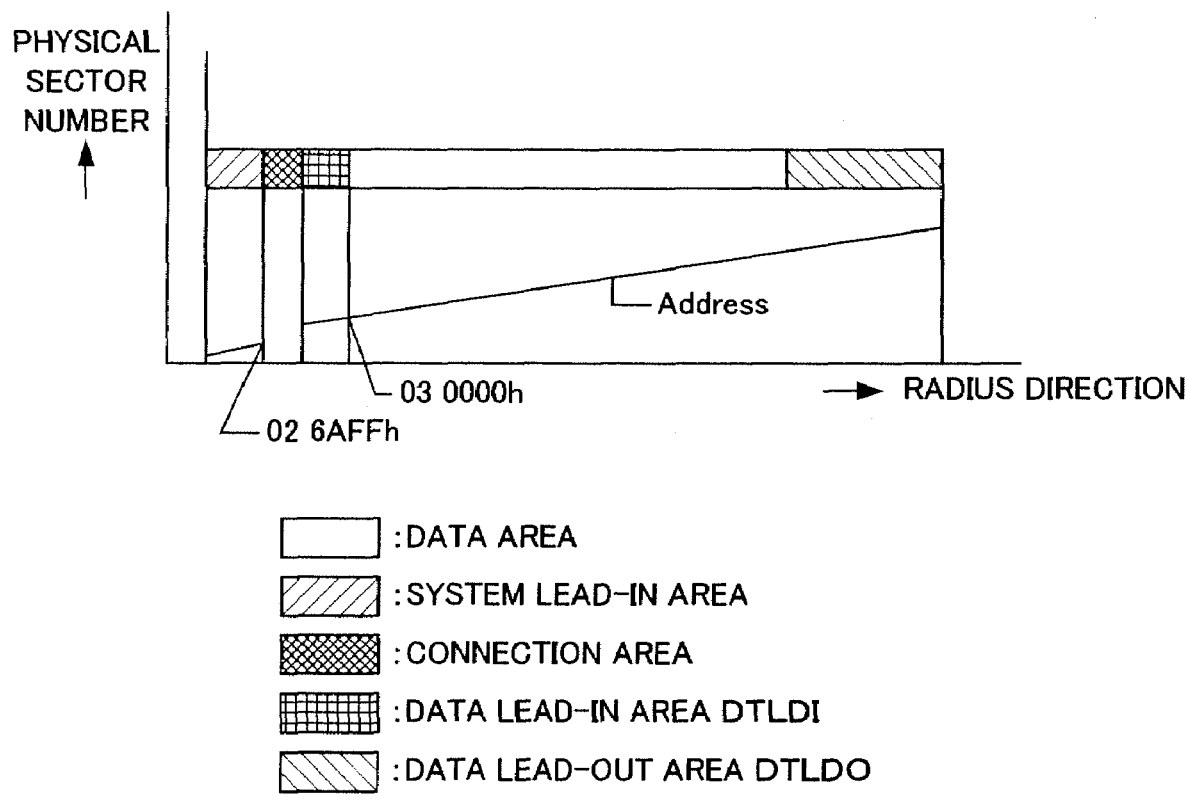
FIG. 15 is a diagram showing a physical sector number setting method of a recordable information storage medium or a single-layer reproduction-only information storage medium.

In all of the above-described three kinds of information storage media, the minimum management unit of the information to be recorded in the information storing media is a sector unit of 2048 bytes. A physical address of the above described sector unit of 2048 bytes is defined as a physical sector number. A setting method of the physical sector number in the recordable information storage medium and the reproduction-only information storage medium having single-layer structure is shown in FIG. 15. The physical sector number is not given to the inside of the burst cutting area BCA and the connection area CNA, but the physical sector numbers are set for the system lead-in area SYLDI, the data area DTA and the data lead-out area DTLDO in ascending order from the inner circumference. The physical sector numbers are set so that the final physical sector number of the system lead-in area SYLDI becomes "026AFFh", and the physical sector number at the start position of the data area DTA becomes "030000h".

There are two kinds of physical sector number setting methods of the reproduction-only information storage media each having a double-layer structure as shown in FIGS. 16A to 16B. One is parallel placement (Parallel Track Path) PTP shown in FIG. 16A, and has the structure in which the physical number setting method shown in FIG. 15 is applied to both the two layers. The other method is opposite placement (Opposite Track Path) OPT shown in FIG. 16B, in which the physical sector number is set from the inner circumference to the outer circumference in ascending order in the layer at the front (Layer 0) and the physical sector number is set from the outer circumference to the inner circumference in ascending order in the layer at the back side (layer 1) on the other hand. In the case of the placement of OPT, a middle area MDA, a data lead-out area DTLDO and a system lead-out area SYLDO are disposed.

A physical sector number setting method in the rewritable information storage medium is shown in FIG. 17.

In FIG. 17, Zone, Nominal radius (mm), Number of Physical segment per track, Number of tracks, Start Physical sector number (hex value) and End Physical sector number (hex value) in each of Land and Groove are shown with respect to each of System Lead-in area, Connection area, Data Lead-in area, Data area and Data Lead-out area.

In the rewritable information storage medium, the physical sector numbers are respectively set for the land area and groove area. The rewritable information storage medium has the structure in which the data area DTA is divided into 19 zones.

FIG. 18 shows each parameter value of this embodiment in the reproduction-only information storage medium, FIG. 19 shows each parameter value of this embodiment in the recordable information storage medium, and FIG. 20 shows each parameter value of this embodiment in the rewrite-only information storage medium.

As is understood from comparison of FIG. 18 or FIG. 19 and FIG. 20 (especially the comparison of the part (B)), the rewrite-only information storage medium is enhanced in recording capacity by closing up the track pitch and line density (data bit length) with respect to the reproduction-only or the write-only information storage medium. As will be described later, in the rewrite-only information storage medium, the influence of crosstalk of the adjacent tracks is reduced to close up the track pitch by adopting the land groove record.

All of the reproduction-only information storage medium, the recordable information storage medium and rewritable information storage medium have the characteristic that the data bit length and track pitch (corresponding to the record density) of the system lead-in/out areas SYLDI/SYLDO are made larger than the data lead-in/out areas DTLDI/DTLDO ((B1) in FIG. 1). Compatibility with the current DVD is secured by making the data bit length and track pitch of the system lead-in/out areas SYLDI/SYLDO close to the value of the lead-in area of the current DVD.

In the embodiment of the present invention, as in the current DVD-R, a level difference of embossing of the system lead-in/out areas SYLDI/SYLDO of the recordable information storage medium is set to be small. This brings about the effect that the depth of the pre-groove of the recordable information storage medium is made small, and the reproduction signal modulation degree from the record mark formed on the pre-groove by recording is made high. On the other hand, as the reaction, there arises the problem that the modulation degree of the reproduction signal from the system lead-in/out areas SYLDI/SYLDO becomes low. For this, the data bit length (and track pitch) of the system lead-in/out areas SYLDI/SYLDO is made large, and thereby, the repetitive frequency of pits and spaces at the closest position is kept apart from the optical cutoff frequency of the MTF (Modulation Transfer Function) of the objective lens for reproduction (is made significantly small). As a result, the amplitude of the reproduction signal from the system lead-in/out areas SYLDI/SYLDO is increased, and stabilization of reproduction can be realized.

Comparison of the detailed data in the system lead-in SYLDI and the data lead-in DTLDI in various kinds of information storage media is shown in FIG. 21. (a) in FIG. 21 shows the data structure of the reproduction-only information storing medium, (b) in FIG. 21 shows the data structure of the rewritable information storage medium, and (c) in FIG. 21 shows the data structure of the recordable information storage medium.

As shown in (a) of FIG. 21, except that only the connection zone CNZ is the mirror surface 210, the insides of all the system lead-in area SYLDI, data lead-in area DTLDI and the data area DTA are the embossed pit area 211 where embossed pits are formed, in the reproduction-only information storage medium.

The part where the inside of the system lead-in area SYLDI is the embossed pit area 211, and the connection zone CNZ has the mirror surface 210 is common. As shown in (b) of FIG. 21, in the rewritable information storage medium, the land area and groove area 213 are formed in the data lead-in area DTLDI and the data area DTA, and in the recordable information storage medium, the groove area 214 is formed in the data lead-in area DTLDI and the data area DTA. Information is recorded by forming the record mark in the land area and the groove area 213 or the groove area 214.

An initial zone INZ indicates the start position of the system lead-in SYLDI. As semantic information recorded in the initial zone INZ, data ID (Identification Data) information including the above described physical sector number or logical sector number is discretely disposed. Information of the data frame structure constituted of data ID, IED (ID Error Detection code), main data recording user information, and EDC (Error Detection Code) is recorded in one physical sector as will be described later, and information of the above-described data frame structure is also recorded in the initial zone INZ. However, all the information of the main data recording user information is all set at "00h" in the initial zone INZ, and therefore, the semantic information in the initial zone INZ is only the above described data ID information. The position of the present head can be known from the information of the physical sector number or the logical sector number recorded in this data ID information. Namely, on starting information reproduction from the information storage medium in the information recording and reproducing unit 141 in FIG. 5, when reproduction is started from the information in the initial zone INZ, the information of the physical sector number or the logical sector number recorded in the data ID information is extracted first. While the present position in the information storage medium is being confirmed, shift to a control data zone CDZ is made.

Buffer zones 1 and 2, BFZ1 and BFZ2 are each constituted of 32 ECC blocks. As shown in FIG. 18 to FIG. 20, one ECC block is constituted of 32 physical sectors, and therefore, 32 ECC blocks correspond to 1024 physical sectors. In the buffer zones 1 and 2, BFZ1 and BFZ2, the information of the main data is all set at "00h" as in the initial zone INZ.

The connection zone CNZ which exists in the connection area (Connection Area) CNA is the area for physically separating the system lead-in area SYLDI and the data lead-in area DTLDI, and this area becomes the mirror surface where any embossed pit or pre-groove does not exist.

A reference code recording zone (Reference code zone) RCZ of the reproduction-only information storage medium and the recordable information storage medium is the area used for adjusting the reproduction circuit of the reproduction apparatus (for example, for automatic adjustment of each tap coefficient value at the time of adaptive equalization performed in the tap controller in FIG. 9), and the information of the aforementioned data frame structure is recorded therein. The length of the reference code is the same as one ECC block (=32 sectors).

It is the characteristic of this embodiment that reference code recording zones (Reference code zones) RCZ of the reproduction-only information storage medium and the recordable information storage medium are disposed adjacently to the data areas (Data Areas) DTA ((A2) in FIG. 1). In any of the structures of the current DVD-ROM disc and current DVD-R disc, a control data zone is disposed between the reference code recording zone (Reference code zone) and the data area (Data Area), and the reference code recording zone and the data area are spaced from each other. If the reference code recording zone and the data area are spaced from each other, an inclination amount and optical reflectivity of the information storage medium, or (in the case of the recordable information storage medium), the recording sensitivity of the recording film changes a little, and there arises the problem that even if the circuit constant of the reproducing apparatus is adjusted at the reference code recording zone, the optimal circuit constant in the data area is shifted.

In order to solve the above described problem, the reference code recording zone (Reference code zone) RCZ is disposed adjacently to the data area (Data Area) DTA. As a result, when the circuit constant of the information reproducing apparatus is optimized in the reference code recording zone (Reference code zone), the optimized state is also kept at the same circuit constant in the adjacent data area (Data Area) DTA.

When a signal is desired to be reproduced with high accuracy at the optional place in the data area (Data Area) DTA, it is preferable to pass the following steps (1) to (4). As a result, signal reproduction at the target position becomes possible with extremely high accuracy.

(1) Optimize the circuit constant of the information reproducing apparatus in the reference code recording zone (Reference code zone) RCZ.

(2) Optimize the circuit constant of the information reproducing apparatus again while reproducing the nearest portion to the reference code recording zone RCZ in the data area DTA.

(3) Optimize the circuit constant once again while reproducing information at an intermediate position between the target position in the data area DTA and the optimized position in (2).

(4) Move to the target position and reproduce a signal.

Guard track zones 1 and 2, GTZ1 and GTZ2 existing in the recordable information storage medium and the rewritable information storage medium are the area for defining the start border position of the data lead-in area DTLDI and the border position of a disc test zone DKTZ and a drive test zone DRTZ. This area is defined as the area where recording by the record mark formation must not be performed. The guard track zones 1 and 2, GTZ1 and GTZ2 exist in the data lead-in area DTLDI. Therefore, in this area, the pre-groove area is previously formed in the recordable information storage medium and the groove area and the land area are previously formed in the rewritable information storage medium. The wobble addresses are previously recorded in the pre-groove area or the groove are and the land area as shown in FIG. 18 to FIG. 20, and therefore, the current position in the information storage medium can be determined by using the wobble addresses.

The disk test zone DKTZ is the area which is set for performing quality test (evaluation) by the manufacturer of the information recording medium.

The drive test zone DRTZ is secured as the area for test writing before the information recording and reproducing apparatus records information into the information storage medium. The information recording and reproducing apparatus previously performs test writing in this area, and after determining the optimal recording condition (write strategy), it can record information in the data area DTA under the optimal recording condition.

A disc identification zone DIZ existing inside the rewritable information recording medium ((b) in FIG. 21) is the optional information recording area, and a recordable area for each set with the manufacturer name information of the recording and reproducing apparatus and the related added information and Drive description constituted of the area where the manufacturer can record uniquely as one set.

Defect management areas 1 and 2, DMA 1 and 2 existing inside the rewritable information storage medium ((b) in FIG. 21) are the place where defect management information inside the data area DTA is recorded, and spare spot information or the like when a defect spot occurs, for example, is recorded.

A data structure in a recording position management zone RMZ existing in the recordable information storage medium ((c) in FIG. 21) is shown in FIG. 22. (a) in FIG. 22 shows the same thing in (c) in FIG. 21, and enlarged diagram of the recording position management zone RMZ in (c) in FIG. 21 is shown in (b) in FIG. 22.

In the recording position management zone RMZ, the data regarding the recording position management is collectively recorded in one recording position management data (Recording Management Data), and each time the content of the recording management data RMD is updated, new recording management data RMD is recorded at the rear side in sequence as a new recording management data RMD. Namely, the recording position management data (Recording Management Data) RMD is recorded in the size unit of one physical segment block (the physical segment block will be explained later), and is recorded at the rear in sequence as a new recording management data RMD each time the data content is updated.

The example of (b) in FIG. 22 shows the example in which the recording management data RMD #1 is recorded first, but the management data is changed, and the data after the change (after updated) is recorded immediately after the recording management data RMD #1 as recording management data RMD #2.

Accordingly, an unrecorded area 206 exists in the recording management data RMZ so that further recording is possible. The concrete information content in the recording management data RMD will be described later by using FIG. 30 to FIG. 32. The information content of an R physical information zone RIZ shown in (c) of FIG. 21 will be also explained in detail later in the explanation of FIG. 27 to FIG. 29.

The characteristics of this embodiment lies in that as shown in FIG. 21, in each of the reproduction-only, recordable, and rewritable information storing media, the system lead-in area is disposed at the opposite side of the data area with the data lead-in area therebetween ((B4) of FIG. 1) and as shown in FIG. 13, the burst cutting area BCA and the data lead-in area DTLDI are disposed at the opposite sides with the system lead-in area SYLDI therebetween.

When the information storage medium is inserted into the information reproducing apparatus or the information recording and reproducing apparatus shown in FIG. 5, the information reproducing apparatus or the information recording and reproducing apparatus perform processing in the order of the following (1) to (5). This processing content is shown in the above described FIG. 14.

(1) Reproduce information in the burst cutting area BCA (2) Reproduce information in an information data zone CDZ in the system lead-in area SYLDI (3) Reproduce information in the data lead-in area DTLDI (in the case of recordable type or rewritable type)

(4) Readjust (optimize) a reproduction circuit constant in a reference code recording zone RCZ (5) Reproduce information recorded in the data area DTA or record new information As shown in FIG. 21, information is disposed in order from the inner circumferential side along the sequence of the above described processing, and therefore, unnecessary access processing to the inner circumference is not required. Accordingly, it is possible to reach the data area DTA with the number of accesses reduced, and therefore, there is provided the effect of advancing the start time of reproduction of the information recorded in the data area DTA or recording of new information. The slice level detection method is utilized for signal reproduction in the system lead-in area SYLDI (FIG. 1 [B]), and PRML is used for signal reproduction in the data lead-in area DTLDI and the data area DTA (FIG. 1 [A]). Therefore, when the data lead-in area DTLDI and the data area DTA are made to adjoin each other, and reproduction is performed in order from the inner circumferential side, stable signal reproduction is continuously possible by only switching from the slice level detection circuit to the PRML detection circuit only once between the system lead-in area SYLDI and the data lead-in area DTLDI. Therefore, since the number of switching times of reproduction circuit following the reproducing steps is small, the processing control is simplified and time required for starting reproduction in the data area becomes short.

Comparison of the data structures in the data area DTA and the data lead-out area DTLDO in various kinds of information storing media is shown in FIG. 23. In FIG. 23, (a) shows the data structure of the reproduction-only information storage medium, (b) and (c) show the data structures of the rewritable information storage medium, and (d) to (f) show the data structures of the recordable information storage medium. (b) and (d) especially show the data structure at the initial time (before recording), and (c), (e) and (f) show the data structures in the state in which recording (record or rewrite) advances to some extent.

As shown in (a) in FIG. 23, the data recorded in the data lead-out area DTLDO and the system lead-out area SYLDO have the data frame structures (the data frame structure will be described later) as the buffer zones 1, 2 BFZ1 and 2 in FIG. 21, and all the values of the main data in them are set at "00h". In the reproduction-only information storage medium, all the area in the data area DTA can be used as the prerecorded area 201 of the user data. As will be described later, in all embodiments of the recordable information storage medium and the rewritable information storage medium, the rewritable/recordable ranges 202 to 205 of the user data are smaller than the data area DTA.

In the recordable information storage medium or the rewritable information storage medium, a spare area (Spare Area) SPA is provided in the innermost circumferential part of the data area DTA. When a defective place occurs in the data area DTA, replacement processing is performed by using the above described spare area SPA, and in the case of the rewritable information storage medium, its replacement history information (defect management information) is recorded in the defective management areas 1 and 2 (DMA1, 2) in (b) of FIG. 21, and defect management areas 3 and 4 (DMA3, 4) in (b) and (c) of FIG. 23. Defect management information recorded in the defect management areas 3 and 4 (DMA3, 4) in (b) and (c) of FIG. 23 have the same content as the information recorded in the defect management areas 1 and 2 (DMA1, 2) in (b) of FIG. 21.

In the case of the recordable information storage medium, the replacement history information (defect management information) in the case where replacement processing is performed is recorded in copy information C_RMZ which is the record content in the recording position management zone existing in the data lead-in area DTLDI shown in (c) in FIG. 21 and in a border zone which will be described later. Defect management is not performed in the current DVD-R disc. Therefore, as the number of manufactured DVD-R discs increases, the DVD-R discs having defective spots in part come to appear, and the demand for enhancement in reliability of information recorded in the recordable information storage media is growing.

In the example shown in FIG. 23, the spare area SPA is also set for the recordable information storage medium to make defect management by replacement processing possible (FIG. 1 [C]). As a result, it becomes possible to enhance reliability of recorded information by also performing defect management processing for the recordable information storage medium having a defective spot in part. In the rewritable information storage medium or the recordable information storage medium, the information recording and reproducing apparatus determines on the user side when many defects occur, whereby the spare place can be enlarged by automatically setting the extended spares area (Extended Spare Area) ESPA, ESPA1 and ESPA2 for the state immediately after selling to the user shown in (b) and (d) in FIG. 23.

The extended spare areas ESPA, ESPA1 and ESPA2 are made settable in this manner, and thereby, the media having a number of defects for the reason of manufacture can be on sale. As a result, manufacturing yield is enhanced, thus making it possible to reduce the cost of the media.

When the extended spare areas ESPA, ESPA1 and ESPA2 are additionally provided in the data area DTA as shown in (c), (e) and (f) in FIG. 23, the rewritable or recordable ranges 203 and 205 of the user data decrease, and it is necessary to manage the position information. In the rewritable information storage medium, its information is recorded in the defect management areas 1 to 4 (DMA1 to 4) and a control data zone CDZ as will be described. In the case of recordable information storage medium, its information is recorded in the data lead-in area DTLDI and a recording management zone RMZ existing in a border out BRDO as will be described later. As will be described later, its information is recorded in recording position management data (Recording Management Data) RMD in the recording position management zone RMZ. The recording management data RMD is updated and recorded in the recording management zone RMZ each time the management data content is updated, and therefore, even if the extended spare area is reset many times (the example in (e) of FIG. 23 shows the state in which the extended spare area 1 EAPA1 is set, even after all the extended spare area is used up, there is so many defects that it is necessary to set another spare area, and therefore, extended spare area 2 ESPA2 is further set at a later date), it is possible to update and manage the data timely ((C1) in FIG. 23).

Guard track zones 3 (GTZ3) shown in (b) and (c) in FIG. 23 are disposed for separation between a defect management area 4 (DMA4) and a drive test zone DRTZ, and a guard track zone GTZ4 is disposed for separation between a disc test zone DKTZ and a servo calibration zone (Servo Calibration Zone) SCZ. The guard track zones 3 and 4 (GTZ 3, 4) are defined as the area in which recording by formation of the record marks must not be performed as in the guard track zones 1 and 2 (GTZ1 and 2) shown in FIG. 21. Since the guard track zones 3 and 4 (GTZ3, GTZ4) exist inside the data lead-out area DTLDO, in this area, a pre-groove area is previously formed in the recordable information storage medium, and a groove area and a land area are previously formed in the rewritable information storage medium. The wobble addresses are previously recorded in the pre-groove area, the groove area and the land area, as shown in FIG. 18 to FIG. 20, and therefore, the current position in the information storage medium is determined by using the wobble addresses.

The drive test zone DRTZ is secured as the area for test writing before the information recording and reproducing apparatus records information into the information storage medium as in FIG. 21. The information recording and reproducing apparatus previously performs test writing in this area, and after determining the optimum recording condition (write strategy), information can be recorded in the data area DTA with the optimum write strategy.

The disc test zone DKTZ is the area for the manufacturer of the information storage medium to perform a quality test (evaluation) as in FIG. 21.

In all the areas in the data lead-out areas DTLDO except for servo calibration zones (Servo Calibration Zone) SCZ, the pre-groove area is previously formed in the recordable information storage medium, the groove area and the land area are previously formed in the rewritable information storage medium, and it is made possible to record the record mark (record or rewrite).

As shown in (c) and (e) in FIG. 23, the inside of the servo calibration zone (Servo Calibration Zone) SCZ is the embossed pit area 211 as in the system lead-in area SYLDI instead of the pre-groove area 214, or the land area and groove area 213 (FIG. 1 [D]). In this zone, a continuous track by the embossed pit is formed, continuing from the other areas of the data lead-out area DTLDO. This track consecutively continues in a spiral form, extends over 360 degrees along the circumference of the information storage medium to form the embossed pit.

This zone is provided to detect the inclination amount of the information storage medium by using a DPD (Differential Phase Detect) method. When the information storage medium inclines, offset occurs to the amplitude of the track deviation detection signal using the DPD method. At this time, it becomes possible to detect the inclination amount by the offset amount and detect the inclination direction by the offset direction with high accuracy. By utilizing this principle, the embossed pit by which the DPD detection can be performed is previously formed at the outermost peripheral portion (the peripheral portion in the data lead-out area DTLDO) of the information storage medium, whereby inclination detection at low cost with high accuracy is made possible without adding a special component (for inclination detection) to the optical head existing inside the information recording and reproducing unit 141 in FIG. 5. By further detecting the inclination amount of this outer circumferential portion, stabilization of the servo (by inclination amount correction) can be also realized in the data area DTA.

In this embodiment, the track pitch in this servo calibration zone SCZ is conformed to those in the other zones in the data lead-out area DTLDO (FIG. 1(D1)). As a result, manufacturability of the information storage medium is enhanced, and reduction in cost of the medium by enhancement of yield is made possible. Namely, in the recordable information storage medium, pre-groove is formed in the other zones in the data lead-out area DTLDO. At the time of manufacturing the master of the recordable information storage medium, the pre-groove is made by making the speed of the feeding motor of the aligner part of the master recording apparatus constant. At this time, by conforming the track pitch in the servo calibration zone SCZ to those in the other zones in the data lead-out area DTLDO, the feeding motor speed can be also continuously kept constant in the servo calibration zone SCZ. Therefore, a pitch variation hardly occurs, and manufacturability of the information storage medium is enhanced.

As another example, there is the method of conforming at least either the track pitch or the data bit length in the servo calibration area SCZ to the track pitch or the data bit length of the system lead-in area SYLDI (FIG. 1(D2)).

Measuring the inclination amount and the inclination direction in the servo calibration area SCZ by using the DPD method and realizing servo stabilization in the data area DTA by utilizing the result in the data area DTA are described above. As the method for estimating the inclination amount in the data area DTA at this time, it is considered to previously measure the inclination amount and its direction in the system lead-in area SYLDI by the same DPD method and estimate the inclination amount by utilizing the relationship with the measurement result in the servo calibration zone SCZ.

In the case of using the DPD method, the offset amount of the detection signal amplitude with respect to the inclination of the information storage medium and the direction in which the offset comes out change dependently on the track pitch and the data bit length of the embossed pitch. Accordingly, it is considered to conform at least either the track pitch or the data bit length in the servo calibration zone SCZ to the track pitch or the data bit length of the system lead-in area SYLDI. In this manner, the detection characteristics concerning the offset amounts of the detection signal amplitude and the directions in which the offset comes out can be conformed to each other in the servo calibration area SCZ and the system lead-in area SYLDI. As a result, there arises the effect of making it easy to obtain correlation between both of them and facilitate estimation of the inclination amount and the direction in the data area DTA.

As shown in (c) in FIG. 21 and (d) in FIG. 23, in the recordable information storage medium, drive test zones DRTZ are provided at two spots in the inner circumferential side and the outer circumferential side. As the number of test writings performed in the drive test zone DRTZ is larger, the optimal recording condition can be sought in detail by varying the parameter minutely, and recording accuracy to the data area DTA is enhanced. In the rewritable information storage medium, reuse of the drive test zone DRTZ by overwriting is made possible. However, in the recordable information storage medium, when the recording accuracy is enhanced by increasing the number of test writings, there arises the problem of using up the drive test zone DRTZ in a short time. In order to solve the problem, this embodiment has the characteristic that it is made possible to set extended drive test zone (Extended Drive Test Zone) EDRTZ along the direction of the inner circumference from the outer circumferential portion, and it is made possible to extend the drive test zone ((E2) in FIG. 1).

As the characteristics concerning the setting method of the extended drive test zone and the test writing method in the set extended drive test zone, the following 1 to 3 can be cited in this embodiment.

1. Setting (framing) of the extended drive test zone EDRTZ is performed collectively and sequentially from the outer circumferential direction (the side near the data lead-out area DTLDO) to the inner circumferential side.

As shown in (e) in FIG. 23, the extended drive test zone 1 (EDRTZ1) is set as a sizable zone from the nearest place (the nearest place to the data lead-out area DTLDO) to the outer circumference in the data area, and after the extended drive test zone 1 (EDRTZ1) is used up, an extended drive test zone 2 (EDRTZ2) is made settable next as a sizable zone which exists at the inner circumferential side from the extended drive test zone 1 (EDRTZ1).

2. In the extended drive test zone EDRTZ, test writing is performed sequentially from the inner circumferential side ((E3) in FIG. 1). When test writing is performed in the extended drive test zone EDRTZ, test writing is performed along the groove area 214 disposed in a spiral form along the outer circumferential side from the inner circumferential side, and test writing of this time is performed in the unrecorded place just behind the place where test writing is performed previous time (already recorded).

The inside of the data area has the structure in which recording is performed along the groove area 214 disposed in the spiral form to the outer circumferential side from the inner circumferential side. Namely, test writing in the extended drive test zone is performed according to the method of sequentially recording test writing into the rear of the place of the test writing which is performed immediately before, whereby the processing of "verifying the place of the test writing which is performed immediately before" and the next processing of "implementation of the test writing of this time" can be performed serially. As a result, not only the test writing becomes easy, but also management of the place where test writing is already performed in the extended drive test zone EDRTZ is simplified.

3. Resetting of the data lead-out area DTLDO is possible in the form including the extended drive test zone EDRZ ((E4) in FIG. 1).

(e) in FIG. 23 shows an example in which two extended spare areas 1 and 2 (ESPA1, 2) are set in the data area DTA, and two extended drive test zones 1 and 2 (EDRTZ1, 2) are set in the data area DTA. In this case, this embodiment has the characteristic that reset can be performed as the data lead-out area DTLO for the area including the area up to the extended drive test zone 2 (EDRT2) ((E4) in FIG. 1) as shown in (f) in FIG. 23. Being linked to this, reset of the range of the data area DTA is performed in the form of narrowed range, and it becomes easy to manage the recordable range 205 of the user data existing in the data area DTA.

In the case of performing reset as in (f) in FIG. 23, the set place of the extended spare area 1 (ESPA1) shown in (e) in FIG. 23 is regarded as "the extended spare area already used up", and management is performed considering that the unrecorded area (area where additional test writing is possible) exists only in the extended spare area 2 (ESPA2) in the extended drive test zone EDRTZ. In this case, nondefective information which is recorded in the extended spare area 1 (ESPA1) and used for replacement is transferred to an unused area in the extended spare area 2 (ESPA2) as it is, and the defect management information is rewritten. At this time, start position information of the data lead-out area DTLDO which is reset is recorded in the position information of the newest (updated) data area DTA of the RMD field 0 in the recording management data RMD as shown in FIG. 30.

Figure 24:
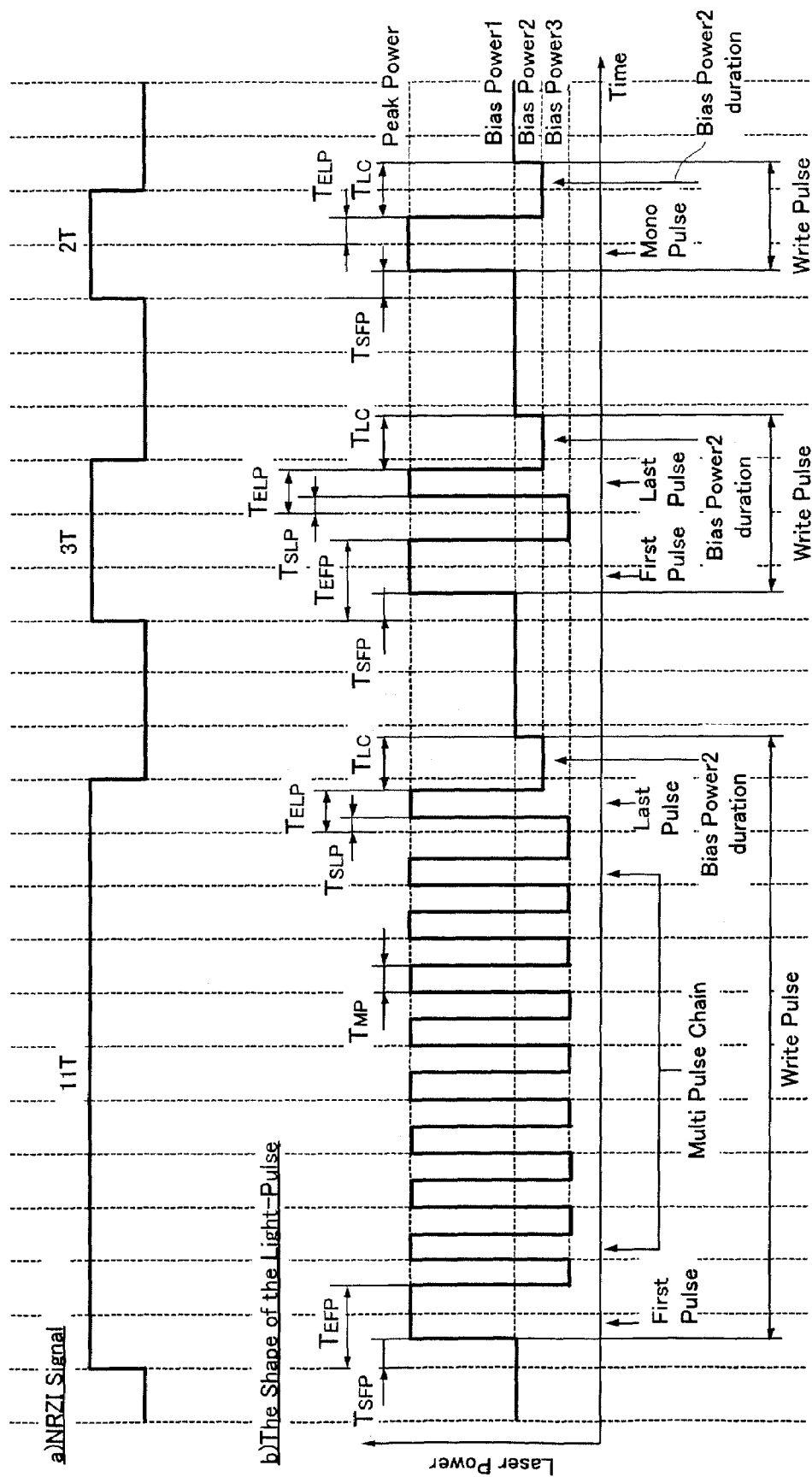
FIG. 24 is a waveform (write strategy) explanatory diagram of a record pulse.
Figure 25:
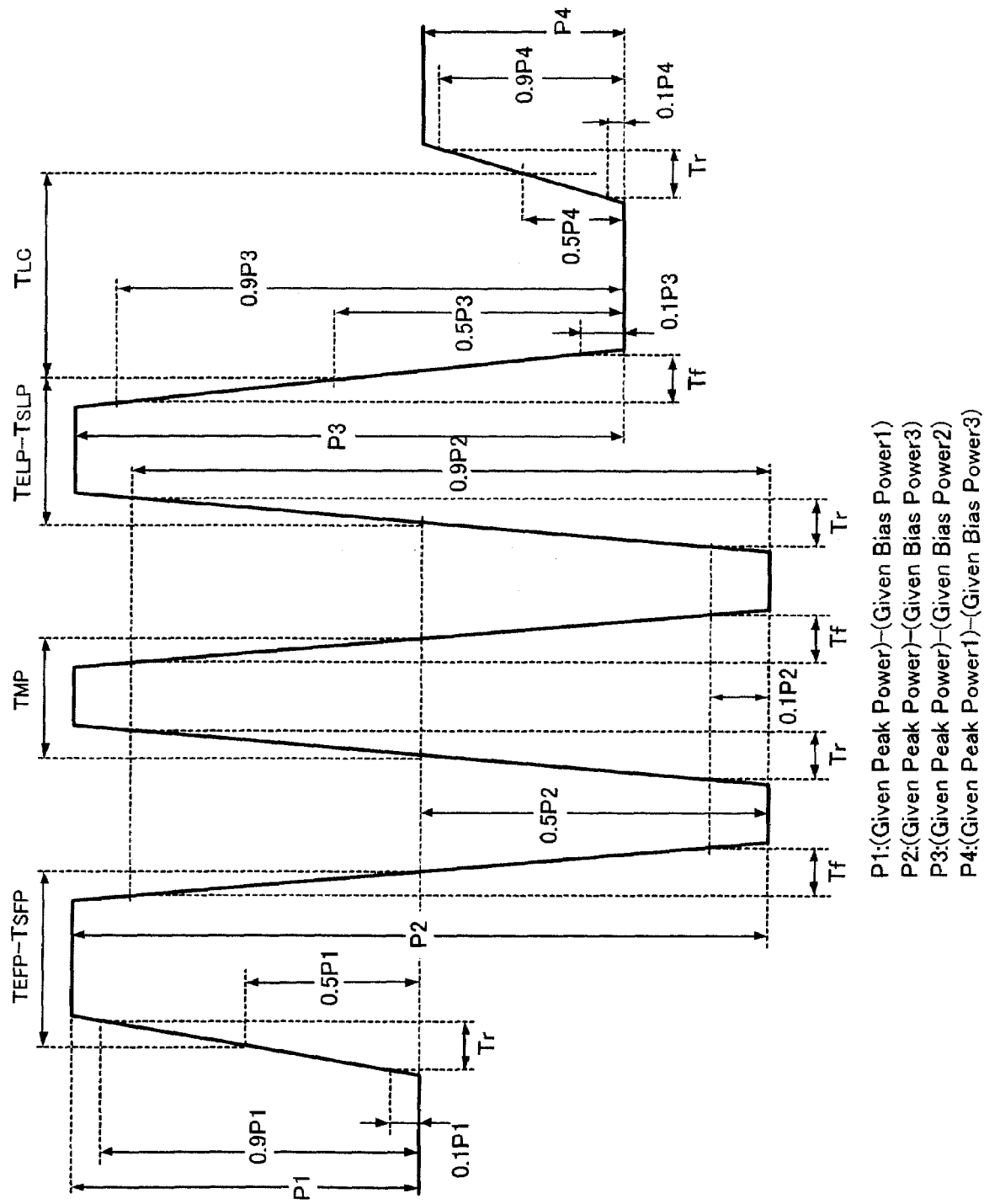
FIG. 25 is a definition explanatory diagram of a record pulse shape.

The waveform of the record pulse (write strategy) for performing test writing in the above described drive test zone is shown in FIG. 24 and the definition of the record pulse shape is shown in FIG. 25.

The structure of the border area in the recordable information storage medium will be explained with FIG. 26. When one border area is set in the recordable information storage medium for the first time, a bordered area (Bordered Area) BRDA#1 is set at the inner circumferential side (the nearest side to the data lead-in area DTLDI), and thereafter, border-out (Border-out) BRDO is formed behind it, as shown in (a) in FIG. 26.

Figure 26:
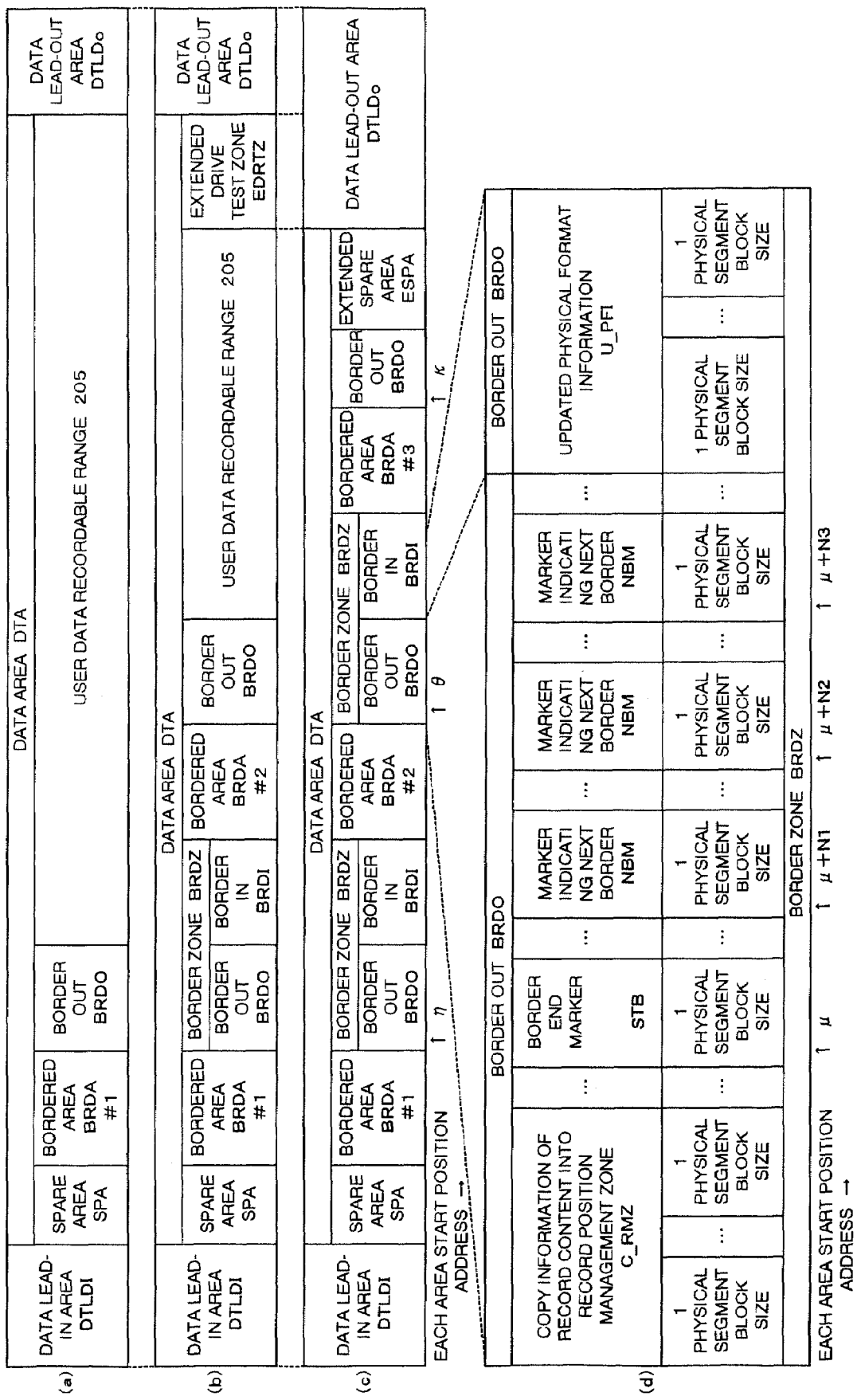
FIG. 26 is a structure explanatory diagram concerning a border area in the recordable information storage medium.

When the next bordered area (Bordered Area) BRDA #2 is desired to be set, the next border-in (Border-in) BRDI (of #1) is formed behind the previous border-out BRDO (of #1) as shown in (b) in FIG. 26, and thereafter, the next bordered area BRDA #2 is set. When the next bordered area BRDA #2 is desired to be closed, the border-out BRDO (of #2) is formed just behind it. In this embodiment, the state in which the next border-in (Border-in) BRDI (of #1) is formed behind the previous border-out BRDO (of #1) and is paired with the border-out BRDO (of #1) is called a border zone (Border Zone) BRDZ. The example of setting the extended drive test zone EDRTZ in the data area DTA is shown in (b) in FIG. 26.

The state after finalizing (Finalization) the recordable information storage medium is shown in (c) in FIG. 26. The example in which the extended drive test zone EDRTZ is incorporated in the data lead-out area DTLDO and the extended spare area ESPA is further set is shown in (c) in FIG. 26. In this case, the recordable range 205 of the user data is filled with the final border-out BRDO so that the recordable range 205 of the user data is not left unfilled.

The detailed data structure in the border zone BRDZ explained above is shown in (d) in FIG. 26. Each information is recorded in a size unit of one physical segment block (Physical Segment Block) which will be described later.

Copy information C_RMZ of the content recorded in the recording position management zone is recorded in the initial part in the border-out BRDO, and a border stopping marker (Stop Block) STB indicating that this is the border-out BRDO is recorded.

When the next border-in BRDI further comes, the initial marker indicating that a border area comes next (Next Border Marker) NBM is recorded in the "N1st" physical segment block counted from the physical segment block in which this border stopping marker (Stop Block) STB is recorded. Then, the second marker NBM indicating that a border area comes next is recorded in the "N2nd" physical segment block, and the third marker NBM indicating that a border area comes next is recorded in the "N3rd" physical segment block. In this manner, the markers NBM are discretely recorded at the three spots in total for each size of one physical segment block.

Updated physical format information (Updated Physical Format Information) U_PFI is recorded in the next border-in BRDI.

When the next border area does not come (in the final border-out BRDO) in the current DVD-R or DVD-RW disc, the place where "the marker NBM indicating the next border" is to be recorded (the place of one physical segment block size) shown in (d) in FIG. 26 is kept to be "the place where no data is recorded". When the border close is performed in this state, this recordable information storage medium (current DVD-R or DVD-RW disc) is in the state capable of reproduction in the conventional DVD-ROM drive or the conventional DVD player. In the conventional DVD-ROM drive or the conventional DVD player, track deviation detection using the DPD (Differential Phase Detect) method is performed by utilizing the record mark recorded on this recordable information storage medium (current DVD-R or DVD-RW disc). However, in the above described "place where no data is recorded", a record mark does not exist over one physical segment block size, and therefore, track deviation detection using the DPD (Differential Phase Detect) method cannot be performed. Therefore, there exists the problem that the track servo does not perform stably.

As the solution to the problems of the above described current DVD-R or DVD-RW disc, the following [1] to [5] can be cited in this embodiment.

[1] When the next border area does not come, the data of a specific pattern is previously recorded in "the place where the marker NBM indicating the next border should be recorded".

[2] When the next border area comes, "overwriting processing" is performed with a specific record pattern partially and discretely in the place of "the marker NBM indicating the next border" in which the above described data of the specific pattern is recorded. Namely, the method of utilizing the overwriting processing as the identification information indicating "that the next border area comes" is adopted. By setting the marker indicating the next border by overwriting (FIG. 4 [L]) in this manner, the record mark of the specific pattern can be previously formed in "the place where the marker NBM indicating the next border should be recorded" even when the next border area does not exist as shown in [1]. A a result, there arises the effect that when the track deviation detection is performed by the DPD method in the reproduction-only information reproducing apparatus after the border close, track servo performs stably.

There is the fear that stabilization of the PLL circuit shown in FIG. 5 is impaired in the information recording and reproducing apparatus or the information reproducing apparatus when a new record mark is overwritten even partially on the part where the record mark is already formed in the recordable information storage medium.

As the solution to the fear, the methods of [3] to [5] are further adopted in this embodiment.

[3] When overwriting is performed on the position of "the marker NBM indicating the next border" of one physical segment block size, overwriting situation is changed in accordance with the place in the same data segment ((L1) in FIG. 4).

[4] Overwriting is performed partially in the sync data 432, and overwriting is prohibited on the sync code 431 ((L2) in FIG. 4).

[5] Overwriting is performed in the place except for the data ID and IED.

As will be explained in detail later by using FIGS. 65A to 65C, data fields 411 to 418 for recording the user data and guard areas 441 to 448 are alternately recorded on the information storage medium. A set of combination of each of the data fields 411 to 418 and each of the guard areas 441 to 448 is called a data segment 490, and one data segment length corresponds to one physical segment block length.

Figure 65A:
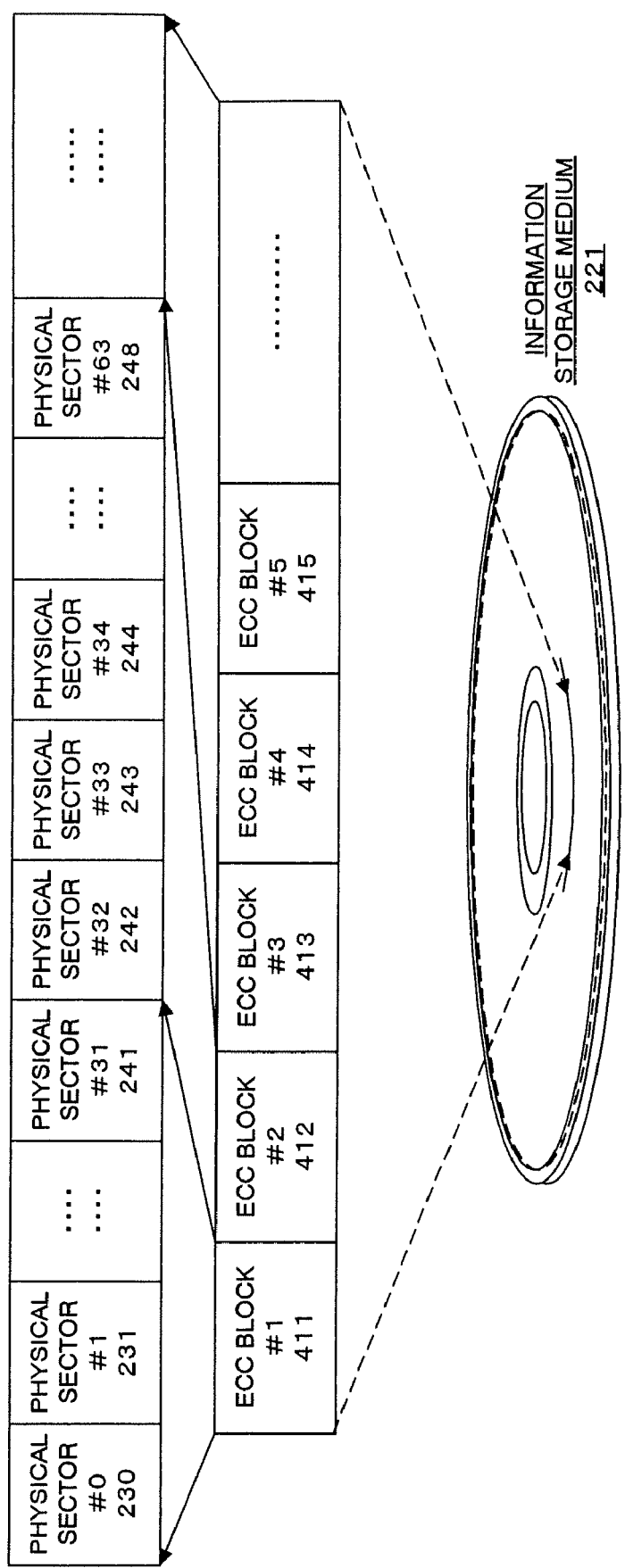
FIG. 65A is an explanatory diagram of comparison of a data structure in the information storage medium of this embodiment with a prior art example.
Figure 65B:
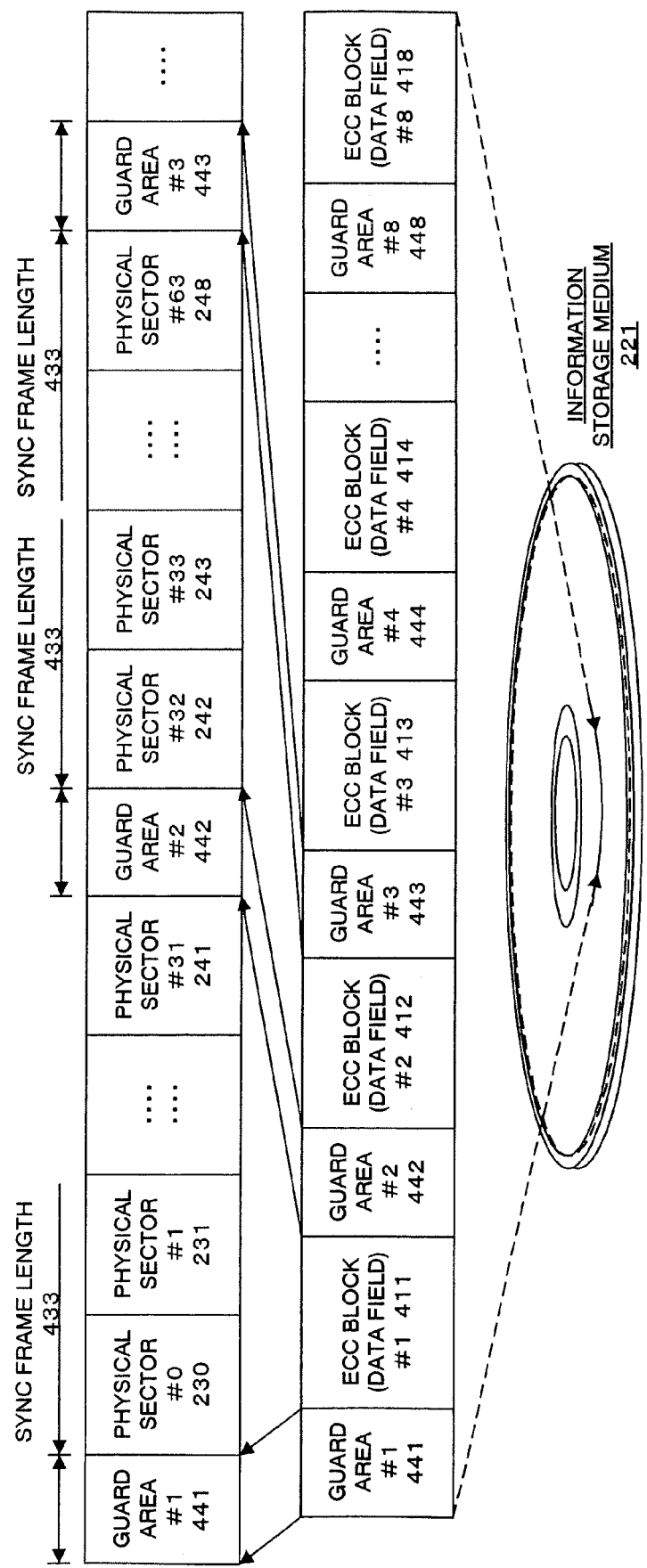
FIG. 65B is an explanatory diagram of comparison of the data structure in the information storage medium of this embodiment with the prior art example.
Figure 65C:
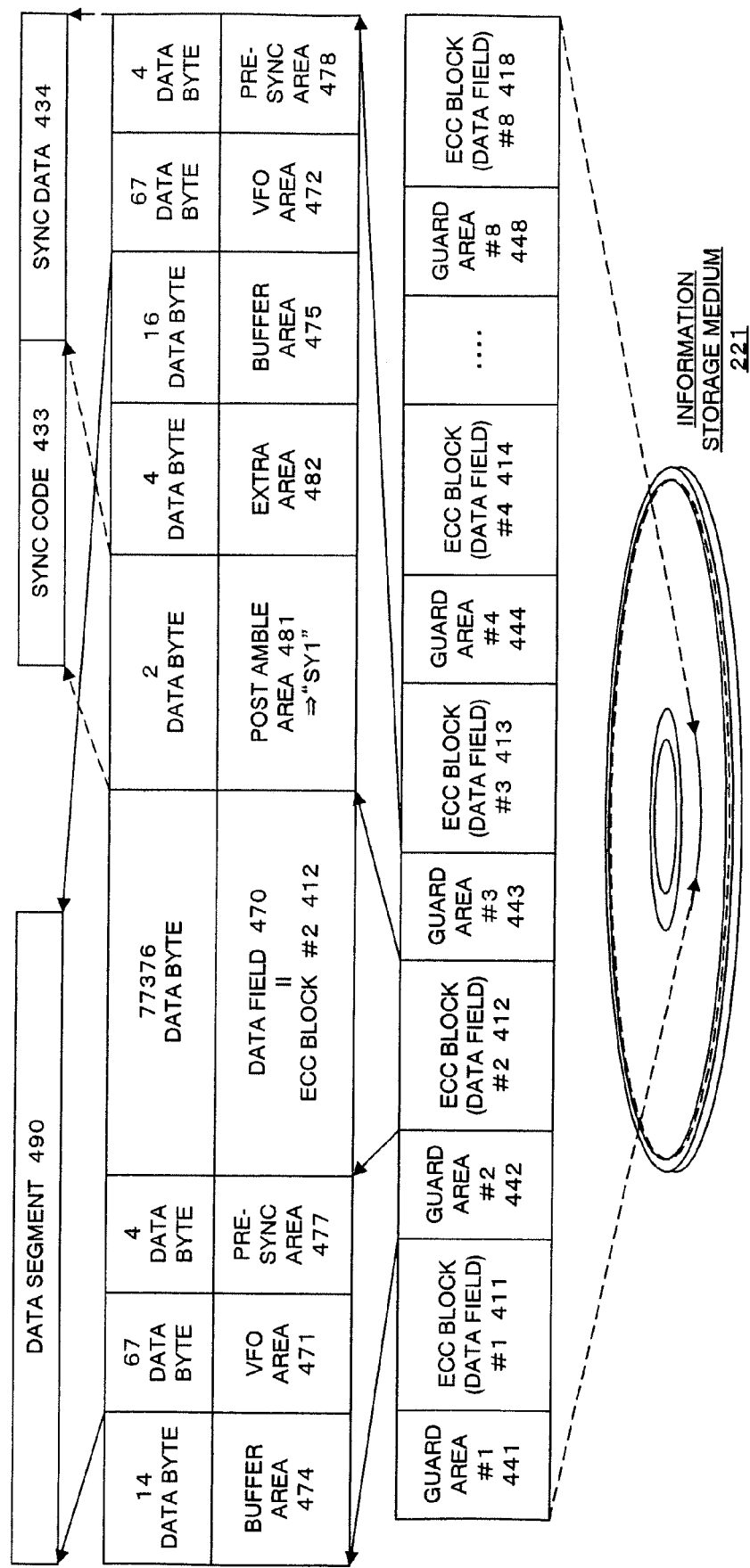
FIG. 65C is an explanatory diagram of comparison of the data structure in the information storage medium of this embodiment with the prior art example.

In the PLL circuit shown in FIG. 5, lead-in of PLL is easily performed especially in VFO areas 471 and 472 shown in FIGS. 65A to 65C. Accordingly, even if PLL is off, another lead-in of PLL can be easily performed by using the VFO areas 471 and 472 if it is in the place immediately before the VFO areas 471 and 472, and the influence as the whole system in the information recording and reproducing apparatus or the information reproducing apparatus is reduced.

By utilizing this situation, [3] the overwriting situation is changed in accordance with the place in the data segment as described above ((L1) in FIG. 4), and overwriting amount of a specific pattern is increased at the rear part near the VFO areas 471 and 472 in the same data segment. In this manner, it is made easy to determine "the marker indicating the next border", and the accuracy deterioration of the signal PLL at the time of reproduction can be prevented.

As is explained in detail by using FIGS. 65A to 65C and FIG. 45, one physical sector is constructed by combination of the place where a sync code 433 (SY0 to SY3) is disposed and sync data 434 disposed between the synch codes 433. The information recording and reproducing apparatus or the information reproducing apparatus extracts the sync code 433 (SY0 to SY3) from a channel bit string recorded on the information storage medium, and detects a break of the channel bit string. The position information (physical sector number or logical sector number) of the data recorded on the information storage medium is extracted from the information of the data ID in FIG. 35 as will be described later. The error of the data ID is detected by using IED disposed immediately behind it.

Accordingly, in this embodiment, [5] overwriting is prohibited on the data ID and IED, and [4] overwriting is partially performed in the sync data 432 except for the sync code 431 ((L2) in FIG. 4), thereby also making it possible to detect the data ID position by using the sync code 431 and reproduce information recorded in the data ID (read the content) in "the marker NBM indicating the next border".

Figure 12:
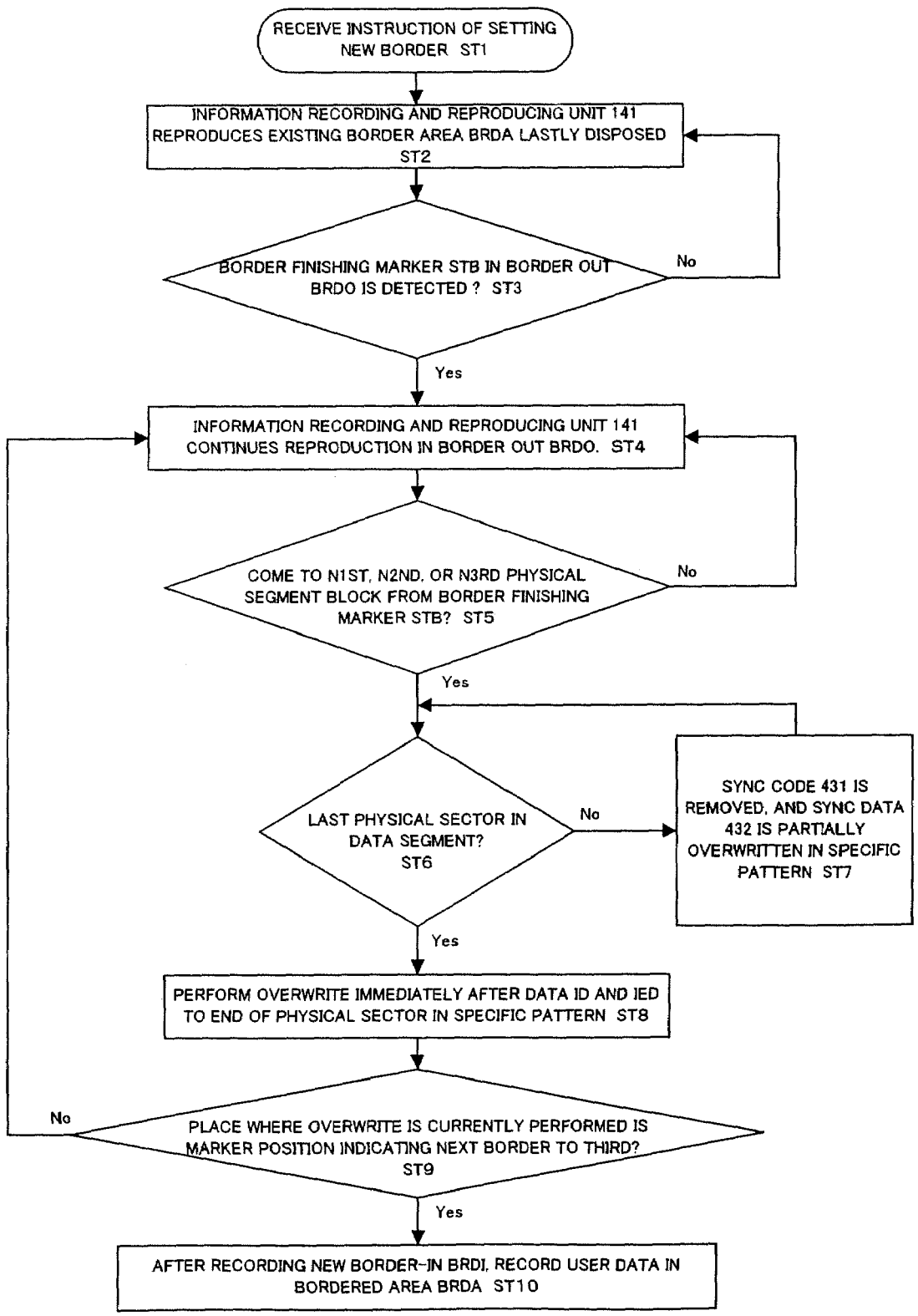
FIG. 12 is an explanatory diagram of a method of creating a maker indicating a next border by overwrite processing.

In order to explain the above described content more specifically, the flow chart at the time of performing overwriting in the place of "the marker NBM indicating the next border" is shown in FIG. 12. When the control unit 143 of the information recording and reproducing apparatus shown in FIG. 5 receives the setting instruction of a new border via the interface unit 142 (ST1), the control unit 143 controls the information recording and reproducing unit 141 and starts reproduction of the exiting bordered area BRDA disposed at the end (ST2). Subsequently, the information recording and reproducing unit 141 keeps tracing along the pre-groove in the bordered area BRDA while tracking until it detects the border stopping marker STB in the border-out BRDO (ST3).

As shown in (d) in FIG. 26, behind the border stopping marker STB, the markers NBM each indicating the next border which is recorded in the specific pattern are already disposed in the N1st, N2nd and N3rd physical segment block. The information recording and reproducing unit 141 counts the number of physical segment blocks while continuing reproduction in the border-out BRDO (ST4), and seeks the position of the above described marker NBM indicating the next border (ST5).

As described above, as a specific example of the method of "[3] the overwriting situation is changed in accordance with the place in the same data segment ((L1) in FIG. 4),", a wide overwriting area is taken in at least the final physical sector in the same data segment. When the final physical sector in the data segment is detected (ST6), overwriting is performed from immediately behind the data ID and IED to the end of the final physical sector with the data ID and IED left (without overwriting in the data ID and IED) (ST9).

In the same data segment other than at least the final physical sector, overwriting is partially performed in a specific pattern in the sync data 432 (ST7) while avoiding the area of the sync code 431 (SY0 to SY3) shown in FIG. 40 or FIG. 63 which will be described later ((L2) in FIG. 4). The above described process is performed for each marker NBM indicating each border, and after overwriting processing for the marker NBM indicating the third border is finished (ST9), a new border-in BRDI is recorded, after which user data is recorded in the bordered area BRDA (ST10).

The logical record unit of the information recorded in the bordered area BRDA shown in (c) in FIG. 26 is called R zone (R Zone). Accordingly, one bordered area BRDA is constructed by at least one or more R zones. In the current DVD-ROM, the file system called "UDF bridge" in which both the file management information in conformity with the UDF (Universal Disc Format) and the file management information in conformity with ISO9660 are simultaneously recorded in one information storage medium is adopted for its file system. Here, in the fail management method in conformity with ISO9660, there is the rule that one file has to be recorded continuously without fail in the information storage medium (namely, it is prohibited to divide and dispose the information in one file at discrete positions on the information storage medium). Accordingly, when the information is recorded in conformity with the above described UDF bridge, for example, all information constituting one file is continuously recorded, and therefore, the area where this one file is continuously recorded can be adapted to constitute one R zone.

Figure 27:
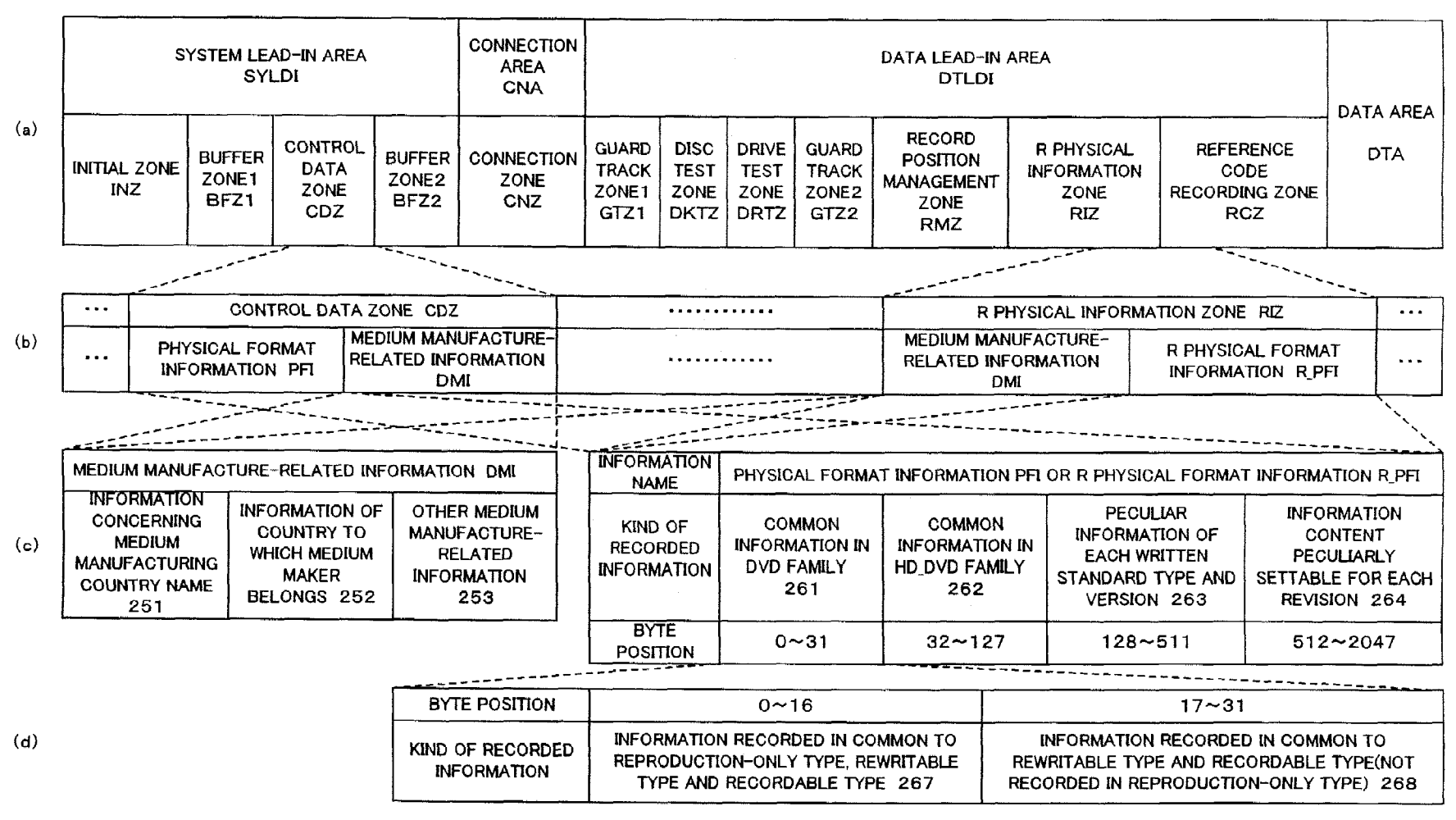

FIG. 27 shows the data structure in the control data zone CDZ and the R-physical information zone RIZ. As shown in (b) in FIG. 27, physical format information (Physical Format Information) PFI and medium manufacturing information (Disc Manufacturing Information) DMI exist in the control data zone CDZ. The R-physical information zone RIZ is constituted of the medium manufacturing information (Disc Manufacturing Information) DMI and R-physical format information (R-Physical Format Information) R_PFI.

Information 251 concerning the medium manufacturing country and medium manufacturer belonging country information 252 are recorded in the medium manufacturing information DMI (FIG. 2 [F]). When the information storage medium on sale makes infringement of the patent, infringement warning is issued to the country where the manufacturing place exists or the country where the information storage medium is consumed (used) in many cases. The manufacturing place (country name) is found out by making it mandatory to record the above described information in the information storage medium, and patent infringement warning is easily issued, whereby the intellectual property is protected and the advancement of technology is promoted. Further, the other medium manufacturing information 253 is also recorded in the disc manufacturing information DMI.

This embodiment is characterized in that the kind of information to be recorded is specified in accordance with the recording place (relative byte position from the head) in the physical format information PFI or the R physical format information R_PFI (FIG. 2 [G]). Namely, common information 261 in the DVD family is recorded in the area of 32 bytes which is from 0 byte to the 31st byte as the recording place in the physical format information PFI or the R physical format information R_PFI. 96 bytes from the 32nd byte to the 127th byte are for recording common information 262 in the HD_DVD family which is the target of this embodiment. 384 bytes from the 128th byte to the 511th byte is for recording respective individual information (peculiar information) 263 concerning each written standard type and a part version. 1536 bytes from the 512th byte to the 2047th byte is for recording information corresponding to each revision. By achieving commonality of the information position in the physical format information in accordance with the information content like this, the place of the recorded information is made common irrespective of the kinds of the media. Therefore, commonality and simplification of reproduction processing of the information reproducing apparatus or the information recording and reproducing apparatus are achieved. The common information 261 in the DVD family which is recorded in the place from 0 byte to the 31st byte is divided into information 267 which is recorded in the place from 0 byte to the 16th byte and recorded in common in the reproduction-only information storage medium, the rewritable information storage medium and the recordable information storage medium, and information 268 which is recorded in the place from the 17th byte to the 31st byte and recorded in common in the rewritable information storage medium and the recordable information storage medium, but not recorded in the reproduction-only type.

Concrete information contents in the physical format information PFI or the R-physical format information R_PFI shown in FIG. 27 and the comparison of information in the physical format information PFI in accordance with the kind of medium (whether the reproduction-only type, rewritable type or recordable type) are shown in FIG. 28. As the information 267 recorded in common to all the reproduction-only type, rewritable type and recordable type in the common information 261 in the DVD family, there are sequentially in the byte position 0 to 16, information of the type of the written standard (reproduction-only/rewritable/recordable) and version number information, medium size (diameter) and maximum possible data transfer rate information, medium structure (single layer or double-layer, presence or absence of embossed pit/recordable area/rewritable area), recording density (linear density and track density) information, position information of the data area DTA, and presence and absence information of the burst cutting area BCA (all present in this embodiment).

As the information 268 which is the common information 261 in the DVD family and is recorded in common in the rewritable type and the recordable type, there are cited sequentially from the 28th byte to the 31st byte, revision number information specifying the maximum recording speed, revision number information specifying the minimum recording speed, revision number table (application revision number), class state information, and extended (part) version information. Giving the information from the 28th byte to the 31st byte corresponds to the characteristic of this embodiment of giving the revision information corresponding to the recording speed to the recording area of the physical format information PFI or the R-physical format information R_PFI ((G1) in FIG. 2).

When the medium which is enhanced in recording speed into the medium to double-speed, quadruple-speed or the like is conventionally developed, extremely troublesome labor to newly recompose the written standard has to be done corresponding to it each time. On the other hand, in this embodiment, the written standard is divided into a written standard which changes in version when the content is changed to a large extent (version book) and a revision book which is issued by changing revision corresponding to a small change such as recording speed, and only the revision book which is updated in revision is issued each time the recording speed is enhanced. Thereby, extension function to future medium corresponding to the high-speed recording is ensured, and it is made possible to be adapted to the standard by the simple method of revision, thus providing the effect of being adaptable to high speed when a new high-speed recording-compliant medium is developed.

The characteristic of this embodiment lies in that the revision numbers are made separately settable at the maximum value and the minimum value of the recording speed especially by separately providing the column of the revision number information specifying the maximum recording speed at the 17th byte, and the column of the revision number information specifying the minimum recording speed at the 18th byte ((G1α) in FIG. 2). For example, when a recording film recordable at extremely high speed is developed, such a recording film is capable of recording at the extremely high speed, but when the recording speed is lowered, such a recording film cannot perform recording suddenly, or the recording film capable of lowering the recordable minimum speed is very expensive in many cases. On the other hand, the revision numbers are made separately settable at the maximum value and the minimum value of the recording speed as in this embodiment, whereby the selection range of the developable recording film is widened, and as the result, there arises the effect of making it possible to supply media capable of higher-speed recording and media at lower price.

The information recording and reproducing apparatus of the embodiment of the present invention previously has the information of the possible maximum recording speed and possible minimum recording speed in each revision. When an information storage medium is put on this information recording and reproducing apparatus, the information in the physical format information PFI or the R-physical format information R_PFI is read first in the information recording and reproducing unit 141 shown in FIG. 5. Subsequently, with reference to the information of the possible maximum recording speed and possible minimum recording speed of each revision previously recorded in the memory unit 175 in the control unit 143 based on the obtained revision number information, the possible maximum recording speed and the possible minimum recording speed of the information recording medium which is mounted thereon are determined. Further, recording is performed at the optimal recording speed based on the result.

Next, the meaning of the peculiar information 263 of the type and version of each written standard from the 128th byte to the 511th byte, and the meaning of the information content 264 peculiarly settable in each revision from the 512th byte to the 2047th byte, which are shown in (c) in FIG. 27 will be explained. Namely, in the peculiar information 263 of the type and version of each written standard from the 128th bite to the 511th byte, meaning of the record information content in each byte position is consistent irrespective of the rewritable information storage medium and the recordable information storage medium which differ in type. The information content 264 peculiarly settable for each revision from the 512th byte to the 2047th byte is allowed to differ in the meaning of the record information content at each byte position not only when the difference between the rewritable information storage medium and the recordable information storage medium which differ in types exists, but also when the revision differs in the same kind of media.

As shown in FIG. 28, as the information in the peculiar information 263 of the type and version of each written standard in which the meaning of the record information content is consistent at each byte position in the rewritable information storage medium and the recordable information storage medium which differ in types, medium manufacturer name information, added information from the medium manufacturer, record mark polarity (discrimination of whether H→L or L→H) information, linear speed information at the time of recording or at the time of reproduction, the rim intensity value of an optical system along the circumferential direction, the rim intensity value of the optical system along the radius direction, and recommended laser power (light amount value on recording surface) at the time of reproduction are cited, and these are sequentially recorded.

This embodiment is characterized especially in that the 192nd byte is allowed to have the record mark polarity (discrimination of whether H→L or L→H) information (Mark Polarity Descriptor). In the conventional rewritable or recordable DVD disc, only the recording film of "H→L" (High to Low) type in which the light reflection amount in the record mark becomes low (Low) with respect to the unrecorded state (reflection level is relatively high: High) is admitted. On the other hand, when the demands on "provision for high-speed recording" and "reduction in cost" or as physical performance, "decrease in cross erase", "increase in the upper limit value of the number of rewrites" and the like are made for the medium, there arises the problem of being incapable of coping with these demands with only the conventional H→L type recording films. On the other hand, in this embodiment, not only the use of the H→L type recording film but also the use of the "L→H" type recording film increasing in light reflection amount in the record mark is allowed, and therefore, not only the conventional H→L type but also the L→H type recording film is incorporated in the standard. As a result, the selection range of the recording film is widened, thereby providing the effect of being capable of recording at high speed and supplying the medium at low price.

A concrete method of carrying out the information recording and reproducing apparatus will be explained hereinafter. In the written standard (version book) or revision book, both the reproduction signal characteristics from the "H→L" type recording film and the reproduction signal characteristic from the "L→H" type recording film are written side by side, and two corresponding circuits are prepared in the PR equalizing circuit 130 and the viterbi decoder 156 in FIG. 5 corresponding to them. When the information storage medium is attached in the information reproducing unit 141, the slice level detecting circuit 132 for reading information in the system lead-in area SYLDI is started first. After the record mark polarity (discrimination of whether H→L or L→H) information recorded at the 192nd byte is read in this slice level detecting circuit 132, discrimination of whether "H→L" type of "L→H" type is performed, and after the circuits in the PR equalizing circuit 130 and the viterbi decoder 156 are switched corresponding to this, the information recorded in the data lead-in area DTLDI or the data area DTA is reproduced.

According to the above described method, the information in the data lead-in area DTLDI or the data area DTA can be read comparatively fast with high accuracy.

The revision number information specifying the maximum recording speed is described at the 17th byte and the revision number information specifying the minimum recording speed is described at the 18th byte, but the above described information is only the range information specifying the maximum and minimum. The optimal linear speed information is required at the time of record when recording is performed most stably, and the information of it is recorded at the 193rd byte.

Another large characteristic of this embodiment lies in that the information of the rim intensity value of the optical system along the circumferential direction at the 194th byte and the rim intensity value of the optical system along the radius direction at the 195th byte as the optical system condition information is disposed at the position prior to the various kinds of recording conditions (write strategy) information included in the information content 264 which can be peculiarly set in each revision. The information of them means the condition information of the optical system of the optical head which is used when the recording conditions disposed at the rear side are determined. The rim intensity means the distribution state of incident light incident on the objective lens before converging on the record surface of the information storage medium, and is defined by "the intensity value at the objective lens peripheral position (pupil surface outer peripheral position) when the center intensity of the incident light intensity distribution is set as "1".

The intensity distribution of the incident light on the objective lens is not symmetrical about a point, but elliptic distribution, and since the rim intensity values differ in the radius direction and the circumferential direction of the information storage medium, two kinds of values are recorded. As the rim intensity value is larger, the converging spot size on the recording surface of the information storage medium becomes smaller, and therefore, the optimal recording power condition changes greatly in accordance with the rim intensity values. Since the information recording and reproducing apparatus previously knows the rim intensity value information of the optical head it owns, it firstly reads the rim intensity values of the optical system along the circumferential direction and the radius direction recorded in the information storage medium, and compares them with the values of the optical head which it owns. If no significant difference is found in the comparison result, the recording conditions recorded at the rear side can be applied. However, if there is significant difference in the comparison result, it is necessary to ignore the recording conditions recorded at the rear side and start to determine the optimal recording conditions while the recording and reproducing apparatus itself is performing test writing by utilizing the drive test zone DRTZ described in FIG. 21 or FIG. 23.

It is necessary to determine quickly whether the recording conditions recorded at the rear side is utilized, or determination of the optimal recording conditions is started while the apparatus ignores the information and the apparatus itself is performing test writing in this manner. As shown in FIG. 28, at the precedent position to the position where the recommended recording conditions are recorded, the condition information of the optical system in which the conditions are determined is disposed. Therefore, there exists the effect that the rim intensity information can be read first, and applicability of the recording conditions disposed behind can be determined at high speed.

As described above, in this embodiment, the written standard (version book) which is changed inversion when the content is changed to a large extent, and the revision book which is issued by changing in revision corresponding to a small change such as recording speed are separately prepared, so that each time the recording speed is enhanced, only the revision book updated in only revision can be issued. Accordingly, when the revision number differs, the recording conditions in the revision book change, and therefore, the information concerning the recording conditions (write strategy) are mainly recorded in the information content 264 which can be set peculiarly for each revision from the 512th byte to the 2047th byte. As is obvious from FIG. 28, as the information content 264 which can be peculiarly set for each revision from the 512th byte to the 2047th byte, not only the difference between the rewritable information storage medium and the recordable information storage medium which differ in types is allowed, but also difference of the meaning of the recorded information content at each byte position in the case where the revision differs even in the same kind of media is allowed.

Definitions of peak power, bias power 1, bias power 2 and bias power 3 in FIG. 28 correspond to the power values defined in FIG. 24. The termination time of the first pulse in FIG. 28 means TEFP defined in FIG. 24. Multi-pulse interval means TMP defined in FIG. 24. The start time of the last pulse means TSLP defined in FIG. 24. The period of the bias power 2 of 2T mark means TLC defined in FIG. 24.

Comparison of the contents of the detailed information recorded in the position information of the data area DTA recorded at the part from the 4th byte to the 15th byte is shown in FIG. 29. The start position information of the data area DTA is recorded in common without discriminating the types of the media, the physical format information PFI and the R-physical format information R_PFI. As the information indicating the termination position, the termination position information of the data area DTA is recorded in the reproduction-only information storage medium.

In the rewritable information storage medium, as shown in FIG. 17, the place with the largest value of the physical sector number is in the groove area, but the termination position information of the data area DTA in the land area is recorded.

The final position information in the recordable range of the user data is recorded in the physical format information PFI of the recordable information storage medium, and this position information means the position just before the point ζ in the example shown in (e) in FIG. 23, for example.

On the other hand, the final position information of the recorded data in the corresponding bordered area BRDA is recorded in the R-physical format information R_PFI of the recordable information storage medium.

The final address information in the "layer 0" which is the layer in front seen from the reproduction side optical system is also recorded in the reproduction-only information storage medium. The information of the difference value of the start position information between the land area and the groove area is recorded in the rewritable information storage medium.

As shown in (c) in FIG. 21, the recording management zone RMZ exists in the data lead-in area DTLDI. As shown in (d) in FIG. 26, the copy information exists in the border-out BRDO as the copy information C_RMZ of the record content into the recording position management zone. In this recording management zone RMZ, recording position management data (Recording Management Data) RMD having the same data size as one physical segment block size is recorded as shown in (b) in FIG. 22. Each time the content of the recording management data RMD is updated, the recording management data RMD can be sequentially recorded to the rear as the new updated recording management data RMD. The detailed data structure in the one recording management data RMD is shown in FIGS. 30 to 32. The inside of the recording management data RMD is further divided into small RMD field information RMDF each in the size of 2048 bytes.

The initial 2048 bytes in the recording management data RMD is a reserve area.

In the RMD field 0 of the next 2048-byte size, the recording management data format code information, the medium state information indicating whether the target medium is (1) in the unrecorded state, (2) halfway through recording before finalizing, or (3) after finalizing, the unique disc ID (disc identification information), the position information of the data area DTA and the position information of the newest (updated) data area DTA, and the position information of the recording management data RMD are sequentially disposed.

In the position information of the data area DTA, the start position information of the data area DTA and the final position information of the recordable range 204 of the user data at the initial time (in the example (d) in FIG. 23, this information indicates the position just before the point β) are recorded as the information indicating the recordable range 204 ((d) in FIG. 23) of the user data at the initial state.

This embodiment has the characteristic in that the extended drive test zone EDRTZ and the extended spare area ESPA are additionally settable in the recordable range 204 of the user data as shown in (e) and (f) in FIG. 23 ((C1) and (E2) in FIG. 1). If the extension is made in this way, the recordable range 205 of the user data becomes small. Another characteristic of this embodiment lies in that the related information is recorded in "position information of the newest (updated) data area DTA" so that user data is not recorded in the extended zones EDRTZ and ESPA by mistake.

Namely, it can be known whether the extended drive test zone EDRTZ is additionally provided or not by the presence and absence discrimination information of the extended drive test zone EDRTZ, and it can be known whether the extended spare area ESPA is additionally provided or not by the presence or absence discrimination information of the extended spare area (ESPA).

Further, as the recordable range information (FIG. 1 [E]) concerning the recordable range 205 of the user data managed in the recording management data RMD, there is the final position of the recordable range 205 of the newest user data recorded in the position information of the newest (updated) data area DTA in the RMD field 0 as shown in FIG. 30. By this, the recordable range 205 of the user data shown in (f) in FIG. 23 is instantly found, and high-speed detection of the size (unrecorded amount) of the unrecorded area which is recordable hereafter is made possible.

This brings about the effect that by setting the optimal transfer rate at the time of recording corresponding to the programmed recording time designated by the user, for example, recording into the medium can be carried out without fail with the highest realizable image quality at the programmed recording time designate by the user.

Taking the example of (d) in FIG. 23 as an example, the above described "final position of the recordable range 205 of the newest user data" means the position just before the point ζ. The position information can be described in the ECC block address number as another example ((E1) in FIG. 1) instead of being described in the physical sector number.

As will be described later, one ECC block is constituted of 32 sectors in this embodiment. Accordingly, low-order 5 bits of the physical sector number of the sector disposed at the head in the specific ECC block corresponds to the sector number of the sector disposed at the head position in the adjacent ECC block.

When the physical sector number is set so that the low-order 5 bits of the physical sector number of the sector disposed at the head in the ECC block becomes "00000", the values of the higher bits than the low-order sixth bit of the physical sector numbers of all the sectors existing in the same ECC block correspond to each other. Therefore, the low-order 5-bit data of the physical sector numbers of the sectors existing in the above described same ECC block are removed, and the address information extracting only the data of the higher bits than the low-order sixth bit is defined as the ECC block address information (or the ECC block address number).

As will be described later, the data segment address information (or physical segment block number information) recorded in advance by wobble modulation corresponds to the above described ECC block address, and therefore, when the position information in the recording position management data RMD is described in the ECC block address number, the effects such as the following 1) and 2) are provided.

1) Access to an unrecorded area is especially performed at high speed. Since the position information unit in the recording management data RMD and the information unit of the data segment address recorded in advance by wobble modulation correspond to each other, calculation processing of the difference is made easy.

2) The management data size in the recording position management data RMD can be made small. The required number of bits for address information description can be saved by five bits per one address.

As will be described later, one physical segment block length corresponds to one data segment length, and the user data of one ECC block is recorded in one data segment. Accordingly, when the expressions such as "ECC block address number", "ECC block address", "data segment address", "data segment number", and "physical segment block number" are used, all of these expressions have the meanings of synonyms.

As shown in FIG. 30, set size information of the recording management zone RMZ in which the recording management data RMD can be sequentially recorded therein is recorded in ECC block unit or physical segment block unit in the position information of the recording management data RMD present in the RMD field 0.

As shown in (b) in FIG. 22, one recording management data RMD is recorded in each physical segment block. With this information, it can be found how many times the updated recording management data RMD can be recorded in the recording management zone RMZ.

Next to it, the current recording management data number in the recording management zone RMZ is recorded. This means numeral information of the recording management data RMD already recorded in the recording management zone RMZ. For example, as the example shown in (b) in FIG. 22, assume this information is the information in the recording management data RMD#2, this information is the second recorded recording management data RMD in the recording management zone RMZ, and therefore, the value "2" is recorded in this column.

Next to this, the remaining amount information in the recording management zone RMZ is recorded. This information means the information of the number of further recordable recording management data RMD in the recording management zone RMZ, and is described in physical segment block unit (=ECC block unit=data segment unit).

The following relationship is established among the above described three kinds of information.

[Set size information of RMZ]=[current recording management data number]+[Remaining amount in RMZ]

The characteristic of this embodiment lies in that the used amount by the recording management data RMD or the remaining amount information in the recording management zone RMZ is recorded in the recording area of the recording position management data RMD ((E7) in FIG. 1).

For example, when all information is recorded in one recordable information storage medium at one time, it is suitable to record the recording management data RMD only once. However, when it is desired to repeatedly record recording of user data (recording of the user data into the recordable range 205 of the user data in (f) in FIG. 23) in detail into one recordable information storage medium, it is necessary to record updated recording management data RMD for each record. In this case, if the recording management data RMD is recorded frequently, the unrecorded area 206 shown in (b) in FIG. 22 is used up, and it is necessary for the information recording and reproducing apparatus to take appropriate measures. Therefore, by recording the already used amount by the recording management data RMD or the remaining amount information in the recording management zone RMZ in the recording area of the recording management data RMD, the unrecordable state in the recording management zone RMZ can be known in advance, and it is possible for the information recording and reproducing apparatus to take measures early.

This embodiment has the characteristic in that the data lead-out area DTLDO can be set in such a form as includes the extended drive test zone EDRTZ inside as shown in the shift from (e) to (f) in FIG. 23 ((E4) in FIG. 1). At this time, the start position of the data lead-out area DTLDO changes from the point β to the point ε in (e) of FIG. 22. In order to manage this situation, the column for recording the start position information of the data lead-out area DTLDO is provided in the position information of the newest (updated) data area DTA of the RMD field 0 in FIG. 30. As described above, the drive test (test writing) is basically recorded in cluster unit capable to extend in data segment (ECC block) unit. Accordingly, the start position information of the data lead-out area DTLDO is described in the ECC block address number. However, as another example, it is possible to describe the start position information in the physical sector number or physical segment block number of the physical sector initially disposed in the initial ECC block, data segment address, or ECC block address.

The history information of the information recording and reproducing apparatus which performed recording of the corresponding medium is recorded in the RMD field 1. For each information recording and reproducing apparatus, the manufacturer identification information, serial number and model number described in ASCII code, date time information of recording power adjustment using the drive test zone, and recording condition information at the time of additional recording are described in accordance with the format of all recording condition information in the information 264 (FIG. 28) individually settable for each revision.

The RMD field 2 is an area used by a user, in which the user can record information or the like of the recorded (desired) content, for example.

The start position information of each border zone BRDZ is recorded in the RMD field 3. Namely, as shown in FIG. 30, the start position information of the first to fiftieth border-out BRDO is described in the physical sector numbers. For example, in the example shown in (c) in FIG. 26, the start position of the first border-out BRDO expresses the position of the point η, an the start position of the second border-out BRDO indicates the position of the point θ.

The position information of the extended drive test zone is recorded in the RMD field 4. The final position information of the place which is already used for test writing in the drive test zone DRTZ in the data lead-in area DTLDI described in (c) in FIG. 21 is firstly recorded, and the final position information of the place which is already used for test writing in the drive test zone DRTZ in the data lead-out area DTLDO described in (d) to (f) in FIG. 23 is recorded.

The drive test zone DRTZ is used for test writing sequentially from the inner circumferential side (smaller physical sector number) to the outer circumferential direction (the direction in which the physical sector number becomes larger). The place unit used for test writing is the ECC block unit since test writing is performed in cluster unit which is the recording unit as will be described later. Accordingly, as the final position information of the place already used for test writing, the ECC block address number is written, or the physical sector number of the physical sector disposed at the end of the ECC block used for test writing is written when it is written in the physical sector number. The place used for test writing once is already recorded, and therefore, when the next test writing is to be performed, the test writing is performed at the next position to the last position already used for test writing. Therefore, by utilizing the last position information (=already used amount in the drive test zone DRTZ) of the place already used for test writing in the above described drive test zone DRTZ ((E5) in FIG. 1), the information recording and reproducing apparatus not only can find out where to start test writing next instantly, but also can determine whether a vacant space capable of next test writing is present or not in the drive test zone DRTZ from the information.

Size information of the area capable of additional test writing in the drive test zone DRTZ in the data lead-in area DTLDI or flag information indicating whether the drive test zone DRTZ is used up or not, and size information of the area capable of additional test writing in the drive test zone DRTZ in the data lead-out area DTLDO or flag information indicating whether the drive test zone DRTZ is used up or not are recorded. The size of the drive test zone DRTZ in the data lead-in area DTLDI and the size of the drive test zone DRTZ in the data lead-out area DTLDO are already known. Therefore, it is possible to determine the size (remaining amount) of the area in which additional test writing can be performed in the drive test zone DRTZ with only the final position information of the place already used for test writing in the drive test zone DRTZ in the data lead-in area DTLDI or the drive test zone DRTZ in the data lead-out area DTLDO. However, by providing this information in the recording management data RMD ((E5) in FIG. 1), the remaining amount in the drive test zone DRTZ is immediately known, and time before the determination of presence or absence of setting of new extended drive test zone EDRTZ can be shortened. As another example, the flag information of whether this drive test zone DRTZ is used up or not can be recorded in this column instead of the size (remaining amount) information of the area where additional test writing can be performed in the drive test zone DRTZ. If the flag by which the fact that drive test zone DRTZ is already used up is found out instantly is set, the risk of performing test writing in this area by mistake can be eliminated.

In the RMD field 4, the information of the number of additional setting of the extended drive test zone EDRTZ is recorded next. In the example shown in (e) in FIG. 23, the extended drive test zones EDRTZ are set at two spots which are the extended drive test zone 1 EDRTZ1 and the extended drive test zone 2 EDRTZ2, and therefore, "the number of additional settings of the extended drive test zone EDRTZ=2". The range information of each of the extended drive test zones EDRTZ and the information of the range already used for test writing are further recorded in the field 4. By making it possible to manage the position information of the extended drive test zone in the recording position management data RMD in this manner ((E6) in FIG. 1), it is made possible to set extension of the extended drive test zone EDRTZ a plurality of times, and the position information of the extended drive test zone EDRTZ which is consecutively extended in the form of updating and recording of the recording management data RMD in the recordable information storage medium can be accurately managed. As a result, the risk of overwriting the user data on the extended drive test zone EDRTZ as a result of determining it as the recordable range 204 of the user data ((d) in FIG. 22) by mistake can be eliminated.

As described above, the test writing unit is recorded in the cluster unit (ECC block unit), and therefore, the range of each of the extended drive test zones EDRTZ is designated in the ECC block address unit. In the example shown in (e) in FIG. 23, the start position information of the extended drive test zone EDRTZ which is initially set is shown by the point γ since the extended drive test zone 1 EDRTZ1 is initially set, and the end position information of the extended drive test zone EDRTZ which is initially set corresponds to the position just before the point β. The unit of the position information is also described in the ECC block address number or the physical sector number.

In the example in FIG. 30, the termination position information of the extended drive test zone EDRTZ is shown, but without being limited to this, the size information of the extended drive test zone EDRTZ may be described instead. In this case, the size of the extended drive test zone 1 (EDRTZ1) initially set is "β-γ". The final position information of the place which is already used for test writing in the extended drive test zone EDRTZ which is initially set is also described in the ECC block address number or the physical sector number.

Next, size (remaining amount) information of the area in which additional test writing can be further performed in the extended drive test zone EDRTZ which is initially set is recorded. The size of the extended drive test zone 1 (EDRTZ1) and the size of the area which is already used therein are known from the above described information, and therefore, the size (remaining amount) of the area in which additional test writing can be performed is automatically obtained. However, by providing this field ((E5) in FIG. 1), it can be immediately known whether the current drive test zone is sufficient or not when new drive test (test writing) is performed, and thus, the judging time until the additional setting of the extended drive test zone EDRTZ is determined can be shortened. The size (remaining amount) information of the area in which additional test writing can be further performed can be recorded in this field, and as another example, it is possible to set the flag information indicating whether the extended drive test zone EDRTZ is used up or not in this field. If the flag from which the fact that the extended drive test zone EDRTZ is already used up is known instantly is set, the risk of performing test writing in this area by mistake can be eliminated.

Figure 33:
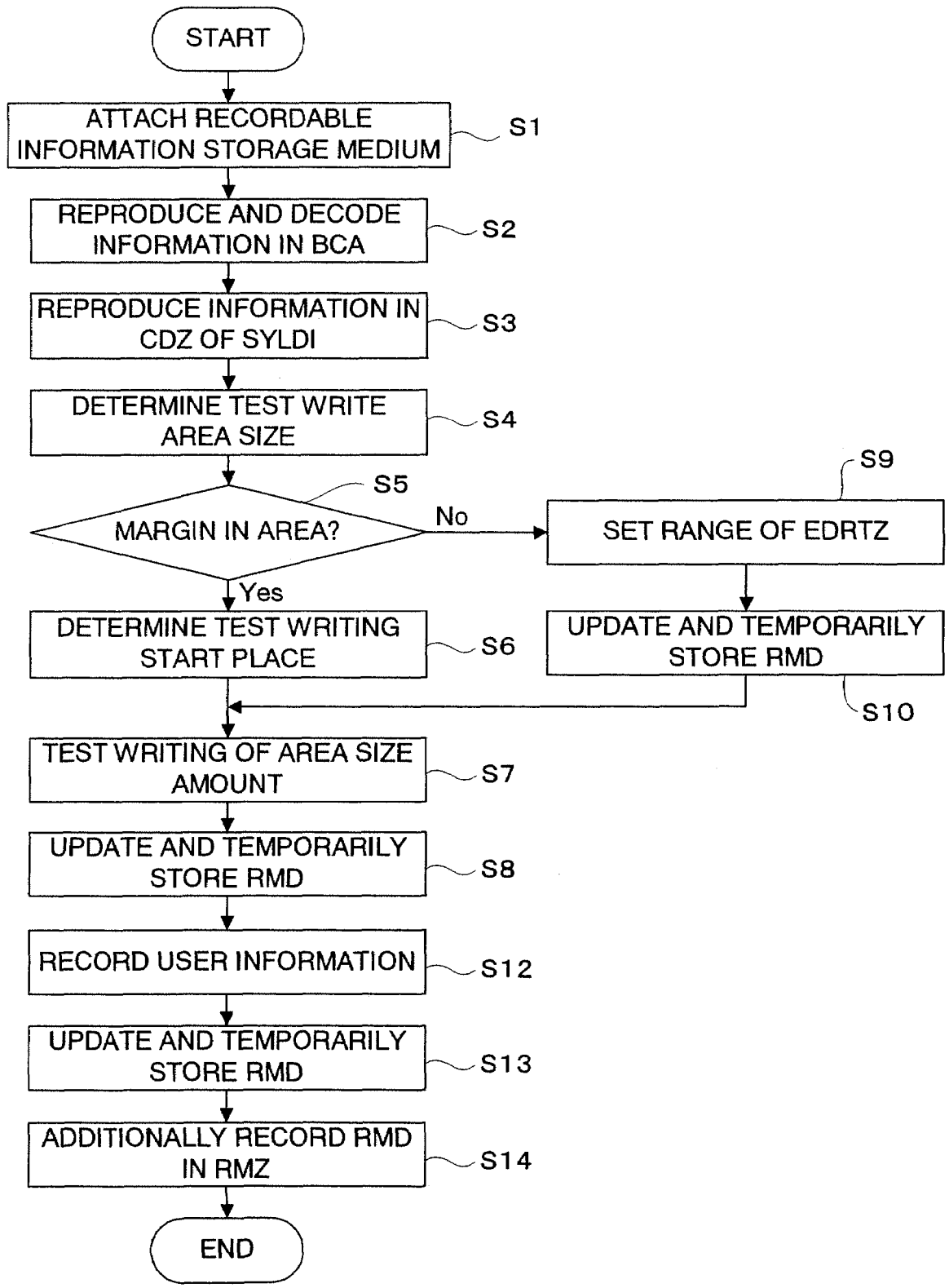
FIG. 33 is an explanatory view of process steps of setting a test write area and test write.

One example of the processing method for setting a new extended drive test zone EDRTZ by the information recording and reproducing apparatus shown in FIG. 5 and performing test writing there will be explained. This processing content is shown in FIG. 33.

(1) Attach a recordable information storage medium onto the information recording and reproducing apparatus.

→(2) Reproduce the data formed in the burst cutting area BCA in the information recording and reproducing unit 141, and transfer it to the control unit 143→Decode the transferred information in the control unit 143, and determine whether to proceed to the next step.

→(3) Reproduce the information recorded in the control data zone CDZ in the system lead-in area SYLDI in the information recording and reproducing unit 141, and transfer it to the control unit 143.

→(4) Compare the values (the 194th byte and the 195th byte in FIG. 28) of the rim intensity when the recommended recording condition is determined in the control unit 143 and the values of the rim intensity of the optical head used in the information recording and reproducing unit 141, and determine the necessary area size for test writing.

→(5) Reproduce the information in the recording management data by the information recording and reproducing unit 141 and transfer it to the control unit 143. Decode the information in the RMD field 4 in the control unit, then determine the presence or absence of sufficient area size necessary for test writing determined in (4), proceed to (6) in the case having sufficient area size, and proceed to (9) in the case without sufficient area size. →(6) Determine the place at which the test writing starts this time from the final position information of the place which is already used for test writing in the drive test zone DRTZ to be used for test writing or the extended drive test zone EDRTZ from the RMD field 4. →(7) Execute test writing by the size determined in (4) from the place determined in (6). →(8) Temporarily store the recording management data RMD in which the final position information of the place already used for test writing is rewritten in the memory unit 175 because the place which is used for test writing increases due to the processing in (7), and proceed to (12).

*(9) Read the information of "the final position of the recordable range 205 of the newest user data" recorded in the RMD field 0 or "the final position information of the recordable range of the user data" recorded in the position information in the data area DTA in the physical format PFI shown in FIG. 29 by the information recording and reproducing unit 141, and set the range of the extended drive test zone EDRTZ, which is to be newly set, in the control unit 143. →(10) Update the information of "the final position of the recordable range 205 of the newest user data" recorded in the RMD field 0, based on the result of (9), and increment the information of the number of additional settings of the extended drive test zone EDRTZ in the RMD field 4 by one (adding the number and 1) to perform new setting. Store the recording position management data RMD, to which the start/end position information of the extended drive test zone EDRTZ is added, temporarily in the memory unit 175. →(11) proceed to (7) to (12).

*(12) Record necessary user information in the recordable range 205 of the user data under the optimal recording conditions obtained as a result of the test writing performed in (7). →(13) Record the start/end position information (FIG. 31) in the R zone newly generated corresponding to (12), and store the updated recording management data RMD temporarily in the memory unit 175. →(14) The control unit 143 controls and the information recording and reproducing unit 141 additionally records the newest recording position management data RMD temporarily stored in the memory unit 175 in the unrecorded area 206 (for example, (b) in FIG. 22) in the recording position management zone RMZ.

As shown in FIG. 31, the position information of the extended spare area ESPA is recorded in the RMD field 5. The characteristic of this embodiment lies in that the recordable information storage medium, the spare area is extendable and the position information of the spare area is managed in the position management data RMD ((C1) in FIG. 1).

In the example shown in (e) in FIG. 23, the extended spare areas ESPA are set at two spots of the extended spare area 1 (ESPA1) and the extended spare area 2 (ESPA2), and therefore, the number of additional settings of the extended spare area ESPA described at the head in the RMD field 5 is "2". The start position information of the extended spare area ESPA which is initially set corresponds to the position of the point δ, the end position information of the extended spare area ESPA which is firstly set corresponds to the position just before the point γ, the start position information of the extended spare area ESPA which is secondarily set corresponds to the position of the point ζ, and the end position information of the extended spare area ESPA which is secondarily set corresponds to the position just before the point ε.

The information concerning the defect management is recorded in the RMD field 5 in FIG. 31. The characteristic of this embodiment lies in that the information of the already used amount or the remaining amount of the spare area SPA (or the extended spare area ESPA) is recorded in the RMD ((C2) in FIG. 1). More specifically, number information or the physical segment block number information of the ECC blocks which are already used for replacement in the spare area adjacent to the data lead-in area DTLDI is recorded in the first column in the RMD field 5 in FIG. 31. In this embodiment, replacement processing is performed in the ECC block unit for the defective area found in the recordable range 204 of the user data.

As will be described later, one data segment constituting one ECC block is recorded in one physical segment block area. Therefore, the number of replacements already performed equals the number of ECC blocks already used for replacement (or the number of physical segments, the number of data segments). Accordingly, the unit of the information described in this column is the ECC block unit, the physical segment block unit or the data segment unit.

In the recordable information storage medium, in the spare area SPA or the extended spare area ESPA, the place to be used for replacement processing is used from the inner circumferential side with smaller ECC block address number in many cases. Accordingly, as the information of this column, it is possible to describe the ECC block address number as the final position information of the used place for replacement in another example.

As shown in FIG. 31, the sections for recording the similar kinds of information ("the information of the number of ECC blocks or the number of physical segment blocks already used for replacement, or the final position information of the place used for replacement (ECC block address number) in the extended spare area ESPA firstly set" and "the information of the number of ECC blocks or the information of the number of physical segment blocks already used for replacement, or the final position information of the place used for replacement (ECC block address number) in the extended spare area ESPA secondarily set" exist for the extended spare area 1 (ESPA1) which is firstly set and the extended spare area 2 (ESPA2) which is secondarily set.

The following 1) and 2) can be carried out by utilizing these kinds of information.

1) When the next replacement processing is to be performed, a spare place to be newly set for the defective area which is found out in the recordable range 205 of the user data can be found out instantly. New replacement is performed just after the final position of the place already used for replacement.

2) The remaining amount in the spare area SPA or the extended spare area ESPA is obtained by calculation, and (when the residual amount is insufficient), presence or absence of necessity of setting a new extended spare area ESPA can be known.

The size of the spare area SPA adjacent to the data lead-in area DTLDI is known in advance, and therefore, if the information concerning the number of ECC blocks already used for replacement in the spare area SPA is available, the remaining amount in the spare area SPA can be calculated. However, the remaining amount is found out instantly by providing the recording frame of the information of the number of ECC blocks or the information of the number of physical segment blocks of the unused place usable for replacement in future which is the remaining amount information in the spare area SPA, and the time required for determination of presence or absence of the necessity of setting of the additional extended spare area ESPA can be shortened. From the same reason, the frames in which "the information of the remaining amount in the extended spare area ESPA firstly set" and "the information of the remaining amount in the extended spare area ESPA secondarily set" are provided ((C2) in FIG. 1).

In this embodiment, the spare area SPA is made extendable in the recordable information storage medium, and its position information is managed in the recording management data RMD ((C1) in FIG. 1). As shown in (e) in FIG. 22, the extended spare areas land 2 (ESPA1, ESPA2) and the like can be extended and set at optional start positions in optional sizes in accordance with necessity. Accordingly, the information of the number of additional settings of the extended spare area ESPA is recorded in the RMD field 5, and the start position information of the extended spare area ESPA initially set and the start position information of the extended spare area ESPA secondarily set are settable. These pieces of start position information are described in the physical sector numbers or ECC block address numbers (or physical segment block numbers, data segment addresses). In the example in FIG. 30, as the information specifying the range of the extended spare area ESPA, "the end position information of the extended spare area ESPA firstly set" and "the end position information of the extended spare area ESPA secondarily set" are recorded. However, as another example, it is possible to record the size information of the extended spare area ESPA instead of the end position information by the ECC block number or the physical segment block number, the data segment number, the ECC block number or the physical sector number.

The defect management information is recorded in the RMD field 6. In this embodiment, the following two kinds of methods of [1] and [2] can be provided as the method for enhancing reliability of information concerning defect processing which is recorded in the information storage medium.

[1] Conventional "replacement mode" for recording information planned to be recorded in the defective place into a spare place.

[2] "Multiplexing mode" for enhancing reliability by recording the information of the same content twice in different places on the information storage medium.

The information concerning by which mode the processing is performed is recorded in "class information of defect management processing" in the secondary defect list entry information in the recording management data RMD as shown in FIG. 32 ((C3) in FIG. 1).

The following is provided for the content in the secondary defect list entry information.

[1] In the Case of Replacement Mode

Class information of the defect management processing is set at "01" (same as in the conventional DVD-RAM).

"Position information of the original ECC block" means the position information of the ECC block which is found as a defective place in the recordable range 205 of the user data, and the information which is originally to be recorded in this place is not recorded, but recorded in the spare area or the like.

"Position information of the replacement destination ECC block" means the position information of the replacement place set in the spare area SPA or the extended spare area 1 (ESPA1) and the extended spare area 2 (ESPA2) in (e) in FIG. 23, and the information, which is to be recorded in the defective place which is found out in the recordable range 205 of the user data, is recorded here.

[2] In the Case of Multiplexing Mode ((C3) in FIG. 1)

Class information of the defect management processing is set at "10".

"Position information of the original ECC block" means the position information of the non-defective place, in which the information to be recorded is recorded and the information recorded herein can be accurately reproduced.

"Position information of replacement destination ECC block" means the position information of the place in which quite the same content as the information recorded in the above described "position information of the original ECC block" is recorded for multiplexing set in the spare area SPA or the extended spare area 1 (ESPA1) and the extended spare area 2 (ESPA2) in (e) in FIG. 23.

When recorded in the above described "[1] replacement mode", it is confirmed that the information recorded in the information storage medium can be accurately read at the stage directly after recording. However, there is the risk of being unable to reproduce the above described record as a result of a flaw and dust attaching to the information storage medium due to failure of the user thereafter.

On the other hand, when recorded in the above described "[2] multiplexing mode", even if the information cannot be partially read due to attachment of a flaw and dust to the information storage medium due to failure of the user, the same information is backed up in the other part, and therefore, reliability of information reproduction is enhanced dramatically. If replacement processing of "[1] Replacement mode" is performed for the information which is not read at this time by utilizing the above described backed up information, reliability is further enhanced.

Accordingly, by the processing of the above described "[2] Multiplexing mode", or the combination of the processing of "[1] Replacement mode" and the processing of "[2] Multiplexing mode", there is provided an effect of being capable of securing high information reproduction reliability after recording with a countermeasure against a flaw and dust taken into consideration.

As the method of describing the position information of the above described ECC block, there exists the method of describing the ECC block address, physical segment block address or data segment address other than the method of describing the physical sector number of the physical sector present at the head position constituting the above described ECC block. As will be described later, the area on the data which data of one ECC block size enters is called a data segment in this embodiment. As a physical unit of the place in which data is recorded on the information storage medium, the physical segment block is defined, and one physical segment block size corresponds to the size of the area in which one data segment is recorded.

This embodiment also has a configuration in which the defect position information which is detected in advance before replacement processing. This makes it possible for the manufacturer of the information storing media to inspect the defect state in the recordable range 204 of the user data just before shipment and record the defective place which is found out in advance (before replacement processing), and also makes it possible for the information recording and reproducing apparatus on the user side to inspect the defect state in the recordable range 204 of the user data when performing initializing processing and record the defective place which is found out in advance (before replacement processing).

The information indicating the defect position detected in advance before replacement processing as described above is "the presence and absence information of replacement processing of a defective block to a spare block" (SLR: Status of Linear Replacement) in the secondary defect list entry information shown in FIG. 32.

When the presence and absence information SLR of replacement processing of a defective block to a spare block is "0".

Replacement processing is performed for the defective ECC block designated in "the original ECC block position information", and reproducible information is recorded in the place designated in "the replacement destination ECC block position information".

When the presence and absence information SLR of replacement processing of a defective block to a spare block is "1".

The defective ECC block designated in "the original ECC block position information" means the defective block detected in advance at the stage before replacement processing, and the column of "the replacement destination ECC block position information" is blank (no information is recorded).

If the defective place is known in advance, there is provided the effect of being capable of performing optimal replacement processing at high speed (and in real time) at the stage of the information recording and reproducing apparatus recording the user data in the recordable information storage medium. Especially when image information and the like are recorded in the information storage medium, it is necessary to ensure continuity at the time of recording, and high-speed replacement processing based on the above described information becomes important.

The characteristic of this embodiment lies in that the management information area (RMD field 6) of the defect management is extendable ([C] in FIG. 1). When a defect exists in the recordable range 205 of the user data, replacement processing is performed at a predetermined place in the spare area SPA or the extended spare area ESPA, and one piece of secondary defect list entry (Secondary Defect List Entry) information is added to each one replacement processing, then the combination information of the position information of the defective ECC block and the position information of the ECC block utilized for replacement is recorded in the RMD field 6. When a new defective place is found when recording of new user data is repeated in the recordable range 205 of the user data, replacement processing is performed, and the number of pieces of secondary defect list entry information increases. By recording the recording management data RMD with increased number of pieces of secondary defect list entry information into the unrecorded area 206 in the recording position management zone RMZ as shown in (b) in FIG. 22, extension of the management information area of defect management (RMD field 6) (FIG. 1 [C]) is handled.

By carrying out this embodiment, reliability of the defect management information itself can be enhanced from the following reasons.

1) The recording position management data RMD can be recorded by avoiding a defective place in the recording management zone RMZ.

A defective place sometimes occurs in the recording position management zone RMZ shown in (b) in FIG. 22. The unrecordable state due to defect can be detected by verifying the content of the recording management data RMD newly recorded in the recording management zone RMZ just after recording. When the unrecordable state is detected, the recording management data RMD is written again next to it, and thereby, the recording management data RMD can be recorded in such a manner as ensures high reliability.

2) If reproduction of the past recording management data RMD becomes impossible due to a flaw or the like attached to the surface of the information storage medium, a certain degree of backup becomes possible.

For example, in (b) in FIG. 22, the state in which a flaw is made on the surface of the information storage medium due to a user's mistake or the like after recording the recording management data RMD #2, and reproduction of the recording management data RMD #2 becomes impossible is assumed as an example. In this case, the past defect management information (information in the RMD field 6) can be restored to some degree by reproducing the information of the recording management data RMD #1 instead.

The size information of the RMD field 6 is recorded at the first place of the RMD field 6, and the management information area (RMD field 6) of defect management is made extendable (FIG. 1 [C]) by making this field size variable. It is already described that each RMD field is set at 2048 size (one physical sector size amount), but when the information storage medium has many defects and the number of times of replacement processing increases, the size of the secondary defect list information increases, and cannot be housed in 2048 byte-size (one physical sector size amount). Considering this situation, the RMD field 6 is in the form to be capable of being a plurality of times of 2048 size (recordable across a plurality of sectors). Namely, when "the size of the RMD field 6" exceeds 2048 bytes, the area of the size of a plurality of physical sectors is allocated to the RMD filed 6.

In the secondary defect list information SDL, "the secondary defect list discrimination information" indicating the start position of the secondary defect list information SDL, and "update counter of the secondary defect list (update times information)" indicating how many times this secondary defect list information SDL is rewritten are recorded other than the secondary defect list entry information explained above. The data size of the entire secondary defect list information SDL is known from "information of the number of secondary defect list entries".

It is already described that user data is logically recorded by R zone (R Zone) unit in the recordable range 205 of the user data. Namely, a part of the recordable range 205 of the user data reserved for recording the user data is called an R Zone. The R Zone is divided into two kinds of R zones in accordance with the recording condition. The type in which the additional user data can be further recorded is called "open type R zone (Open R Zone)", and the type in which the user data cannot be added further is called "complete type R zone (Complete R Zone)".

In the writable range 205 of the user data, three or more of "open R zones" cannot be included (namely, "open R zones" can be set at only two spots in the recordable range 205 of the user data). The place in which either of the above described two kinds of R zones is not set in the recordable range 205 of the user data, namely, the place which is reserved to record user data (as either of the above described two kinds of R zones) is called "R zone in undesignated state (Invisible R Zone)".

When user data is recorded in all the recordable range 205 of the user data, and cannot be added, this "Invisible R Zone" does not exist. The position information up to the 254th R zone is recorded in the RMD field 7. "Information of the number of entire R zones" recorded in the first place in the RMD field 7 is the total number of the number of "R zone in undesignated state (Invisible R Zone)", the number of "Open R Zones" and the number of "Complete R Zones" set logically in user data recordable range. Next, the number information of the first "Open R Zone", and the number information of the second "Open R Zone" are recorded. However, as described above, three or more of "Open R Zones" cannot be included in the recordable range 205 of the user data, and therefore, "1" or "0" (when the first or the second Open R zone does not exist) is recorded here. Next, the start position information and the end position information of the first "Complete R Zone" are described in physical sector number. Subsequently, the start position information and the end position information from the second to the 254th are sequentially recorded in physical sector number.

Form the RMD field 8 on, the start position information and the end position information from the 255th are sequentially described in physical sector number, and it is possible to write the information up to the RMD field 15 (up to 2047 Complete R Zones at the maximum) at the maximum in accordance with the number of "Complete R Zones".

Figure 34A:
FIGS. 34A to 34C are conversion steps explanatory diagrams until forming a physical sector structure.
Figure 34B:
Figure 34C:
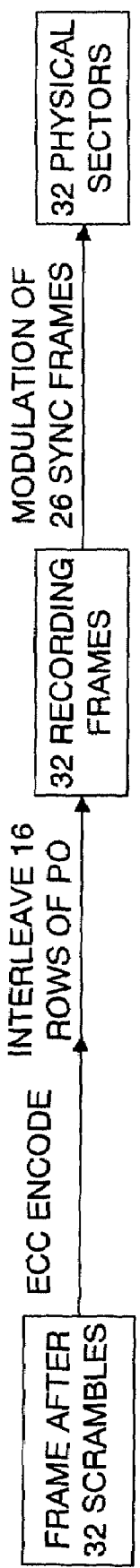

An outline of conversion procedure of constructing the ECC block from the data frame structure in which the user data of 2048 bytes unit is recorded, adding a synchronous code, and thereafter, forming a physical sector structure for recording in the information storage medium will be shown in FIGS. 34A to 34C. This conversion procedure is adopted in common in all of the reproduction-only information storage medium, the recordable information storage medium and the rewritable information storage medium. In accordance with the respective conversion stages, they are called a data frame (Data Frame), a frame after scramble (scrambled frame), recording frame (Recording Frame), or recorded data field (Recorded Data Field). The data frame is where the user data is recorded, and is constituted of main data of 2048 bytes, data ID of 4 bytes, ID error detection code (IED) of 2 bytes, reserved bytes (Reserved Bytes) RSV of 6 bytes, and error detection code (EDC) of 4 bytes.

Initially, after IED (ID error detection code) is added to the data ID which will be described later, reserved bytes of 6 bytes and main data of 2048 bytes are added, and after the error detection code (EDC) is further added, scramble for the main data is executed.

Here, Cross Reed-Solomon Error Correction Code is applied to 32 of data frames which are scrambled (scrambled frames), and ECC encode processing is executed. Thereby, the recording frame is constructed. This recording frame includes an outer parity code (Parity of Outer-code) PO, and an inner parity code (Parity of Inner-code) PI. PO and PI are error correction codes made for each ECC block constituted of 32 scrambled frames.

The recording frame is subjected to ETM (Eight to Twelve Modulation) for converting 8 data bits into 12 channel bits as described above. The synchronous code (Sync Code) SYNC is added to the head every 91 bytes, and 32 physical sectors are formed. As described in the right frame in FIG. 34C, the characteristic of this embodiment lies in that one error correction unit (ECC block) is constituted of 32 sectors ((H2) in FIG. 2).

As will be described later, the numbers from "0" to "31" in the respective frames in FIG. 38 or FIG. 39 indicate the numbers of the respective physical sectors, and one large ECC block is constituted by 32 physical sectors from "0" to "31" in total.

In the next generation DVD, it is demanded that accurate information can be reproduced in error correction processing when a flaw of about the same length as the current generation DVD is made on the information storage medium surface. In the embodiment of the present invention, recording density is enhanced with the aim of increase in capacity. As a result, in the case of the conventional one ECC block=16 sectors, the length of the physical flaw correctable by error correction is shorter than as compared with the conventional DVD. By providing the structure of constituting one ECC block by 32 sectors as in the embodiment of the present invention, the effect of being capable of elongating the tolerance length of the flaw on the information storage medium surface capable of error connection, and securing compatibility of ECC block structure/format continuity of the current DVD is provided.

FIG. 35 shows the structure in the data frame. One data frame is 2064 bytes constituted of 172 bytes×2×6 rows, in which main data of 2048 bytes is included.

Figures 36A, 36B:
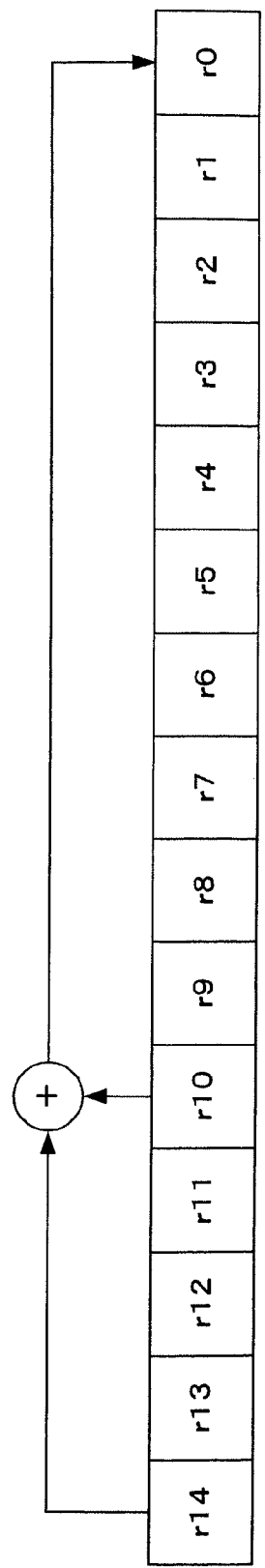
FIG. 36A is an explanatory diagram of initial values which are given to a shift register when a frame after scramble is created.
FIG. 36B is an explanatory diagram of a circuit construction of a feedback shift register for creating scramble bytes.

FIG. 36A shows examples of the initial value which is given to the feed back shift register when the frame after scrambling is created, and FIG. 36B shows the circuit configuration of the feed back shift register for creating scramble byte. r7 (MSB) to r0 (LSB) shifts by eight bits and used as scramble bytes. As shown in FIG. 36A, 16 kinds of preset values are prepared in this embodiment. The initial preset number in FIG. 36A equals to 4 bits (b7 (MSB) to b4 (LSB)) of the data ID. At the time of start of scramble of the data frame, the initial values of r14 to r0 have to be set at the initial preset values of the Table in FIG. 36A. The same initial preset value is used for 16 consecutive data frames. Next, the initial preset value is switched, and the same switched preset value is used for 16 consecutive data frames.

The lower 8 bits of the initial values of r7 to r0 are taken out as scramble byte S0. Thereafter, 8-bit shift is performed, then the scramble byte is taken out, and such operation is repeated 2047 times.

Figure 37:
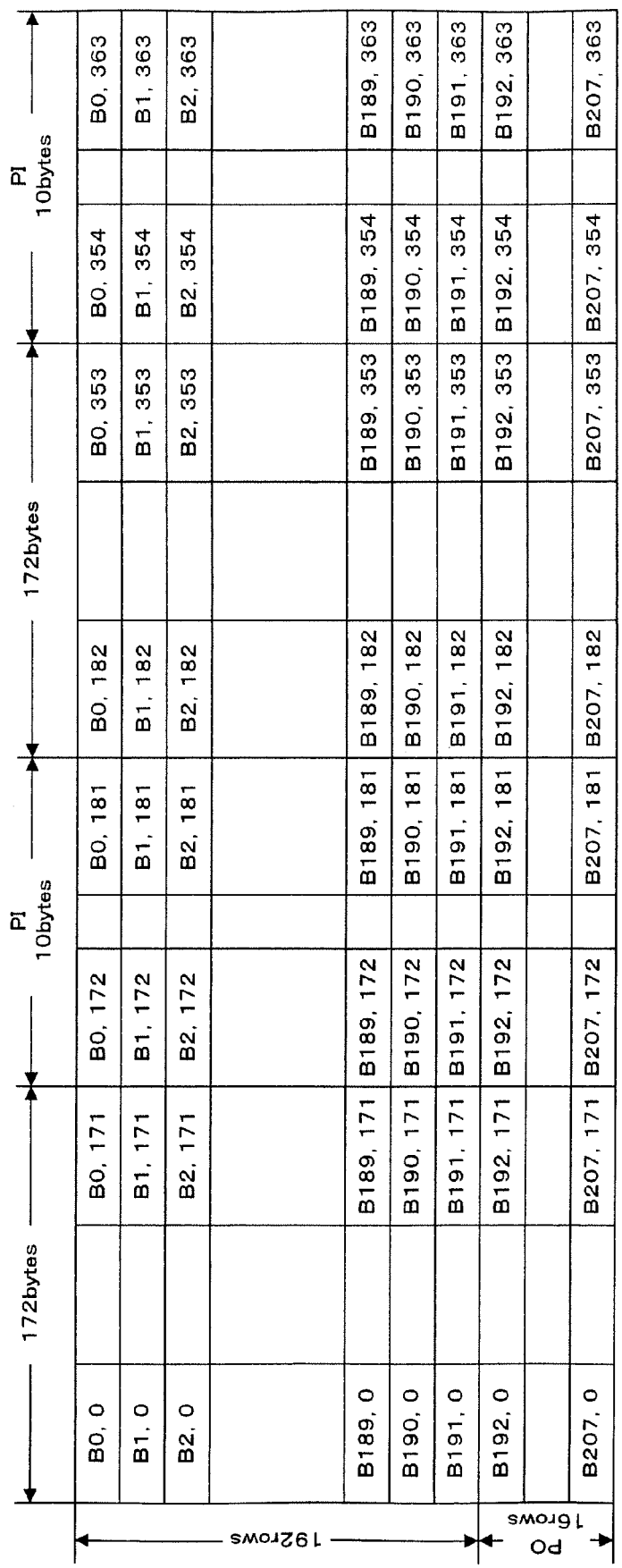
FIG. 37 is an explanatory diagram of an ECC block structure.

FIG. 37 shows the ECC block structure in this embodiment. The ECC block is formed by 32 consecutive scrambled frames. 192 rows+16 rows are disposed in the vertical direction, and (172+10)*2 lines are disposed in the horizontal direction. Each of B0,0, B1,0, . . . is 1 byte. PO and PI are error correction codes, and are an outer parity and an inner parity respectively. In this embodiment, the ECC block structure using the product code is constructed. Namely, the data to be recorded in the information storage medium is two-dimensionally disposed, and as the error correcting overhead bit, PI (Parity in) is added to the "line" direction, and PO (Parity out) is added to the "row" direction. By constructing the ECC block structure using the product code like this, high error correction ability by erasure correction and vertical and horizontal repeating correction processing can be ensured.

The ECC block structure shown in FIG. 37 has the characteristic in that PIs are set at two spots in the same "line" unlike the ECC block structure of the conventional DVD. Namely, PI of 10-byte size described in a centre in FIG. 37 is added to 172 bytes disposed at the left side of it. Namely, for example, PI of 10 bytes from B0,172 to B0,181 is added as PI to the data of 172 bytes from B0,0 to B0,171, and PI of 10 bytes from B1,172 to B1,181 is added as PI to the data of 172 bytes from B1,0 to B1,171. PI of 10 byte size described at the right end in FIG. 37 is added to 172 bytes disposed at the center at its left side. Namely, PI of 10 bytes from B0, 354 to B0,363 as PI is added to the data of 172 bytes from B0.182 to B0,353, for example.

Figure 38:
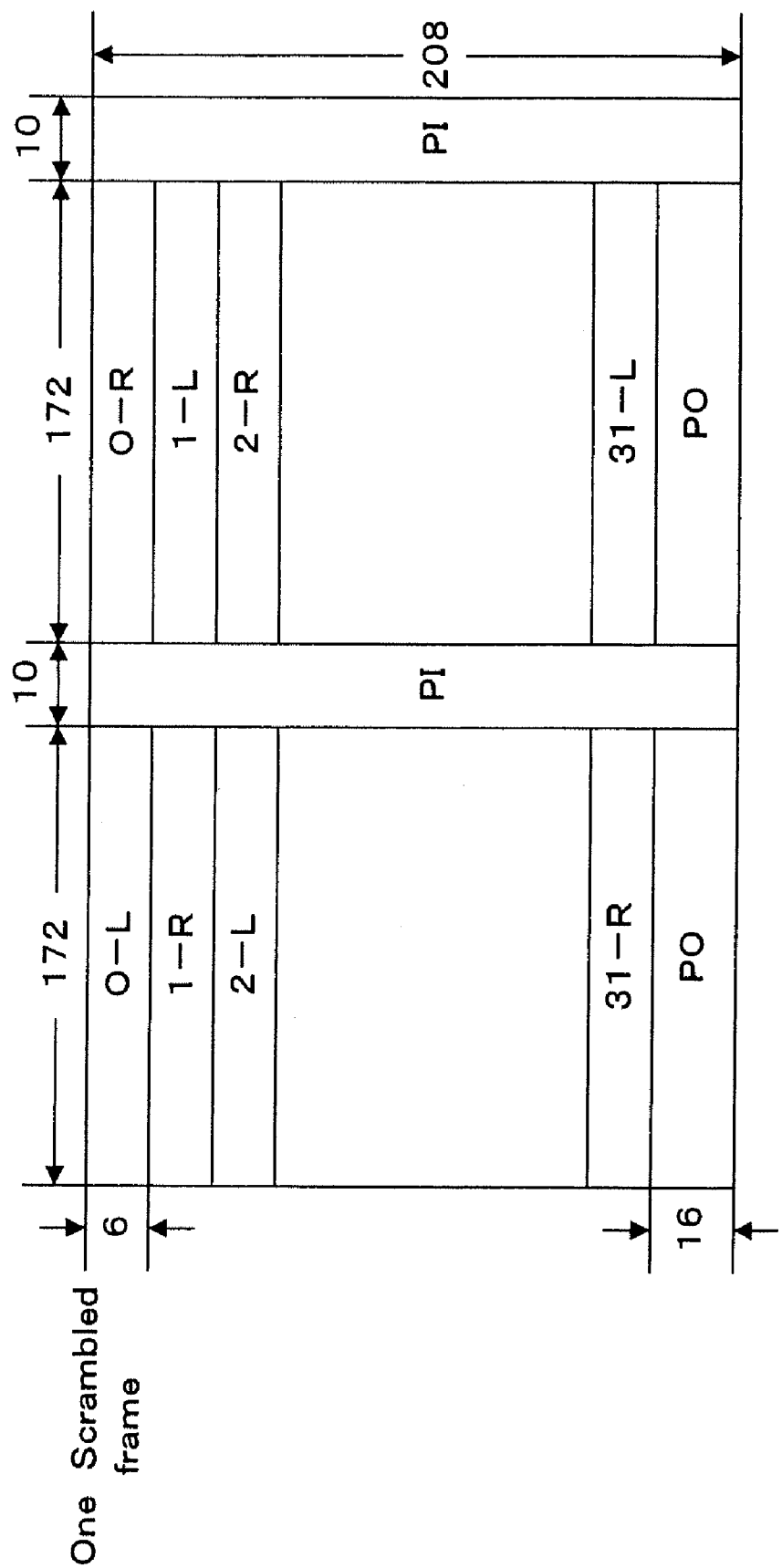
FIG. 38 is a frame arrangement explanatory diagram after scramble.

FIG. 38 shows a frame arrangement explanatory view after scramble. (6 rows×172 bytes) unit is dealt as a frame after one scramble. Namely, one ECC block is constituted of consecutive 32 frames after scramble. Further, in this system, (block 182 bytes×207 bytes) is dealt as a pair. When L is affixed to the number of the frame after each scramble of the ECC block at the left side, and R is affixed to the number of the frame after each scramble of the ECC block at the right side, the frames after scramble are disposed as shown in FIG. 38. Namely, the left and right frames after scramble alternately exist at the left side block, and the frames after scramble alternately exist at the right side block.

Namely, the ECC block is formed by 32 consecutive frames after scramble. Each row of the odd-numbered sector at the left side is exchanged with the row at the right side. 172×2 bytes×192 rows equals to 172 bytes×12 rows×32 scrambled frames, and is the data area. PO of 16 bytes is added to each of 172×2 lines to form the outer code of RS (208, 192, 17). PI (RS (182, 172, 11)) of 10 bytes is added to each of 208×2 lines of left and right blocks. PI is also added to the line of PO. The numerals in the frames indicate the scrambled frame numbers, and R and L of the suffixes mean the right side half and the left side half of the scrambled frame.

The characteristic of this embodiment lies in that the same data frame is distributively disposed in a plurality of small ECC blocks (FIG. 2 [H]). More specifically, in this embodiment, one large ECC block is constituted of two small ECC blocks, and the same data frame is distributively disposed alternately in two small ECC blocks ((H1) in FIG. 2). In the explanation in FIG. 37, it is already described that PI of 10-byte size described at the center is added to 172 bytes disposed at its left side and PI of 10 bite-size described at the right end is added to 172 bytes disposed at the center at its left side. Namely, the small ECC block at the left side is constructed by the 172 bytes from the left end of FIG. 37 and PI of 10 bytes continuing from the 172 bytes, and the small ECC block is constructed by the 172 bytes at the center and PI of 10 bytes at the right end of the 172 bytes. The mark in each frame in FIG. 38 is set corresponding to this. For example, "2-R" in FIG. 38 shows the data frame number and which of left and right small ECC blocks it belongs to (for example, this belongs to the small ECC block at the right side in the second data frame).

Figure 39:
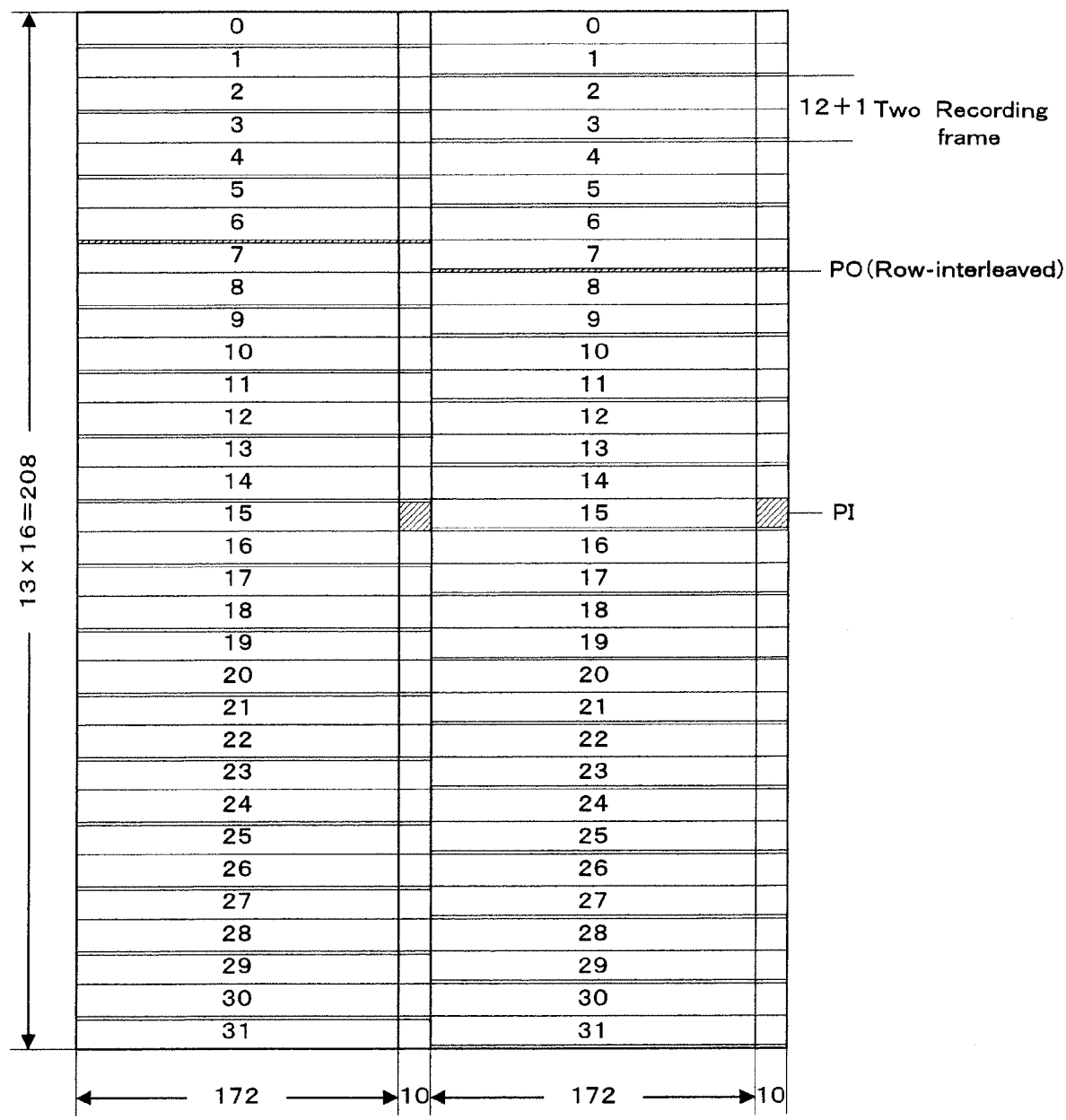
FIG. 39 is an explanatory diagram of an interleave method of PO.

As will be described later, in each physical sector finally constructed, the data in the same physical sector is distributively disposed in the left and right small ECC blocks alternately (the left half column in FIG. 39 is included in the small ECC block at the left side, and the right half column is included in the small ECC block at the right side).

When the same data frame is distributively disposed in a plurality of small ECC blocks (FIG. 1 [H]), reliability of recorded data can be enhanced by enhancing the ability of correcting error of the data in the physical sector (FIG. 39). For example, the case where overwriting on the recorded data occurs due to deviation of track at the time of recording, and data of one physical sector is broken is considered. In the embodiment of the present invention, the error in the broken data in one sector is corrected by using two small ECC blocks. Therefore, the burden of error correction in one ECC block is reduced, and error correction with high performance is ensured. In the embodiment of the present invention, the data ID is disposed at the head position of each sector after formation of the ECC block, and therefore, verifying of data position at the access time can be performed at high speed.

FIG. 39 is an explanatory view of an interleaving method of PO. As shown in FIG. 39, 16 parity rows are distributed one by one. Namely, each of 16 parity rows is disposed to every two recording frames. Accordingly, the recording frame constituted of 12 rows becomes 12 rows+one row. After the row interleave is performed, 13 row×182 bytes are referred to as the recording frame. Accordingly, the ECC block after row interleave is performed is constituted of 32 recording frames. In one recording frame, six rows exist in each of right and left side blocks as explained in FIG. 38. PO is disposed to be located at different positions in the left block (182×208 bytes) and the right block (182×208 bytes).

In FIG. 39, one completed ECC block is shown. However, at the time of reproducing actual data, such ECC blocks continuously come to the error correction processing unit. In order to enhance the correcting performance of such error correction processing, the interleaving method as shown in FIG. 39 is adopted.

Figure 40:
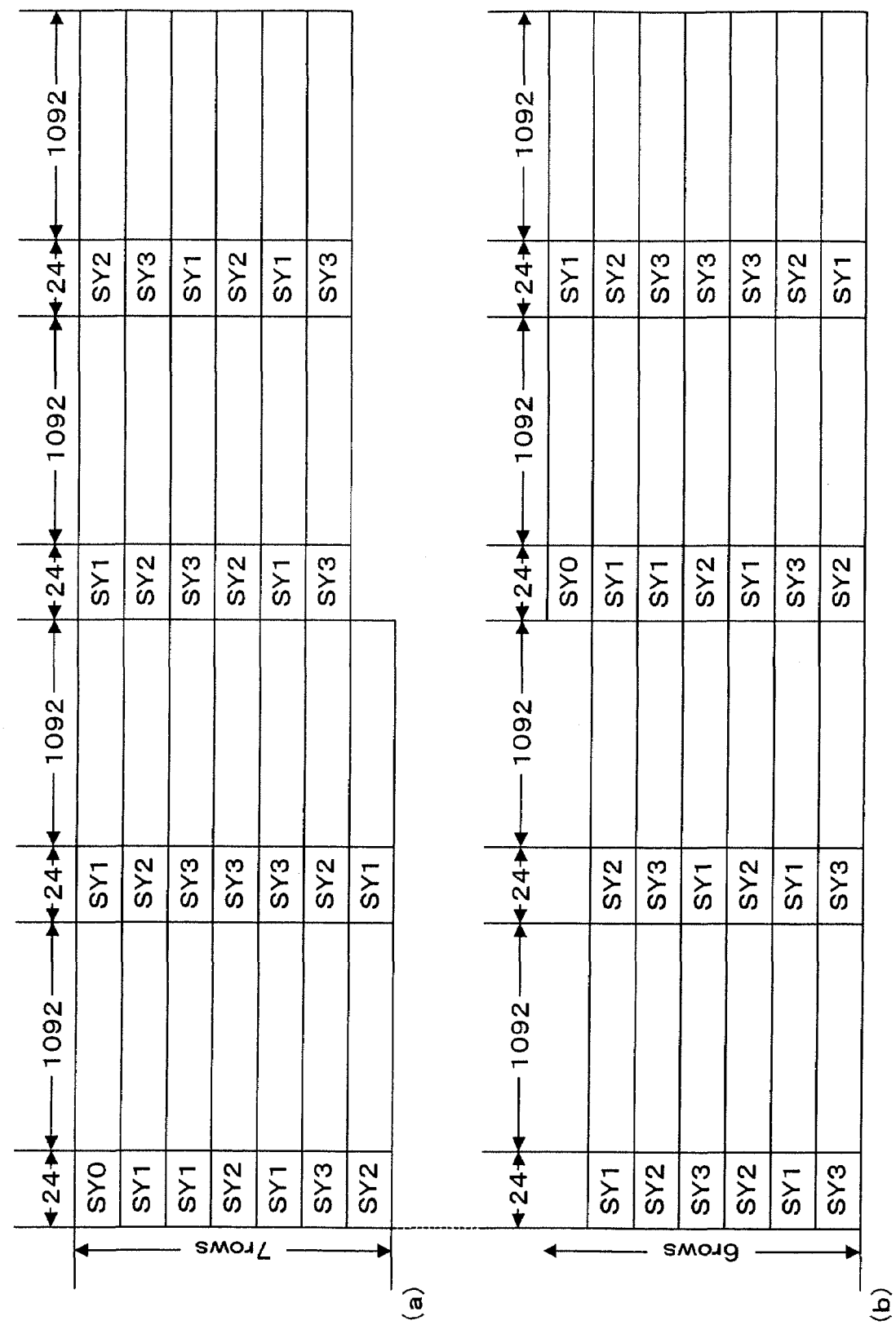
FIG. 40 is a structure explanatory diagram in a physical sector.

The physical sector structure is shown in FIG. 40. (a) in FIG. 40 shows the even-numbered physical sector structure, and (b) in FIG. 40 shows the odd-numbered data structure. In FIG. 40, information of the outer parity PO shown in FIG. 39 is inserted in the sync data field in the last two sync frames (namely, the portion in which the portion where the last synch code is SY3 and the sync data just after it, and the portion where the sync code is SY1 and the sync data just after it are aligned) in both of the even recorded data field and the odd recorded data field.

A part of PO at the left side shown in FIG. 38 is inserted into the spots of the final two sync frames in the even recorded data filed, and a part of PO at the right side shown in FIG. 38 is inserted into the final two sync frame spots in the odd recorded data field. As shown in FIG. 38, one ECC block is constructed by the left and right small ECC blocks, and the data of different PO groups (PO belonging to the left small ECC block or PO belonging to the right small ECC block) are alternately inserted for each sector. Both of the even-numbered physical sector structure shown in (a) of FIG. 40, and the odd-numbered data structure shown in (b) in FIG. 40 are divided into two by the center line. "24+1092+24+1092 channel bits" at the left side of them is included in the small ECC block at the left side shown in FIG. 37 or FIG. 38, and "24+1092+24+1092 channel bits" at the right side is included in the small ECC block at the right side shown in FIG. 37 or FIG. 38.

When the physical sector structure shown in FIG. 40 is recorded in the information storage medium, it is serially recorded by each row.

Accordingly, when the channel bit data of the even-numbered physical sector structure shown in (a) in FIG. 40, for example, is recorded in the information storage medium, the data of 2232 channel bits to be recorded first is included in the small ECC block at the left side, and the data of 2232 channel bits to be recorded next is included in the small ECC bock at the right side. The data of 2232 channel bits to be further recorded next is included in the small ECC block at the left side.

On the other hand, when the channel bit data of the odd-numbered data structure shown in (b) in FIG. 40 is recorded in the information storage medium, the data of 2232 channel bits to be recorded first is included in the small ECC block at the right side, and the data of 2232 channel bits to be recorded next is included in the small ECC block at the left side. The data of 2232 channel bits to be further recorded next is included in the small ECC block at the right side.

The characteristic of this embodiment lies in that the same physical sector is made to alternately belong to two small ECC block every 2232 channel bits ((H1) in FIG. 2). Expressing this in another way, the physical sector is formed in the form of distributively disposing the data included in the small ECC block at the right side and the data included in the small ECC block at the left side alternately for every 2232 channel bits and is recorded in the information storage medium. As a result, there arises the effect of being capable of providing the structure strong against burst error. For example, the burst error state in which along flaw occurs in the circumferential direction of the information storage medium and the data of more than 172 bytes becomes unreadable is considered. Since the burst error of more than 172 bytes of this case is distributively disposed in two small ECC blocks, the burden of error correction in one ECC block is reduced, and error correction with higher performance is ensured.

The characteristic lies in that the data structure in the physical sector differs depending on whether the physical sector number of the physical sector constituting one ECC block is even number or odd number ((H3) in FIG. 1), as shown in FIG. 40. Namely, the data structure is in the following structure of 1) and 2). 1) Small ECC block (right side or left side) to which the initial 2232 channel-bit data of the physical sector belongs differs. 2) The data of different PO group is alternately inserted for each sector.

As a result, the structure in which the data IDs are disposed at the head positions of all the physical sectors is ensured even after the ECC block is constructed, and therefore, data position verification at the time of access can be performed at high speed. The structure becomes more simple by adopting the PO insertion method as shown in FIG. 39 than by mixedly inserting the POs belonging to different small ECC blocks in the same physical sector. As a result, information extraction at each sector after error correction processing in the information producing apparatus is facilitated, and organization processing of the ECC block data in the information recording and reproducing apparatus can be simplified.

As the method for realizing the above described content concretely, the structure in which the interleave/insertion position of the PO differs in the left and right ((H4) in FIG. 2). The portions shown by the narrow double lines, or the portions shown by the narrow double lines and slash lines in FIG. 39 indicate the interleave/insertion position of POs. POs are inserted at the end of the left side in the even-numbered physical sector number and at the end of the right side in the odd-numbered physical sector number, respectively. By adopting this structure, the structure in which the data ID is disposed at the head position of the physical sector even after the ECC block is constructed. Therefore, data position verification at the time of access can be performed at high speed.

Examples of the concrete pattern contents from the sync codes "SY0" to "SY3" shown in FIG. 40 are shown in FIG. 41. This embodiment has three states from State 0 to State 2 corresponding to the modulation rule (the detailed explanation will be made later). Four kinds of sync codes from SY0 to SY3 are set, and the sync code is selected from the left and right groups in FIG. 41 in accordance with each state. In the current DVD standard, RLL (2, 10) (Run Length Limited: d=2, k=10: the smallest value is 2, the largest value is 10 in the range where "0" continues in succession) of 8/16 modulation (8 bits are converted into 16 channel bits) is adopted as the modulation method, and four states from State 1 to State 4 and 8 kinds of sync codes from SY0 to SY7 are set for modulation. As compared with this, in this embodiment, the kind of sync codes is decreased. In the information recording and reproducing apparatus or the information reproducing apparatus, the type of sync code is identified by the pattern matching method at the time of reproducing information from the information storage medium. By reducing the kind of sync codes dramatically as in this embodiment, the target pattern required for matching can be decreased. As a result, not only the processing efficiency is enhanced by simplifying required processing for pattern matching, but also recognition speed can be enhanced.

In FIG. 41, the bit (channel bit) shown by "#" expresses the DSV (Digital Sum Value) control bit. The above described control bit is determined to suppress the DC component (the value of DSV approaches "0") by the DSV controller as will be described later. It is also the characteristic of this embodiment that the polarity inversion channel bit "#" is included in the sync code (FIG. 2 [I]). Including the frame data fields (fields of 1092 channel bits in FIG. 40) at both sides with the above described sync codes therebetween, the value of "#" can be selected to be "1" or "0" so that DSV value macroscopically approach "0", and the effect of being capable of performing DSV control from the macroscopic point of view is provided.

The sync code in this embodiment is constituted of the following (1) to (4) as shown in FIG. 41.

(1) Synchronous Position Detecting Code Part

This has a common pattern in all sync codes, and forms the fixed code region. By detecting this code, the position of the sync code can be detected. More specifically, this means the region of "010000 000000 001001" of the final 18 channel bits in each sync code in FIG. 41.

(2) Conversion Table Selection Code Part at the Time of Modulation

This forms a part of a variable code region, and is a code which changes corresponding to the State number at the time of modulation. The first 1 channel bit in FIG. 41 corresponds to this. Namely, when any of State 1 and State 2 is selected, the first one channel bit becomes "0" in any of the codes from SY0 to SY3. On the other hand, at the time of selecting State 0, the first one channel bit of the sync code becomes "1". However, the first one channel bit of SY3 in the State 0 becomes "0" as an exception.

(3) Sync Frame Position Identifying Code Part

This is the code for identifying the respective kinds from SY0 to SY3 in the sync codes, and constitutes a part of the variable code region. The channel bit part from the first to sixth channel bits in each sync code in FIG. 41 corresponds to this. As will be described later, from a continuing pattern of every three sync codes detected in succession, the relative position in the same sector can be detected.

(4) DC Suppressing Polarity Inversion Code Part

The channel bit at the position "#" in FIG. 41 corresponds to this, and the bit at this position inverts or non-inverts, whereby the DSV value of the channel bit string including the frame data before and after it moves to be close to "0" as described above.

In this embodiment, 8/12 modulation (ETM: Eight to Twelve Modulation), and RLL (1, 10) are adopted as the modulation method. Namely, 8 bits are converted into 12 channel bits at the time of modulation, and the range in which "0" continues in succession after conversion is set so that the minimum value (d value) is 1 and the maximum value (k value) is 10. In this embodiment higher density than the prior art can be achieved by setting d=1, but it is difficult to obtain sufficiently large reproduction signal amplitude at the maximum density mark.

Thus, as shown in FIG. 5, the information recording and reproducing apparatus of this embodiment has the PR equalizing circuit 130 and the Viterbi decoder 156, and uses the technique of PRML (Partial Response Maximum Likelihood) to make very stable signal reproduction possible. Since k=10 is set, eleven or more of "0"s do not continue in succession in general modulated channel bit data. By utilizing this modulation rule, in the above described synchronous position detecting code unit, such a pattern as not appear in general modulated channel bit data is given.

Namely, as shown in FIG. 41, 12 (=K+2) of "0"s continue in succession in the synchronous position detecting code unit. In the information recording and reproducing apparatus or the information reproducing apparatus, the position of the synchronous position detecting code unit is detected by finding this part. If too many "0"s continue in succession, a bit shift error easily occurs. Therefore, in order to relieve the harmful effect, in the synchronous position detecting code unit, a pattern with a small number of continuing "0"s is disposed immediately after it. In this embodiment, d=1, and therefore, it is possible to set "101" as the corresponding pattern. However, as described above, it is difficult to obtain sufficiently large reproduction signal amplitude at the position of "101" (the position of the maximum density pattern), and therefore, "1001" is disposed instead, and the pattern of the synchronous position detecting code unit as shown in 41 is adopted.

This embodiment is characterized in that 18 channel bits at the rear side in the sync code are independently set as (1) synchronous position detecting code part, and 6 channel bits at the front side are shared to be used as (2) conversion table selection code part at the time of modulation, (3) synch frame position identifying code part, and (4) DC suppressing polarity inversion code part, as shown in FIG. 41. The synchronous position detection accuracy is enhanced by facilitating individual detection by making (1) synchronous position detecting code part independent in the sync code. The 6 channel bits are shared by the code parts (2) to (4), thereby providing the effect of decreasing the data size of the entire sync code (channel bit size), and enhancing the occupancy rate of the sync data to enhance the substantial data efficiency.

The characteristic of this embodiment lies in that among four kinds of sync codes shown in FIG. 41, only SY0 is disposed at the first sync frame position in the sector as shown in FIG. 40. As the effect of this, the head position in the sector can be instantly determined only by detecting SY0, and head position extraction processing in the sector is extremely simplified.

There is also provided the characteristic that the combination patterns of continuing three sync codes are all different in the same sector.

In this embodiment, a common modulation method which will be explained below is adopted in all of the reproduction-only type/recordable type/rewritable type information storage media.

8-bit data word in the data field is converted into channel bit on the disc by the 8/12 modulation (ETM: Eight to Twelve Modulation) method. The channel bit string converted by the ETM method satisfies the constraint of run length of RLL (1, 10) that the channel bit 1b is apart by at least 1, and 10 channel bits at the maximum.

Modulation is performed by using the code conversion table shown in FIGS. 46 to 51. The conversion table shows each of data words "000h" to "FFh", and 12 channel bits of the code word corresponding to each of States 0 to 2, and States of the next data words.

Figure 42:
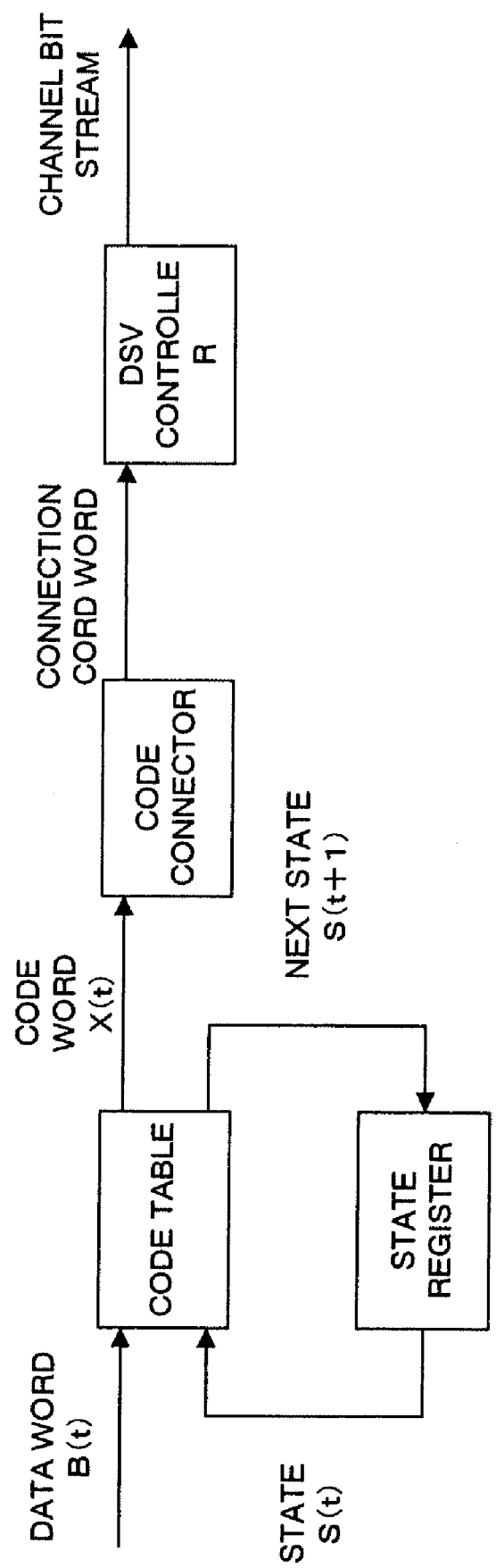
FIG. 42 is a diagram showing a construction of a modulation block.

The configuration of the modulation block is shown in FIG. 42.

$X(t)=H\{B(t), S(t)\}$ $S(t+1)=G\{B(t), S(t)\}$

H represents a code word output function, and G represents a next State output function.

Some 12 channel bits in the code conversion table include asterisk bit "*" and sharp bit "#" as well as "0b" and "1b".

The asterisk bit "*" in the code conversion table indicates that the bit is a merging bit. Some code words in the conversion table have the merging bits at LSB. The merging bit is set at any one of "0b" and "1b" by the code connector in accordance with the channel bit following itself. When the following channel bit is "0b", the merging bit is set at "1b". When the following channel bit is "1b", the merging bit is set at "0b".

The sharp bit "#" in the conversion table indicates that the bit is a DSV control bit. The DSV control bit is determined by performing DC component suppressing control by the DSV controller.

Concatenation rule for the cord word shown in FIG. 43 is used for concatenating the code words obtained from the cord table. When the adjacent two code words correspond to the pattern shown as the previous code word and the current code word in the table, these code words are replaced with the concatenation code word shown in the table. "?" bit is any one of "0b", "1b" and "#". "?" bits in the concatenation code word are not replaced, but are assigned as the previous code word and the current code word.

Concatenation of the code words is applied at the previous concatenation point first. The concatenation rule in the table is applied in the sequence of index at each concatenation point. Some code words are replaced twice for connecting the preceding code word and the subsequent code word. The merging bit of the preceding code word is determined before pattern matching for concatenation. The DSV control bit "#" of the previous code word, or the current code word is dealt as a special bit after and before code connection. The DSV control bit is not "0b" or "1b", but "?". The concatenation rule of the code words is not used for connecting a code word to a sync code. The concatenation rule shown in FIG. 44 is used for connection of a code word and a sync code.

At the time of modulation of a recording frame, a sync code is interposed at the head of each modulation code word of the data word of 91 bytes. Modulation starts from State 2 after the sync code, the modulation code word is sequentially outputted to the head of each conversion code word as MSB, and is subjected to NRZI conversion before recorded in the disc.

The sync code is determined by performing DC component suppression control.

The DC component suppression control (DCC: DC component suppression control) minimizes the absolute value of accumulated DSV (digital sum value: addition is performed with "1b" set at +1, and "0b" set at −1) in the NRZI conversion modulation channel bit stream.

DCC algorithm controls selection of a code word and a sync code for each of the following cases (a) and (b) so that the absolute value of DSV is minimized.

(a) Selection of sync code (see FIG. 41)

(b) Selection of DSV control bit "#" of concatenation code word

Selection is determined in accordance with the value of the accumulated DSV at the position of each DSV bit of the concatenation code word and sync code.

The DSV as the basis of calculation is added as the initial value of 0 at the time of starting modulation, and addition continues sequentially from that time on until the modulation is finished, but the DSV is not reset at zero. The starting point of selection of the DSV control bit is the DVS control bit, the channel bit stream to minimize the absolute value of the DSV is selected just before the next DSV control bit. Out of two channel bit streams, the one with a smaller absolute value of DSV is selected. If the absolute values of the DSVs of two channel bit streams are the same, the DSV control bit "#" is set as "0b".

Considering maximum DSV in the calculation of scenario with logical possibility, the range of DVS calculation needs to be at least ±2047.

A demodulation method will be explained hereinafter.

A demodulator converts the code word of 12 channel bits into the data word of 8 bits. The code word is reproduced by using the detachment rule shown in FIG. 45 from the read bit stream. When the adjacent two code words agree to the pattern of the detachment rule, these code words are replaced with the current code word and the subsequent code word shown in the table. "?" bit is any of "0b", "1b" and "#". The "?" bits of the current code word and the subsequent code word are not replaced, but assigned as they are in the read code word.

The border of the sync code and the code word is detached without being replaced.

Conversion from the code word into the data word is carried out in accordance with the demodulation table shown in FIGS. 52 to 61. All the code words with possibility are described in the demodulation table. "z" may be any data word of "00h" to "FFh". The detached current code word is decoded by observing 4 channel bits of the next code word, or the pattern of the next sync code.

Case 1: The next code word starts with "1b", or the next sync code is SY0 to SY2 of State 0.
Case 2: The next code word starts with "0000b", or the next sync code is SY3 of State 0.
Case 3: The next code word starts with "01b", "001b" and "0001b", or the next sync code is SY0 to SY3 of State 1 and 2.

The pattern content of the reference code recorded in the reference code recording zone RCZ shown in FIG. 21 will be explained in detail.

In the current DVD, the "8/16 modulation" method for converting 8-bit data into 16 channel bits is adopted as the modulation method, and the repetition pattern of "0010000010000001001000001000001" is used as the reference code pattern as a channel bit string which is recorded in the information storage medium after modulation.

As compared with this, in this embodiment, the ETM modulation for modulating 8-bit data to 12 channel bits is used, the run length constraint of RLL (1, 10) is performed, and the PRML method is used for signal reproduction from the data lead-in area DTLDI, the data area DTA, the data lead-out area DTLDO and the middle area MDA. Accordingly, it is necessary to set the optimal pattern of the reference code for the above described modulation rule and PRML detection. In accordance with the run length constraint of RLL (1, 10), the minimum value of succession of "0" is "d=1", which results in the repetition pattern of "10101010". When the distance from the code of "1" or "0" to the next adjacent code is set at "T", the distance between the adjacent "1"s in the above described pattern is "2T".

For densification of the information storage medium, the reproduction signal from the repetition pattern ("10101010") of "2T" which is recorded on the information storage medium is in the vicinity of cutoff frequency of the MTF (Modulation Transfer Function) characteristic of the objective lens (exists in the information recording and reproducing unit 141 in FIG. 5) in the optical head as described above in this embodiment. Therefore, modulation degree (signal amplitude) is hardly obtained.

Accordingly, when the reproduction signal from the repetition pattern ("10101010") of "2T" is used as the reproduction signal used for circuit adjustment of the information reproducing apparatus or the information recording and reproducing apparatus (for example, initial optimization of each tap coefficient performed in the tap controller in FIG. 9), it lacks stability with large influence of noise.

Accordingly, it is desirable to perform circuit adjustment for the signal after modulation performed in accordance with the run length constraint of RLL (1, 10) by using the pattern of "3T" with the next highest density.

When the DSV (Digital Sum Value) value of the reproduction signal is considered, the absolute value of the DC (direct current) value increases in proportion to the number of successions of "0" between "1" and the next "1" which comes directly after the "1", and the DC value is added to the immediately preceding DSV value. The polarity of the DC value which is added is inverted each time "1" comes.

Accordingly, as the method for making the DSV value "0" where the continuous channel bit string continues in the reference code, the method which will be described next increases the degree of freedom of the reference code pattern design more than the method of setting so that the DSV value is "0" in the 12 channel bit string after ETM modulation. Namely, the number of occurrences of "1" to the 12 channel bit string after ETM modulation is made an odd number, and the DC component occurring in a set of reference code cell constituted of 12 channel bits is cancelled off by the DC component occurring to the reference code cell of 12 channel bits of the next set. This increases the degree of freedom of reference code pattern design more.

Accordingly, in this embodiment, the number of "1"s which appear in the reference code cell constituted of 12 channel bit string after ETM modulation is set at an odd number. In this embodiment, the mark edge recording method in which the position of "1" corresponds to the record mark or the border position of the embossed pit is adopted for densification. For example, when the repetition pattern of "3T" ("100100100100100100100") continues, and the length of the record marks or the embossed pits, the length of the space between them sometimes differ a little in accordance with the recording condition or the mastering condition. When using the PRML detection method, the level value of the reproduction signal is very important, and in order to be able to detect signal with stability and high precision even when the length of the record marks and embossed bits and the length of the space therebetween differs a little as described above, it becomes necessary to correct the little difference in terms of circuit.

Figure 62:
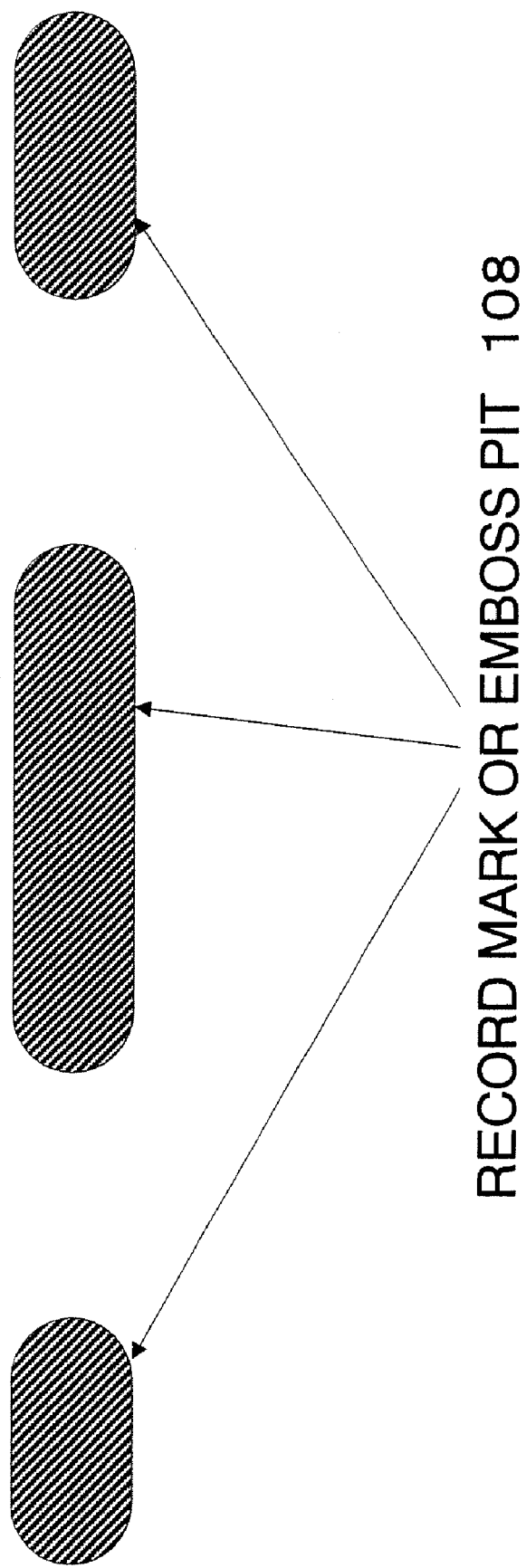
FIG. 62 is an explanatory diagram of a reference code pattern.

Accordingly, accuracy of adjustment of the circuit constant is enhanced more with the presence of the record mark or the embossed pit of the length of "3T" and the space of the length of the same "3T" as the reference cord for adjusting the circuit constant. Therefore, when the pattern of "1001001" is included inside as the reference code pattern of this embodiment, the record mark or the embossed pit and the space of the length of "3T" are always disposed. For circuit adjustment, not only the pattern ("1001001") with high density, but also a pattern with low density is needed. Accordingly, considering that a low density state (pattern in which many continuous "0"s occur) is generated in the part except for the pattern of "1001001" in the 12 channel bit string after ETM modulation, and that the number of occurrences of "1" is set at an odd number, the repetition of "100100100000" becomes the optimal condition as the reference code pattern as shown in FIG. 62. In order to make the channel bit pattern after modulation the above described pattern, it is necessary to set the data word before modulation at "A4h" from FIG. 59 when using the aforementioned modulation table. The data of "A4h" (sexadecimal notation) corresponds to the data symbol "164" (decimal notation).

The method of creating a concrete data in accordance with the above described data conversion rule will be explained. First, the data symbol "164" (="0A4h") is set to the main data ("D0 to D2047") in the above described data frame structure. Next, the data frame 1 to data frame 15 are pre-scrambled in advance with the initial preset number "0Eh", and the data frame 16 to the data frame 31 are pre-scrambled in advance with the initial preset number "0Fh". When pre-scramble is performed in advance, scramble is doubly performed when scramble is performed in accordance with the above described data conversion rule, (when the data is doubly scrambled, it returns to the original pattern) the data symbol "164" (="0A4h") appears as it is. If all the reference codes constituted of 32 physical sectors are pre-scrambled, the DSV control cannot be performed, and therefore, only the data frame 0 is not pre-scrambled in advance. The pattern shown in FIG. 62 is recorded on the information storage medium when modulation is performed after the above described scramble is performed.

Figure 63:
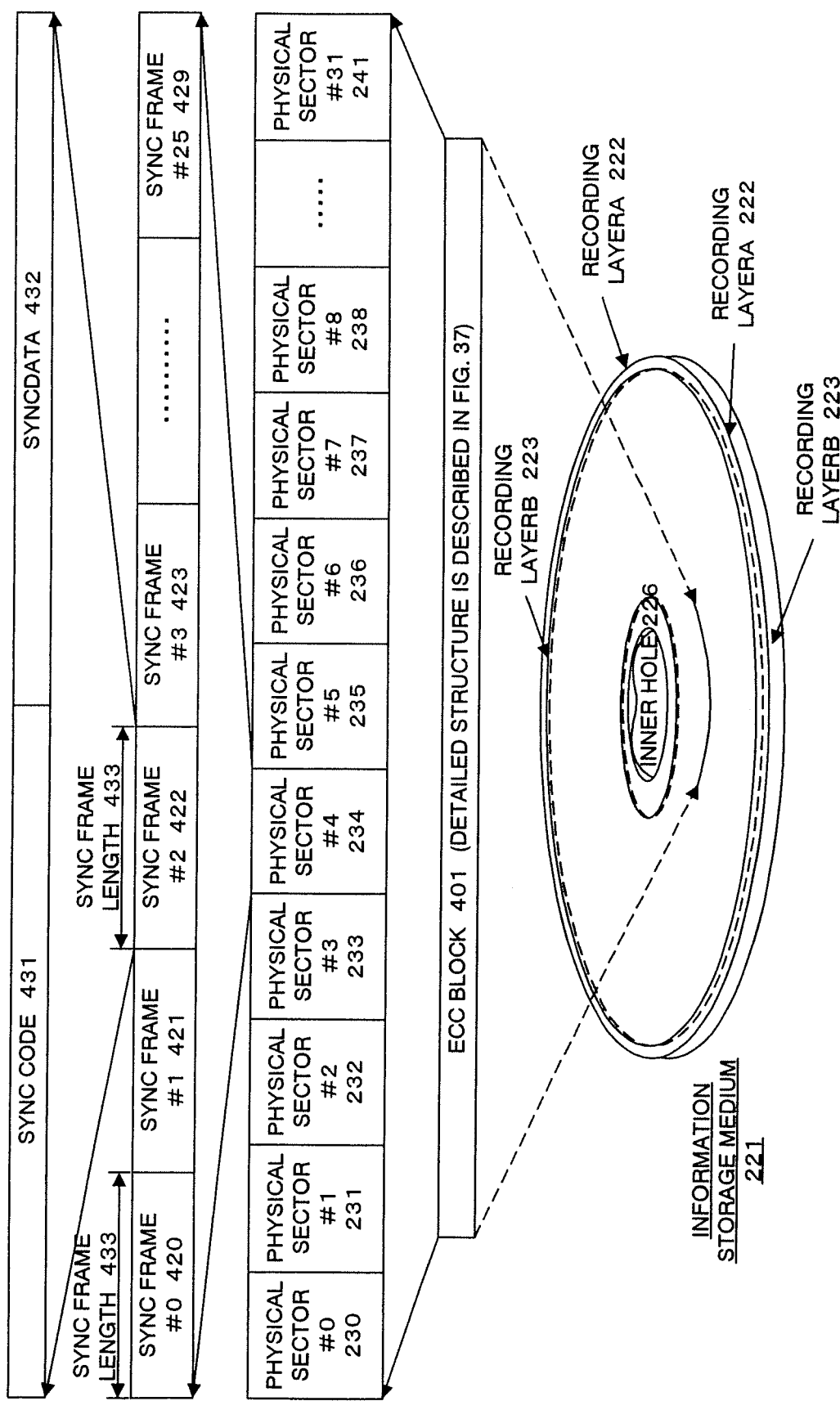
FIG. 63 is a data unit explanatory diagram of a recorded data on an information storage medium of this embodiment.

The state in which the channel bit data having the structure in one physical sector shown in FIG. 40 are continuously recorded in the information storage medium 221 is shown in FIG. 63. In this embodiment, the channel bit data which is recorded on the information storage medium 221 has the hierarchic structure of the record data as shown in FIG. 63 irrespective of the kinds (reproduction-only type/ recordable type/rewritable type) of the information storage medium 221. Namely, one ECC block 401 that is the largest data unit, by which the error detection or error correction of the data is possible, is constituted of 32 physical sectors 230 to 241.

As is already explained in FIG. 40, and as shown in FIG. 63 again, the sync frames #0 420 to #25 429 are constituted of 24 channel bit data forming any sync code (sync code 431) from "SY0" to "SY3", and the sync data 432 having 1092 channel bit data size disposed between the respective sync codes. Each of the physical sectors 230 to 241 is constituted of 26 sync frames #0 420 to #25 429. As described above, one sync frame includes the data of 1116 channel bits (24+1092) as shown in FIG. 40, the sync frame length 433 which is the physical distance on the information storage medium 221 where one sync frame is recorded is substantially constant everywhere (when the change amount of the physical distance for intra-zone synchronization is excluded).

Comparison of data recording modes (Format) of the respective kinds of information storing media in this embodiment will be explained. (a) in FIG. 64 shows the data recording modes in the conventional reproduction-only information storage medium DVD-ROM, the conventional recordable information storage medium DVD-R and the conventional DVD-RW, (b) in FIG. 64 shows the data recording mode of the reproduction-only information storage medium in this embodiment, (c) in FIG. 64 shows the data recording mode of the recordable information storage medium in this embodiment, and (d) in FIG. 64 shows the data recording mode of the rewritable information storage medium. For comparison, the sizes of the ECC blocks 411 to 418 are made to be the same. However, one ECC block is constituted of 16 physical sectors in the conventional reproduction-only information storage medium DVD-ROM, the conventional recordable information storage medium DVD-R and conventional DVD-RW shown in (a) in FIG. 64, and this embodiment shown in (b) to (d) in FIG. 64 differs from them in the point that one ECC block is constituted of 32 physical sectors. It is the characteristic of this embodiment that guard fields 442 to 448 each of the same length as the sync frame length 433 are provided between the respective ECC blocks #1 411 to #8 418 (FIG. 3 [K]) as shown in (b) to (d) in FIG. 64. In the conventional reproduction-only information storage medium DVD-ROM, the respective ECC blocks #1 411 to #8 418 are recorded continuously as shown in (a) in FIG. 64.

The conventional recordable information storage medium DVD-R and the conventional DVD-RW have the problem that when recording or rewriting processing called restricted overwrite is performed in order to ensure compatibility of the data recording mode (format) with the conventional reproduction-only information storage medium DVD-ROM, a part of the ECC block is broken by overwriting and data reliability at the time of reproduction is seriously impaired.

On the other hand, by disposing the guard fields 442 to 448 between the data fields (ECC blocks) as in this embodiment, the effect that the overwriting place is limited to the guard fields 442 to 448 and data corruption of the data field (ECC block) can be prevented is provided.

Another characteristic of this embodiment lies in that the length of each of the above described guard fields 442 to 448 is set at the sync frame length 433 which is one sync frame size as shown in FIG. 64 ((K1) in FIG. 3).

As shown in FIG. 40 and FIG. 63, the synch codes are disposed at the fixed sync frame length 433 of 1116 channel bits, and in the sync code position detecting unit 145 shown in FIG. 5, the sync code position is extracted by utilizing this fixed intervals. By setting the length of each of the guard fields 442 to 448 at the sync frame length 433 in this embodiment, the sync frame interval can be kept constant even if the guard areas 442 to 448 are spanned at the time of reproduction. Therefore, the effect of facilitating detection of sync code position at the time of reproduction is provided.

Further, with the purpose of the following 1) and 2), the sync codes (sync data) is disposed in the guard field in this embodiment ((K2) in FIG. 1).

1) Even in the place across the guard fields 442 to 448, frequency of occurrence of the sync code is made consistent, and detection accuracy of detection of the sync code position is enhanced.

2) Determination of the position in the physical sector including the guard fields 442 to 448 is facilitated.

More specifically, as shown in FIG. 65C, a postamble field 481 is formed at the start position of each of the guard fields 442 to 468, and the sync code "SY1" of the sync code number "1" shown in FIG. 41 is disposed in the postamble field 481.

As is known from FIG. 40, the combinations of the sync numbers of three continuing sync codes in the physical sector differ in all places. Further, the combinations of the sync numbers of the three continuing sync codes with the sync code number "1" took into consideration in the guard fields 442 to 448 also differ in all places. Accordingly, by combination of sync code number of three continuing sync codes in an optional field, not only the position information in the physical sector, but also discrimination of the position in the physical sector including the place of the guard fields becomes possible.

The detailed structure in the guard fields 441 to 448 shown in FIG. 64 is shown in FIG. 65C. It is shown in FIG. 63 that the structure in the physical sector is constituted of the combination of the sync codes 431 and the sync data 432. The characteristic of the present invention lies in that the guard fields 441 to 448 are also constituted of the combinations of the sync codes 433 and the sync data 434, and that the data which is modulated in accordance with the same modulation rule as the sync data 432 in the sector is also disposed in the sync data 434 field in the guard field #3 443. The field in the one ECC block #2412 constituted of 32 physical sectors shown in FIG. 37 is called a data field 470 in the present invention.

VFO (Variable Frequency Oscillator) areas 471 and 472 in FIG. 65C are used for synchronizing the reference clock of the information reproducing apparatus or the information recording and reproducing apparatus when the data field 470 is reproduced. As the data content which is recorded in the fields 471 and 472, continuous repetition of data "7Eh" before modulation in the common modulation rule which will be described later is cited, and the channel bit pattern after modulation which is actually recorded is the repetition pattern of "010001 000100" (the pattern in which continuation of three "0"s is repeated). In order to obtain this pattern, it is necessary to set the head bytes of the VFO fields 471 and 472 in the state of State 2 in modulation.

Pre-sync fields 477 and 478 express the border positions between the above described VFO fields 471 and 472 and the data field 470, and the record channel bit pattern after modulation is the repetition of "100000 100000" (the pattern in which continuation of five "0" is repeated). In the information reproducing apparatus or the information recording and reproducing apparatus, the pattern change positions of the repetition patterns of "10000 100000" in the pre-sync fields 477 and 478 are detected from the repetition patterns of "10001 000100" in the VFO fields 471 and 472, and getting near to the data field 470 is recognized.

Postamble field 481 expresses the end position of the data field 470 and also expresses the start position of the guard field 443. The pattern in the postamble field 481 corresponds to the pattern of "SY1" among the sync codes (SYNC Codes) shown in FIG. 41 as described above.

Extra field 482 is a field which is used for copy control and prevention of unauthorized copy. When the extra field 482 is not specially used for copy control and prevention of unauthorized copy, all channel bits are set at "0".

The data which is recorded in the buffer field is continuous repetition of data "7Eh" before modulation as in the VFO fields 471 and 472, and the channel bit pattern after modulation which is actually recorded is the repetition pattern of "010001 000100" (the pattern in which continuous three "0"s is repeated). In order to obtain this pattern, it is necessary to set the head bytes of the VFO fields 471 and 472 at the state of "State 2" in modulation.

As shown in FIG. 65C, the postamble field 481 in which the pattern of "SY1" is recorded corresponds to the sync code field 433, and the fields from the extra field 482 immediately after the postamble field 481 to the pre-sync field 478 correspond to the sync data field 434. The fields from the VFO field 471 to the buffer field 475 (fields including the data field 470 and part of the guard fields before and after the data field 470) are called a data segment 490 in the present invention, and the data segment 490 shows a different content from the "physical segment" which will be described later. The data size of each data shown in FIG. 65C is expressed by the number of bytes of the data before modulation.

The embodiment of the present invention is not limited to the structure shown in FIG. 65C, but the following method can be adopted as another embodiment. Namely, instead of disposing the pre-sync field 477 at the border portion of the VOF field 471 and the data field 470, the pre-sync field 477 is disposed at a midpoint between the VOF fields 471 and 472 in FIG. 65C.

In another embodiment, distance correlation is taken to be large by increasing the distance between the sync code "SY0" disposed at the head position of the data block 470 and the pre-sync field 477, and the pre-sync field 477 is set as a temporary Sync and is utilized as the distance correlation information of the real Sync position (though different from the distance from the other Sync). If the real Sync cannot be detected, Sync is placed at the position where the real Sync which is generated from the temporary Sync will be detected. The characteristic of the other embodiment lies in that the pre-sync field 477 is spaced by some distance from the real sync ("SY0") in this manner. If the pre-sync field 477 is disposed at the beginning of the VFO fields 471 and 472, the role of pre-sync is weakened since the PLL of read clock is not locked. Accordingly, it is desirable to dispose the pre-sync field 477 in the intermediate position between the VFO fields 471 and 472.

In this embodiment, the address information in the recordable (rewritable or recordable) information storage medium is recorded in advance by using wobble modulation.

The characteristic of this embodiment lies in that the phase modulation of ±90 degrees (180 degrees) is used as the wobble modulation method, and the address information is recorded in advance by adopting the NRZ (Non Return to Zero) method (FIG. 2 [J]). Concrete explanation will be made by using FIG. 66. In the embodiment of the present invention, one address bit (also called an address symbol) field 511 is expressed by 4 wobble cycles concerning the address information, and the frequencies, amplitudes and phases are respectively consistent everywhere in one address bit field 511. When the same value continues as the value of the address bit, the same phase continues at the border portion (portion with "symbol Δ (triangle)" affixed in FIG. 66) of each one address bit field 511. When the address bit is inverted, inversion of the wobble pattern (shift of 180 degrees of the phase) occurs. In the wobble signal detection unit 135 of the information recording and reproducing apparatus shown in FIG. 5, the border position of the above described address bit field 511 (place with "symbol Δ (triangle)" affixed in FIG. 66) and a slot position 512 which is a border position of one wobble cycle are simultaneously detected.

A PLL (Phase Lock Loop) circuit not shown is incorporated in the wobble signal detection unit 135, and PLL is carried out in synchronism with both the border position and the slot position 512 of the above described address bit field 511. When the border position or the slot position 512 of this address bit field 511 deviates, synchronism is deviated in the wobble signal detection unit 135 and it becomes impossible to reproduce (read) an accurate wobble signal. The interval between the adjacent slot positions 412 is called a slot interval 513, and as the slot interval 513 becomes physically shorter, synchronism of the PLL circuit is more easily taken, and it becomes possible to reproduce (read the information content) the wobble signal stably. As is obvious from FIG. 66, when the phase modulation method of 180 degrees which shifts to 180 degrees or 0 degree is adopted, this slot interval 513 corresponds to one wobble cycle.

The AM (Amplitude Modulation) method which changes the wobble amplitude as the wobble modulation method is susceptible to dust and flaw attached on the information storage medium surface. However, in the above described phase modulation, a change in phase is detected instead of the signal amplitude, and therefore, the phase modulation method is hardly influenced by dust and flaw on the information storage medium surface comparatively. As another modulation method, in the FSK (Frequency Shift Keying) method which changes frequency, the slot interval 513 is long with respect to the wobble cycle, and synchronism of the PLL circuit is relatively difficult to take. Accordingly, when the address information is recorded by the phase modulation of wobble as in this embodiment, the slot interval is small, and therefore, the effect of easily taking synchronism of the wobble signal is provided.

Figure 66:
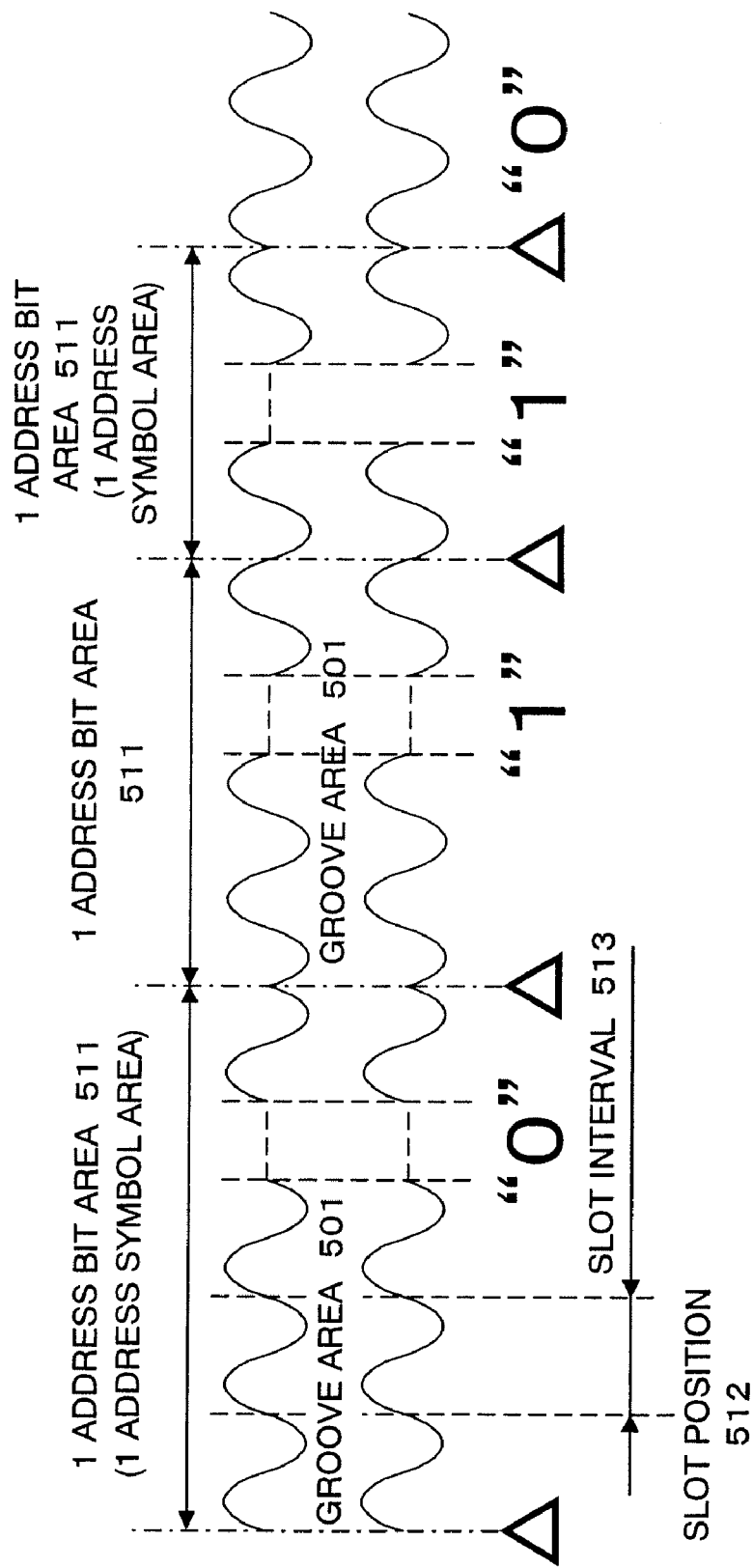
FIG. 66 is an explanatory diagram of 180 degrees phase modulation in wobble modulation and an NRZ method.
Figure 67:
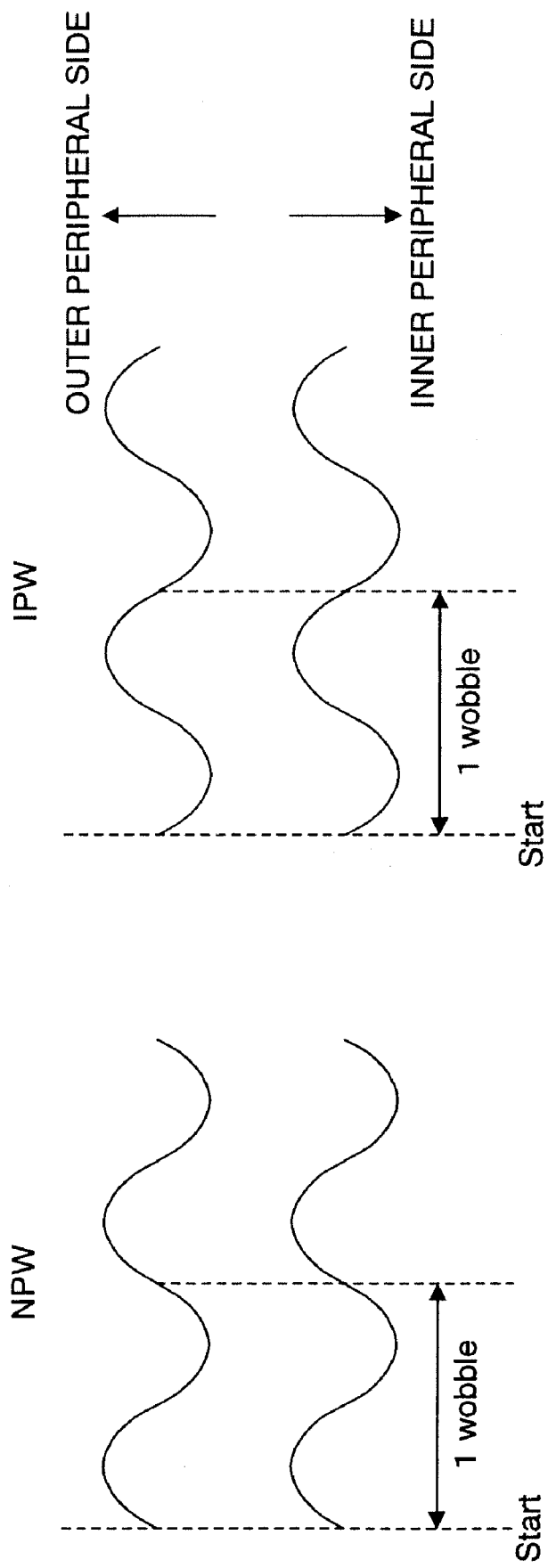
FIG. 67 is an explanatory view of relationship between the wobble shapes and address bits in an address bit area.

As shown in FIG. 66, the binary data of "1" or "0" is assigned to one address bit field 511, an assigning method of bit in this embodiment is shown in FIG. 67. As shown in the left side of FIG. 67, the wobble pattern which firstly meanders to the outer circumferential side from the start position of one wobble is called NPW (Normal Phase Wobble), and is assigned with data of "0". As shown in the right side, the wobble pattern which firstly meanders to the inner circumferential side from the start position of one wobble is called IPW (Invert Phase Wobble) and is assigned with data of "1".

Comparison of the wobble dispositions and recording places in the recordable information storage medium and the rewritable information storage medium in this embodiment will be outlined by using FIG. 68 and FIG. 69. (a) in FIG. 69 shows the wobble disposition and the record mark 107 formation place in the recordable information storage medium, and (b) and (c) in FIG. 69 shows the wobble disposition and the formation place of the record mark 107 in the rewritable information storage medium. In FIG. 69, the lateral direction is reduced, and the longitudinal direction is extended as compared with the actual enlarged view. A CLV (Constant Linear Velocity) method is adopted in the recordable information storage medium as shown in FIG. 68 and (a) in FIG. 69, and the slot position between the adjacent tracks and the border position of the address bit field (portion shown by the dashed line in FIG. 69) are deviated (in some places). The record mark 107 is formed on grooves areas 501 and 502. In this case, the wobble position between the adjacent tracks is asynchronous, and therefore, interference of the wobble signal between the adjacent tracks occurs. As a result, displacement of the slot position detected from the wobble signal in the wobble signal detection unit 135 in FIG. 5 and the displacement of the border position of the address bit field easily occur. In order to overcome the technically difficult point, occupancy rate of the modulation area is lowered ((J2) in FIG. 2) as will be described later, and thereby, the modulation areas between the adjacent tracks are displaced ((J5) in FIG. 3) in this embodiment.

On the other hand, in the rewritable information storage medium, "the land/groove recording method" which forms the record marks 107 in both the land area 503 and the groove areas 501 and 502 is adopted as shown in FIG. 68 and (b) in FIG. 69, and Zoned CAV (Zoned Constant Angular Velocity) that is the zone recording method which divides the data area into 19 zones from 0 to 18 as shown in FIG. 17 and synchronizes the wobbles between the adjacent tracks in the same zone is adopted. In the rewritable information storage medium in this embodiment, a large characteristic lies in that "the land/groove recording method" is adopted and the address information is recorded in advance by wobble modulation ((J4) in FIG. 3).

When "the groove recording method" which records the record marks 107 in only the groove areas 501 and 502 is adopted as shown in (a) in FIG. 69, if the recording is performed by shortening the track pitch which is the distance between the adjacent groove areas 501 and 502, the reproduction signal from the record mark 107 recorded on the one groove area 501 has the influence (crosstalk between the adjacent tracks) from the record mark 107 recorded on the adjacent groove area 502. Therefore, the track pitch cannot be shortened very much and thus, the recording density is limited.

As compared with this, when the record marks 107 are recorded on both the groove areas 501 and 502 and the land area 503 as shown in (b) in FIG. 69, if the level difference between the groove areas 501 and 502 and the land area 503 is set at $\lambda/(5n)$ to $\lambda/(6n)$ ($\lambda$: wavelength of the optical head light source utilized in reproduction, n: refractive index of the transparent substrate of an information storage medium in the aforesaid wavelength), there arises the phenomenon in which the crosstalk between the adjacent areas (land and groove) is cancelled off even if the track pitch is shortened. By utilizing this phenomenon, the track pitch can be shortened more with "land/groove recording method" than with "the groove recording method", and the recording capacity as the information storage medium can be increased.

If it is desired to have access to a predetermined position on the information storage medium in an unrecorded state (the state before the record marks 107 are recorded) with high accuracy, it is necessary to record address information on the information storage medium in advance. If this address information is recorded in advance in the form of embossed pit, it is necessary to form the record marks by avoiding the embossed pit area, and the recording capacity decreases by the amount of the embossed pit area.

As compared with this, by recording the address information by wobble modulation as in the rewritable information storage medium of this embodiment ((J4) in FIG. 3), the record mark 107 can be formed on the area subjected to wobble modulation, and therefore, high recording efficiency is obtained, thus increasing the recording capacity. By adopting "the land/groove recording method" and recording the address information in advance by wobble modulation as described above, the record mark 107 can be recorded with high efficiency, and the recording capacity as the information storage medium can be enhanced.

In accordance with the user demand that the recording capacity of a recordable information storage medium corresponds to the that of a reproduction-only information storage medium, the recording capacities of the recordable information storage medium and the reproduction-only information storage medium correspond to each other as known from the comparison of the columns of "the recording capacity usable by user" in FIG. 18 and FIG. 19. Accordingly, capacity as large as that of the rewritable information storage medium is not needed, and therefore, the recordable information storage medium adopts "the groove recording method" as shown in (a) in FIG. 69.

In the method shown in (b) in FIG. 69, the slot positions and the border positions (the portion shown by the dashed line in FIG. 69) of the address bit areas between the adjacent tracks are all correspond to each other, and therefore, interference of the wobble signals between the adjacent tracks does not occur. Instead, an indefinite bit area 504 occurs. In (c) in FIG. 69, the case where the address information of "0110" is recorded by wobble modulation in the upper groove area 501 is considered. When the address information of "0010" is recorded by wobble modulation in the lower groove area 502 next, the indefinite bit area 504 in the land shown in (c) in FIG. 69 occurs. The width of the land changes in the indefinite bit area 504 in the land, which is in the state where a wobble detection signal cannot be obtained from here. In order to eliminate this technical difficulty, a gray code ((J4β) in FIG. 2) is adopted in this embodiment as will be described later, and an indefinite bit area is also formed in the groove area by locally changing the width of the groove area ((J4γ) in FIG. 2), and the indefinite bits are distributively disposed in both the land area and groove area ((J4δ) in FIG. 2).

The point of this embodiment lies in that considering occurrence of the above described indefinite bit area 504, "the land/groove recording method" is used, and the wobble phase modulation of 180 degrees (±90 degrees) is incorporated in the wobble modulation for recording the address information ((J4α) in FIG. 3). When an indefinite bit occurs on the land as a result of changing the track number on the groove in the "L/G record+wobble modulation of the groove", there arises the problem that the entire level of the reproduction signal from the record mark recorded thereon changes and the error rate of the reproduction signal from the record mark there locally increases. However, the wobble modulation for the groove is performed by the phase modulation of 180 degrees (±90 degrees) as in this embodiment, and thereby, the land width changes in the form of bilateral symmetry and sine wave in the indefinite bit position on the land. Therefore, the entire level change of the reproduction signal from the record mark is in the very gentle shape close to the sine wave shape. When tracking is further performed stably, the indefinite bit position on the land can be estimated in advance. Therefore, according to this embodiment, the structure in which the reproduction signal quality is easily improved by performing correction processing in terms of circuit for the reproduction signal from the record mark can be realized.

By using FIG. 68, and FIGS. 70A and 70B, the address information which is recorded in advance by using wobble modulation in the recordable information storage medium and the rewritable information storage medium will be explained. FIG. 70A shows the address information content and the setting method of the address in the recordable information storage medium. FIG. 70B shows the address information content in the rewritable information storage medium and the setting method of its address. As for the detailed content, the physical recording place unit on the information storage medium is called "a physical segment block" in both of the recordable information storage medium and rewritable information storage medium, and the unit of data to be recorded (as a channel bit string) is called "a data segment". The data of one data segment is recorded in the area of one physical segment block length (the physical length of one physical segment block agrees to one data segment length when being recorded on the information storage medium). One physical segment block is constituted of seven physical segments. The user data of one ECC block shown in FIG. 37 is recorded in one data segment.

As shown in FIG. 68, since the "groove recording method" is adopted in CLV in the recordable information storage medium, the data segment address number Da is utilized as shown in FIG. 70A as the address information on the information storage medium. This data segment address may be called ECC block address (number), and physical segment block address (number). In order to further obtain detailed position information in the same data segment address Da, the physical segment sequence Ph is owned as the address information. Namely, each physical segment position on the recordable information storage medium is specified by the data segment address Da and the physical segment address sequence Ph. The data segment address Dais assigned with the numbers from the inner circumferential side along the groove areas 501, 502, 507 and 505 in the ascending order, and as for the physical segment sequence Ph, numbers from "0" to "6" are repeatedly set from the inner circumferential side to the outer circumference.

In the rewritable information storage medium, the data area is divided into 19 zones as shown in FIG. 17. Since the grooves are connected in the spiral shape, the length of one circumference of each of the adjacent tracks differs from each other between the adjacent tracks, and the length of the difference between the adjacent tracks is set for each zone to be within ±4 channel bits when the length of the channel bit interval T is made equal everywhere. The border positions of the physical segments or the physical segment blocks agree to each other (synchronize) between the adjacent tracks in the same zone.

Accordingly, the position information of the rewritable information storage medium is given in the zone address (number) Zo, track address (number) Tr, and the physical segment address (number) Ph as shown in FIG. 68 and FIG. 70B. The track address Tr expresses the track number from the inner circumference to the outer circumference in the same zone, and the same track address number Tr is set for a set of the adjacent land area and groove area (for example, the set of the land area 503 and the groove area 502, and the set of the land area 507 and the groove area 505).

The indefinite bit area 504 frequently appears in the part of "Ph=0" and "Ph=1" of the land area 507 in FIG. 70B, and therefore, it becomes impossible to decode the track address Tr. Therefore, recording of the record mark 107 in this area is prohibited. The physical segment address (number) Ph expresses the relative physical segment number in one circumference of the same track, and the number of the physical segment address Ph is assigned with the switching position of the zone in the circumferential direction as the reference. Namely, the start number of the physical segment address Ph is set at "0" as shown in FIG. 70B.

The recording form of the address information using wobble modulation in the recordable information storage medium in the embodiment of the present invention will be explained by using FIG. 71. The address information setting method using wobble modulation in this embodiment has the large characteristic in that "assignment is performed with the sync frame length 433 as the unit" shown in FIG. 64. As shown in FIG. 40, one sector is constituted of 26 sync frames, and one ECC block is constituted of 32 physical sectors as known from FIG. 34C. Therefore, one ECC block is constituted of 26×32=832 sync frames. Since the length of each of the lengths of the guard fields 442 to 468 existing between the ECC blocks 411 to 418 agrees to one sync frame length 433, and therefore, the length of one guard area field 462 and one ECC block 411 being added up is constituted of 832+1=833 sync frames.

Since 833 can be factorized into prime numbers as (1), the structure and disposition which take advantage of this characteristic is adopted.

$$833 = 7 \times 17 \times 7 \quad (1)$$

Figure 71:
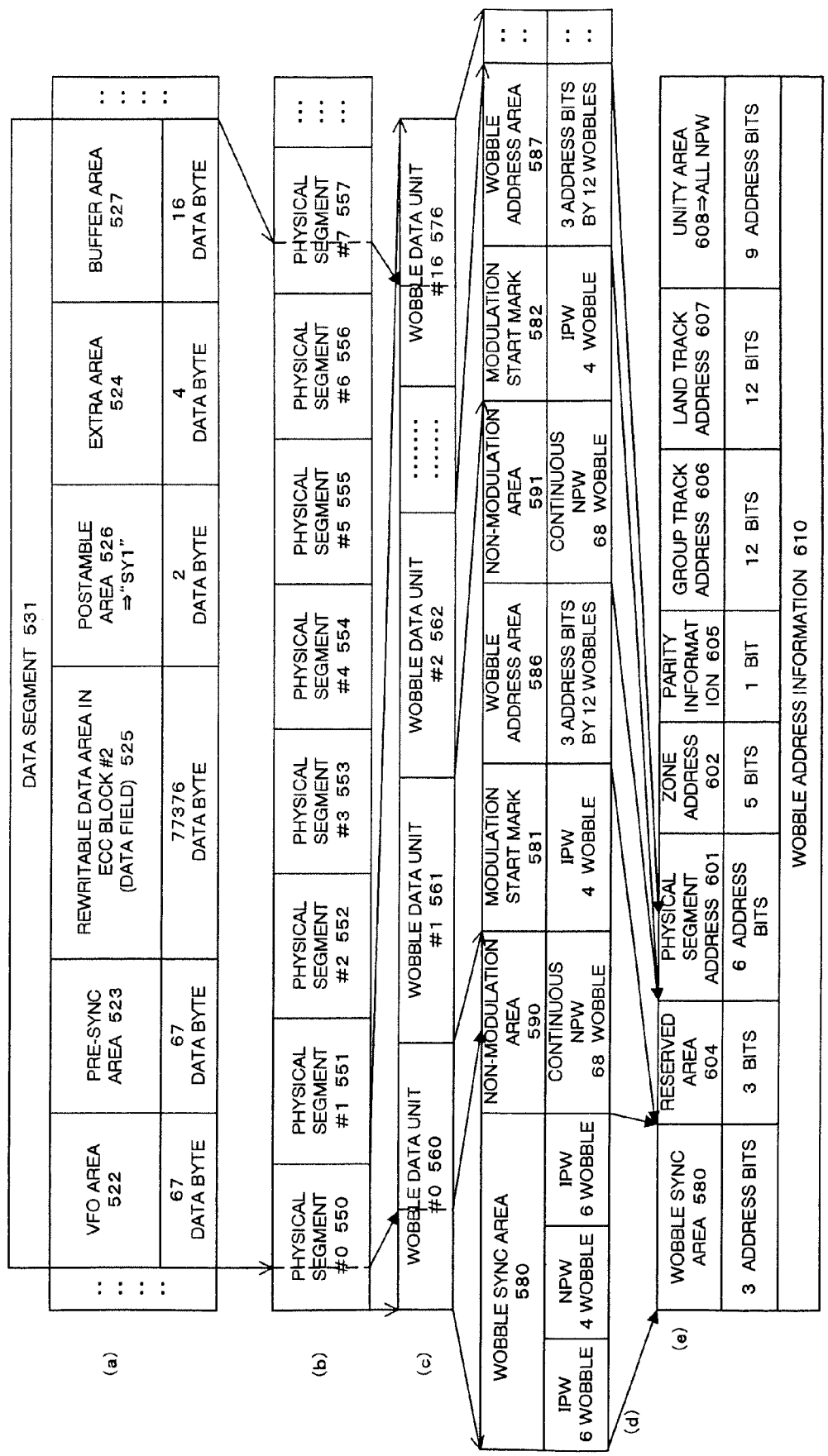
FIG. 71 is a wobble address format explanatory diagram on the recordable information storage medium of this embodiment.

Namely, as shown in (a) in FIG. 71, the area of which length equals to the lengths of one guard field and one ECC block added up is defined as a data segment 531 as the basic unit of the rewritable data (the structures in the data segments 490 shown in FIG. 65C agree to each other irrespective of the reproduction-only information storage medium, the rewritable information storage medium and the recordable information storage medium), and the area of the same length as the physical length of one data segment 531 is divided into "seven" physical segments #0 550 to #6 556 ((K3ε) in FIG. 4)), and the address information is recorded in advance in the form of wobble modulation for each of the physical segments #0 550 to #6 556. As shown in FIG. 71, the border position of the data segment 531 and the border position of the physical segment 550 do not agree to each other, but is deviated by the amount which will be described later.

Further, each of physical segments #0 550 to #6 556 is divided into 17 wobble data units (WDU: Wobble Data Unit) #0 560 to #16 576 ((J1) in FIG. 2, (c) in FIG. 71). It can be known that seven sync frames are assigned to the length of each of the wobble data units #0 560 to #16 576 from the expression (1). The physical segment is constituted of 17 wobble data units in this manner ((J1) in FIG. 1), and the length of the seven physical segments is conformed to the data segment length ((K3ε) in FIG. 4), whereby the sync frame border is secured in the range across the guard fields 442 to 468 and detection of the sync code 431 (FIG. 63) is facilitated. In the rewritable information storage medium, an error of the reproduction signal from the record mark easily occurs in the place of the indefinite bit area 504 (FIG. 69). However, since the number of physical sectors 32 constituting the ECC block and the number of physical segments 7 are in the relationship in which they are indivisible by each other (non-multiple relationship), the data recorded in the indefinite bit area 504 is prevented from being arranged on the straight line in the ECC block shown in FIG. 37, and the effect of being capable of preventing reduction of the error correction ability in the ECC block can be also provided.

Each of the wobble data units #0 560 to #16 576 is constituted of a modulation area with 16 wobbles and non-modulation areas 590 and 591 each with 68 wobbles as shown in (d) in FIG. 71. This embodiment has a large characteristic that occupancy ratio of the non-modulation areas 590 and 591 to the modulation area is made large to a large degree ((J2) in FIG. 3). The groove area or the land area always wobbles at a constant frequency in the non-modulation areas 590 and 591. Therefore, PLL (Phase Locked Loop) is performed by utilizing this non-modulation areas 590 and 591, it is made possible to stably extract (generate) a reference clock at the time of reproducing the record mark recorded in the information storage medium and the recording reference clock at the time of newly recording.

The occupancy ratio of the non-modulation areas 590 and 591 to the modulation area is made significantly large in this embodiment, the accuracy and extraction (generation) stability of extraction (generation) of the reproducing reference clock or extraction (generation) of the recording reference clock can be enhanced remarkably. Namely, when the phase modulation in the wobble is performed, if the reproduction signal is passed through the band pass filter for waveform shaping, the phenomenon that the detection signal waveform amplitude after shaping becomes small appears before and after the phase change point. Accordingly, there arises the problem that when the frequency of the phase change point by phase modulation becomes high, the waveform amplitude variation increases and the above described clock extraction accuracy reduces, while when the frequency of the phase change point in the modulation area is low on the other hand, bit shift at the time of detection of wobble address information tends to occur. Therefore, in the embodiment of the present invention, the effect of enhancing the above described clock extraction accuracy is provided by constituting the modulation area by the phase modulation and the non-modulation area, and making the occupancy rate of the non-modulation area high.

In the embodiment of the present invention, the switching position of the modulation area and the non-modulation area can be estimated in advance. Therefore, the signal of only the non-modulation area is detected by gating the non-modulation area for the above described clock extraction, and the above described clock extraction can be performed from the detection signal.

When shifting to the modulation area from the non-modulation areas 590 and 591, the modulation start marks 581 and 582 are set by using 4 wobbles, so that the wobble address areas 586 and 587 which are modulated in wobble come immediately after the modulation start marks 581 and 582 are detected. In order to actually extract a wobble address information 610, the wobble sync area 580 and each of the wobble address areas 586 and 587 in each of the physical segments #0 550 to #6 556 except for the non-modulation areas 590 and 591 and the modulation start marks 581 and 582 as shown in (d) in FIG. 71 are collected and disposed again as shown in (e) in FIG. 71.

As shown in (d) in FIG. 71, in each of the wobble address areas 586 and 587, three address bits are set with 12 wobbles ((J2α) in FIG. 3). Namely, continuous four wobbles constitute one address bit. In this manner, this embodiment takes the structure in which the address information is distributively disposed every three address bits ((J2α) in FIG. 3). If the wobble address information 610 is intensively recorded at one spot in the information storage medium, it becomes difficult to detect all information when dust or a flaw attaches to the surface. As shown in (d) in FIG. 71, the wobble address information 610 is distributively disposed at every three address bits (12 wobbles) included in each of the wobble data units 560 to 576, and a sizable amount of information is recorded in every address bits which are an integral multiple of three address bits. Therefore, there is provided the effect of making it possible to detect information of the other information when information detection of one spot is difficult due to influence of dust or a flaw.

As described above, by distributively disposing the wobble address information 610, and by conclusively disposing the wobble address information 610 for each of the physical segments 550 to 557 ((J1α) in FIG. 2), the address information can be known for each of the physical segments 550 to 557. Therefore, when the information recording and reproducing apparatus accesses the medium, the current position can be known by the physical segment unit.

In this embodiment, the NRZ method is adopted as shown in FIG. 66, and therefore, the phase does not change in the continuous 4 wobbles in the wobble address areas 586 and 587. By utilizing this characteristic, the wobble sync area 580 is set. Namely, by setting the wobble pattern which is difficult to generate in the wobble address information 610 is set in the wobble sync area 580 ((J3) in FIG. 3), position discrimination of the wobble sync area 580 is facilitated. The embodiment of the present invention has the characteristic in that in contrast to the wobble address areas 586 and 587 in which continuous four wobbles constitute one address bit, one address bit length is set at the length other than four wobbles at the position of the wobble sync area 580. Namely, in the wobble sync area 580, the wobble pattern change such as "6 wobbles→4 wobbles→6 wobbles" which is different from 4 wobbles and which cannot occur in the wobble address areas 586 and 587 is set in the area where wobble bit is "1".

By utilizing the method of changing the wobble cycle ((J3α) in FIG. 3) as described above as the concrete method for setting the wobble pattern which cannot occur in the wobble address areas 586 and 587 for the wobble sync area 580, the following effects 1 and 2 are provided.

1. Wobble detection (determination of a wobble signal) can be continued stably without breakage of the PLL concerning the slot position 512 (FIG. 66) of the wobble performed in the wobble signal detection unit 135 in FIG. 5.

2. The detection of the wobble sync area 580 and the modulation start marks 561 and 582 can be easily detected by the deviation of the address bit border position performed in the wobble signal detection unit 135 in FIG. 5.

As shown in (d) in FIG. 71, the characteristic of this embodiment lies in that the wobble sync area 580 is formed of 12 wobble cycles and the length of the wobble sync area 580 is conformed to the length of three address bits ((J3β in FIG. 3). Thereby, all the modulation areas (16 wobbles) in one wobble data unit #0 560 are assigned to the wobble sync are 580, and thereby, detection easiness of the start position (placement position of the wobble sync area 580) of the wobble address information 610 is enhanced.

As shown in (c) in FIG. 71, the wobble sync area 580 is disposed in the initial wobble data unit #0 560 in the physical segment #0 550. By disposing the wobble sync area 580 at the head position in the physical segment #0 550 ((J3γ) in FIG. 3) in this manner, there arises the effect of being capable of easily extracting the border position of the physical segment by only detecting the position of the wobble sync area 580.

The modulation start marks 581 and 582 are disposed at the head position prior to the wobble address areas 586 and 587 in the wobble data units #1 561 and #2 562, and the waveform of IPW shown in FIG. 67 is set. In the non-modulation areas 590 and 591 disposed at the position prior to this, consecutive waveform of NPW is set. In the wobble signal detection unit 135 shown in FIG. 5, the switching point from NPW to IPW is detected, and the positions of the modulation start marks 581 and 582 are extracted.

As shown in (e) in FIG. 71, the content of the wobble address information 610 is expressed by the following 1 to 5.

1. Track Addresses 606 and 607

These addresses mean the track numbers in the zone, and the groove track address 606 of which address is defined on the groove area (indefinite bit is not included→indefinite bit occurs on the land), and the land track address 607 of which address is defined on the land (indefinite bit is not included→indefinite bit occurs on the groove) are alternately recorded. Concerning only the track addresses 606 and 607, the track number information is recorded in the gray code shown in FIG. 72 (details will be described later)

2. Physical Segment Address 601

This is the information showing the physical segment number in the track (in one circumference in the information storage medium 221). The number of physical segments in the same track is shown by the "number of physical segments per track" in FIG. 17. Accordingly, the maximum value of the physical segment address 601 in each zone is specified by the number shown in FIG. 17.

3. Zone Address 602

This shows the zone number in the information storage medium 221 and the value of "n" of "Zone (n)" shown in FIG. 17 is recorded.

4. Parity Information 605

This is the thing set for error detection at the time of reproduction from the wobble address information 610, and is the information of adding up 14 address bits from the reserved information 604 to the zone address 602 in each address bit unit individually, and displaying whether the addition result is odd number or even number. The value of the parity information 605 is set so that the result of taking the Exclusive OR in each address bit unit with respect to the total of 15 address bits including one address bit of this address parity information 605 becomes "1".

5. Unity Area 608

The content of each of the wobble data units #0 560 to #16 576 is set to be constituted of the modulation area of 16 wobbles and the non-modulation areas 590 and 591 each with 68 wobbles as described above, and the occupancy ratio of the non-modulation areas 590 and 591 to the modulation area is made significantly large. Further, the occupancy ratio of the non-modulation areas 590 and 591 is made large, and thereby, accuracy and stability of the extraction (generation) of the reproducing reference clock or the recording reference clock are further enhanced.

The place which includes a unity area 608 shown in (e) in FIG. 71 corresponds to the wobble data unit #16 576 in (c) in FIG. 71 and the whole of the wobble data unit #15 just before it though not shown. In the monotone information 608, all of 6 address bits are "0". Therefore, the modulation start marks 581 and 582 are not set in the wobble data unit #16 576 including the monotone information in which all are NPWs and the wobble data unit #15 directly before it though not shown, and all of them are the non-modulation area with uniform phase.

The number of address bits assigned to each of the above described information is shown in (e) in FIG. 71.

As described above, the wobble address information 610 is separated every three address bits and is distributively disposed in the wobble data units 560 to 576. Even if a burst error occurs due to dust or a flaw on the surface of the information storage medium, the probability of an error spreading across the different wobble data units 560 to 576 is very low. Therefore, as the place where the same information is recorded, the number of times of spreading across different wobble data units is reduced as much as possible, and a contrivance is made to conform the break of each information to the border positions of the wobble data units 560 to 576. Thereby, even if specific information cannot be read as a result that a burst error occurs doe to dust or a flaw on the surface of an information storage medium, the other information recorded in each of the other wobble data units 560 to 576 is made readable, and thereby, reproduction reliability of the wobble address information is enhanced. More specifically, as shown in (e) in FIG. 71, nine address bits are assigned to the unity area 608, and thereby, the border position between the unity area 608 and a land track address 607 immediately before it and the border position of the wobble data unit are made to correspond to each other ((J3δ) in FIG. 3).

From the same reason, the zone address 605 expressed by five address bits, and the parity information 605 expressed by one address bit are made adjacent to each other ((J4ε) in FIG. 3), and thereby, the total value of the address bits of both of them is made six address bits (corresponding to address bits of two wobble data units).

It is also the large characteristic of the embodiment of the present invention that the unity area 608 is disposed at the end in the wobble address information 610 ((J3ε) in FIG. 3) as shown in (e) in FIG. 71. As described above, the wobble waveform becomes that of NPW in the unity area 608, and therefore, NPW substantially continues in succession in the three consecutive wobble data units 576. By utilizing this characteristic, there is provided the effect that the position of the unity area 608 disposed at the end of the wobble address information 610 can be easily extracted by the wobble signal detection unit 135 in FIG. 5 finding the place where NPW continues in succession by the length of three wobble data units 576, and the start position of the wobble address information 610 can be detected by utilizing the position information.

Among various kinds of address information shown in FIG. 71, FIG. 70B or FIG. 68, the physical segment address 601 and the zone address 602 show the same values between the adjacent tracks, but the values of the groove track address 606 and the land track address 607 change between the adjacent tracks. Therefore, the indefinite bit area 504 shown in (c) in FIG. 69 appears in the area where the groove track address 606 and the land track address 607 are recorded. In order to reduce the indefinite bit frequency, the address (number) is expressed by using the gray code of which example is shown in FIG. 72 as for the groove track address 606 and the land track address 607 in this embodiment. The gray code means the code after conversion when the original value changes by "1" as in FIG. 72 changes by only "one bit" anywhere. Thereby, the indefinite bit frequency is reduced, and signal detection of not only a wobble detection signal but also a reproduction signal from the record mark can be stabilized.

Figure 73:
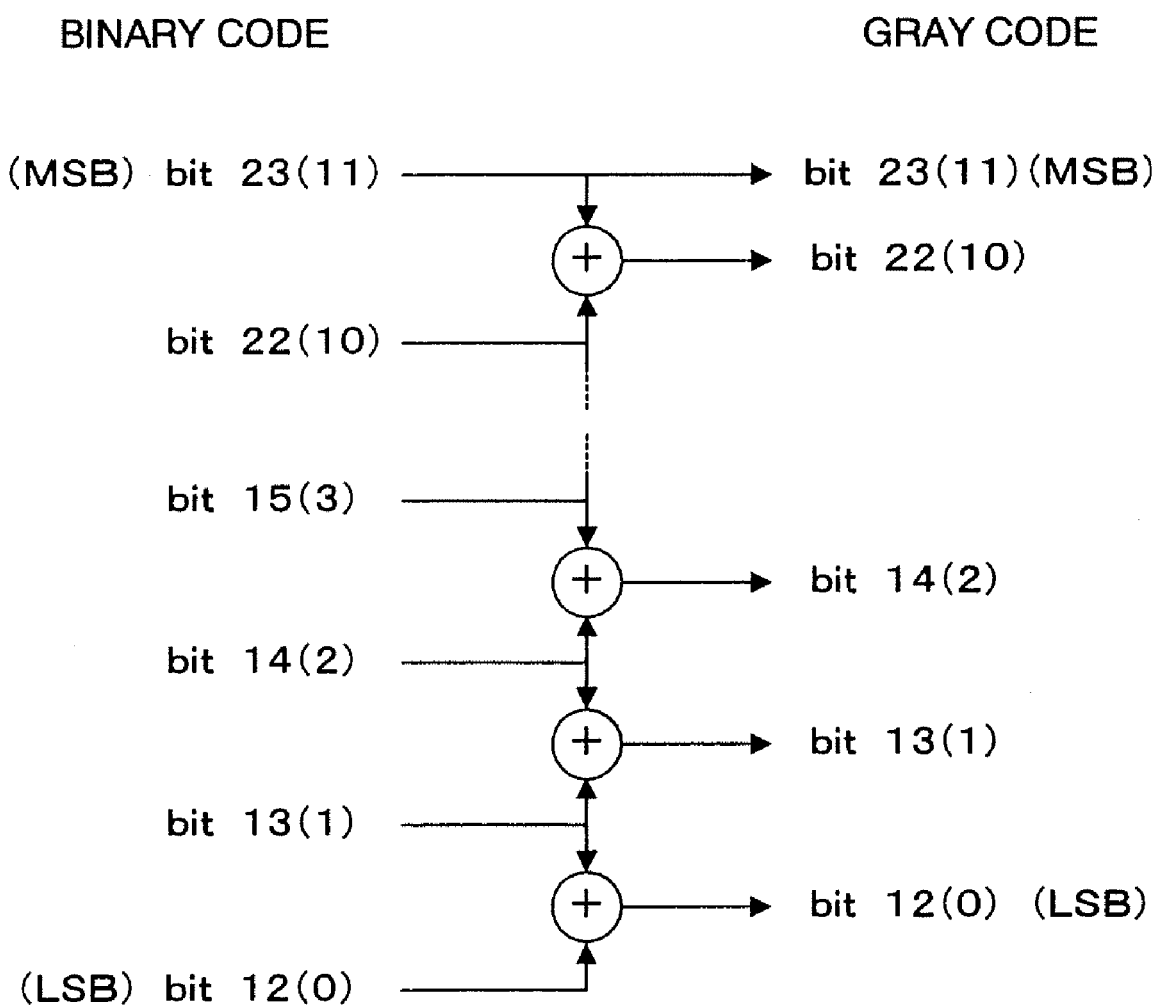
FIG. 73 is an explanatory diagram of a gray code conversion algorithm.

The algorithm for concretely realizing gray code conversion shown in FIG. 72 is shown in FIG. 73. For the original binary code, the most significant 11th bit is conformed to the 11th bit of the gray code as they are. Concerning the lower codes from them, the result of adding (taking Exclusive OR) the binary code of "the mth bit" and the binary code of "the m+1th bit" which is upper than it by one bit is converted into the gray code of "the mth bit".

Figure 74:
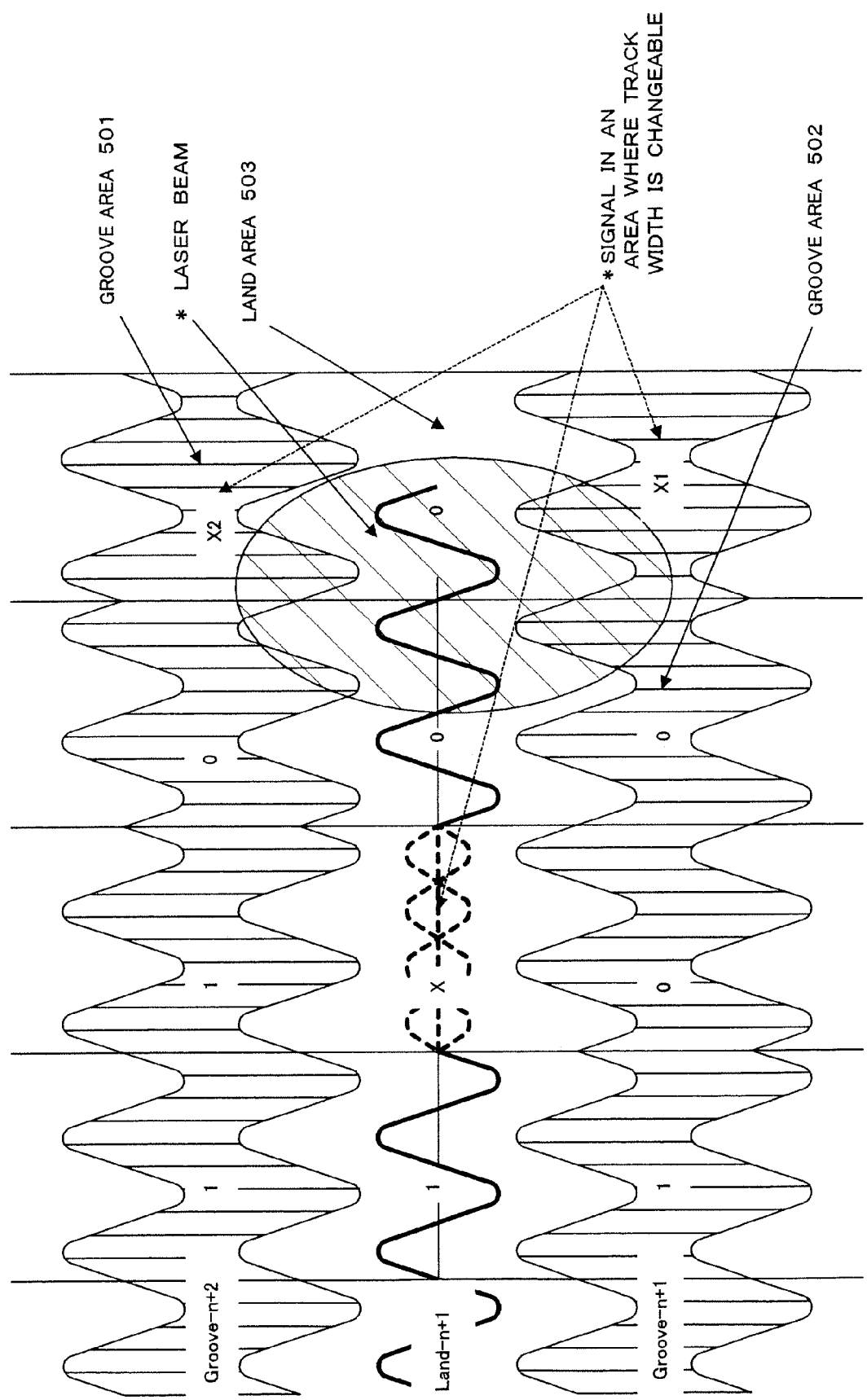
FIG. 74 is an explanatory diagram showing an example in which an indefinite bit area is formed in a groove area.

In this embodiment, the contrivance to distributively dispose the indefinite bit area in the groove area ((J4γ) in FIG. 3) is made. More specifically, by partially changing the widths of the groove areas 501 and 502, the width of the land area 503 sandwiched therebetween is made constant from FIG. 74. The widths of the groove areas 501 and 502 can be changed by locally changing the light amount of laser light for exposure at the point of time when the groove areas 501 and 502 are made in the master recording apparatus for the information storage medium. Thereby, the land area is also given the area in which an indefinite bit does not enter and the track address is defined, and thereby, address detection with high accuracy is also made possible in the land area. More specifically, the land width is made constant by using the above described method in the place in the land area where the information of the land track address 607 in (e) in FIG. 71 is recorded. Thereby, the address information can be detected stably without inclusion of an indefinite bit concerning the land track address 607 in the land area.

In this embodiment, indefinite bits are distributively disposed ((J4σ) in FIG. 3) in both the land area and the groove area. More specifically, at the rightmost side in FIG. 74, the widths of the groove areas 501 and 502 are changed to make the width of the land area 503 constant. At a slightly left side from the center of FIG. 74, the widths of the groove areas 501 and 502 are kept constant, but the width of the land area 503 locally changes. The groove width is made constant in the place in the groove area where the information of the groove track address 606 is recorded in (e) in FIG. 71 by utilizing this method. Therefore, concerning the groove track address 606 in the groove area, the address information can be detected stably without inclusion of the indefinite bit. If indefinite bits are intensively disposed in either one of the land area or the groove area, the frequency at which the error detection occurs becomes very high at the time of reproduction of address information at the part where the indefinite bits are intensively disposed. The risk of error detection is distributed by distributively disposing the indefinite bits in the land area and the groove area, and the system which facilitates to stably detect the address information totally can be provided. The area where the track address is defined without inclusion of the indefinite bits can be estimated in advance in each of the land area and groove area by distributively disposing indefinite bits in both the land area and the groove area like this, and therefore, track address detection accuracy is enhanced.

As already explaining by using FIG. 68, the record mark is formed on the groove area and the CLV recording method is adopted in the recordable information storage medium of this embodiment. It is already described that in this case, the wobble slot positions are displaced between the adjacent tracks, and therefore, interference between the adjacent wobbles is easily exerted on the wobble reproduction signal. In order to remove this influence, a contrivance to shift the modulation area ((J5) in FIG. 3) is made so that the modulation areas of the adjacent tracks do not overlap each other in this embodiment.

More specifically, it is made possible to set a primary position 701 and a secondary position 702 in the position of the modulation area as shown in FIG. 75. Basically, the method in which all the modulation areas are temporarily disposed at the primary position as the placement position, and if there arises the place where the modulation areas partially overlap each other between the adjacent tracks, the modulation area is partially shifted to the secondary position. For example, when the modulation area of the groove area 505 is set at the primary position in FIG. 75, the modulation area of the adjacent groove area 502 and the modulation area of the groove area 506 partially overlap each other, and therefore, the modulation area of the groove area 505 is shifted to the secondary position. Thereby, interference between the modulation areas of the adjacent tracks in the reproduction signal from the wobble address is prevented, and the effect of being capable of reproducing the wobble address stably can be provided.

The concrete primary position and the secondary position concerning the modulation area are set by switching the positions in the same wobble data unit. In this embodiment, the occupancy rate of the non-modulation area is set higher than that of modulation area ((J2) in FIG. 3), and therefore, switching of the primary position and the secondary position can be performed by only changing the position in the same wobble data unit. Thereby, the same placement of the physical segments 550 to 557 and placement of the wobble data units 560 to 576 as shown in (b) and (c) in FIG. 71 as in the rewritable information storage medium also becomes possible in the recordable information storage medium, and compatibility with different kinds of media can be enhanced. More specifically, in the primary position 701, the modulation area 598 is disposed at the head position in each of the wobble data units 560 to 571 as shown in (a) and (c) in FIG. 76. In the secondary position 702, the modulation area 598 is disposed at the latter half position in each of the wobble data units 560 to 571 as shown in (b) and (d) in FIG. 76.

In the recordable information storage medium of this embodiment, the first three address bits of the wobble address information 610 are utilized for the wobble sync area 580 and are recorded in the wobble data unit #0 560 disposed initially in each of the physical segments 550 to 556 as in the rewritable information storage medium in (e) in FIG. 71. The modulation area 598 shown in each of (a)

and (b) in FIG. 76 shows the wobble sync area 580. The initial IPW areas in the modulation area 598 in (c) and (d) in FIG. 76 correspond to the modulation start marks 581 and 582 shown in (d) in FIG. 71. The address bits #2 to #0 in the modulation areas 598 in (c) and (d) in FIG. 76 correspond to the wobble address areas 586 and 587 shown in (d) in FIG. 71.

The characteristic of this embodiment lies in that the wobble sync patterns in the wobble sync areas are changed in the primary position 701 and the secondary position 702 ((J5β) in FIG. 3). In (a) in FIG. 76, as the wobble sync pattern of the wobble sync area 580 which is the modulation area 598, six wobbles (cycles) are assigned to each IPW and four wobbles (cycles) are assigned to NPW. On the other hand, in the modulation area 598 in (b) in FIG. 76, the number of wobbles (wobble cycles) which are assigned to each IPW is 4, but six wobbles (cycles) are assigned to NPW. In the wobble signal detection unit 135 in FIG. 5, by only detecting the difference in the wobble sync pattern immediately after rough access, the position of the modulation area (the difference between the primary position 701 and the secondary position 702) is known, and it is easy to estimate the place of the modulation area to be detected next in advance. Therefore, preparation for detection of the modulation area to come next can be made in advance, and therefore, signal detection (discrimination) accuracy in the modulation area can be enhanced.

Other examples except for the examples shown in (a) and (b) in FIG. 76 are shown in (b) and (d) in FIG. 77 concerning the relationship between the position of the modulation area and the wobble sync pattern. For comparison, the example of (a) in FIG. 76 is shown in (a) in FIG. 77 and the example shown in (b) in FIG. 76 is shown in (c) in FIG. 77. In (b) and (d) in FIG. 77, the numbers of wobbles which are assigned to the IPW and the NPW in the modulation area 598 are made opposite to those in (a) and (c) in FIG. 77 (four wobbles are assigned to the IPW and six wobbles are assigned to the NPW).

The application range of the primary position 701 and the secondary position 702 shown in FIG. 76 and FIG. 77, namely, the range in which the primary position or the secondary position continues in succession is defined to be the range of the physical segment in this embodiment. Namely, as shown in FIG. 78, three kinds (plurality of kinds) from (a) to (c) of disposition patterns of the modulation area in the same physical segment are given ((J5α) in FIG. 1), the wobble signal detection unit 135 in FIG. 5 identifies the disposition pattern of the modulation area in the physical segment from the wobble sync pattern or the information of the type identification information 721 of the physical segment which will be described later as described above, whereby the position of the other modulation area 598 in the same physical segment can be estimated in advance. As a result, detection of the modulation area to come next can be prepared in advance, and therefore, the effect of being capable of enhancing signal detection (discrimination) accuracy in the modulation area is provided.

In FIG. 78, the second stage shows the disposition of the wobble data unit in the physical segment, and the number described in each frame in the second stage shows the wobble data unit number in the same physical segment. The 0th wobble data unit is called a sync field 711 as shown in the first stage, and the wobble sync area exists in the modulation area in the sync field. The first to the eleventh wobble data units are each called an address field 712, and the address information is recorded in the modulation area in this address field 712. The twelfth to the sixteenth wobble data unit is a unity field 713 in which all the wobble patterns are NPW.

Marks "P" described in the third stage and thereafter in FIG. 78 show that the modulation area is at the primary position in the wobble data unit, and marks "S" shows that the modulation area in the wobble data unit is at the secondary position. The mark "U" shows that the wobble data unit is included in the unity field 713 and the modulation area does not exist. The disposition pattern of the modulation area shown in (a) in FIG. 78 shows that the entire physical segment becomes the primary position, while the disposition pattern of the modulation area shown in (b) in FIG. 78 shows that the entire physical segment becomes the secondary position. In (c) of FIG. 78, the primary position and the secondary position are mixed in the same physical segment, the modulation area becomes the primary position in the 0th to the fifth wobble data units, and the modulation area becomes the secondary position in the sixth to the eleventh wobble data units. As shown in (c) in FIG. 78, by disposing the primary positions and the secondary positions half-and-half in the area with the sync field 711 and the address field 712 added up, and thereby, overlap of the modulation areas between the adjacent tracks can be finely prevented.

FIG. 79 shows an embodiment relating to a data structure in wobble address information of a recordable type information recording medium. FIG. 79(a) shows a data structure in wobble address information of a rewriteable type information recording medium for comparison. FIGS. 79(b) and (c) show two embodiments relating to data structures in wobble address information of recordable type information recording mediums.

In wobble address area 610, 3 address bits is set with 12 wobble (see FIG. 66). In other words, 1 address bit is constituted by 4 successive wobbles. In the embodiment, address information are distributively disposed every 3 address bits. If the wobble address information 610 is intensively recorded at one spot in the information storage medium, it becomes difficult to detect all information when dust or a flaw attaches to the surface. In the embodiment, the wobble address information 610 is distributively disposed at every three address bits (12 wobbles) included in each of the wobble data units 560 to 576, and a sizable amount of information is recorded in every address bits which are an integral multiple of three address bits. Therefore, there is provided the effect of making it possible to detect information of the other information when information detection of one spot is difficult due to influence of dust or a flaw.

As described above, by distributively disposing the wobble address information 610, and by conclusively disposing the wobble address information 610 for each of the physical segments, the address information can be known for each of physical segments. Therefore, when the information recording and reproducing apparatus accesses the medium, the current position can be known by the physical segment unit.

As for reference, in wobble address information 610 of rewritable type information recording medium, the following information (1) to (4) are recorded.

(1) Physical Segment Address 601

This is the information showing the physical segment number in the track (in one circumference in the information storage medium 221).

(2) Zone Address 602

This shows the zone number in the information storage medium 221.

(3) Parity Information 605

This is the thing set for error detection at the time of reproduction from the wobble address information 610, and is the information of adding up 14 address bits from the reserved information 604 to the zone address 602 in each address bit unit individually, and displaying whether the addition result is odd number or even number. The value of the parity information 605 is set so that the result of taking the Exclusive OR in each address bit unit with respect to the total of 15 address bits including one address bit of this address parity information 605 becomes "1".

(4) Unity Area 608

The content of each of the wobble data units is set to be constituted of the modulation area of 16 wobbles and the non-modulation areas 590 and 591 each with 68 wobbles as described above, and the occupancy ratio of the non-modulation areas 590 and 591 to the modulation area is made significantly large. Further, the occupancy ratio of the non-modulation areas 590 and 591 is made large, and thereby, accuracy and stability of the extraction (generation) of the reproducing reference clock or the recording reference clock are further enhanced. In unity area 608, all NPW areas exist continuously and unity area 608 is non-modulation area of uniform phase.

The number of address bits assigned to each of the above described information is shown in (e) in FIG. 71. As described above, the wobble address information 610 is separated every three address bits and is distributively disposed in the wobble data units. Even if a burst error occurs due to dust or a flaw on the surface of the information storage medium, the probability of an error spreading across the different wobble data units is very low. Therefore, as the place where the same information is recorded, the number of times of spreading across different wobble data units is reduced as much as possible, and a contrivance is made to conform the break of each information to the border positions of the wobble data units. Thereby, even if specific information cannot be read as a result that a burst error occurs doe to dust or a flaw on the surface of an information storage medium, the other information recorded in each of the other wobble data units 560 to 576 is made readable, and thereby, reproduction reliability of the wobble address information is enhanced.

It is also the large characteristic of the embodiment of the present invention that the unity area 608, 609 is disposed at the end in the wobble address information 610 as shown in (a)-(c) in FIG. 79. As described above, the wobble waveform becomes that of NPW in the unity area 608, 609 and therefore, NPW substantially continues in succession in the three consecutive wobble data units 576. By utilizing this characteristic, there is provided the effect that the position of the unity area 608 disposed at the end of the wobble address information 610 can be easily extracted by the wobble signal detection unit 135 in FIG. 5 finding the place where NPW continues in succession by the length of three wobble data units 576, and the start position of the wobble address information 610 can be detected by utilizing the position information.

Among various kinds of address information shown in FIG. 79(*a*), the physical segment address 601 and the zone address 602 show the same values between the adjacent tracks, but the values of the groove track address 606 and the land track address 607 change between the adjacent tracks.

Therefore, the indefinite bit area 504 appears in the area where the groove track address 606 and the land track address 607 are recorded. In order to reduce the indefinite bit frequency, the address (number) is expressed by using the gray code as for the groove track address 606 and the land track address 607 in this embodiment. The gray code means the code after conversion when the original value changes by "1" changes by only "one bit" anywhere. Thereby, the indefinite bit frequency is reduced, and signal detection of not only a wobble detection signal but also a reproduction signal from the record mark can be stabilized.

As shown by FIG. 79(*b*)-79(*c*), in recordable type information recording medium as same as in rewritable type information recording medium, wobble sync area 680 is allocated at a starting position of physical segment to enable to easily detect a starting position of physical segment or a border position between adjacent physical segments. The type identifying information 721 of the physical segment shown in (b) in FIG. 79 shows the position of the modulation area in the physical segment as the wobble sync pattern in the aforementioned wobble sync area 580. As a result, the position of the other modulation area 598 in the same physical segment can be estimated in advance, and detection of the modulation area to come next can be prepared in advance, thus providing the effect of being capable of enhancing signal detection (discrimination) accuracy in the modulation area.

The following is expressed in concrete.

When the type identifying information 721 of the physical segment is "0", all the physical segments shown in (a) in FIG. 78 are the primary positions, or are in the mixed state of the primary positions and the secondary positions shown in (c) in FIG. 78.

When the type identifying information 721 of the physical segment is "1", all the physical segments are the secondary positions as shown in (b) in FIG. 78.

As another example of the above described example, the position of the modulation area in the physical segment can be shown by the combination of the wobble sync pattern and the type identifying information 721 of the physical segment ((J5δ) in FIG. 3). By combining the aforesaid two kinds of information, three or more kinds of position patterns of the modulation areas shown in (a) to (c) in FIG. 78 can be expressed, and a plurality of position patterns of the modulation areas can be given. The relationship between a combination method of the wobble sync pattern and the type identifying information of the physical segment in another example and the position pattern of the modulation area is shown in FIG. 80.

In FIG. 80, ⟪⟪A⟫⟫ shows the aforementioned combination, and shows the primary position or the secondary position with the wobble sync pattern, and shows whether all of the physical segment is at the secondary position with the type identifying information 721 of the physical segment ("1" when all of it is at the secondary position, and in the other cases, "0"). In the case of ⟪⟪A⟫⟫, and in the case of mixture, the wobble sync pattern in (a) of FIG. 77 is recorded in the primary position, and the wobble sync pattern of (c) in FIG. 77 is recorded in the secondary position.

On the other hand, in the example of ⟪⟪B⟫⟫, it is shown whether all positions in the physical segment agree to each other, or are mixed ("1" in the case where all positions agree, and "0" in the case of mixture) with the type identifying information 721 of the physical segment.

In the example of 《《《C》》》, it is shown whether all positions in the physical segment agree or mixed by the wobble sync pattern, and it is shown whether the secondary positions exist or not in the physical segment with the type identifying information 721 of the physical segment ("1" in the case where the secondary position exists even partially, "0" in the other cases).

In the above described embodiment, the positions of the modulation areas in the physical segment in which the wobble sync area 580 and the type identifying information 721 of the physical segment are included are shown. However, the present invention is not limited to this, and, for example, as another example, the wobble sync area 580 and the type identifying information 721 of the physical segment may show the position of the modulation area in the physical segment which will come next. Thereby, in the case of continuously tracking along the groove area, there arises the effect that the position of the modulation area in the next physical segment is known in advance, and the preparation time for modulation area detection can be taken longer.

Layer number information 722 in the recordable information storage medium shown in (b) in FIG. 79 shows which of the one side surface with one recording layer and the one side surface with two recording layers the recording layer indicates, and means the following:

"0" means the "L0 layer" (front side layer at the laser light incident side) in the case of the one side surface with one recording layer medium or one side surface with two recording layers.

"1" means "L1 layer" (back side layer of the laser light incident side) of the one side surface with two recording layers.

Physical segment sequence information 724 shows the position sequence of the relative physical segments in the same physical segment block as shown in FIG. 68, FIGS. 70A and 70B. As is obvious by comparing with (a) in FIG. 79, the head position of the physical segment sequence information 724 in the wobble address information 610 agrees to the head position of the physical segment address 601 in the rewritable information storage medium. By conforming the physical segment sequence information position to the rewritable type ((J5ϵ) in FIG. 3), compatibility with the different types of media is enhanced, and commonality and simplification of the address detecting control program using the wobble signal in the information recording and reproducing apparatus in which both a rewritable information storage medium and a recordable information recording medium can be used.

As explained with FIG. 68, and FIGS. 70A and 70B, the data segment address 725 describes the address information of the data segment in numbers.

As is already explained, one ECC block is constituted by 32 sectors in this embodiment. Accordingly, the lower 5 bits of the physical sector number of the sector disposed at the head in a specific ECC block agrees to the sector number of the sector disposed at the head position in the adjacent ECC block. When the physical sector number is set so that the lower 5 bits of the physical sector number of the sector disposed at the head in the ECC block become "00000", the higher values from the sixth lowest bits of the physical sector number of all the sectors existing in the same ECC block agree to each other.

Accordingly, the lower 5-bit data of the physical sector number of the sector which exists in the above described same ECC block is removed, and the address information from which the data of the sixth lowest bit or higher is extracted is set as the ECC block address (or the ECC block address number). The data segment address 725 (or the physical segment block number information) which is previously recorded by the wobble modulation agrees to the above described ECC block address. Therefore, when the position information of the physical segment block by the wobble modulation is expressed by the data segment address, the data amount decreases by 5 bits as compared with the case where the position information is expressed by the physical sector number, and therefore, there arises the effect of simplifying the current position detection at the time of access.

A CRC code 726 is the CRC code (error correction code) for 24 address bits from the type identifying information 721 of the physical segment to the data segment address 725. If the wobble modulation signal is partially read erroneously, it can be partially corrected by this CRC code 726.

Each of the address bits shown in the lowest stage in (b) of FIG. 79 is used for describing the information content. In the writable information storage medium, the area corresponding to the remaining 15 address bits is assigned to the unity area 609, and five wobble data units from the 12th to the 16th are all NPW (the modulation area 598 does not exist).

Figure 81:
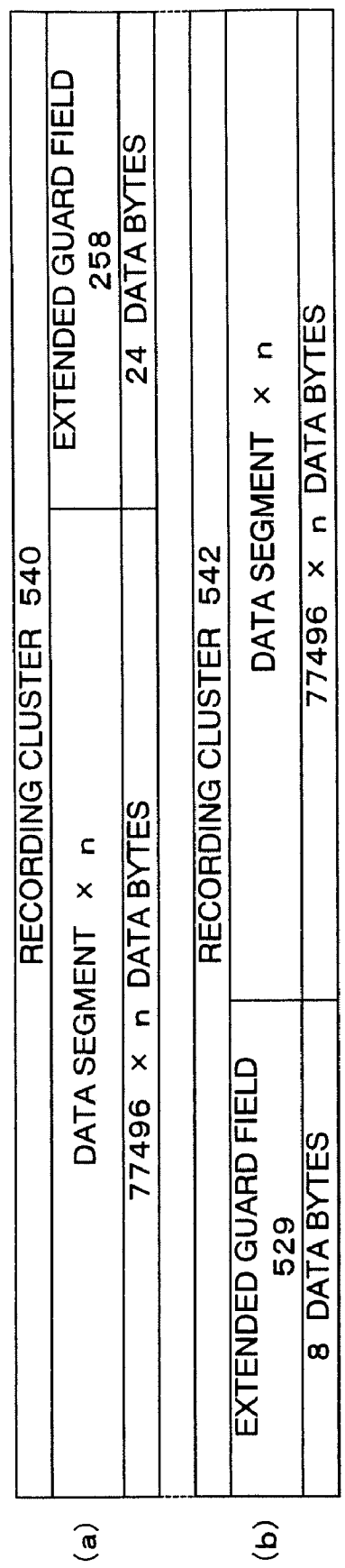
FIG. 81 is a layout explanatory diagram in a recording cluster.

A method for recording the aforementioned data segment data into the physical segment or the physical segment block in which the address information is recorded in advance by wobble modulation explained above will be explained. In both of the rewritable information storage medium and the recordable information storage medium, the data is recorded in the recording cluster unit as the unit in which the data is continuously recorded. The layout of the recording cluster is shown in FIG. 81. In each of the recording clusters 540 and 542, one or more (integer) of data segments 531 having the data structure shown in (a) in FIG. 71 continues in succession, and at the head or the end of the data segments 531, the extension guard fields 528 and 529 are set.

The extension guard fields 528 and 529 are set in the recording clusters 540 and 542. They are for partially overwriting by physically overlapping between the adjacent recording clusters so that a gap does not occur between the adjacent recording clusters, when data is newly recorded or rewritten in the unit of the recording clusters 540 and 542. As the positions of the extension guard fields 528 and 529 which are set in the recording clusters 540 and 542, the extension guard field 528 is disposed at the end of the recording cluster 540 in the example in (a) in FIG. 81 ((K3γ) in FIG. 4).

In the case of using this method, the extension guard field 528 comes after the postamble area 526 shown in (a) in FIG. 71. Therefore, the postamble area 526 is not mistakenly broken at the time of rewriting especially in the rewritable information storage medium, protection of the postamble area 526 at the time of rewriting can be performed, and reliability in position detection using the postamble area 526 at the time of data reproduction can be secured. As another example, the extension guard field 529 can be disposed at the head of the recording cluster 542 as in (b) in FIG. 81 ((K3δ) in FIG. 4).

In this case, as known by combining (b) in FIG. 81 and (a) in FIG. 71, the extension guard field 529 comes immediately before the VFO area 522, and therefore, the VFO area 522 can be taken to be sufficiently long at the time of rewriting or recording. Therefore, PLL lead in time concerning the reference clock at the time of reproducing the data field 525 can be taken to be long, and reproduction reliability of the data recorded in the data field 525 can be enhanced. By adopting the structure in which the recording cluster expressing the rewriting unit is constructed by one or more data segments ((K3α) in FIG. 4) like this, there arises the effect of being capable of easily performing mixture recording processing of PC data (PC file) in which a small data amount is rewritten many times and AV data (AV file) in which a large amount of data is continuously recorded at one time.

Namely, as for the data used for a personal computer, a comparatively small amount of data is rewritten many times. Accordingly, if rewritable or recordable data unit is set to be as much as small, a recording method suitable for PC data is provided. In the embodiment of the present invention, 32 physical sectors constitute the ECC block as shown in FIG. 34C. Therefore, the data segment unit which includes only one ECC block by which rewriting or recording is performed is the minimum unit by which rewriting or recording is performed with high efficiency. Accordingly, the structure in this embodiment in which one or more data segments is included in the recording cluster expressing the rewriting unit or the recording unit is the recording structure suitable for the PC data (PC file).

In the AV (Audio Video) data, an extremely large amount of image information and sound information need to be continuously recorded without being cut halfway. In this case, continuously recorded data is recorded collectively as one recording cluster. At the time of recording AV data, random shift amount, the structure in the data segment, the attribute of the data segment and the like are switched for each data segment constructing one recording cluster, time for switching processing is taken, and continuous recording processing becomes difficult. In this embodiment, it is made possible to construct the recording cluster by continuously arranging the data segments of the same type (the attribute and the random shift amount are not changed, without interposing specific information between the data segments) as shown in FIG. 81. Therefore, not only the record format suitable for AV data recording for recording a large amount of data continuously can provided, but also the structure in the recording cluster is simplified, simplification of the recording control circuit and reproduction detection circuit is achieved, and reduction in price of the information recording and reproducing apparatus or the information reproducing apparatus is made possible.

The data structure in which the data segments continuously aligned in the recording cluster 540 shown in FIG. 81 (except for the extended guard field 528) has quite the same structure as the reproduction-only information storage medium shown in (b) in FIG. 64 and the recordable information storage medium shown in (c) in FIG. 64. All the information storage media have the common data structures irrespective of the reproduction-only type/recordable type/rewritable type like this, compatibility of the media is secured, a detection circuit of the information recording and reproducing apparatus or the information reproducing apparatus in which compatibility is secured can be shared. Thus, high reproducing reliability can be secured and reduction in cost can be realized.

By taking the structure in FIG. 81, the random shift amounts of all the data segments inevitably agree in the same recording cluster ((K3β) in FIG. 4). As will be described later, recording cluster is recorded by performing random shift in the rewritable information storage medium. In this embodiment, the random shift amounts of all the data segments agree in the same recording cluster 540. Therefore, when reproduction is performed across different data segments in the same recording cluster 540, synchronization (resetting of phase) in the VFO area (522 in FIG. 71) becomes unnecessary, and it becomes possible to simplify the reproduction detection circuit and secure high reliability in reproduction detection at the time of continuous reproduction.

Figure 82:
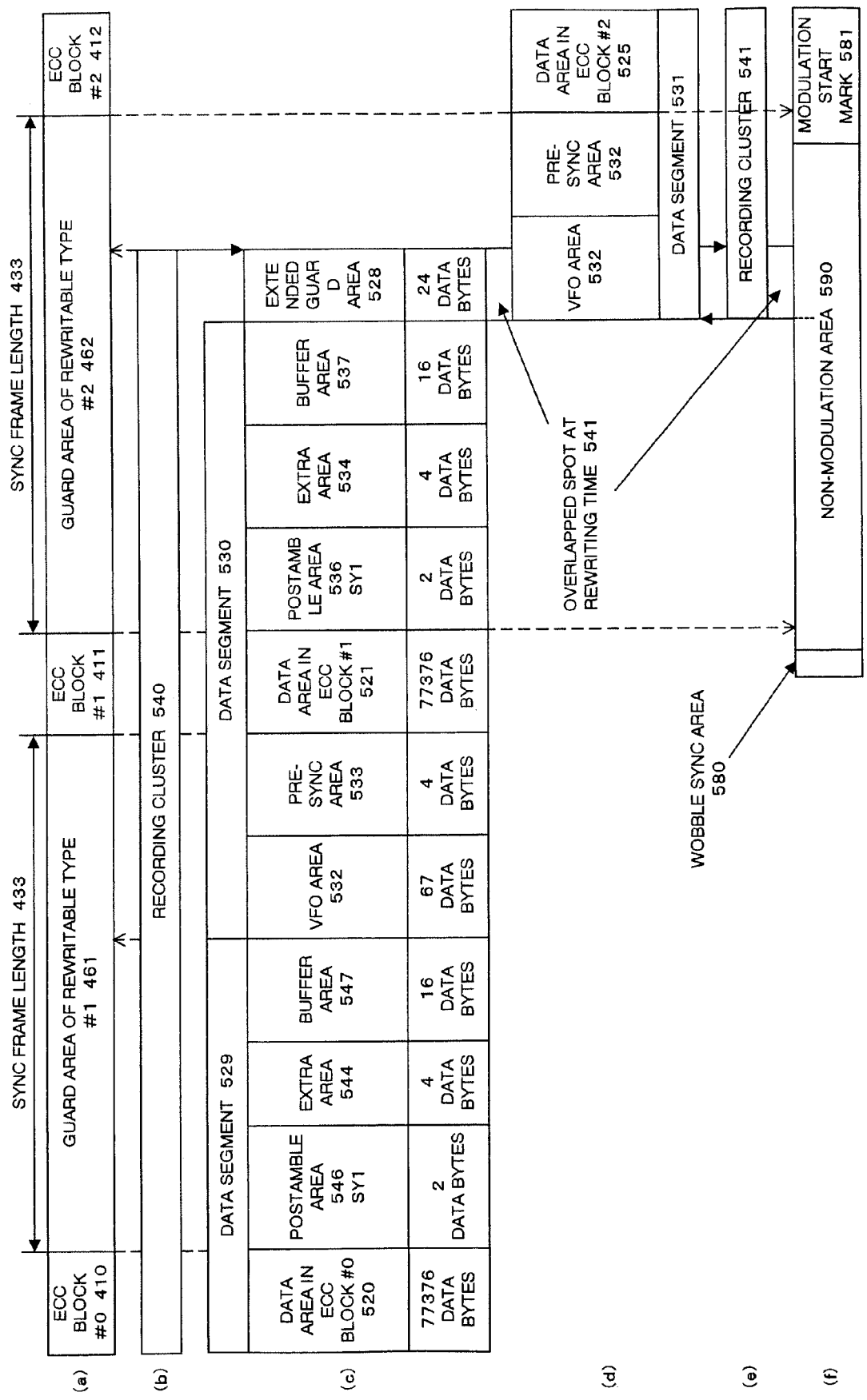
FIG. 82 is a data recording method explanatory view of a rewritable data recorded on the rewritable information storage medium.

A rewritable data recording method for recording in the rewritable information storage medium is shown in FIG. 82. The layout in the recording cluster in the rewritable information storage medium of this embodiment will be explained by using an example taking the layout in (a) in FIG. 81. However, in this embodiment, without being limited to this, the layout shown in (b) in FIG. 81 may be adopted in the rewritable information storage medium. (a) in FIG. 82 shows the same content as the aforementioned (d) in FIG. 64.

In this embodiment, rewriting concerning the rewritable data is performed in the unit of the recording clusters 540 and 541 shown in (b) and (e) in FIG. 82. One recording cluster is constructed by one or more the data segments 529 to 531, and the extended guard field 528 which is disposed at the end. Namely, the start position of one recording cluster 541 corresponds to the start position of the data segment 531, and starts from the VFO area 522. When a plurality of data segments 529 and 530 are continuously recorded, a plurality of data segments 529 and 530 are continuously disposed in the same recording cluster 540, and the buffer area 547 which exists at the end of the data segment 529 and the VFO area 532 which exits at the head of the next data segment are continuously connected, as shown in (b) and (c) in FIG. 82. Therefore, the phases of both of them (of recording reference clock at the time of recording) agree to each other.

When the continuous recording is finished, the extended guard area 528 is disposed at the end position of the recording cluster 540. The data size of this extension guard area 528 has the size of 24 data bytes as the data before modulation.

As known from the correspondence of (a) in FIG. 82 and (c) in FIG. 82, the postample areas 546 and 536, the extra areas 544 and 534, the buffer areas 547 and 537, the VFO areas 532 and 522, and the pre-sync areas 533 and 523 are included in the guard areas 461 and 462 of the rewritable type, and the extended guard field 528 is disposed only in the continuous record finishing place.

For comparison of the physical range of the rewritable unit, (c) in FIG. 82 shows a part of the recording cluster 540 which is the rewritable unit of the information, and (d) in FIG. 82 shows a part of the recording cluster 541 which is the unit to be rewritten next. The characteristic of the present invention lies in that rewrite is performed so that the extended guard area 528 and the VFO area 522 at the rear side partially overlap each other in the rewriting time overlapping spots 541 ((K3) in FIG. 4). Rewrite is performed by partially overlapping as described above, and thereby, a gap (area where record mark is not formed) between the recording clusters 540 and 541 is prevented from occurring. As a result, stable reproduction signal can be detected by removing the interlayer crosstalk in a recordable information storage medium of one side surface with two recording layers.

As is known from (a) in FIG. 71, rewritable data size in one data segment in the embodiment of the present invention is expressed by the following expression (2).

$$67+4+77376+2+4+16=77469 \text{ data bytes} \quad (2)$$

As is known from (c) and (d) in FIG. 71, one wobble data unit 560 is expressed by the following expression (3).

$$6+4+6+68=84 \text{ wobbles} \quad (3)$$

17 wobble data units constitute one physical segment 550, and the length of seven physical segments 550 to 556 corresponds to the length of one data segment 531. Therefore, the following (4) is disposed in the length of one data segment 531.

$$84 \times 17 \times 7 = 9996 \text{ wobbles} \quad (4)$$

Accordingly, the following expression (5) corresponds to one wobble from the expression (2) and the expression (4).

$$77496 \div 9996 = 7.75 \text{ data bytes/wobbles} \quad (5)$$

Figure 83:
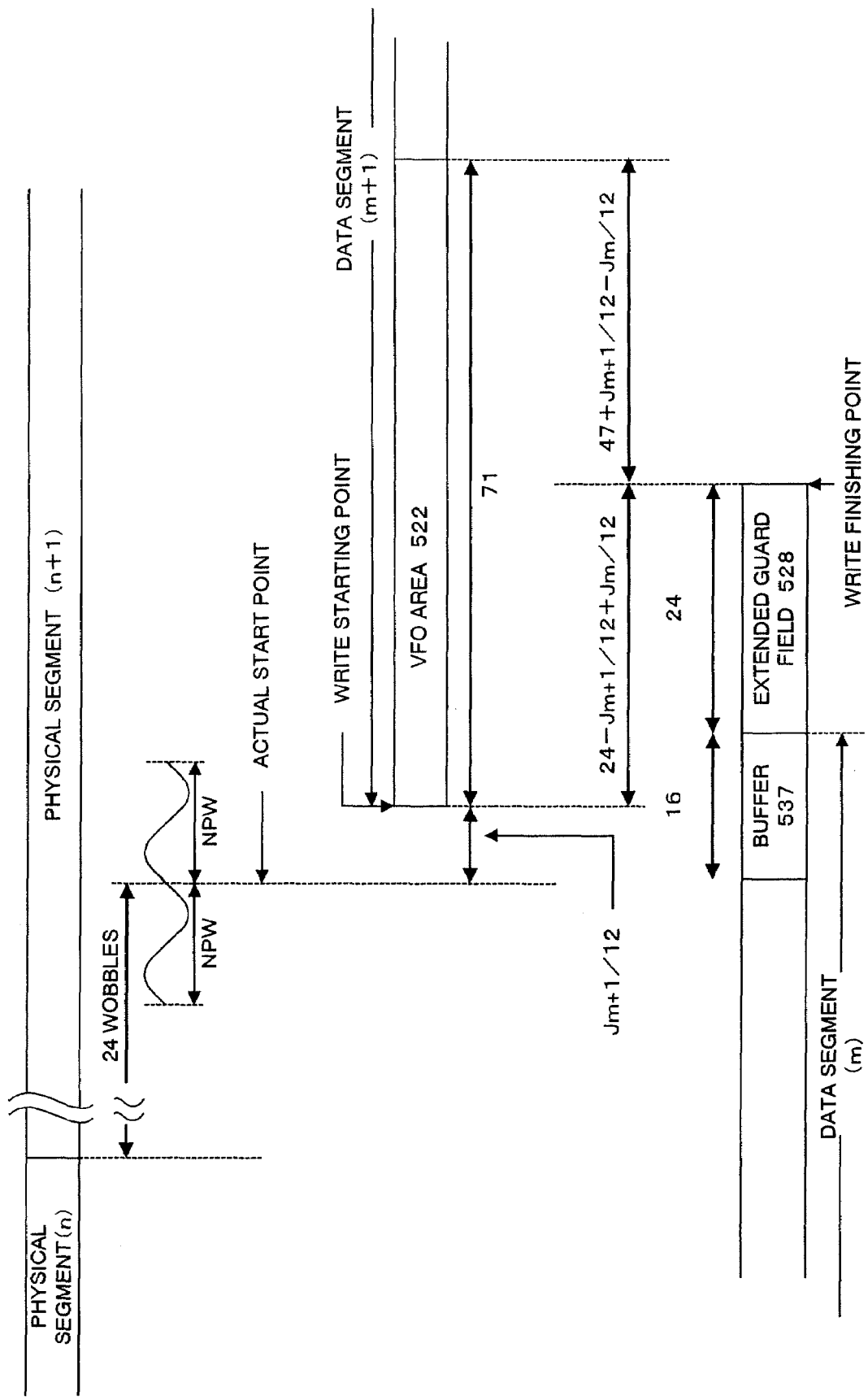
FIG. 83 is a data random shift explanatory view of the rewritable data recorded on the rewritable information storage medium.

As shown in FIG. 83, the overlapping portions of the next VFO area 522 and the extended guard field 528 after 24 wobbles from the head position of the physical segment. As is known from (d) in FIG. 71, the portion from the head of the physical segment 550 up to 16 wobbles is in the wobble sync area 580, and 68 wobbles thereinafter is the non-modulation area 590. Accordingly, the portion where the next VFO area 522 and the extended guard field 528 overlap each other after 24 wobbles is in the non-modulation area 590. By making the head position of the data segment come after 24 wobbles from the head position of the physical segment ((K5) in FIG. 4), not only the overlapping spot is in the non-modulation area 590, but also detection time of the wobble sync area 580 and the preparation time of the recording processing can be taken appropriately. Therefore, stable and highly accurate recording processing can be ensured.

The recording film of the rewritable information storage medium in this embodiment uses a phase change recording film. Since deterioration of the recording film starts in the vicinity of rewrite starting/finishing position in the phase change recording film, and therefore, if record start/record finish is repeated at the same position, the limitation of the number of rewrites due to deterioration of the recording film occurs. In order to reduce the above described problem, at the time of rewrite, as shown in FIG. 83, the record starting position is shifted by Jm+1/12 data bytes, and the record starting position is shifted at random in the embodiment of the present invention.

In (c) and (d) in FIG. 82, the head position of the extended guard field 528 and the head position of the VFO area 522 correspond to each other to explain the basic concept. However, strictly speaking, the head position of the VFO area 522 is shifted at random as in FIG. 83 in the embodiment of the present invention.

In the DVD-RAM disc which is a current rewritable information storage medium, the phase change recording film is used as a recording film, and the record start/finish position is shifted at random to increase the number of rewrites. The maximum shift amount range when random shift is made in the current DVD-RAM disc is set at 8 data bytes. The channel bit length in the current DVD-RAM disc (as the data after modulation to be recorded in the disc) is set at 0.143 μm on average.

In the rewritable information storage medium example of this embodiment, the average length of channel bit is expressed by expression (6) from FIG. 20.

$$(0.087+0.093) \div 2 = 0.090 \text{ μm} \quad (6)$$

When the length in the physical shift range is conformed to the current DVD-RAM disc, the minimum required length as the random shift range in the embodiment of the present invention is expressed by expression (7) by utilizing the above described value.

$$8 \text{ bytes} \times (0.143 \text{ μm} \div 0.090 \text{ μm}) = 12.7 \text{ bytes} \quad (7)$$

In order to secure easiness of the reproduction signal detection processing, unit of the random shift amount is conformed to the "channel bit" after modulation in this embodiment. In this embodiment, the ETM modulation (Eight to Twelve modulation), which converts 8 bits into 12 bits, is used for modulation, and therefore, as the mathematical expression for expressing the random shift amount, the random shift amount is expressed by expression (8) with the data byte as the reference.

$$Jm/12 \text{ data bytes} \quad (8)$$

As the value which Jm can take, Jm is from 0 to 152 from expression (9) using the value of the expression (7).

$$12.7 \times 12 = 152.4 \quad (9)$$

From the above reason, as long as the range satisfies the expression (9), the length of the range of the random shift corresponds to the current DVD-RAM disc, and the same number of rewrites as the current DVD-RAM disc can be ensured.

In the embodiment of the present invention, in order to secure the number of rewrites more than the current DVD-RAM, a little margin is given to the value of the expression (7), and the length of the random shift range is set as expression (10).

$$\text{The length of the random shift range is 14 data bytes} \quad (10)$$

When the value of the expression (10) is substituted into the expression (8), $14 \times 12 = 168$, and therefore, the value which Jm can take is set as in expression (11).

$$\text{The value which Jm can take is 0 to 167} \quad (11)$$

As described above, the random shift amount is in the larger range than Jm/12 ($0 \leq Jm \leq 154$) ((K4) in FIG. 4), and thereby, the expression (9) is satisfied. At this time, the length of the physical range with respect to the random shift amount agrees to the current DVD-RAM, and therefore, there exists the effect of being capable of ensuring the same number of times of repetitive recording as the current DVD-RAM.

In FIG. 82, the length of the buffer area 547 and the VFO area 532 is constant in the recording cluster 540. As is obvious from (a) in FIG. 81, random shift amounts Jm in all the data segments 529 and 530 have the same value everywhere in the same recording cluster 540.

When continuously recording one recording cluster 540 including a lot of data segments inside, the recording position is monitored from wobbles. Namely, the position detection of the wobble sync area 580 shown in FIG. 71 is performed, and verification of the recording position on the information storage medium is performed at the same time as the number of wobbles is counted in the non-modulation areas 590 and 591. At this time, wobble slip (recording in the position shifted by one wobble cycle) occurs due to count error of wobbles or rotational variation of a rotational motor (for example, Motor in FIG. 1) which rotates the information storage medium, and recording position on the information storage medium is deviated in some rare cases.

The information storage medium of the present invention has the characteristic in that when a recording position deviation which occurs as described above is detected, adjustment is performed in the guard area 461 of the rewritable type in FIG. 82 or in the guard area 452 of the recordable type shown in FIG. 64, and correction of the recording timing is performed ((K3) in FIG. 3). In FIG. 82, important information which cannot allow bit omission and bit overlapping is recorded in the postamble area 546, the extra area 544 and the pre-sync area 533, but a specific pattern is repeated in the buffer area 547 and the VFO area 532. Therefore, as long as the repetition border position is secured, omission and overlapping of only one pattern are allowed. Accordingly, in this embodiment, adjustment is performed especially in the buffer area 547 and the VFO area 532 in the guard area 461, and correction of recording timing is performed.

As shown in FIG. 83, in this embodiment, the actual start point position to be the reference of the position setting is set to correspond to the position of the wobble amplitude of "0" (center of wobble). However, since wobble position detection accuracy is low, the actual start point position allows the following at the maximum the deviation amount up to "±1 data byte" (12)

as described as "±1 max" in FIG. 83 in this embodiment.

In FIG. 82 and FIG. 83, the random shift amount in the data segment 530 is set as Jm (the random shift amounts of all data segments 529 agree in the recording clusters 540 as described above), and the random shift amount of the data segment 531 written thereafter is set as Jm+1. As the values which Jm and Jm+1 shown in expression (11) can take, for example, a median value is taken with Jm=Jm+1=84, and when the position accuracy of the actual start point is sufficiently high, the start position of the extended guard field 528 and the start position of the VFO area 522 agree to each other as shown in FIG. 82.

On the other hand, when the data segment 530 is recorded at the rearmost possible position, and thereafter, the data segment 531 which can be recorded or rewritten is recorded at the foremost possible position, the head position of the VFO area 522 sometimes enters the buffer area 537 by 15 data bytes at the maximum from the value shown in the expression (10) and the value in the expression (12). Specific important information is recorded in the extra area 534 immediately before the buffer area 537.

Accordingly, in this embodiment, it is necessary to satisfy the following (13).

The length of the buffer area 537 is 15 data bytes or more (13).

In the example shown in FIG. 82, a margin of one data byte is taken into consideration, and the data size of the buffer area 537 is set to be 16 data bytes.

When a gap occurs between the extended guard area 528 and the VFO area 522 as a result of random shift, interlayer crosstalk at the time of reproduction due to the gap occurs when the structure of the one side surface with two recording layers is adopted. Therefore, the contrivance is made so that even if random shift is performed, the extended guard field 528 and a part of the VFO area 522 always overlap, and the gap does not occur ((K3) in FIG. 4). Accordingly, in this embodiment, the length of the extended guard field 528 needs to be set at 15 data bytes or more from the same reason based on the expression (13).

The succeeding VFO area 522 is sufficiently taken to be as long as 71 data bytes, and therefore, no problem occurs in signal reproduction even if the overlapping area of the extended guard field 528 and the VFO area 522 become large to some extent (because the time for synchronizing the reproducing reference clock is sufficiently secured in the VFO area 522 which does not overlap).

Therefore, it is possible to set the extended guard field 528 at a larger value than 15 data bytes.

It is already described that in rare occasions, wobble slip occurs at the continuous recording time, and the recording position of 1 wobble cycle is deviated. As shown in the expression (5), 1 wobble cycle corresponds to 7.75 (≠8) data bytes, and therefore, in this embodiment, considering the expression (13) and this value, setting is made as in expression (14).

The length of the extended guard field 528 is
(15+8=) 23 data bytes or more (14)

In the example shown in FIG. 82, the margin of 1 data byte is added as the buffer area 537, the length of the extended guard field 528 is set at 24 data bytes.

In (e) in FIG. 82, it is necessary to accurately set the record starting position of the recording cluster 541. In the information recording and reproducing apparatus of this embodiment, this record starting position is detected by using the wobble signal previously recorded in the rewritable or recordable information storage medium.

As is known from (d) in FIG. 71, the pattern changes from NPW to IPW in 4-wobble unit in all except for the wobble sync area 580. As compared with this, in the wobble sync area 580, the switching unit of wobbles is partially shifted from 4 wobbles. Therefore, the position detection is the most easily performed in the wobble sync area 580. Therefore, in the information recording and reproducing apparatus of this embodiment, after the position of the wobble sync area 580 is detected, preparation of recording processing is performed, and record is started.

Therefore, the start position of the recording cluster 541 needs to be in the non-modulation area 590 immediately after the wobble sync area 580. The content is shown in FIG. 83. The wobble sync area 580 is disposed immediately after the change of the physical segment. As shown in (d) in FIG. 71, the length of the wobble sync area 580 corresponds to 16 wobble cycles. After detection of the wobble synch area 580, 8 wobble cycles are further necessary in expectation of a margin for preparation of recoding processing. Accordingly, as shown in FIG. 83, it is necessary to dispose the head position of the VFO area 522 existing at the head position of the recording cluster 541 at the position 24 wobbles or more back from the change position of the physical segment.

As shown in FIG. 82, recording processing is performed many times at the overlapping spot 541 at the rewriting time. When rewrite is repeated, the physical shape of a wobble groove or a wobble land changes (deteriorates), and the quality of the wobble reproduction signal from it is lowered. In the embodiment of the present invention, it is contrived that the overlapping spots 541 are recorded in the non-modulation area 590 by avoiding the overlapping spots 541 at the time of rewrite or at the time of record coming into the wobble sync area 580 and the wobble address area 586 ((3KϚ) in FIG. 4). In the non-modulation area 590, the constant wobble pattern (NPW) is only repeated, and even if the wobble reproduction signal quality is partially deteriorated, it can be interpolated by utilizing the wobble reproduction signals before and after it. In this manner, the position of the overlapping spot 541 at the time of rewrite or at the time of record is set to come into the non-modulation area 590. Therefore, deterioration of the wobble reproduction signal quality due to the shape deterioration of the wobble sync area 580 or the wobble address area 586 is prevented, and the effect of being capable of ensuring a stable wobble detection signal from the wobble address information 610 is provided.

Figure 84:
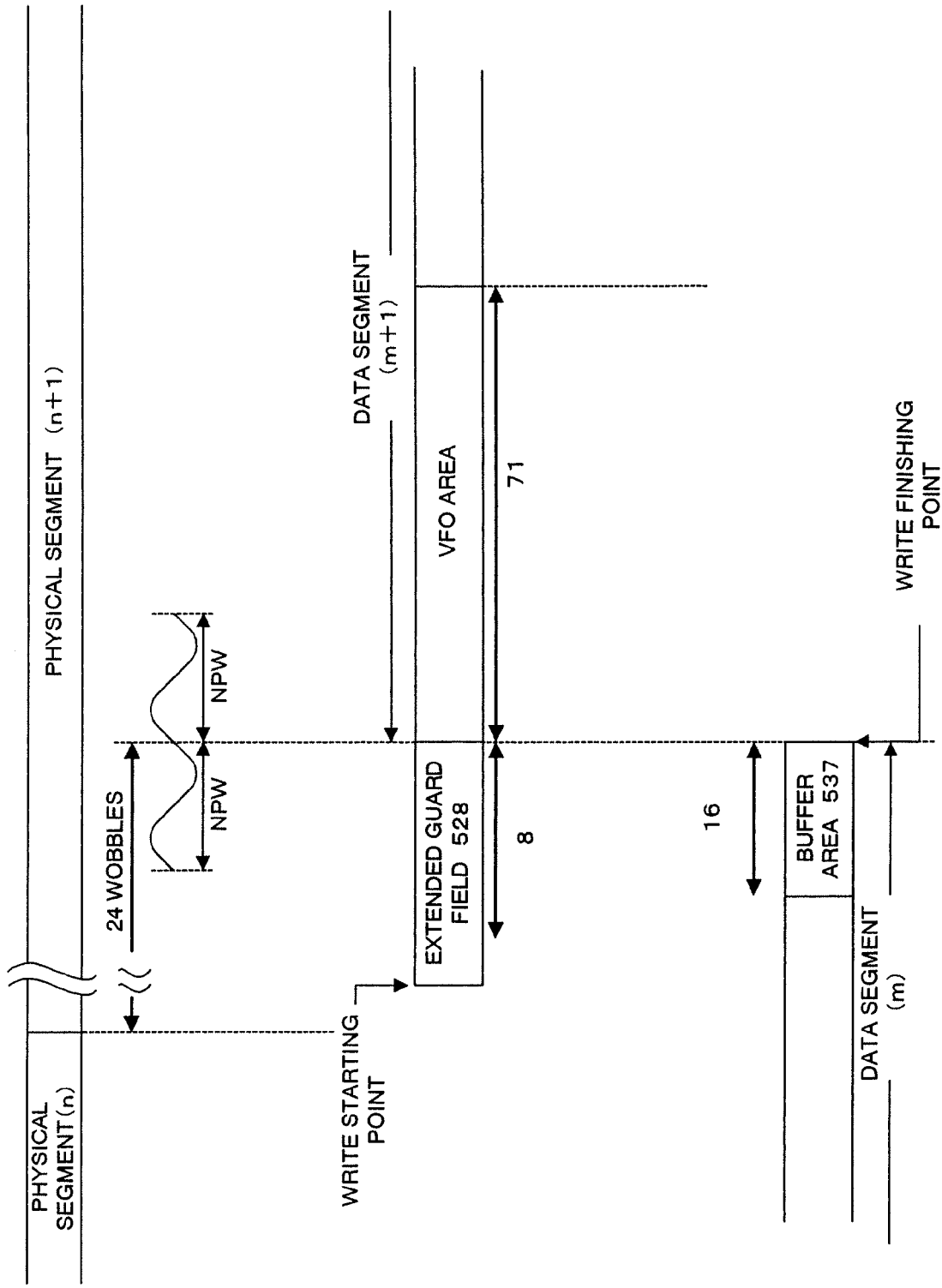
FIG. 84 is an explanatory view of a recording method of a recordable data recorded on the recordable information storage medium.

Next, an example of recording method of recordable data which is recorded on the recordable information storage medium is shown in FIG. 84. In this embodiment, the method in (b) in FIG. 81 is adopted for the layout in the recording cluster, but the layout is not limited to this, and (a) in FIG. 81 may be adopted. In the recordable information storage medium, only one recording is performed, and therefore, the random shift explained above is not needed. In the recordable information storage medium, the head position of the data segment is set to come to the position 24 wobbles back from the head position of the physical segment as shown in FIG. 83 ((K5) in FIG. 4), so that the overwriting place is in the non-modulation area of wobble.

Figure 85:
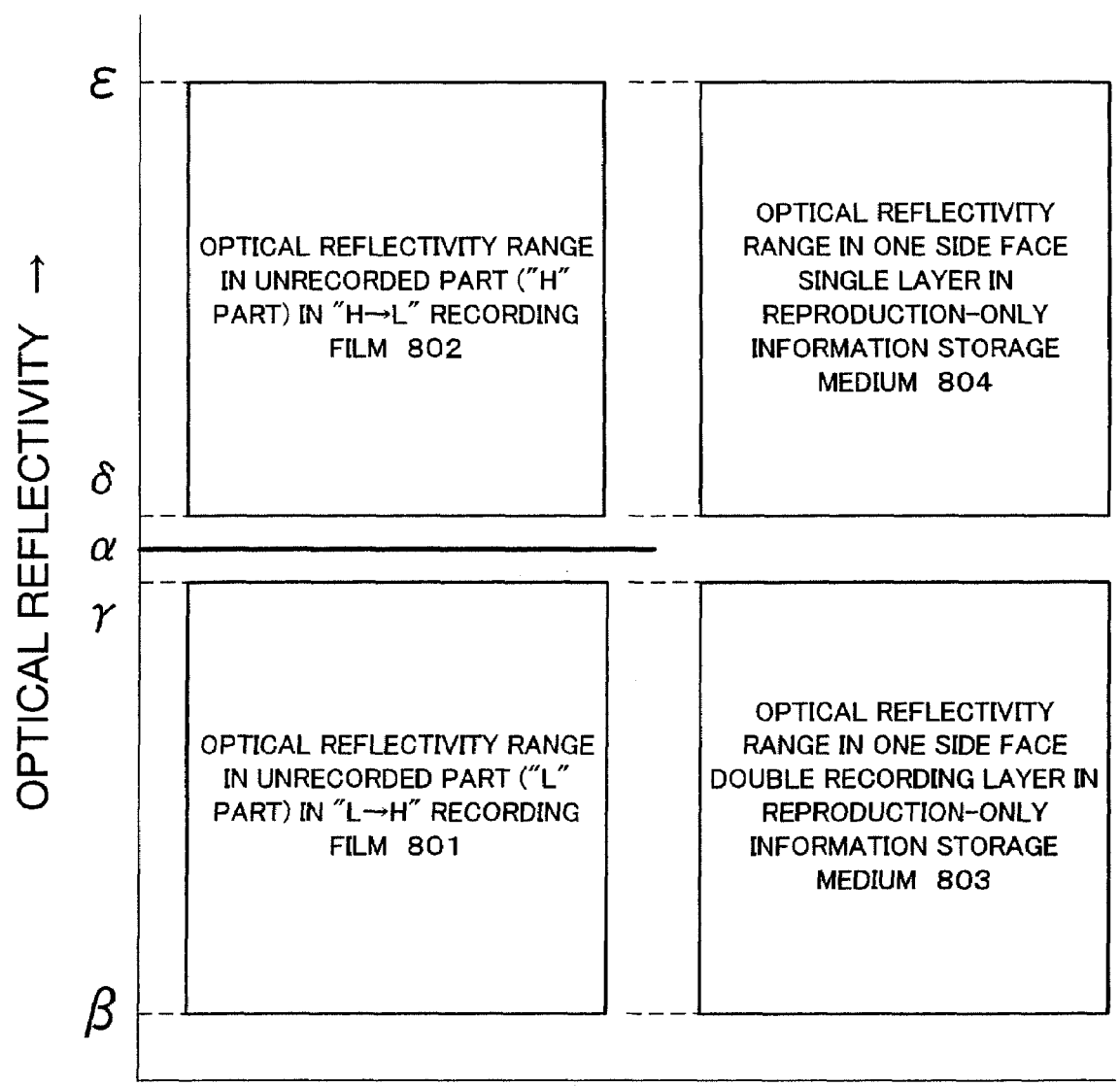
FIG. 85 is an explanatory view concerting a reflectivity of an unrecorded part in an "H→L" recording film and an "L→H" recording film.

As already explained in "recording mark polarity (identification of H→L or L→H) information" at the 192nd byte in FIG. 28, use of both of "H→L recording film" and "L→H recording film" is allowed in this embodiment. The optical reflectivity ranges of the "H→L recording film" and "L→H recording film" specified in this embodiment are shown in FIG. 85. This embodiment has the characteristic in that the reflectivity lower limit value in the unrecorded part of the "H→L recording film" is specified to be higher than the upper limit value in the unrecorded part of the "L→H recording film" ([M] in FIG. 4). When the above described information storage medium is attached to the information recording and reproducing apparatus or the information reproducing apparatus, the optical reflectivity of the unrecorded part is measured by the slice level detection unit 132 or the PR equalizing circuit 130 in FIG. 5, and determination of whether it is the "H→L recording film" or the "L→H recording film" can be made instantly, thus extremely facilitating determination of kinds of recording films.

As a result of measuring the "H→L recording film" and "L→H recording film" made by changing many manufacturing conditions, it is found out that manufacturability of the recording film is enhanced and reduction in cost of the media is facilitated if the optical reflectivity α between the reflectivity lower limit value at the unrecorded part of the "H→L recording film" and the upper limit value at the unrecorded part of the "L→H recording film" is set at 36% ((M1) in FIG. 4). Favorable compatibility with the reproduction-only information storage medium is obtained when the optical reflectivity range 801 of the unrecorded part ("L" part) of the "L→H recording film" is conformed to the optical reflectivity range 803 of the one side surface double recording layer in the reproduction-only information storage medium ((M3) in FIG. 4), and the optical reflectivity range 802 of the unrecorded part ("H" part) of the "H→L recording film" is conformed to the optical reflectivity range 804 of the one side surface single layer in the reproduction-only information storage medium ((M2) in FIG. 4). As a result, the reproduction circuit of the information reproducing apparatus can be used in common, and therefore, the information reproducing apparatus can be made at low cost.

As a result of measuring the "H→L recording film" and "L→H recording film" made by changing many manufacturing conditions, the lower limit value β of the optical reflectivity of the unrecorded part ("L" part) of the "L→H recording film" is set at 18% and its upper limit value γ is set at 32%, and the lower limit value δ of the optical reflectivity of the unrecorded part ("H" part) of the "H→L recording film" is set at 40% and its upper limit value ε is set at 70% in this embodiment in order to enhance manufacturability of the recording film and facilitate reduction in cost of the medium.

In the above embodiment, the following effects can be provided.

With the management data structure applicable to "recordable information storage medium" which can record only once, the size of the extendable test area and the size of the extendable spare area are optionally settable. Therefore, the sizes of the extended test area and the spare area can be set to the minimum necessary values. As a result, the recordable area size can be left as large as possible, and therefore, substantial capacity reduction can be stopped to a minimum.

The recordable range information is simultaneously recorded in the record management information RMD which is necessary to be reproduced without fail before recording. Therefore, the information of the recordable range can be obtained at high speed as the information recording and reproducing apparatus, and thus the size (remaining amount) of the recordable area can be known. Accordingly, to record all image information in the time range programmed to be recorded, for example, the bit rate at the time of recording is controlled, whereby it is possible to ensure recording for a user.

OTHER EMBODIMENTS

The embodiments of the present invention are not limited to the above described embodiment, but are extendable and changeable, and extended and modified embodiments are included in the technical range of the present invention.

What is claimed is:

1. An information recording medium, comprising:
wobble information represented by phase modulation of a pre-groove on the information recording medium by using a normal phase wobble and an invert phase wobble defined respectively by wobbles which start moving toward an outside and an inside of the information recording medium, the wobble information including a wobble sync, address information, and a CRC code related to a part of the address information, the wobble sync being constructed by a combination of six invert phase wobbles, four normal phase wobbles, and six invert phase wobbles, one bit of the address information being constructed by four wobbles, the address information having a physical segment block address corresponding to a physical segment block and physical segment sequence information corresponding to a physical segment, and the physical segment block being divided into seven physical segments.

2. An information reproducing method, comprising:
reproducing wobble information represented by phase modulation of a pre-groove on an information recording medium by using a normal phase wobble and an invert phase wobble defined respectively by wobbles which start moving toward an outside and an inside of the information recording medium, the wobble information including a wobble sync, address information, and a CRC code related to a part of the address information, the wobble sync being constructed by a combination of six invert phase wobbles, four normal phase wobbles, and six invert phase wobbles, one bit of the address information being constructed by four wobbles, the address information having a physical segment block address corresponding to a physical segment block and physical segment sequence information corresponding to a physical segment, and the physical segment block being divided into seven physical segments.

3. An information recording method, comprising:

recording information in an information recording medium comprising wobble information represented by phase modulation of a pre-groove on the information recording medium by using a normal phase wobble and an invert phase wobble defined respectively by wobbles which start moving toward an outside and an inside of the information recording medium, the wobble information including a wobble sync, address information, and a CRC code related to a part of the address information, the wobble sync being constructed by a combination of six invert phase wobbles, four normal phase wobbles, and six invert phase wobbles, one bit of the address information being constructed by four wobbles, the address information having a physical segment block address corresponding to a physical segment block and physical segment sequence information corresponding to a physical segment, and the physical segment block being divided into seven physical segments.

4. An information reproducing apparatus, comprising:

a reproducing unit to reproduce wobble information represented by phase modulation of a pre-groove on an information recording medium by using a normal phase wobble and an invert phase wobble defined respectively by wobbles which start moving toward an outside and an inside of the information recording medium, the wobble information including a wobble sync, address information, and a CRC code related to a part of the address information, the wobble sync being constructed by a combination of six invert phase wobbles, four normal phase wobbles, and six invert phase wobbles, one bit of the address information being constructed by four wobbles, the address information having a physical segment block address corresponding to a physical segment block and physical segment sequence information corresponding to a physical segment, and the physical segment block being divided into seven physical segments.

5. An information recording apparatus, comprising:

a recording unit to record information in an information recording medium comprising wobble information represented by phase modulation of a pre-groove on the information recording medium by using a normal phase wobble and an invert phase wobble defined respectively by wobbles which start moving toward an outside and an inside of the information recording medium, the wobble information including a wobble sync, address information, and a CRC code related to a part of the address information, the wobble sync being constructed by a combination of six invert phase wobbles, four normal phase wobbles, and six invert phase wobbles, one bit of the address information being constructed by four wobbles, the address information having a physical segment block address corresponding to a physical segment block and physical segment sequence information corresponding to a physical segment, and the physical segment block being divided into seven physical segments.

* * * * *